United States Patent
Phillips

(10) Patent No.: US 9,644,601 B2
(45) Date of Patent: May 9, 2017

(54) LINEAR FARADAY INDUCTION GENERATOR FOR THE GENERATION OF ELECTRICAL POWER FROM OCEAN WAVE KINETIC ENERGY AND ARRANGEMENTS THEREOF

(71) Applicant: Reed E. Phillips, Glen Cove, NY (US)

(72) Inventor: Reed E. Phillips, Glen Cove, NY (US)

(73) Assignee: ENERGYSTICS, LTD., Glen Cove, NY (US)

( * ) Notice: Subject to any disclaimer, the term of this patent is extended or adjusted under 35 U.S.C. 154(b) by 0 days.

(21) Appl. No.: 14/861,344

(22) Filed: Sep. 22, 2015

(65) Prior Publication Data

US 2016/0010619 A1 Jan. 14, 2016

Related U.S. Application Data

(60) Continuation of application No. 14/611,713, filed on Feb. 2, 2015, which is a continuation of application No. 14/141,723, filed on Dec. 27, 2013, now Pat. No. 8,946,920, which is a division of application No. 13/662,630, filed on Oct. 29, 2012, now Pat. No. 8,629,572.

(51) Int. Cl.
*H02K 35/00* (2006.01)
*F03B 13/16* (2006.01)
*H02K 7/18* (2006.01)
*F03B 13/18* (2006.01)
*H02K 35/02* (2006.01)
*H01F 7/02* (2006.01)
*H02M 7/06* (2006.01)

(52) U.S. Cl.
CPC ............ *F03B 13/16* (2013.01); *F03B 13/188* (2013.01); *F03B 13/1855* (2013.01); *H01F 7/0273* (2013.01); *H02K 7/1876* (2013.01); *H02K 35/00* (2013.01); *H02K 35/02* (2013.01); *H02M 7/064* (2013.01); *H02M 7/066* (2013.01); *F05B 2220/707* (2013.01); *F05B 2240/40* (2013.01); *H02K 2203/00* (2013.01); *Y02E 10/38* (2013.01)

(58) Field of Classification Search
CPC .... F03B 13/16; F03B 13/1855; F03B 13/188; F05B 2220/707; F05B 2240/40; H01F 7/0273; H02K 2203/00; H02K 35/00; H02K 35/02; H02K 7/1876; H02M 7/064; H02M 7/066; Y02E 10/38
See application file for complete search history.

(56) References Cited

U.S. PATENT DOCUMENTS

| 3,362,336 A | * 1/1968 | Kafka ..................... B63B 13/00 114/183 R |
| 3,995,160 A | 11/1976 | Zener et al. |
| 4,009,396 A | 2/1977 | Mattera et al. |

(Continued)

*Primary Examiner* — Tulsidas C Patel
*Assistant Examiner* — S. Mikailoff
(74) *Attorney, Agent, or Firm* — Tutunjian & Bitetto, P.C.

(57) ABSTRACT

A linear generator includes a permanent magnet array having at least two magnets arranged end-to-end. A set of conductive coils is arranged around the permanent magnet array. A four-phase full wave rectifier is configured to accept alternating current inputs from the set of conductive coils and to produce one or more direct current outputs. A summing circuit is configured to aggregate the one or more direct current outputs from the rectifier to produce a combined, rectified direct current output.

20 Claims, 30 Drawing Sheets

(56) References Cited

U.S. PATENT DOCUMENTS

| | | | |
|---|---|---|---|
| 4,047,098 A | 9/1977 | Duroux | |
| 4,062,189 A | 12/1977 | Mager et al. | |
| 4,087,975 A | 5/1978 | Owens | |
| 4,110,628 A | 8/1978 | Paull et al. | |
| 4,166,222 A | 8/1979 | Hanley | |
| 4,189,924 A | 2/1980 | LaCoste | |
| 4,204,406 A | 5/1980 | Hopfe | |
| 4,219,303 A | 8/1980 | Mouton, Jr. et al. | |
| 4,232,230 A * | 11/1980 | Ames | F03B 13/1895 290/53 |
| 4,268,757 A | 5/1981 | Rogers | |
| 4,281,257 A | 7/1981 | Testa et al. | |
| 4,284,901 A | 8/1981 | Giguere | |
| 4,302,682 A | 11/1981 | LaCoste | |
| 4,334,873 A | 6/1982 | Connell | |
| 4,359,868 A | 11/1982 | Slonim | |
| 4,379,388 A | 4/1983 | Williamson et al. | |
| 4,398,362 A | 8/1983 | Weinert | |
| 4,441,321 A | 4/1984 | Ridgway | |
| 4,468,568 A | 8/1984 | Carr, Jr. et al. | |
| 4,541,246 A | 9/1985 | Chang | |
| 4,630,440 A | 12/1986 | Meyerand | |
| 4,703,626 A | 11/1987 | Jensen | |
| 4,719,158 A | 1/1988 | Salomon | |
| 4,748,338 A | 5/1988 | Boyce | |
| 4,781,029 A | 11/1988 | SerVaas | |
| 5,056,447 A | 10/1991 | Labrador | |
| 5,347,186 A * | 9/1994 | Konotchick | H02K 7/1876 310/17 |
| 5,434,549 A * | 7/1995 | Hirabayashi | H02K 33/00 335/229 |
| 5,440,176 A | 8/1995 | Haining | |
| 5,512,795 A | 4/1996 | Epstein et al. | |
| 5,548,177 A | 8/1996 | Carroll | |
| 5,552,656 A | 9/1996 | Taylor | |
| 5,552,657 A | 9/1996 | Epstein et al. | |
| 5,578,889 A | 11/1996 | Epstein | |
| 5,582,691 A | 12/1996 | Flynn et al. | |
| 5,621,264 A | 4/1997 | Epstein et al. | |
| 5,789,826 A | 8/1998 | Kumbatovic | |
| 5,814,921 A | 9/1998 | Carroll | |
| 5,844,340 A * | 12/1998 | Noda | F15B 15/086 310/103 |
| 6,000,880 A | 12/1999 | Halus | |
| 6,040,642 A * | 3/2000 | Ishiyama | H02K 41/031 310/12.24 |
| 6,109,863 A | 8/2000 | Milliken | |
| 6,133,644 A | 10/2000 | Smith et al. | |
| 6,153,944 A | 11/2000 | Clark | |
| 6,201,336 B1 | 3/2001 | Burns | |
| 6,229,225 B1 | 5/2001 | Carroll | |
| 6,291,904 B1 | 9/2001 | Carroll | |
| 6,300,689 B1 | 10/2001 | Smalser | |
| 6,376,968 B1 | 4/2002 | Taylor et al. | |
| 6,406,219 B1 | 6/2002 | Nove | |
| 6,424,079 B1 | 7/2002 | Carroll | |
| 6,522,048 B1 | 2/2003 | Burns et al. | |
| 6,528,928 B1 | 3/2003 | Burns et al. | |
| 6,531,788 B2 | 3/2003 | Robson | |
| 6,574,957 B2 | 6/2003 | Brumfield | |
| 6,617,705 B1 | 9/2003 | Smalser et al. | |
| 6,666,024 B1 | 12/2003 | Moskal | |
| 6,711,897 B2 | 3/2004 | Lee | |
| 6,731,019 B2 | 5/2004 | Burns et al. | |
| 6,756,695 B2 | 6/2004 | Hibbs et al. | |
| 6,768,216 B1 | 7/2004 | Carroll et al. | |
| 6,768,217 B2 | 7/2004 | Chalmers et al. | |
| 6,772,592 B2 | 8/2004 | Gerber et al. | |
| 6,800,966 B2 * | 10/2004 | Godkin | H02K 41/031 310/12.25 |
| 6,812,588 B1 | 11/2004 | Zadig | |
| 6,863,028 B2 | 3/2005 | Sherman | |
| 6,933,623 B2 | 8/2005 | Carroll et al. | |
| 6,952,060 B2 * | 10/2005 | Goldner | B60G 17/0157 310/12.13 |
| 6,955,049 B2 | 10/2005 | Krouse | |
| 7,043,904 B2 | 5/2006 | Newman | |
| 7,140,180 B2 | 11/2006 | Gerber et al. | |
| 7,141,888 B2 | 11/2006 | Sabol et al. | |
| 7,168,532 B2 | 1/2007 | Stewart et al. | |
| 7,178,337 B2 | 2/2007 | Pflanz | |
| 7,224,077 B2 | 5/2007 | Allen | |
| 7,250,697 B2 * | 7/2007 | Beaulieu | B60G 13/14 310/12.12 |
| 7,279,803 B1 | 10/2007 | Bosley | |
| 7,291,936 B1 | 11/2007 | Robson | |
| 7,298,054 B2 * | 11/2007 | Hirsch | F03B 13/1845 290/42 |
| 7,305,823 B2 | 12/2007 | Stewart et al. | |
| 7,310,944 B2 | 12/2007 | Sabol et al. | |
| 7,323,790 B2 * | 1/2008 | Taylor | F03B 13/1895 290/42 |
| 7,348,764 B2 * | 3/2008 | Stewart | H02P 9/48 322/24 |
| 7,352,073 B2 | 4/2008 | Ames | |
| 7,362,003 B2 * | 4/2008 | Stewart | F03B 13/1845 290/42 |
| 7,375,436 B1 * | 5/2008 | Goldin | F03B 13/14 290/1 R |
| 7,385,301 B2 * | 6/2008 | Hirsch | F03B 13/1845 290/42 |
| 7,393,413 B2 * | 7/2008 | Kido | H01L 51/0004 118/300 |
| 7,397,152 B2 * | 7/2008 | Stewart | H02K 7/1876 310/12.22 |
| 7,420,004 B2 | 9/2008 | Hardy et al. | |
| 7,420,287 B2 * | 9/2008 | Smushkovich | F03B 13/1845 290/42 |
| 7,443,046 B2 | 10/2008 | Stewart et al. | |
| 7,453,165 B2 | 11/2008 | Hench | |
| 7,476,137 B2 | 1/2009 | Stewart et al. | |
| 7,594,780 B2 | 9/2009 | Bull | |
| 7,629,704 B2 | 12/2009 | Hench | |
| 7,658,067 B2 | 2/2010 | Gerber | |
| 7,728,454 B1 | 6/2010 | Anderson, Jr. | |
| 7,737,569 B2 | 6/2010 | Hench | |
| 7,781,903 B2 | 8/2010 | Buffard et al. | |
| 7,816,797 B2 | 10/2010 | Nair | |
| 7,841,177 B1 | 11/2010 | Detwiler | |
| 7,877,994 B2 | 2/2011 | Bull et al. | |
| 7,878,734 B2 | 2/2011 | Bull et al. | |
| 7,886,680 B2 | 2/2011 | Draper | |
| 7,911,074 B2 | 3/2011 | Anderson | |
| 7,938,622 B2 | 5/2011 | Anderson, Jr. | |
| 7,946,113 B1 | 5/2011 | Bishop | |
| 7,948,101 B2 | 5/2011 | Burtch | |
| 7,964,977 B2 | 6/2011 | Nair | |
| 7,965,980 B2 | 6/2011 | Troutman | |
| 7,980,832 B2 | 7/2011 | Ahdoot | |
| 8,004,104 B2 | 8/2011 | Hench | |
| 8,093,766 B2 | 1/2012 | Hoshi | |
| 8,803,346 B2 * | 8/2014 | Pitre | F03B 13/186 290/42 |
| 8,941,251 B2 * | 1/2015 | Zuo | B60G 17/06 290/1 R |
| 8,963,380 B2 * | 2/2015 | Fullerton | H02K 21/24 310/12.12 |
| 9,252,649 B2 * | 2/2016 | Kakiuchi | F16F 6/00 |
| 9,257,891 B2 * | 2/2016 | Kawarai | H02K 35/02 |
| 2002/0079997 A1 * | 6/2002 | Godkin | H01F 7/066 335/220 |
| 2002/0158472 A1 | 10/2002 | Robson | |
| 2002/0162326 A1 | 11/2002 | Brumfield | |
| 2003/0034697 A1 * | 2/2003 | Goldner | B60G 17/0157 310/17 |
| 2003/0110767 A1 | 6/2003 | Lee | |
| 2003/0155827 A1 * | 8/2003 | Cheung | F16C 33/1035 310/90.5 |
| 2003/0193197 A1 | 10/2003 | Hibbs et al. | |
| 2003/0197433 A1 * | 10/2003 | Cheung | H02K 35/02 310/14 |

(56) References Cited

U.S. PATENT DOCUMENTS

| | | | |
|---|---|---|---|
| 2003/0234585 A1* | 12/2003 | Tu | H01F 7/021 310/12.12 |
| 2004/0022584 A1 | 2/2004 | Sherman | |
| 2004/0108730 A1 | 6/2004 | Walsh | |
| 2004/0250537 A1 | 12/2004 | Krouse | |
| 2005/0047872 A1 | 3/2005 | Baugh | |
| 2005/0084333 A1 | 4/2005 | Zadig | |
| 2005/0121917 A1 | 6/2005 | Kikuchi | |
| 2005/0132699 A1 | 6/2005 | Newman | |
| 2005/0193728 A1 | 9/2005 | Newman | |
| 2005/0206247 A1* | 9/2005 | Stewart | H02K 7/1876 310/12.22 |
| 2005/0218728 A1* | 10/2005 | Stewart | F03B 13/1845 310/12.12 |
| 2005/0225181 A1* | 10/2005 | Tu | H01F 7/021 310/12.12 |
| 2005/0231044 A1* | 10/2005 | Tu | H01F 7/021 310/12.12 |
| 2005/0232833 A1 | 10/2005 | Hardy et al. | |
| 2005/0236843 A1 | 10/2005 | Roddier et al. | |
| 2005/0248162 A1 | 11/2005 | Krouse | |
| 2005/0285402 A1 | 12/2005 | Ames | |
| 2006/0137349 A1 | 6/2006 | Pflanz | |
| 2006/0180231 A1 | 8/2006 | Harland et al. | |
| 2006/0208579 A1* | 9/2006 | Hohberger | H02K 7/1853 310/12.12 |
| 2006/0208839 A1 | 9/2006 | Taylor et al. | |
| 2007/0089682 A1 | 4/2007 | Mariansky | |
| 2007/0108774 A1 | 5/2007 | Estes | |
| 2007/0131284 A1 | 6/2007 | Montgomery | |
| 2007/0228736 A1* | 10/2007 | Smushkovich | F03B 13/1845 290/42 |
| 2007/0228737 A1* | 10/2007 | Hirsch | F03B 13/1845 290/42 |
| 2007/0257492 A1 | 11/2007 | Robson | |
| 2007/0258771 A1 | 11/2007 | Weldon | |
| 2008/0001578 A1* | 1/2008 | Cap | H02K 7/1853 322/3 |
| 2008/0074083 A1* | 3/2008 | Yarger | H01M 6/5033 320/137 |
| 2008/0084121 A1* | 4/2008 | Kelly | H02K 7/1876 310/12.12 |
| 2008/0093858 A1 | 4/2008 | Hench | |
| 2008/0231053 A1 | 9/2008 | Burtch | |
| 2008/0250791 A1 | 10/2008 | Fromson | |
| 2008/0260548 A1 | 10/2008 | Ahdoot | |
| 2008/0265582 A1 | 10/2008 | Hench | |
| 2008/0309088 A1 | 12/2008 | Agamloh et al. | |
| 2009/0026767 A1 | 1/2009 | Petrounevitch | |
| 2009/0121486 A1 | 5/2009 | Ganley | |
| 2009/0127856 A1 | 5/2009 | Hench | |
| 2009/0140524 A1 | 6/2009 | Kejha | |
| 2009/0206609 A1 | 8/2009 | Wood | |
| 2009/0230786 A1* | 9/2009 | Liu | H02K 35/02 310/15 |
| 2009/0251258 A1* | 10/2009 | Rhinefrank | F03B 13/20 335/306 |
| 2009/0261593 A1 | 10/2009 | Culjak | |
| 2009/0289509 A1* | 11/2009 | Hoshi | H02K 41/03 310/12.33 |
| 2009/0295520 A1* | 12/2009 | Yarger | H01F 7/1615 335/306 |
| 2010/0025999 A1 | 2/2010 | Kim et al. | |
| 2010/0032946 A1* | 2/2010 | Begley | H02K 35/02 290/3 |
| 2010/0052327 A1 | 3/2010 | Moreland | |
| 2010/0059999 A1 | 3/2010 | Teng | |
| 2010/0060007 A1 | 3/2010 | Bialor | |
| 2010/0102564 A1 | 4/2010 | Hench | |
| 2010/0123315 A1 | 5/2010 | Anderson, Jr. | |
| 2010/0127499 A1 | 5/2010 | Anderson | |
| 2010/0133843 A1 | 6/2010 | Nair | |
| 2010/0159578 A1 | 6/2010 | Lacaze et al. | |
| 2010/0171313 A1 | 7/2010 | Cook | |
| 2010/0207392 A1 | 8/2010 | Bender | |
| 2010/0215495 A1 | 8/2010 | Anderson | |
| 2010/0225112 A1* | 9/2010 | Hayakawa | F03D 9/003 290/43 |
| 2010/0228401 A1 | 9/2010 | Hench | |
| 2010/0258449 A1 | 10/2010 | Fielder | |
| 2010/0283249 A1 | 11/2010 | Harden | |
| 2010/0289267 A1 | 11/2010 | Jang et al. | |
| 2010/0289347 A1* | 11/2010 | Tu | H01F 7/021 310/28 |
| 2010/0327594 A1 | 12/2010 | Jang et al. | |
| 2011/0031750 A1 | 2/2011 | Kreissig | |
| 2011/0049896 A1 | 3/2011 | Burger et al. | |
| 2011/0057448 A1 | 3/2011 | Page | |
| 2011/0061376 A1 | 3/2011 | Mcalister | |
| 2011/0061383 A1 | 3/2011 | Mcalister | |
| 2011/0074160 A1 | 3/2011 | Chua | |
| 2011/0089697 A1 | 4/2011 | Nair | |
| 2011/0109091 A1 | 5/2011 | Greyshock | |
| 2011/0133463 A1 | 6/2011 | Nair et al. | |
| 2011/0171107 A1 | 7/2011 | Britten | |
| 2011/0214986 A1 | 9/2011 | Brown | |
| 2011/0223023 A1 | 9/2011 | Carden | |
| 2012/0262963 A1* | 10/2012 | Wei | H02M 7/066 363/126 |
| 2013/0033042 A1* | 2/2013 | Fortier | A43B 3/0015 290/54 |
| 2013/0127175 A1* | 5/2013 | Zuo | B60G 17/06 290/1 A |
| 2013/0270927 A1* | 10/2013 | Kakuchi | F16F 6/00 310/12.19 |
| 2014/0062223 A1* | 3/2014 | Park | H02K 35/04 310/12.12 |
| 2014/0139052 A1* | 5/2014 | Kawarai | H02K 35/02 310/28 |
| 2015/0275846 A1* | 10/2015 | MacDonald | F03B 13/1855 290/53 |
| 2015/0330372 A1* | 11/2015 | Nulman | F03G 7/08 290/1 R |

* cited by examiner

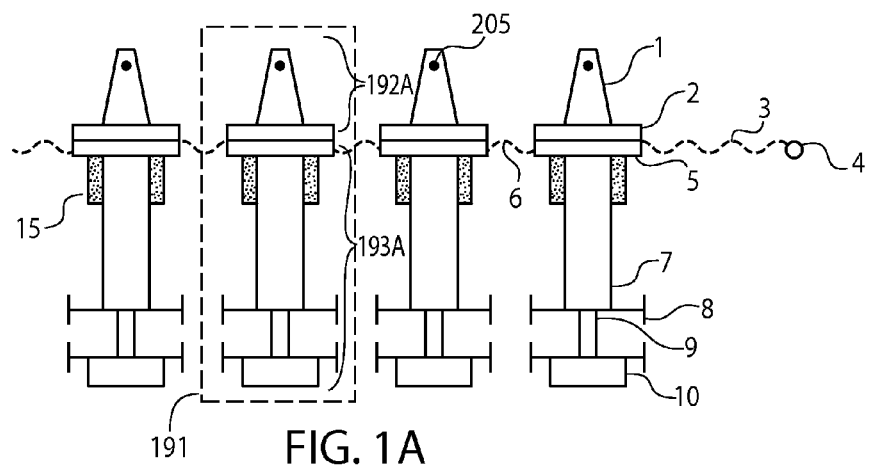
FIG. 1A
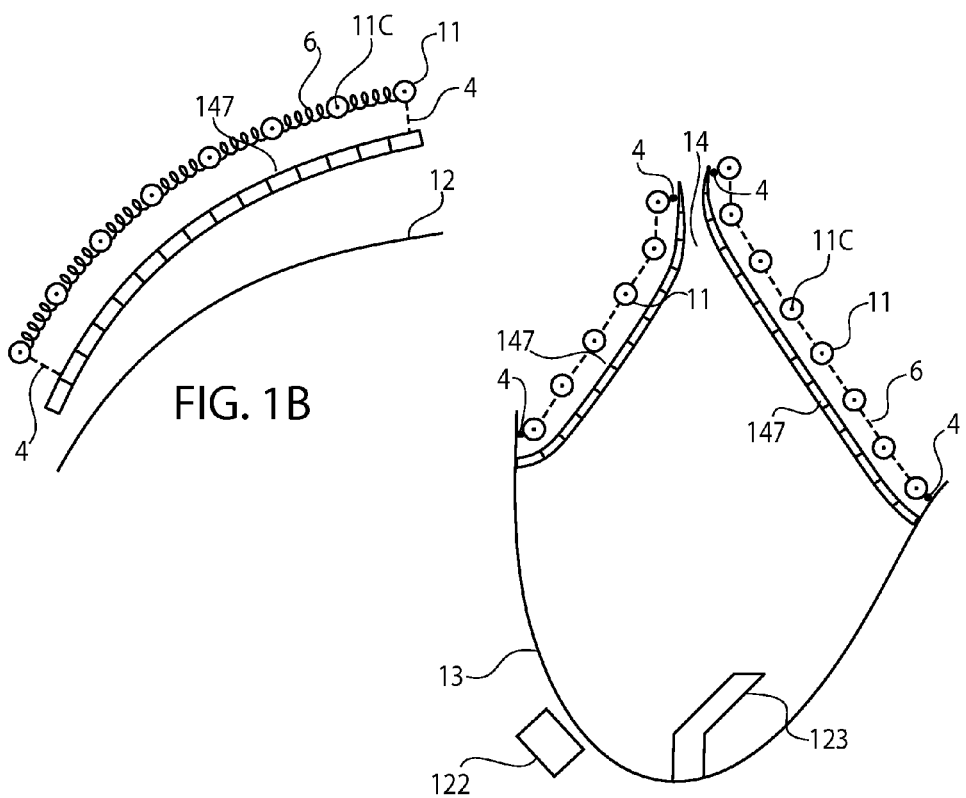
FIG. 1B
FIG. 1C

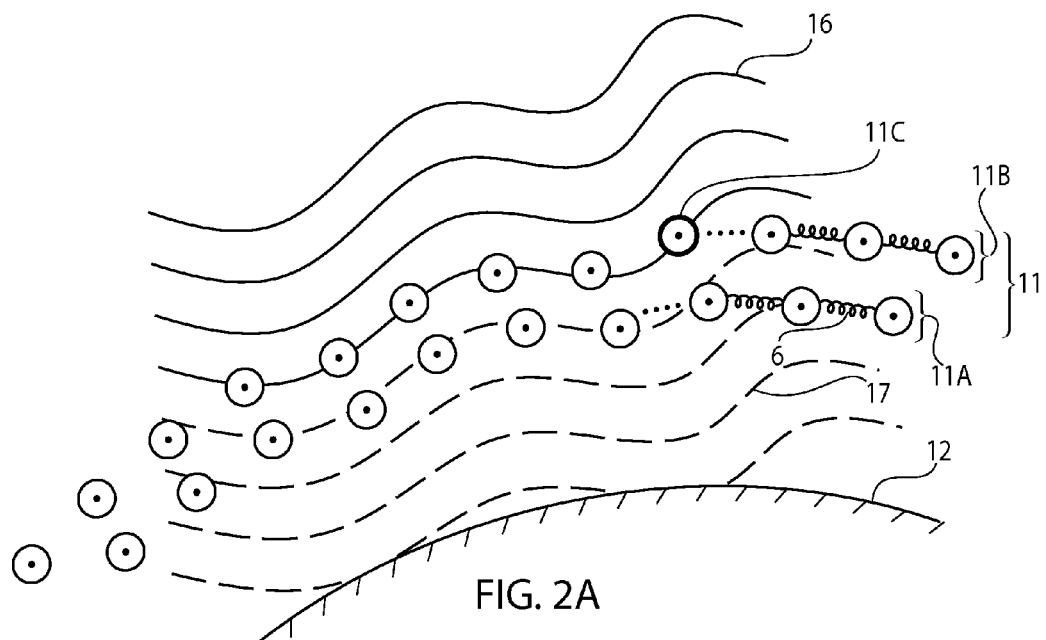
FIG. 2A
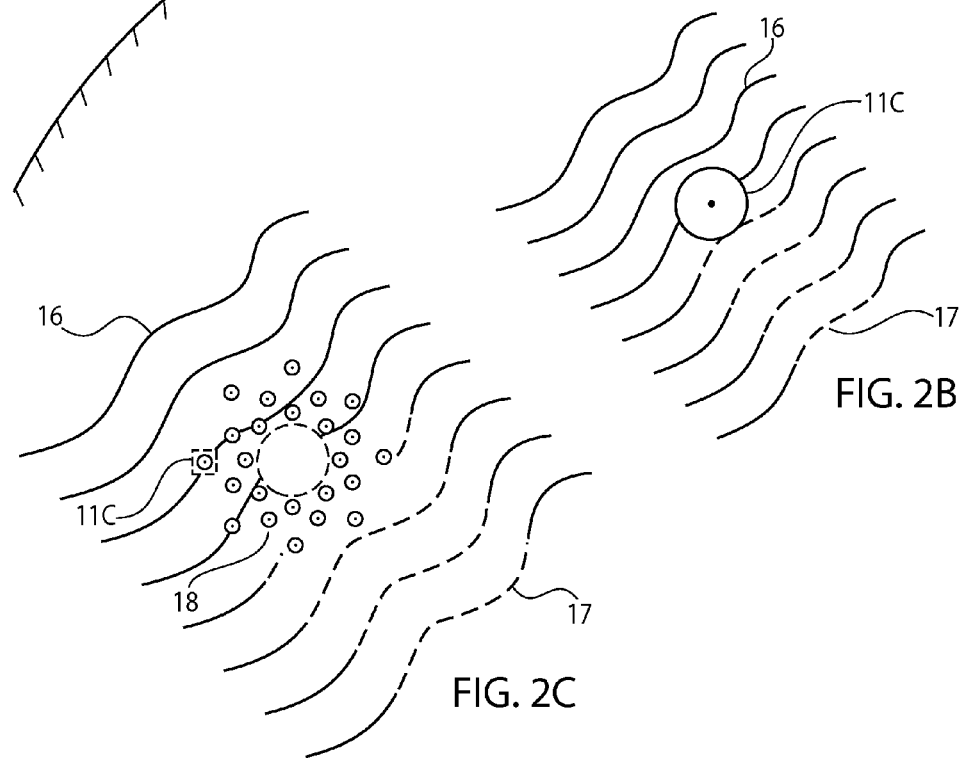
FIG. 2B
FIG. 2C

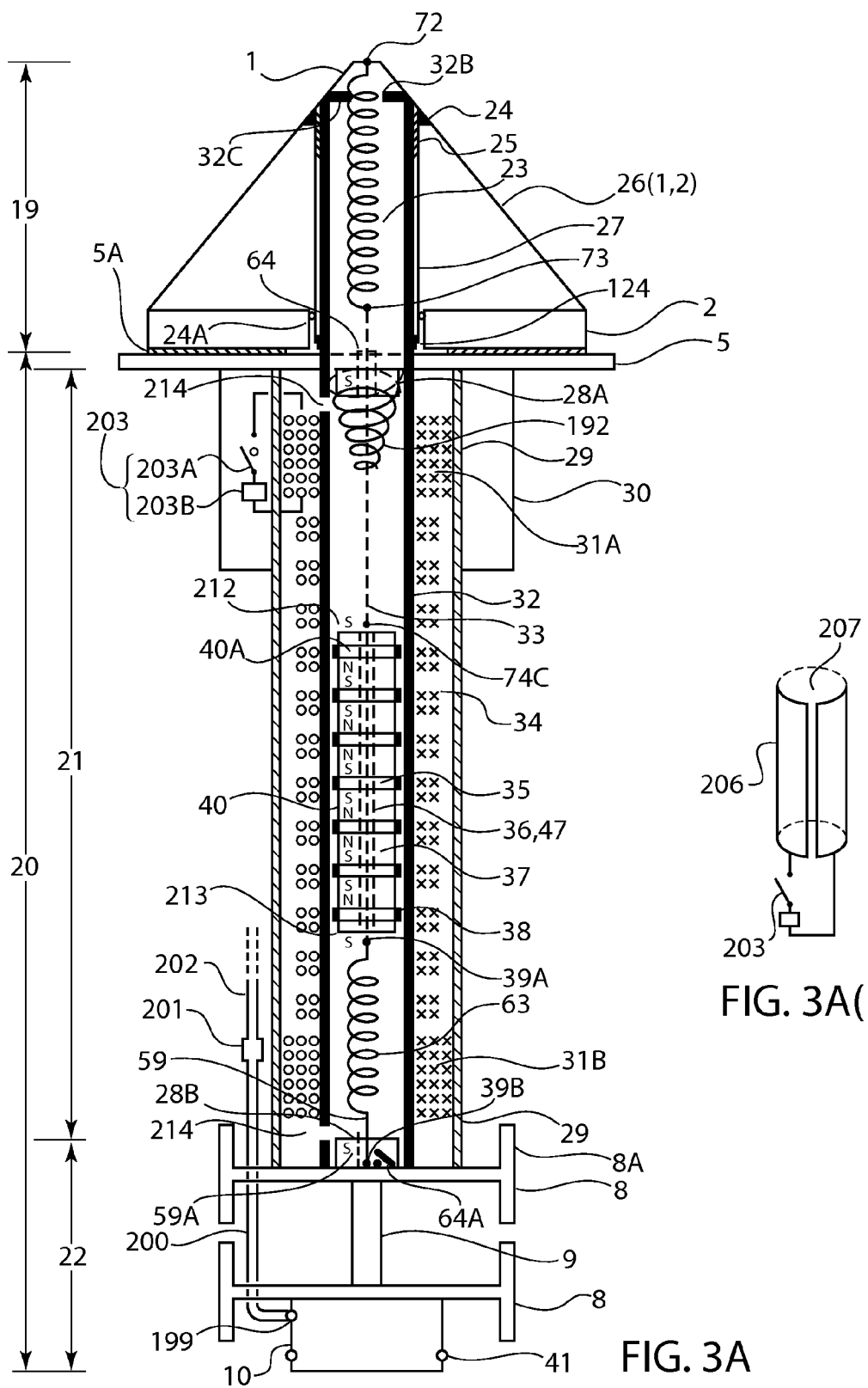

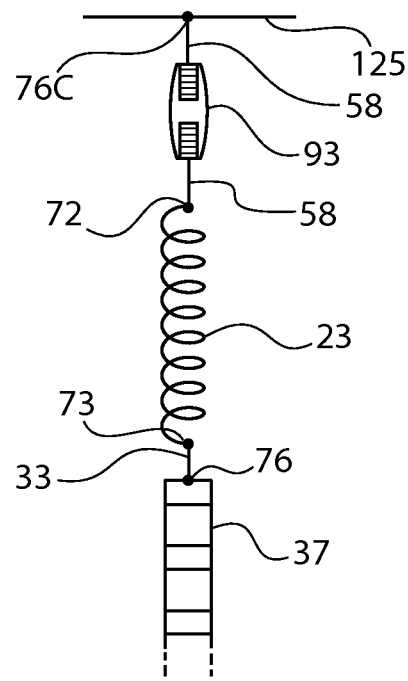
FIG. 3B(1)
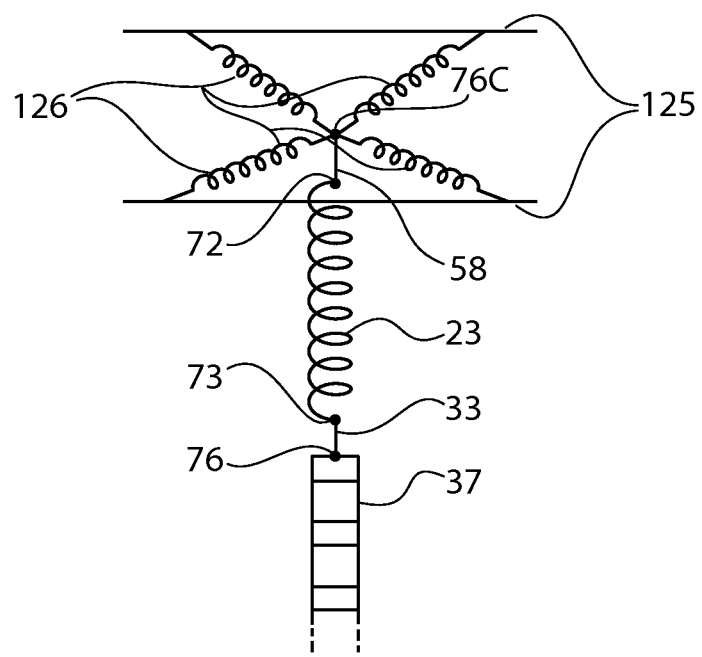
FIG. 3B(2)

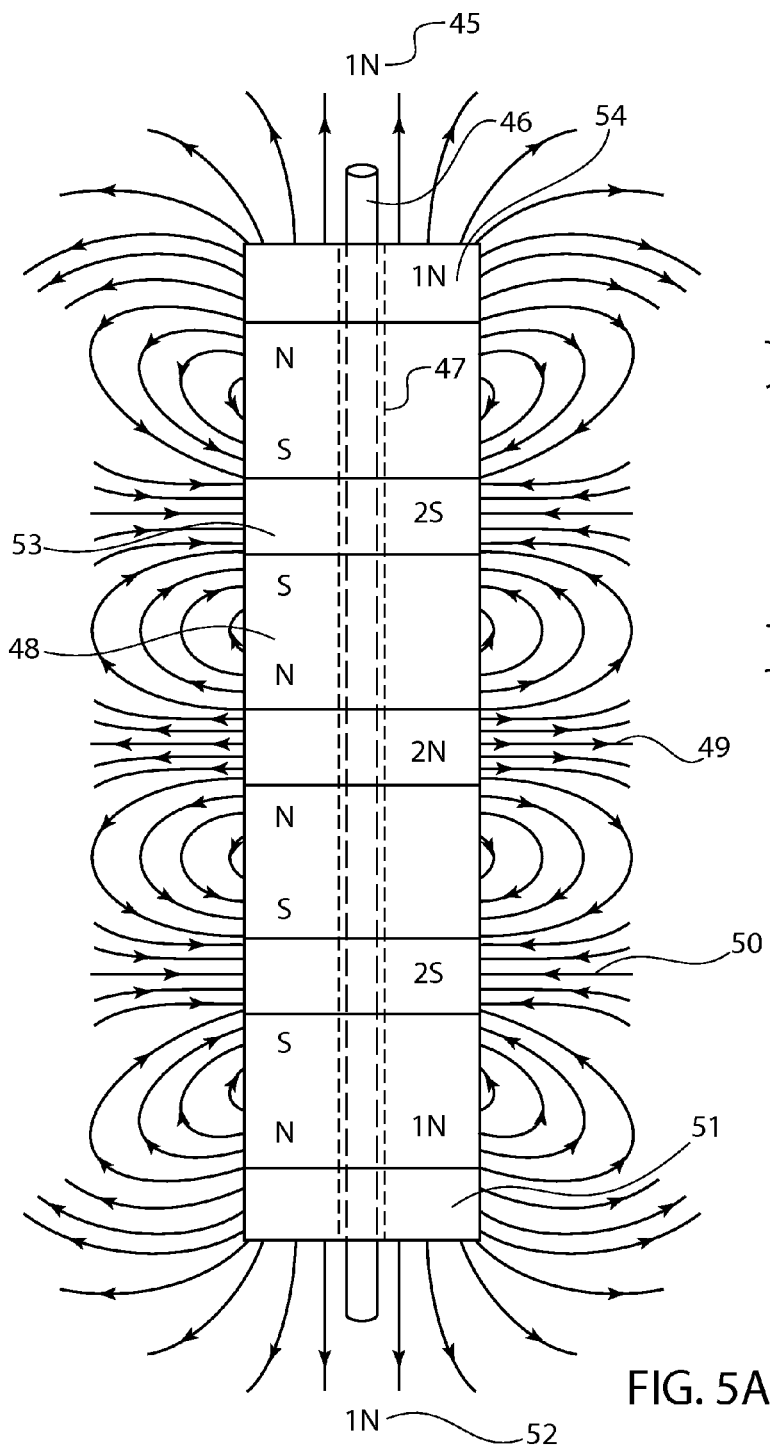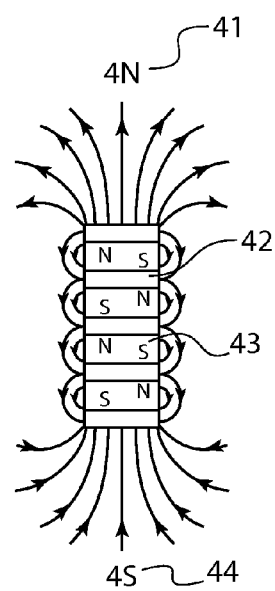
FIG. 5A
FIG. 5B
(Prior Art)

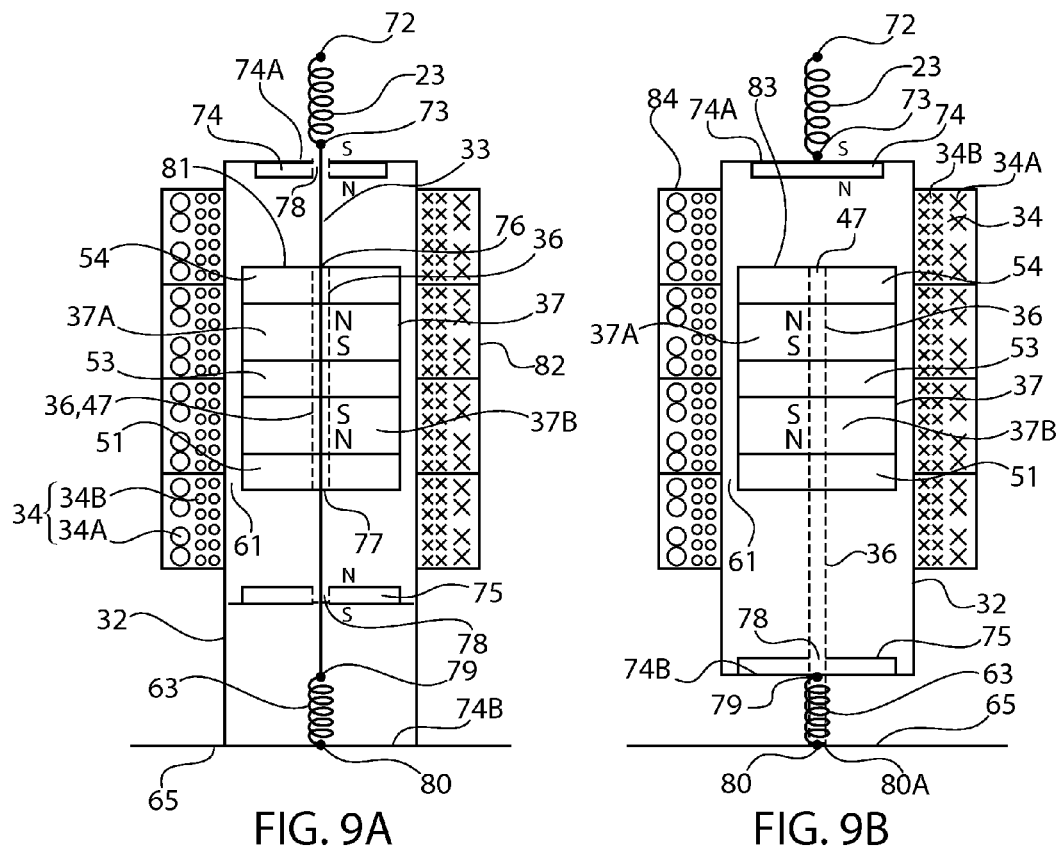
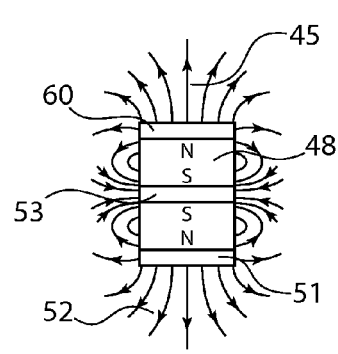
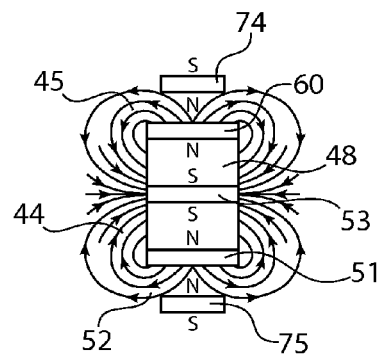
FIG. 9A   FIG. 9B   FIG. 9C   FIG. 9D

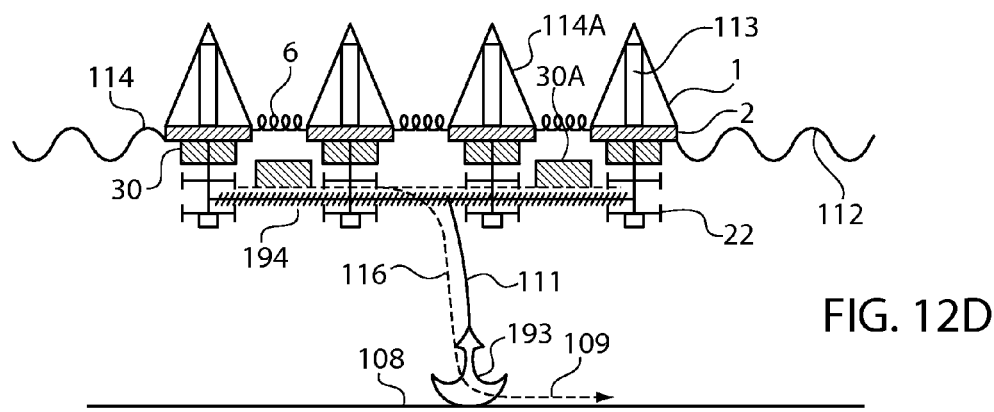
FIG. 12D
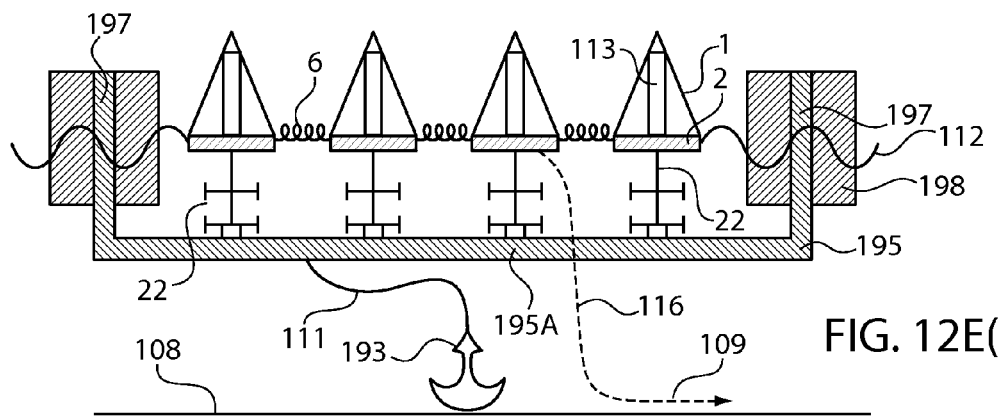
FIG. 12E(1)
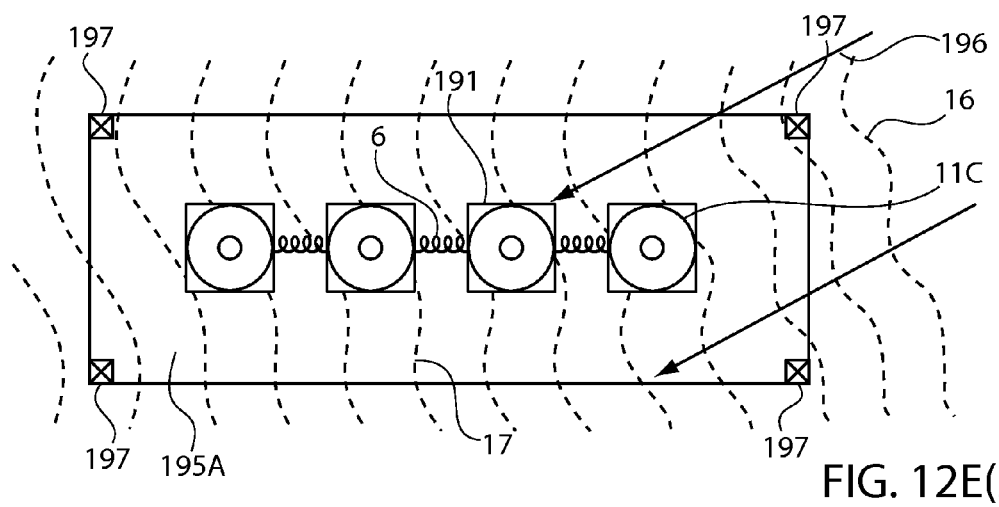
FIG. 12E(2)

LINEAR FARADAY INDUCTION GENERATOR FOR THE GENERATION OF ELECTRICAL POWER FROM OCEAN WAVE KINETIC ENERGY AND ARRANGEMENTS THEREOF

RELATED APPLICATION DATA

This application is a Continuation application of co-pending U.S. patent application Ser. No. 14/611,713, filed on Feb. 2, 2015, which in turn is a Continuation application of issued U.S. Pat. No. 8,946,920, filed on Dec. 27, 2013 and issued on Feb. 3, 2015, which in turn is a Divisional application of issued U.S. Pat. No. 8,629,572, filed on Oct. 29, 2012 and issued on Jan. 14, 2014, all of which are incorporated herein by reference in their entirety.

BACKGROUND

Technical Field

The present principles are directed to linear faraday induction generators as well as electrokinetic seawall apparatuses that employ linear faraday induction generators to dissipate ocean wave kinetic energy.

Description of the Related Art

Seawalls are widely used to protect fragile beaches, coastline, and coastal structures from the enormous power and energy of ocean waves and to provide areas of calm water for shipping and recreational purposes. Waves impact upon a seawall, of which there are basically two principal types—type 1 seawalls of uniform thickness with a level exposed face that is perpendicular to the oncoming ocean waves, and type 2 seawalls whose ocean exposed surface is concave upward with a base of significant greater thickness than at its summit. In either case, the waves collide violently with the seawall, which then dissipates the wave energy through frictional losses into useless heat. Seawalls of the first type suffer from the problem that some of the wave energy is reflected producing extremely violent and undesirable standing waves in front of the seawall. Seawalls of the second type, developed to avoid the standing wave problem, suffer from the fact that the curved exposed surface suffers from increased cumulative damage with shortened lifespan as that type of seawall has to absorb all of the wave energy rather than reflecting a portion of it back toward the ocean in the direction of the original wave propagation. In either case, tremendous amounts of energy is wasted and lost as frictional heat and turbulence.

This large amount of undesirable wave kinetic energy is capable of being converted into electrical power. In an effort to mitigate the effect of climate change from carbon emissions from fossil fuel production, other alternative sources of energy, which include wind, hydrogen, solar, nuclear, cellulosics, geothermal, damming, hydroelectric, tidal current, and ocean wave, are now being explored to supply energy requirements for modern industrialized societies. Ocean wave energy in particular has been investigated for possible use as far back as 1799 with the first known patent, and since then, many patents have been issued in an attempt to tap an estimated 1 TW (Terawatt) to 10 TW of power contained in deep water wave power resources of which, by one estimate, 2.7 TW is potentially practical to tap, thereby providing a significant percentage of the planet's power consumption of 15 TW. With existing technology, however, only about 0.5 TW could in theory be captured.

Energy and momentum is imparted to the surface layer of ocean by winds blowing across its surface by virtue of the shearing frictional forces of the wind against the water surface. This transfer occurs when the wave produced as a result of this interaction propagates across the surface at a slower velocity than the wind. This wind ocean system is called the "wind sea state." A given amount of energy transferred per unit of time will produce a wave whose eventual height will depend on 4 factors: wind speed, the duration of time the wind has been blowing, the distance over which the wind excites the waves (known as the fetch), and the depth and topography of the ocean. Once the wind ceases to blow, these wind generated waves, called ocean surface waves, continue to propagate along the surface of the ocean in the direction of the wind that generated them. The visual distortions that are seen and indicate the presence of such waves are called swells. Because of the restoring force of gravity (hence, ocean waves are known as surface gravity waves), the waves continue to propagate after the wind has ceased blowing, leaving their point of origin as they travel through a viscous medium with a given density, namely ocean water. The energy and momentum associated with an ocean wave front is largely a surface and near surface phenomenon. In deep water, water molecules follow circular motion paths, while in more shallow water, the motions are elliptical. In water depths equal to half the wavelength (the distance between successive wave crests), this orbital motion declines to less than 5% of the motion at the surface. Because of this phenomenon, energy transfer by propagating ocean waves occurs at and just below the surface of the ocean. Furthermore, the momentum associated with this kinetic energy of motion is both linear, reflecting the momentum imparted to the water's surface through wind drag forces, and angular, given by the fact that the wind applies shearing forces to the water at an angle to its surface.

There are two wave velocities associated with ocean wave phenomena, the phase velocity and the group velocity. The phase velocity measures how quickly the wave disturbance propagates through the ocean. It refers to the velocity of each individual wave that propagates across the ocean. However, many waves together may contribute to a summation wave, called a wave group that in itself propagates over the ocean at its own separate velocity. It is the velocity of the wave group, or summation wave, that measures the speed at which energy is transferred across a given section of ocean. Power and energy is transported at and just under the ocean surface at the group velocity. In deep water, the group velocity is equal to one half the phase velocity whereas in shallow water, the group velocity is equal to the phase velocity, reflecting the fact that the phase velocities of all of the individual waves decrease as they approach shallow water in the vicinity of a coastline. Since the energy, momentum, and power contained in a wave remain constant (less frictional losses) as the individual waves approach the coastline, the height of the wave must increase as its base slows, until it becomes unstable causing the wave to fall over itself, a process call breaking. The process of a wave impinging upon a coastline causes all of its stored energy to be released as frictional heat resulting in the undesirable effects to the coastline. The seawall intercepts the wave fronts prior to the breaking process and dissipates the energy instead. Also, waves with the longest wavelengths usually have the highest wave heights, travel the fastest in the ocean, and arrive ahead of waves with shorter wave lengths, as seen with the long high swells observed several days prior to the arrival of a hurricane. These waves carry the greatest amount of energy and are the most harmful to beaches, coast lines, and the life expectancies of seawalls.

The power as given by watts per unit length of wave front transmitted through a plane vertical to the plane of propagation (ocean surface) and parallel to the wave crest front is dependent on the product of the square of the "significant wave height" in meters and the period of the wave in seconds, with the period being the reciprocal of the frequency, which, in turn, varies inversely in a complex function to the wavelength and ocean depth. The height of the wave is defined as the vertical distance between the crest and succeeding trough and it is equal to twice the amplitude of the wave. The "significant wave height" is a statistical average of the heights of the one third of the waves with the highest heights measured during a specified measured time interval of 20 min to 12 hours. The power being transmitted by the wave is known as the "wave energy flux" or "wave power" and it is given by the following equation:

$$P = \frac{\rho g^2}{64\pi} H_t^2 T_e \qquad \text{Eq. 1}$$

where,
P=Wave energy flux (wave power), Watts/meter (W/m) of advancing wave front=Joules/sec/meter (J/s/m)
ρ=Density of water, 1000 kg/m
$H_t$="Significant wave height"=average height of highest one-third of waves measured in a given time interval in meters
$T_e$=Period of wave in seconds
g=Gravitational acceleration, 9.8 m/s
Equation 1 can be approximated by the equation:

$$P \approx 0.5 H_t^2 T_e \text{ where } P \text{ is in Kw/m} \qquad \text{Eq. 2}$$

Power and energy get transported horizontally at and just under the surface of the ocean at the group velocity. The above equations calculate the power available in gravity ocean waves, and the energy associated with that power may be calculated as well from linear wave theory, and the thermodynamic principle of the equipartition theorem, applied to a system where the restoring force of gravity causes an ocean wave to function as an harmonic oscillator in which half of its energy on average is kinetic and half is potential. The total average density of energy in Joules per unit of horizontal area of ocean surface in meters (J/M) is given by:

$$E = \frac{1}{16} \rho g H_t^2 \qquad \text{Eq. 3}$$

where,
E=Average mean density of gravity ocean wave energy at and just below the ocean surface, J/m².
For the following equations below,
$C_g$=Group velocity (wave envelope velocity), m/s, —energy propagation velocity
$C_p$=Phase velocity, m/s, —individual wave front propagation velocity
A=Amplitude of wave—one half the height, in meters, the vertical distance from crest to succeeding trough.
This power (and energy) gets transported horizontally in the direction of wave propagation at the group velocity. In addition, this power, for waves traveling in sufficiently deep water that the depth, h=½λ, may be calculated by:

$$P = EC_g \qquad \text{Eq. 4}$$

where, $$C_g = \frac{g}{4\pi} T_e \qquad \text{Eq. 5}$$

Equations 3 and 5 placed into equation 4 gives equation 1, and therefore, the approximate wave power equation, equation 2, which measures the maximum available wave power or wave energy flux that can be extracted by an ocean wave extraction device:

$$P = \left(\frac{1}{16} \rho g H_t^2\right)\left(\frac{g T_e}{4\pi}\right) = \frac{\rho g^2}{64\pi} H_t^2 T_e$$

The efficiency of the wave energy dissipation device whose interception wave surface interface is of length L is given by:

$$E_f = \frac{P_{ext}}{PL} \qquad \text{Eq. 6}$$

where,
P is given by Eq. 1 or as a good approximation, Eq. 2
$E_f$=Efficiency of the wave energy dissipation device
L=Wave extraction device–wave interception interface length in meters
$P_{ext}$=Measured electrical power extracted from the device in watts
Finally the generated electrical power density, $P_d$, can be computed to measure the density of power generation by the device:

$$P_d = P_{ext}/V \qquad \text{Eq. 7:}$$

where,
$P_d$=Generated power density, W/m³
V=Volume of the energy dissipating device, m³
For illustrative purposes, a calculated example describing the energy in an ocean wave is provided:
A vertically oriented cylindrical shaped power generating device of diameter 11 meters and height 44 meters is placed floating so that its diameter is parallel to the direction of the arriving wavefront and perpendicular to the direction of propagation of the wave. Further, it is located in deep water a few kilometers off the coast and encounters waves with a height ("significant wave height") of 3 meters and a wave period of 8 seconds. Using Eq. 2 to solve for P, we obtain:

$$P \approx \left(0.5 \frac{KW}{m^3 s}\right)(3m)^2 (8s) \approx 36 \frac{KW}{m}$$

36 Kw per meter of wavelength incident on the device over an impact length of 11 meters or 396 Kw in total power. The device produces 150 Kw. Its efficiency is 150 Kw/396 Kw or 39% (from Eq. 6). In addition, given that the device is a cylinder of diameter 11 meters and height 44 meters, where its volume is V=πr²h or 4180 m³; the power generating density $P_d$=150 Kw/4180 m³=0.36 W/m³ or 360 mw/m³ (from Eq. 7).
Note that because of the dissipated ocean wave energy extracted as electrical energy by the device, the wave train in back of the device will be larger than the attenuated wave front in front of the device. Also, the available wave energy flux increases linearly with the period of the wave but exponentially with the square of the height which produces several effects. Storm waves of great height will destroy such wave energy dissipating devices. For instance, if an approaching storm led to waves of 15 meters high with a period of 15 seconds impacting the device, the device would have to deal with a wave energy flux of 1.7 MW/m of wave impact surface on the device with a total wave energy flux of 18.7 MW. Also, even if the device has excellent survivability, the efficiency of the device will go down drastically if the waves impacting upon it are significantly higher than the height with which the device was designed operate.

Thus, all such ocean wave energy dissipating devices extracting the energy as electrical power should be reasonably efficient through a wide range of ocean wave sizes. It should be durable and have reasonable maintenance requirements as would be the case in a seawall of a conventional nature that is made out of concrete, steel bulkhead, or heavy boulders stabilized by some means.

The prior art technology has made use of systems including and involving pistons and pumps using hydraulic fluids and water, spinning turbines, oscillating water columns to produce air pressure changes driving hydraulic or turbine systems, water intake water elevators with downhill hydroelectric flow turbine systems, linear magnetic arrays coupled to oscillating coil assemblies, and piezoelectric wave pressure to electrical energy transducers. All of these technologies have been considered or have been attempted to be used in extracting electrical energy from ocean wave energy.

SUMMARY

A linear generator includes a permanent magnet array having at least two magnets arranged end-to-end. A set of conductive coils is arranged around the permanent magnet array. A four-phase full wave rectifier is configured to accept alternating current inputs from the set of conductive coils and to produce one or more direct current outputs. A summing circuit is configured to aggregate the one or more direct current outputs from the rectifier to produce a combined, rectified direct current output.

An array of linear generators includes a plurality of individual linear generators, each having a single direct current output. Each of the linear generators includes a permanent magnet array having at least two magnets arranged end-to-end, a set of conductive coils arranged around the permanent magnet array, a four-phase full wave rectifier configured to accept alternating current inputs from each subset of conductive coils and to produce one or more direct current outputs, and a summing circuit configured to aggregate the one or more direct current outputs from the rectifier to produce a combined, rectified direct current output. The set of conductive coils includes four subsets of a plurality of conductive coils, with each coil being electrically connected in series with the other coils in the respective subset of coils.

An array of linear generators includes a plurality of individual linear generators, each having a single direct current output. Each of the linear generators includes a permanent magnet array having at least two magnets arranged end-to-end, a set of conductive coils arranged around the permanent magnet array, a plurality of four-phase full wave rectifiers configured to accept alternating current inputs from a respective subset of four conductive coils and to produce one or more direct current outputs, and a summing circuit configured to aggregate the one or more direct current outputs from the rectifiers to produce a combined, rectified direct current output. The set of conductive coils includes a plurality of subsets of four conductive coils each.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 1A is an illustrative side view diagram of an Electrokinetic Seawall showing an arrangement of repeating Wave Energy Converters (WEC's);

FIG. 1B is a top view of an Electrokinetic Seawall deployed for protection of a coastline and conventional seawall;

FIG. 1C is a top view of an electrokinetic seawall deployed for protection of a harbor installation with conventional seawalls;

FIG. 2A is a top view of a two-layered electrokinetic seawall indicating the attenuation of waves passing through the array of WEC's (the attached linkages between all adjacent WEC's are not shown for ease of illustration);

FIG. 2B is a top view of a single WEC positioned in open water;

FIG. 2C is a top view of an open water ringed network of WEC's showing downstream attenuation of waves passing through it;

FIG. 3A depicts a side view of a repeating WEC component of the Electrokinetic Seawall apparatus at the time of the passage of a wave trough, where the WEC component is comprised of a Mobile Subunit (half scale relative to rest of the structure), a Fixed Subunit, a Vibrational Energy Linear Electric Generator (VLEG), and an Inertial Liquid Wave Dampening Stabilizer (ILWDS);

FIG. 3A (1) is an inset showing a section of a stator involved in braking a rotor in rough seas;

FIGS. 3B (1) and 3B (2) respectively show two embodiments of suspending a vertically oscillating rotor from the top of a mobile subunit buoy floatation collar;

FIG. 5A shows a Compressive Repulsive Magnetic Field (CRMF) Permanent Magnet Array (PMA) implementation of Compressive Repulsive Magnetic Field Technology and its associated magnetic field distribution;

FIG. 5B shows a conventional attractive magnetic field PMA and its associated magnetic field distribution;

FIG. 9A shows (to approximate scale) a side view of a basic Vibrational Energy Electrokinetic Transducer (of matrix order 1), a vibrational energy harvester device including the basic VLEG, Embodiment 1, comprising a one magnetic unit PMA Rotor including a 2 magnet, 3 pole piece repulsive pole configuration, two breaking magnets, and a 4 coil variable wire gauge FCA stator;

FIG. 9B shows (to approximate scale) a side view of the basic Vibrational Energy Electrokinetic Transducer (of matrix order 1), a vibrational energy harvester device, including the basic VLEG, Embodiment 2, comprising a one magnetic unit PMA Stator including a 2 magnet, 3 pole piece repulsive pole configuration, two breaking magnets, and a 4 coil variable wire gauge FCA rotor;

FIG. 9C shows the magnetic field configuration around a two magnet, 3 pole piece single magnet unit repulsive pole configuration PMA with no breaking magnet, depicting wide divergence of the magnetic field at the ends of the PMA;

FIG. 9D shows the magnetic field configuration around a two magnet, 3 pole piece single magnet unit repulsive pole configuration PMA with two breaking magnets, depicting the deflection of the end magnetic field flux lines back toward the PMA;

FIG. 12D illustrates a side view of an individual Inertial Liquid Wave Dampening Stabilizer (ILWDS) of 4 WECs that are rigidly attached to each other by metal plate brackets;

FIG. 12E(1) illustrates a side view of 4 WEC's, each of whose ILWDS is rigidly bolted to a boat-like partially submerged metal structure that is neutrally to slightly positively buoyant via sufficient buoyancy structures attached to it;

FIG. 12E(2) illustrates a top view of the 4 WEC's of FIG. 12(E)(1);

DETAILED DESCRIPTION OF PREFERRED EMBODIMENTS

Figure 3C:
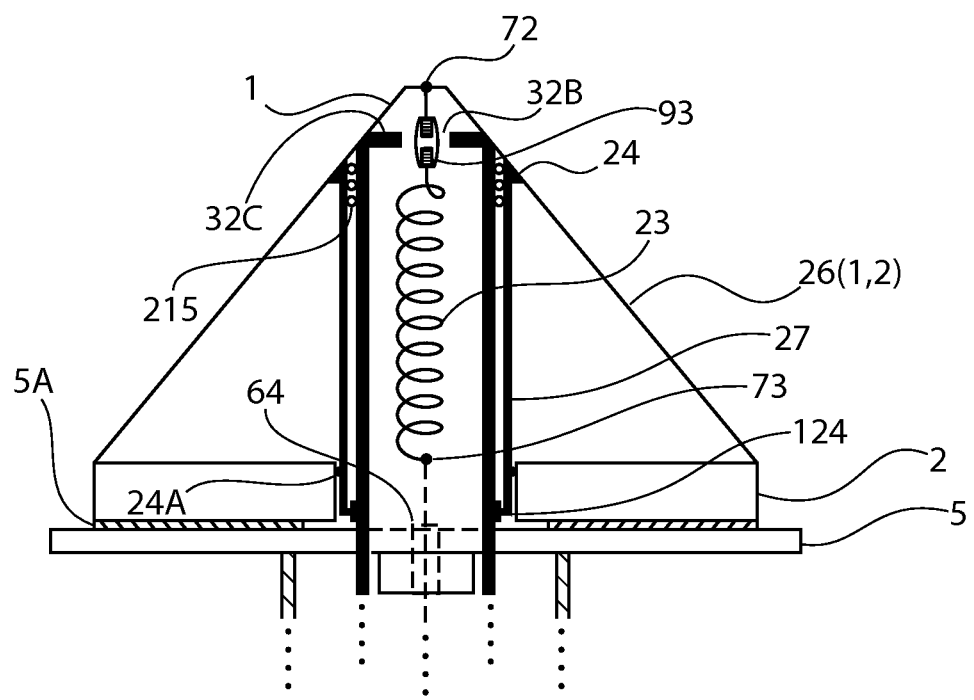
FIG. 3C depicts a view of the Mobile Subunit of the WEC showing the use of O rings or piston rings in place of the rubber or silicone bumper ring illustrated in FIG. 3A and showing a spring tension adjustment unit.

The present principles relate to apparatus, systems, and methods for dissipation of kinetic energy of ocean surface waves by means of electromagnetic Faraday conversion into electrical energy; a seawall employing electromagnetic means to dissipate ocean waves for the purpose of reducing damage or interference to the operation of conventional sea walls, harbors, coastlines, and structures contained within, including buildings, docking facilities, sand dunes and other beach erosion prevention structures. In the process of enhancing and protecting functional and recreational uses of a portion of coastline with the employment of such means of energy conversion inherent to the Electrokinetic Sea Wall (EKS) apparatus described herein, production of useful electrical power is accomplished from the otherwise damaging and wasteful kinetic energy of ocean waves.

The present principles, because the ocean wave energy dissipation and electrical energy extraction is implemented in the form of a seawall in an exemplary embodiment that can be attached to currently existing seawalls or be situated in locations where seawalls would be naturally desired to minimize ocean wave damage, and because it would not contain any environmentally hazardous materials, would overcome many environmental concerns. Furthermore, it has the potential to be used in the open ocean as a free floating or tethered wave energy converter (WEC) array if so desired. The lack of complicated mechanical components and systems and the simple repetitive structure of exemplary embodiments would allow the present principles to principles to address many problems associated with known systems.

For example, certain ocean linear electrical generator (LEG) devices have been characterized by low efficiency magnetic flux field coil linkage, heavy magnetic metal armatures, complicated mechanical linkages, insufficient rotor stroke or range of motion making them very inefficient in handling anything but the smallest waves, usage in single devices or in widely spaced arrays making the efficiency in extracting electrical energy over a given area of ocean extremely low, usage of mechanical impact breaking systems to limit stroke range, such as during a storm, with short life spans and severe energy wastage, low ocean wave energy capture and dissipation capacity leading to low electrical power output, significant electrical eddy current losses within the device, poorly designed coils, exceedingly powerful rare earth magnets in huge sizes that were astronomical in cost and dangerous to use, precise operational requirements including steering into wave fronts, lack of ability to cope with the twisting and bending forces that are present along with the significant vertical wave motion causing mechanical stress and failure, excessive flux leakage, and inefficient magnetic pole placement. While some systems employ the concept that the magnets of a LEG and the field coils of that generator in an WEC should be in separate water tight containers for the purposes of simplicity, reliability, cost, and achievement of a water tight seal, it is believed that such an arrangement sacrifices some efficiency as the coil magnet gap becomes larger than necessary and sliding mechanical linkages using bearings are required. Likewise, it is believed that the most efficient means of magnetic flux linkage remains an arrangement by which a field coil array (FCA) encircles a permanent magnet array (PMA) and that any advantages of maintaining the FCA and PMA in separate containers can be achieved by having both in the same water tight container. It is believed that the current embodiments of the present principles overcome the many deficiencies listed above.

Furthermore, if a seawall is made out of an arrangement of component units comprising wave energy converters (WEC's) in accordance with the present principles which in turn comprise linear electric generators (LEG's) whereby impinging wave fronts can be intercepted and their damaging kinetic energy dissipated and turned into useful electrical energy as the waves went through the structure, any structure or coast line behind such an apparatus would be given some or complete protection from wave damage. Unlike a conventional sea wall, the wave fronts would propagate past the structure in an attenuated form. Such an apparatus can have to have the following characteristics to allow for reasonable, practical, and commercial use:

The devices should capture a reasonable fraction of the wave energy in irregular waves in a wide range of sea states over a reasonable area of water.

Because there is an extremely large fluctuation of power in the waves, the peak absorption capacity should be up to 10 times larger than the mean power absorbed. This ratio should be at least 4.

The device should efficiently dissipate wave motion kinetic energy and convert it into electrical energy. Wave power is available at low speeds, linear in nature, and at high force with the forces of motion not lying necessarily in a single direction. Most readily available electric generators operate in a rotary motion at higher speeds with readily available turbines that require a constant, steady flow of moving medium.

The device should able to survive storm damage, saltwater corrosion, snapped mooring lines, snapped power transmission lines, broken welds, seized bearings. Thus, multiple moving parts is a distinct disadvantage.

The device should be as simple as possible both electrically and mechanically, and should be able to be scaled up in size significantly.

The electricity converter system, whether it is AC to DC, AC to AC, or AC to DC and back again to AC, should allow for power to be taken off from the device, which involves a mooring system that should be reasonable in costs to build and maintain and power collection circuitry that efficiently accomplishes this function.

Noise pollution, chemical pollution from hydraulic fluid leakage, visual detraction to the environment, and other ecological concerns should be avoided.

The system should be easily repairable with component parts easily swapped in and out.

Ocean waves should be attenuated to a reasonable and significant degree.

An exemplary Electrokinetic Seawall system embodying the present principles that can achieve these features is composed of an array of wave energy converters, each of which is in turn composed of a group of permanent magnet arrays (PMA's) interspersed between a network of field coil arrays (FCA's) to produce a matrix of Linear Energy Generators (LEG's) that absorbs and mechanically couples incident mechanical kinetic wave energy and then dissipates it through electromagnetic means via the Faraday-effect producing electrical energy that can be carried away from the device, thereby allowing the coastline and structures behind the Electrokinetic Seawall, which can include a conventional seawall to which it which it may be attached, to be sheltered from damaging and undesirable wave action.

An exemplary Electrokinetic Seawall device in accordance with the present principles includes a linear or other geometric array of floating component Wave Energy Conversion Units or WEC's that are each attached to an adjacent conventional seawall or to each other, tethered, or otherwise attached to the seabed; the array may be freely floating as well. The floating component units may be attached via metal chains or springs to a variable number of adjacent units depending upon the shape and configuration of the linear or geometric array. Depending upon its linear or geometric shape, the array may be moored at one or both ends, at the corners or in the center to the seabed floor or an adjacent nearby conventional seawall or bulkhead. Each repeating component unit, which by itself has the capacity to simply float on or just below the ocean's surface consists of 4 subunits: 1) a virtually fixed portion that is neutrally to slightly positively buoyant and is located somewhat below the ocean's surface called the fixed subunit, 2) a heavily positively buoyant mobile portion that consists of a buoy floatation collar that floats on the ocean surface and oscillates vertically up and down as ocean wave crests and troughs pass, called the mobile subunit, 3) an inertial stabilizing unit that keeps the neutral to slightly positive buoyant fixed portion from moving appreciably with the passage of ocean waves, and 4) an electrokinetic transducer, called a "Vibrational Energy Electrokinetic Transducer" or "Vibrational Energy Linear Electric Generator" (VLEG) that comprises a matrix of PMA's (Permanent Magnet Arrays) surrounded by a matrix of FCA's (Field Coil Arrays).

Movement of the mobile subunit relative to the fixed subunit in accordance with an exemplary embodiment causes magnetic lines of force emanating from the PMA's to cut through the FCA's inducing an electrical voltage and current in the coils. Either the FCA's or the PMA's can be attached to the fixed subunit. Whichever of the two arrays is attached to the fixed subunit, the other is attached to the mobile subunit. Each PMA is surrounded by a FCA. If the PMA moves and the FCA is fixed, the PMA is the linear rotor of a linear electric generator (LEG) and the FCA is the linear stator of the LEG. If the PMA is fixed and the FCA moves, then the PMA is the linear stator and the FCA is the linear rotor. In either case, one PMA and one FCA pair form an LEG and in either case there is motion of one PMA relative to one FCA causing magnetic lines of force from each PMA to cut across the copper wire turns of the FCA inducing a current and voltage in the FCA. Every electrical generator, whether the conventional rotary kind or the linear kind, has the power production component called the armature, and hence in accordance with the present principles, the FCA is the armature of the LEG. In each electrokinetic transducer subunit, to which the nomenclature, Vibrational Energy Linear Electric Generator or VLEG is assigned, there are one to several pairs of PMA's and FCA's of given arrangements and geometries, with the two components of each pair moving relative to each other via a dual spring suspension system. The motion imparted to each LEG pair is derived from the passage of an ocean wave, the kinetic energy of which is transmitted to the buoy floatation collar subunit and then transferred to the vertically oscillating rotor by means of the dual spring suspension system that attaches each linear rotor of each LEG to the vertically oscillating buoy floatation collar subunit and to the virtually stationary fixed subunit on which the stationary stator is mounted. All of the linear rotors oscillate in a vertical manner in response to the passage of the wave crests and troughs. All of the stators can be attached to the fixed subunit by rigid means. The length of travel of the rotor, referred to as the stroke distance, is dependent on the geometric length of the rotor and the stator which can be varied from very small dimensions to large dimensions to capture the energy of different size waves or partially capture the energy of very large waves. It can be shown that there is an optimal arrangement of the length of the rotor to the length of the stator and that there is an optimal mechanical resonance frequency of the dual spring suspension system.

To help insure that the fixed subunit remains as immobile as possible as the ocean waves pass through, the fixed sub-unit is attached to an Inertial Liquid Wave Damping Stabilizer (ILWDS) which comprises a structure of significant mass containing a significant volume of confined immobilized water acting as a ballast mass to steady the fixed subunit and prevent it from oscillating up and down in synchrony with the mobile subunit, thereby maximizing the magnitude of the relative motion of the mobile subunit (and hence the one or more multiple rotors) relative to the fixed subunit (and the one or more multiple fixed stators).

To the extent that electrical power and energy is produced in each pair, a certain corresponding and greater amount of kinetic energy is removed from the passing wave, rendering its amplitude after passage through the electrokinetic seawall smaller which in turn renders its effects on the coastline to be less than it otherwise would have been. In effect, a certain amount of damaging kinetic energy which would have been dissipated as damaging and useless heat and friction on the coastline has been converted to useful electrical energy which then may be collected and brought off the described apparatus for use as desired. The higher the induced electrical energy amount produced from a passage of a wave to the amount of kinetic energy dissipated from the passing ocean wave determines the efficiency of energy conversion. If these two amounts are equal, the conversion efficiency is 100% which of course would never be reached. However, proper and careful design of the present principles can lead to very high efficiencies of conversion, especially if a geometric array or mesh of many rows and columns of WEC repeating component units are used covering an area of ocean surface.

In accordance with one embodiment, since each WEC repeating component unit of the electrokinetic seawall contains one VLEG matrix, each containing one to several PMA and FCA pair LEG's, the total kinetic energy dissipation from incident ocean surface waves represents a summation of the contributions from many component units, each containing several LEG's. The present principles provide several methods by which this electrical energy can be collected and stored, including the diversion of a small amount of electrical power for the purpose of illuminating the electrokinetic seawall so that it would always be visible in the darkness of the night. The amount of kinetic energy dissipated and the amount of electrical power produced is proportional to the height of the electrokinetic seawall and the stroke length of the VLEG rotor which, for one row of WEC's, determines the maximal wave heights from which it can dissipate efficiently the kinetic energy; the size of the waves incident upon the WEC's; the wave frequency; the angle of incidence (unless the 'seawall' is tethered and freely floating so it can align itself with the direction of the incident waves or is of a circular geometric shape where the direction of wave propagation is no longer an issue); the length of the seawall; how many layers of WEC component units are composing the seawall, with each layer or row dissipating a portion of the kinetic energy of a wave whose energy content would exceed the capability of energy dissipation for a single row or layer; and the shape of the seawall (curved, straight, closed shaped etc.). It is important to note that very large waves can be handled by a Electrokinetic Seawall comprising several layers of component units, with each layer dissipating a certain portion of the kinetic energy of the oncoming ocean wave producing in effect a similar kinetic energy dissipation effect and electric energy production equal to one layer of WEC component units with very long LEG rotor stroke lengths. The efficiency of wave kinetic energy dissipation increases with each additional layer or row of WEC's, thereby removing a fraction of the kinetic energy of a large wave larger than that which can be accommodated by the stroke length of a single row or layer of WEC's.

While one known system that encompasses the technology employing separate watertight housing for the PMA and FCA with the two components of the LEG sliding via bearings and slide over an air gap between the two housings have low tolerance requirements, it is important to note that although tolerances can indeed be built to be quite tight (for example, the air gap spacing between the huge LCD stators and huge PMA rotors in the gigantic Hoover Dam generators built in the 1930's was only 0.001 inch without the benefit of computerized design and assembly), costs increase dramatically if such tolerances are employed. Furthermore, one sacrifices efficiency in terms of magnetic flux leakage and air gap increase if the rotor and stator components are housed in separate watertight compartments and allowed to slide over each other. In the system in which the PMA and FCA are in separate housings, one would have to line the inside or the outside of the housings with side to side PMA's and FCA's, each with its bearing slide system to obtain the same magnetic flux confinement crossing from the PMA to the FCA when the PMA is completely encircled by the FCA. In the encirclement configuration, almost every magnetic flux line emanating from a PMA will cross the FCA windings at some point during its return path to that PMA or an adjacent PMA in accordance with designs of the present principles, which is not the case in the two-housing system. Furthermore, since the air gap has been made as small as $\frac{1}{32}$ of an inch in prototypes of the present principles with much thinner gaps possible, it is difficult to project that an air gap between the two watertight encasements of the prior art that is held to a constant level by the diameter of a series of bearings in a slide can result in a sliding bearing system with such a small air gap, especially with the use of multiple LEG's located around the periphery of the encasing shells. Finally, there is no need for certain embodiments of the present principles to handle the largest waves—first they would occur rarely, second in all probability an internal breaking system that will be described in more detail below can be employed to activate and shut off the device, and third, as just noted above, multiple layers of WEC's with LEG's of shorter stroke lengths can substitute the more difficult to construct single layer of WEC's with very long stroke lengths.

To ensure the survivability of embodiments of the present invention in the face of very rough seas several additional features can be employed. For example, an automatic shutoff mechanism can be used to prevent the rotor from moving too far and too fast in rough weather characteristic of ocean storms which would otherwise damage the device. Hence, considering that impact break mechanisms to limit stroke length are highly undesirable for previously mentioned reasons, the breaking mechanism should be electromagnetic using either shorted coils at the end of the FCA or large metal reaction plates or rings there. Further, in contrast to known systems, embodiments of the present principles can switch out the braking coils automatically in an abrupt manner so that power generated in the VLEG is wasted in the braking power only during the passage of an excessively large wave. The rotor baking mechanism can also rely on direct magnetic repulsion by magnets that repel the PMA if it gets too close, and can use both the counter electromotive force (EMF) generated by the shorted coils or reaction plates as well as purely magnetic breaking to stop the rotor and make it immobile in very heavy seas. Yet still another component of the braking mechanism can use springs to decelerate the rotor with an excessively large wave. Also, to further improve the survivability of the electrokinetic seawall, if a WEC unit in the seawall shorts out, the device can be immobilized due to the electromagnetic breaking of the large counter EMF that will develop, and thus a shorted out WEC will not affect other WEC units or if it develops an open circuit, it will at first oscillate very easily as there is no back EMF counter force but it will shortly encounter the shorted out coil of the breaking portion of the FCA as well as the stationary breaking magnet and spring and it will then stop oscillating again leaving the other units unaffected. If just one coil of a FCA in a WEC unit shorts out, the rotor might momentarily decelerate near the shorted coil from the large counter back EMF that will develop, but the WEC in this condition will remain functional though at a lesser efficient level. Furthermore, a power output circuit by electronic means can neutralize the effect of shorted out or open circuit Field Coil Arrays so that they would not make the whole apparatus non-operational. The integration together of these varied techniques for braking excessively moving rotors and dealing with electrical shorts and open circuits provide improvements over known systems. Furthermore, means are provided to remotely switch off the WEC in the event of dangerous weather or electrical instability as well as monitor the status of the system by a remote visual monitoring method all making use of internet communications; known systems do not incorporate such means.

By illustration of when an Electrokinetic Seawall embodiment is placed in a body of water such as an ocean, very large lake, estuary, or bay, and it is deployed and constructed in a pattern to just simply produce electric power, or dissipate wave kinetic energy to protect a nearby piece of coastline, passing ocean waves apply a force to the moving subunit of each seawall component unit which causes this moving subunit comprising a buoyant floatation collar buoy to move up and down relative to the fixed subunit of each seawall component comprising a neutrally or slightly positive buoyant mass whose center of mass is well below the ocean surface and located at the point of a $3^{rd}$ subunit of the seawall component unit, the Inertial Liquid Wave Damping Stabilizer (ILWDS) that is also part of the fixed subunit. The fixed subunit may be anchored or tethered to the seabed or adjacent conventional seawall by either flexible or rigid means or left floating. A $4^{th}$ subunit of the seawall component unit in this embodiment, the VLEG array composed of PMA's encircled by FCA's, is partly connected via a pair of springs to the mobile subunit (the rotor) and partly connected to the fixed subunit (the stator). The linear stators of the LEG's of the VLEG are attached to a plate which is fixed to the fixed subunit and the linear rotors of the LEG's of the VLEG are attached to a plate which is fixed to the mobile subunit. There are two functionally equivalent rotor stator pair configurations: either the rotor may be a PMA and the stator is correspondingly a FCA, or the rotor may be an FCA and the stator is correspondingly a PMA. In either case, relative motion is produced between each PMA and each FCA of each LEG in each Vibrational Energy Electrokinetic Matrix Transducer which results in magnetic lines of force emanating from each PMA cutting the copper coil turns of the corresponding encircling FCA resulting in a certain quantity of kinetic energy of the passing wave being dissipated by each LEG and a certain quantity of electrical energy appears in its place. The size of the Vibrational Energy Electrokinetic Matrix Transducer (VEMT), the name given to the structure composed of a three dimensional arrangement of numerous VLEGs functioning as one transducer converting kinetic ocean wave energy to electrical energy, can vary greatly in size ranging from the simplest—a single pair of permanent magnets whose like poles are bonded under force together surrounded by 4 field coils—the basic VLEG unit—to larger ones with many permanent magnet pairs surrounded by many field coils forming one LEG which in turn is surrounded by anywhere from 1 to 8 other LEG's to form a matrix of field coil arrays and permanent magnet arrays containing many magnets and coils. Size also depends on the size of the coils and magnets themselves.

The configuration of magnetic poles of the PMA in preferred embodiments has been given the nomenclature, Compressive Repulsion Magnetic Field technology (CRMF) that results in minimized flux leakage, maximized magnetic field intensity and total magnetic flux lines cutting across the coil windings in the region occupied by the FCA; the quantity of electrical energy produced as a result of dissipation of a given quantity of wave kinetic energy is thereby maximized increasing the efficiency of this electrokinetic transducer. In this configuration, similar magnetic poles of adjacent magnets of the PMA are forced together under great force to produce these magnetic field characteristics. These magnets should be stabilized with various means to prevent the component magnets from flying apart. The dimensions of the magnets of the basic VLEG electrokinetic transducer exemplary embodiment are related in a precise way to the geometry of the surrounding set of field coils and, to maximize the voltage produced and minimize the magnetic flux leakage away from the coils, precise rules regarding the number of magnets in each PMA, each FCA, the orientation of the PMA of one VLEG with respect to the PMA of its neighbors and the polarities of the terminal magnets of each PMA can be employed to accomplish these objectives, as discussed in further detail herein below. The stroke distance through which the vibrational energy electrokinetic transducer embodiment operates can be shown to be related precisely in a most favored configuration to the longitudinal axial length of the PMA. For maximum transfer of kinetic energy from the passing wave to the oscillating rotor, the frequency of oscillation of the rotor that is determined by the incoming wave frequency in the most favored configuration should be as close as possible to the natural mechanical resonant frequency of the spring mass system composing the rotor and its attachments in exemplary embodiments. The amount of kinetic energy dissipated from a given wave of a given height depends by the combined Faraday induction effect of one to many VLEG's within the Vibrational Energy Electrokinetic Matrix Transducer and for each PMA-FCA VLEG pair, upon the size and magnetization strength of the rare earth magnets composing each PMA, the size and number of turns of each coil in each FCA, the number of magnets in each PMA, the number of coils in each FCA, the length of the each LEG, the length of the vertical stroke of each LEG, the air gap between each PMA and its corresponding FCA, the maximum velocity of each rotor relative to the corresponding stator which is in turn dependent on for a wave of given height on the buoyancy mass displaced by the mobile subunit and the mass of the rotor relative to the mass of the fixed subunit, and finally, by the mechanical impedance matching that transfers the mechanical kinetic energy of the wave first to the mobile subunit, and then second sequentially to the moving linear rotors of the Vibrational Energy Electrokinetic Matrix Transducer, which in turn depend on the closeness of matching the rotor's spring mass natural mechanical resonance frequency with the frequency of the most frequently encountered incoming waves as well as optimization of the ratio of the axial length of the PMA to the stroke distance through which the PMA oscillates. This energy transfer can be accomplished via a stainless steel dual non-magnetic spring and flexible cable system which, because of its high tensile strength, flexibility, and temporary potential energy storage ability, allows for extremely efficient mechanical energy transfer and is tolerant of the twisting and bending forces produced by the small but yet significant horizontal and rotational motion vectors of the ocean surface wave as it impacts and traverses the seawall as well as its interaction with other ocean surface waves in its vicinity. All of these factors should be considered to achieve the highest efficiency of desired wave kinetic energy dissipation via conversion to electrical energy, and, in addition, magnetic flux leakage, ohmic resistive losses, hysteresis losses, Lenz's Law counter EMF losses, and eddy current formation losses should be minimized. All of these factors have been dealt with in preferred embodiments without the need for any hydraulic or bearing mechanical devices to achieve the magnetic flux linkage needed to dissipate undesirable wave kinetic energy into useful electrical power.

A Power Collection Circuitry (PCC) system in accordance with an exemplary embodiment of the present principles uses several different novel features that are distinctly different from and advantageous to the known systems which generally rely on single phase or 3-phase AC electrical power output with or without DC rectification by various means. The problem of combining many sources of asynchronous AC and DC voltages from the many power output terminals from the numerous VLEG's of multiple WEC repeating units of the EKS is dealt with in this invention and solved in each of four ways described below using networks of appropriate electronic components.

Survivability in adverse conditions is important in embodiments used as a seawall. There are at least eleven important factors should be considered: 1) Components of the device should be non-corroding in sea water; 2) The Vibrational Energy Electrokinetic Matrix Transducer (VEMT) should be contained in a water tight container; 3) The mechanical interface where the kinetic energy of the ocean surface wave is transferred by the spring into the VLEG assembly should be water tight; 4) The vertical stroke should be limited and the action of the LEG's should cease if waves of a certain size produce an excessive amount of vertical motion in the VLEG electrokinetic matrix; 5) The seawall and its repeating WEC components each comprising the 4 previously described subcomponents should be able to resist the violence of severe waves; 6) The Electrokinetic Seawall should be located away from other structures including conventional seawalls by a sufficient distance to prevent collision of the seawall which is flexible and may move in position in the ocean water depending upon anchorage and tethering arrangements (if securely attached to a conventional seawall by rigid means of sufficient distance this is not a concern); 7) The repeating WEC component of the EKS should be attached to each other by such means and be sufficiently far from its neighbors so has not to cause collisions with each other in large waves. 8) The mechanical or electrical failure of a repeating WEC component of the EKS should not make the entire system non-functional; 9) The repeating WEC component of the EKS should be serviceable and easily replaceable keeping the rest of the system intact; 10) The EKS should be easily visually observable by ships; 11) The remote system should be visually observable by remote control by system operators. All of these factors have been considered and dealt with in embodiments of the present principles described herein.

FIG. 1A provides a side view of the external appearance of an exemplary Electrokinetic Seawall (EKS) system embodiment comprising a group of a repeating WEC components. Other more specific exemplary EKS system implementations are illustrated in FIGS. 1B, 1C, 2A, 2B, 12A-12E(2), 13A, 13C, 13D and 13F. In general, an EKS system can include a plurality of WECs, where each of the WECs includes a buoyant portion, for example, 192A, configured to be disposed above a surface of a fluid medium, the ocean in this example, when the WEC is immersed in the fluid medium. Further, each of the WECs is configured to convert mechanical energy of waves traversing the fluid medium into an electrical current. As discussed in detail herein below with respect to the various exemplary EKS systems, the plurality of WECs are affixed such that distances between adjacent WECs of the plurality of WECs are relatively close to dissipate the mechanical energy of the waves over an area of the fluid medium and thereby protect one or more structures or areas behind the EKS.

Referring to the EKS example illustrated in FIG. 1A, each Wave Energy Converter (WEC) 191 is connected together by suitable means of sufficient strength, semi-rigidity, and flexibility or elasticity comprising tether or connector 6, which may be a chain, a spring, or a cable made of a material not subject to corrosion such as stainless steel, heavy nylon, or any material commonly employed in the mooring of structures in the marine environment. The length, semi-rigidity and tension of the tether 6 should be such that the action of the waves impinging onto the EKS would not cause the WEC repeating component 191 to crash into and damage its neighbor. The tether or connector 6 in other exemplary embodiments may be rigid. A minimum spacing is preferred to separate one WEC 191 from its adjacent neighbor and this minimum spacing is given by s=4L sin 60°, where s=the minimum spacing between a WEC 191 and its neighbor, L=the height of the buoy floatation unit consisting of a buoy top structure 1 and a bottom base floatation collar structure 2 that floats on the surface of the ocean, and 60° represents the maximum angle of tipping from the vertical by the WEC 191 expected from the largest waves impinging upon the EKS apparatus. The design should allow for two adjacent WEC's tipping toward each other simultaneously (2L sin 60°) with a safety factor of 2 added yielding 4L sin 60° as the minimum spacing; designing in a safety factor of 2.309, which would protect the adjacent WEC's from collision even in the almost impossible event that such a great wave that both adjacent WEC's would be horizontal toward each other, we get s=4L designing in a tipping angle of 90° from vertical. This will maintain the proper minimum spacing between adjacent WEC's so as not to cause either their base floatation collars 2 or their buoy tops 1 to collide into each other. If possible, the preferred arrangement is to employ the 4L sin 60° spacing to maximize the benefit of ocean wave dissipation by EKS embodiments. By adding weight to the fixed subunit and making its center of gravity as deep as possible below the ocean surface, the stability of the WEC repeating component during the passage of large waves will be improved, as the WEC will be able to maintain a fairly erect posture with even the largest of waves, thereby decreasing the tipping angle from the vertical considerably. Thus, this minimum distance between adjacent WEC's will be able to be decreased markedly. If each WEC is fixed rigidly to the sea wall behind it that it is protecting, or if it is rigidly attached to the sea floor via rigid means, this minimum inter-WEC distance goes down to a matter of inches. Also for safety considerations, each WEC is lit with a Power LED module 205 at the summit of the buoy floatation collar top so that the Electrokinetic Sea Wall can be illuminated in darkness making it visible to passing ships. The apparatus is moored to mooring point 4 on the shoreline, attached to a conventional sea wall, or anchored to the sea bed.

The WEC 191 itself comprises an upper structure designed to float on and above the ocean surface comprising buoy floatation unit 192A formed by buoy top 1 and floatation collar base 2 and a lower structure 193A designed to be neutrally or slightly positive buoyant and float at or just below the ocean surface formed by metal top plate 5, buoyancy collar 15, an encasing metal stem shell 7, a metal heave plate 8, a metal brace 9, and a stabilizing metal water filled weight 10. The buoy floatation unit 192A and the buoyancy collar 15 on the lower submerged structure can be made of any of possible lightweight materials that are customarily used in buoys, floats, and rafts such as Styrofoam, polyurethane foam, wood, etc. The metal composing the submerged lower structure and its parts should be non-magnetic and relatively non-corrodible in both salt and fresh water and can include metals such as stainless steels, titanium, or brass; stainless steel, because of cost factors, widespread use and availability, and corrosion resistance being the preferred metal.

In its deployment into a large body of water which may be an ocean, a harbor, a large lake, a bay, or estuary, the array of WEC's forming the EKS are exposed to oncoming waves. The oncoming wave lifts the upper buoy floatation structure 192A as the crest approaches lifting its floatation collar base 2 vertically upwards away from top 5 of the lower buoyancy neutral or slightly positive structure 193A which stays relatively fixed in position relative to the water's surface because of its much greater mass as compared to the upper structure. When the wave crest passes, and the water height begins to descend, gravity forces the upper structure 192A downward, which continues to descend until the wave trough impinges upon the EKS. At that point, the upper structure 192A, still floating upon the water's surface is at its lowest height, and closest to the top 5 of the lower submerged structure 193A. Once the trough passes, and the water surface begins to rise toward the wave's neutral point or node (zero point), the upper structure 192A moves vertically upward separating itself from the lower unit which continues to be relatively stationary. The cycle repeats for each wave that passes.

The function of the WEC 191 is to dissipate unwanted mechanical kinetic energy of the wave as hits a seawall, a coast, a harbor, or other structure exposed to waves thus preventing damage or a shorter life of the involved structure. It converts the energy to a useful form, in this case, electrical energy. The mechanism by which it does this is the Faraday Linear Electric Generator.

The Faraday Effect, described by Faraday's Law, the third law of Maxwell's equations describing all known electromagnetic phenomena, occurs when there is relative motion between a magnetic field and a conductor, usually a metal wire, immersed in that field which causes a current and voltage to be induced in that conductor. The movement of the magnetic field relative to the conductor may allow for either the magnetic field being stationary or the conductor being moved, or the conductor is held stationary while the magnetic field is moved. In either case, mechanical energy is being applied to move either the conductor or the magnetic field, and some of this mechanical energy is converted to electrical energy consisting of the product of the voltage and current levels integrated over time induced within the conductor. Magnetic fields are composed of magnetic force lines called magnetic flux that emanate from the North pole of a magnet, electromagnet, or a magnetic field set up by the motion of a charge current (Ampere's Law—Maxwell's fourth law) and by established convention terminate on the south pole. The stronger the magnet, the greater the field intensity, and the greater the density of the flux lines in the magnetic field produced by that magnet. If the conductor is wound into a coil, the more turns, and the greater the length and cross-sectional area of the coil, the more flux lines will cut across it when there is relative motion of the magnet with respect to the coil. Since the voltage, current, and thus the power and energy levels induced in the conductor is proportional to the amount of magnetic flux lines cutting across the coil per unit time, the amount of mechanical kinetic energy converted into electrical energy by a system consisting of a magnet or magnets, and a coil or coils, the defining elements of the system known as an electrical generator, will depend upon the velocity of the relative motion of the magnet (s) and coil (s), the strength and size of the magnet, the medium through which these magnetic flux lines travel (magnetic material has a high permittivity that offers much greater ease to the flow of magnetic lines of force), the dimensions of the coil, the number of turns in the coil, the thickness of the wire forming the coil, and how well the magnetic field lines can be focused, concentrated, or otherwise directed onto the coil. The concept of the air gap is an important factor for maximizing the amount of flux lines intercepting the conductor. Because air is non-magnetic and offers great resistance (very low permeability approximately that of a vacuum) to the flow of magnetic flux lines of force (in air the density of the flux falls off with the square of the distance between the magnetic pole source of the magnetic field and the conductor), this air gap should be kept as small as possible.

Having described in elementary terms the theory of operation of an electrical generator, we can now explain the functional operation of the Linear Electric Generator in EKS embodiments. Most generators are structured so that a rotary mechanical motion caused by a unidirectional moving medium, such as water, steam, an engine belt, wind etc., intersects a turbine rotating machine to rotate a bank of magnets assembled around a circular structure at high velocity within a set of stationary conducting coils, usually copper, surrounding the magnets. It is also possible for the magnets to be in a ringed stationary structure enclosing a rapidly rotating structure consisting of conducting coils of wire. The effect is the same and symmetrical for either arrangement. The moving portion of the generator is called the rotor, and the stationary portion is called the stator. The power is generated in the coil windings, called the armature.

The conventional rotary generator in all its forms cannot be used directly, and can only be used indirectly with linear to rotary motion converter apparatus, usually of considerable complexity, when attempting to convert the mechanical energy of ocean waves to electrical energy. The problem with ocean wave kinetic energy is that it is not generated by a unidirectional relatively constant and uniform flow of a medium exerting a mechanical force vector always in one direction allowing it to turn a turbine rotary structure. Hence the value of the rotary generator is seriously compromised when attempting to use it for the purpose of dissipating the kinetic energy of waves.

As already discussed, ocean waves are approximately sinusoidal vertical disturbances, that while they propagate in a uniform single direction, virtually all of the mechanical force exerted by a wave is in the vertical direction and little in the horizontal direction. This vertical mechanical force follows a sinusoidal pattern with time, first in one linear direction upward, and then in the other linear direction downward from the ocean's surface.

The Linear Electric Generator is ideally suited for this purpose because it is capable of capturing the vertical oscillating wave force impinging upon it and as a result, because its rotor is a linear structure of moving magnets or coils, and its stator is a linear structure of stationary coils or magnets respectively, it captures the mechanical kinetic energy of the propagating wave with high efficiency as its rotor oscillates vertically in the same plane as the oscillation and displacement of the water particles constituting the wave. What results is a linear motion of the rotor relative to that of the stator in phase with the oscillating force vector of the wave. The larger the wave, the greater the mechanical force and energy impinging upon the LEG, the greater the acceleration and velocity of the rotor in the direction in phase with the impinging wave, the more magnetic flux lines that are cut by the coils per unit time, and the more mechanical energy is dissipated into electrical energy, which can then be directed away through power output circuitry to a load to perform useful work. It is capable of efficiencies of up to 90% because it requires little in the way of moving parts other than the rotor. Because it is important that the maximum velocity of the rotor be developed relative to the stator, the stator can be fixed to a large structure, such as the seabed, or to some other large structure to keep the stator largely stationary. It is important also to make the rotor as massive as possible, consistent with the limiting factor of keeping the mass of the upper mobile structure 192A much smaller than the fixed submerged structure 193A, as that allows for the largest transfer of kinetic energy to the rotor from a wave containing a sufficiently high enough kinetic energy as it intercepts the WEC.

In the exemplary embodiment of the LEG used in the WEC 191, the rotor is an integral part of the upper mobile structure 192A hereon now to be referred to as the mobile subunit, and the stator is an integral part of the of the fixed submerged structure 193A hereon now to be referred to as the fixed subunit. The sinusoidal variation of the distance between the mobile subunit 192A containing the rotor and the fixed subunit 193A containing the stator as the ocean wave impinges upon the WEC 191 develops the velocity of the rotor relative to that of the stator causing dissipation of the kinetic energy of the wave and its conversion to electrical energy.

FIG. 1B depicts, looking down from above a body of water, a deployment of an exemplary EKS apparatus 11 comprising a linear array of WEC's 11C (top view of WEC) tethered together by springs 6 and adjacent to, in front of, and tethered to a conventional seawall 147 by tether 4 thereby protecting that seawall from wave action and damage. Together, the conventional seawall and the EKS apparatus protect the beach or coastline 12 behind it.

FIG. 1C shows, looking down from above, a harbor seawall configuration that resembles an actual harbor coastline 13 with 2 protected buildings 122 and 123. In this configuration there are two conventional seawalls 147 that shield the harbor from approaching ocean waves leaving a small channel 14 for shipping. In front of each conventional seawall 147 an exemplary Electrokinetic Seawall (EKS) 11 of the present principles is showed deployed with EKS tethered attachment points 4 at the lower end of each EKS apparatus, attachment points 4 at the upper end of each EKS apparatus adjacent to the egress and ingress of the shipping lane, a linear array of attached Wave Energy Converters (WEC's) 11C (Top View of WEC) attached by chains, springs, or cables 6. The EKS Apparatus 11 provides kinetic ocean wave energy dissipation for the seawalls and both together protect the harbor coastline 13 and its two buildings 122 and 123.

FIG. 2A thru 2C displays top views of the interaction of the ocean waves and waves that may be seen in large inland bodies of water with varying geometries of an EKS apparatus. In FIG. 2A, an EKS apparatus 11 comprising two linear arrays of WEC's 11A and 11B composed of individual WEC's 11C is impinged upon by ocean waves of full intensity designated by heavy solid black lines 16 and upon passing through the EKS apparatus, the waves are attenuated in intensity as designated by lighter broken lines 17. The protected shoreline 12 is then impinged upon by attenuated waves of less kinetic energy content and is thus protected from erosion and other damage. FIG. 2B depicts a single isolated WEC 11C attenuating impinging ocean wave 16 producing waves of less intensity and smaller height 17 downstream. FIG. 2C illustrates a ring configuration EKS 18 of WEC's 11C which attenuates the incoming waves 16 of high intensity and large height to waves 17 of lesser intensity and lesser height downstream from the EKS. Note that in these configurations, it is not necessary for the EKS to always be in approximation to a conventional seawall to perform its useful function of protecting a coastline, or dissipating kinetic ocean wave energy into useful electrical energy. Note that any structure within the ring of EKS 18 will be surrounded by relatively calm ocean and is thus protected from sea wave motion. One important feature of circular or ring arrays of WEC's is that the efficiency of the EKS is not dependent upon incident wave direction of propagation and in this format the apparatus is omnidirectional without the need for steering mechanisms to maximize energy dissipation. For clarity, attachments between WEC's and means of anchoring the apparatus to a fixed position are not shown.

As indicated above, an important feature of the EKS is that the WECs should be disposed relatively close together to dissipate the energy of potentially damaging ocean waves and thereby protect various structures on or near a coast or even in open water. In contrast, known arrangements of other types of vertically oscillating WEC's have used multiple units that were quite farther apart than the EKS embodiments described here, greatly reducing the efficiency of energy capturing from the propagating waves. To achieve the beneficial effects of the seawall apparatus described herein, it is believed that the spacing of the WEC repeating subcomponents should be such that the spatial distance of each WEC from any of its nearest neighbors in any direction away from that WEC should not be any greater than approximately 8 times the height of one or more, preferably each, floating buoy collars, of the WECs, above the surface of the ocean. The basis for this distance is that any wider spacing seriously degrades the kinetic energy extraction ratio (kinetic wave energy flowing into the EKS minus the kinetic wave energy flowing out of the EKS—that quantity which is then divided by the kinetic wave energy flowing into the EKS) of the EKS array; the spacing between adjacent WEC's in a row perpendicular to the direction of wave propagation will degrade this wave kinetic energy extraction, and the larger the spacing, the greater the degradation. This degradation if not controlled leads to two problems—1) the amount of kinetic wave energy extracted over the area of the ocean in which the EKS is deployed becomes too limited to incur sufficient protection of structures behind it and 2) the magnitude of the by-product of this wave kinetic energy dissipation function, the production of useful electrical energy, is seriously degraded as well. This spacing problem can be overcome by increasing the number of rows of the EKS from a linear array of one row to the 2 dimensional geometrically variable array of many rows of the mesh arrangement, described in more detail herein below. However, this multiple row mesh configuration will only effectively make up for the spacing issue if the spacing between each WEC described above is less than the specified 8 times the height of the WECs above the water; spacings greater than that spacing lead to a degree of degrading of the energy extraction ratio that the institution of a 2-dimensional multiple row configuration may not overcome. Known arrangements of vertically oriented WEC networks fail to take into consideration the spacing problem and, in such configurations, the individual WEC's are spaced far too wide both for any meaningful wave kinetic energy attenuation, a basic purpose of the EKS embodiments, and fail to extract in a useful way a substantial amount of electrical energy from the given area of the ocean in which these networks are located.

FIG. 3A illustrates a side view of an embodiment of a WEC repeating unit of the Electrokinetic Seawall apparatus 11 at the point where a trough of an ocean wave is passing and the ocean surface is at its lowest level. Where not specified, all metal parts other than the PMA are composed of brass, stainless steel, or other non-corrodible and non-magnetic metal, with stainless steel type 316 being preferred for salt water marine environments, and all components made of buoyancy material may be composed of Styrofoam, polyurethane foam, wood, and other materials most commonly used for this purpose. The PMA in one embodiment is preferably composed of NdFeB (NIB) rare earth magnets although samarium cobalt magnets and magnets of other composition maybe used as well and pole pieces, made of hardened low carbon steel, high silicon electric steel, or any other steel that has high magnetic permeability and high saturation properties can be used; iron is not the preferred magnetic metal. The exemplary WEC of FIG. 3A comprises the mobile subunit 19, previously described in less structural detail in FIG. 1A as structure 192A that is now drawn to approximately half scale in FIG. 3A, and a fixed subunit or stator 20 which were shown in less structural detail on FIG. 1A as structure 193A. The mobile subunit or buoyant rotor 19 is configured to be driven by waves traversing a fluid medium, which in this example is the ocean. In turn, the stator 20 is configured to be at least partially submerged in the fluid medium and to be relatively stationary with respect to the rotor in response to the waves. As discussed herein below, the WEC can be configured so that one of the rotor or stator includes a field coil array and the other of the rotor or stator includes a permanent magnetic array that is configured to induce an electrical current in the field coil array in response to relative motion effected by the waves. In the example illustrated in FIG. 3A, the mobile subunit or buoyant rotor 19 comprises two components: 1) a buoy floatation collar 26 formed by buoy floatation collar base 2 of suitable buoyancy material such as Styrofoam, polyurethane foam, wood and others and which may be square, polygonal, or circular, the preferred embodiment, in shape; a buoy floatation collar top 1 of suitable buoyancy material such as Styrofoam, polyurethane foam, wood and others and which may be square, polygonal, or circular, the preferred embodiment in cross sectional shape; outer sliding tube 27; the upper end of fixed metal slotted rotor sliding inner tube 32, designed to be operative in the vertical and near vertical position and its end cap 32C with hole 32B through which upper perturbing force spring 23 extends; if sliding tube 32 is made of polycarbonate plastic or equivalent durable plastic, the slot (not shown in FIG. 3A, but shown in FIGS. 9E and 9F) may be omitted; rubber, silicone PTFE or preferably UHMW-PE (Polyethylene) ring bumper 25; sliding waterproof sliding joint and seal 124; outer sliding tube 27 is attached to the buoy floatation collar top 1 via upper attachment point 24 and buoy flotation collar base 2 via lower attachment point 24A; 2) the rotor of the VLEG 21 which in turn comprises an upper perturbing force stainless steel spring suspension system 23; an upper and lower spring attachment points 72 and 73 respectively; PMA 37 with central cavity 47 of inside diameter of 0.25 inch containing stainless steel tube 36 of outside diameter of 0.24" through which multi-strand flexible stainless steel or mono-filament Kevlar cable 33 flows and is attached to the upper and lower ends of the PMA 37 at attachment points 74C and 39A respectively; stainless steel structural support tube 36 may also be made of brass or any other stiff rigid non-ferrous metal material; the cable 33 attachments to PMA 37 are fixed and non-sliding so that any vertical movement of the cable causes a corresponding equal vertical movement of the PMA 37; a vertical stack of cylindrical rare earth NdFeB magnets 40 composing PMA 37 that are oriented with respect to their like repelling poles separated by interior magnetic pole pieces 35 of electric steel, hardened low carbon steel, or other suitable magnetic metal, end pole pieces 40A with all pole pieces being ringed by stainless steel slide bearings comprising thin stainless steel sheet bonded to interior pole pieces 35 and two end pole pieces 40A; additional stainless steel rings may be bonded to the sides of the magnets; End magnetic field deflecting magnets 212 and 213 whose thickness is a fraction of that of magnets 40 and whose pole which is attached to the end magnet 40 of the magnet stack is of the same polarity as that of the pole at the end of magnet 40 stack and whose other pole face is of the same polarity as the pole of braking magnets 28A and 28B respectively. In the preferred arrangement, flexible multi-strand stainless steel or mono-filament Kevlar cable 33 of suitable thickness attached to upper perturbing force spring 23 at attachment point 73; cables made of other flexible high tensile strength materials would also be suitable; and lower restoring force stainless steel spring 63 with upper attachment point 39A to PMA 37 and cable 33. All parts of metal other than the stainless steel springs 23 and 63 may be brass, stainless steel or some other non-corrodible (in sea water) non-magnetic metal. All cable 33 attachment points may be accomplished by knotted, epoxy bonded, cable clamped, or other suitable means.

With respect to the polarity of magnetic poles, there are three locations within the WEC where the repelling magnetic poles of like polarity are used in this embodiment: 1) between adjacent poles of the thick electric power producing magnets 40 of the PMA; 2) between the pole of the end magnetic field deflecting magnet 212 or 213 and the pole of the thick magnet 40 in the PMA that it faces; 3) between the pole of each of the end braking magnets 24A and 24B that face the end of the PMA and the respective pole of the end magnetic field deflecting magnet 212 and 213 that they face respectively. It does not matter whether a south pole is repelling another south pole or a north pole is repelling another north pole. The south pole configuration with south poles on each of the PMA ends facing south poles of the braking magnets were given as one of the two possible arrangements, with a similar arrangement of north poles being equivalent in structure and function.

FIGS. 3B (1) and FIG. 3B (2) depict two different embodiments of the upper perturbing force springs. The configuration of FIG. 3B (1) is structurally similar to that what was described above with respect to FIG. 3A and the mobile subunit 1. Here, in FIG. 3B(1), cable 33 is attached to the upper perturbing force spring 23 at point 73 and to PMA 37 at point 76. Two similar cables 58 are attached to spring 23 at point 72 and to attachment plate 125 at point 76C via cable tension adjustment assembly 93, a variant of a turnbuckle, a standard component used to adjust tension in spring suspension assemblies and which is made of galvanized or preferably stainless steel. Its purpose (not shown in FIG. 3A) is to adjust the tension that should always be on the spring suspension system of the VLEG so that the natural resonant frequency of the system can approximately approach that of the incoming waves for optimal kinetic energy transfer to the rotor. The configuration of FIG. 3B(2) resembles the configuration of FIG. 3B(1) except that now 4 additional springs 126 are added and cable tension adjustment assembly is not shown. It is believed that the second configuration in FIG. 3B(2) incorporates additional tolerance of the WEC to torsional and rotational force components of the wave input force, lessening mechanical wear from friction on the moving rotor. Cable tension adjustment assembly 93 is also used to adjust the tension in the spring assembly, which would tend to decrease with time, when the WEC is subject to routine maintenance.

Referring again to FIG. 3A, the fixed subunit 20 of the WEC comprises in turn four components: 1) a watertight canister or shell made of stainless steel, brass, heavy duty polycarbonate plastic or UHMW polyethylene plastic (with all plastic used in the present principles being either of UV stabilized or UV resistant nature) or other suitable non-corrodible in sea water non-magnetic material which in turn comprises large cylindrical tube 29; fixed subunit top 5 centrally perforated by ¼ inch hole 64 through which cable 33 extends whose preferred geometry is circular but may also be square, rectangular, or of other geometric shape; shock absorbing rubber, PTFE (Teflon™), silicone, or preferably UHWM Polyethylene (UHWM-PE) bumper 5A on the upper surface of fixed subunit top 5; and the upper surface of upper metal heave plate with skirt 8; 2) the Inertial Liquid Wave Dampening Stabilizer 22 (ILWDS) composed of two metal heave plates 8 of any desired geometric shape but rectangular in the preferred configuration with metal skirts along the entire outside perimeter of each heave plate braced together by metal brace 9 whose length is adjusted together with a suitable height of each metal skirt such that there is very little spacing between the two adjacent upper and lower skirts resulting in a very large quantity of water essentially trapped in the cavities enclosed by the heave plates; a water filled enclosed metal cavity comprising a water filled stabilizing weight or reaction mass 10 with a water ingress hole 41 on each side and an air intake and outlet hole 199 connected to rubber or plastic tube 200 feeding a one way air valve 201 to which a rubber or plastic hose 202 is attached; the structure is named as such because the water filled mass and the two metal heave plates with skirts entrap a large volume of liquid, ocean water, and forms it into a relatively stable mass dampening the motion of the fixed subunit caused by the waves above it; the structures of the ILWDS 22 may be of rectangular, circular, or other geometric shape that would tend to reduce undesirable heaving, swaying, surging, pitching, yawing, and rolling of the fixed subunit 20; 3) buoyancy blocks, tubes or rings 30 made of Styrofoam, polyurethane foam or some other suitable buoyancy material, with a preferred arrangement comprising hollow tubes of Lexan™ (polycarbonate plastic) of varying diameter and length consistent with suitable and desired total buoyant force and whose interior is filled with polyurethane foam; 4) the stator of the VLEG comprising FCA 34, which envelops the PMA 37; central slotted rotor sliding tube 32 whose inner surface upon which the PMA 37 will intermittently slide over air gap 61 (shown in FIG. 6) is suitably lubricated and whose length in the preferred configuration is sufficient to allow the rotor to vibrate through a stroke length of at least three times the longitudinal axis of PMA 37, the stroke length which is also approximately but not necessarily precisely equal to the sum of maximum significant wave height likely to be most commonly encountered plus an additional length to allow for the braking of the magnet, the presence of the electromagnetic mechanical rotor breaking system at each end of the rotor sliding tube, and fixation of the slotted sliding tube to the fixed subunit at its top and bottom; end breaking coils 31A and 31B; end breaking magnets 28A and 28B with central inside channel 59A and 64 respectively both of 0.25 inches in diameter; and water sensor switch 64A. Note that with the exception of inner core holes 47, 59A, and 64, and inner stainless steel tube 36, dimensions on the WEC structure were not listed because the WEC can be scaled down considerably to deal with small waves or scaled up enormously to deal with larger waves; for very large WEC structures, inner core holes 47, 59A and 64 can likewise be scaled up. Prototypes constructed used magnets 2 inches diameter, 1 inch in thickness and magnetization strengths of N42. One novel feature that will be described subsequently (FIG. 12 D, FIGS. 12 E (1) and (2)) is that the fixed subunit can be braced to the fixed subunit of adjacent subunits of nearby WEC's to greatly enhance its stabilizing function to be described below.

Before further discussing the functioning and operation of embodiments of the present principles and its components, several terms need to be defined. First, by convention in this description, the vertical upward direction of motion, velocity vector, and acceleration vector is a positive quantity; the downward vertical direction is a negative quantity. Next, there are perturbing and restoring forces acting upon the systems described herein. Perturbing forces on the WEC are considered to be the following: the force applied to the WEC by the wave which may be positive (upward) or negative (downward), and, with a pure single wave, sinusoidal in pattern with respect to time, but with actual ocean waves that are summation waves of other waves, approximately sinusoidal in pattern; the upper perturbing force of the spring of the rotor which always, because it is an extension spring, will exert a force upward that varies from zero to a maximum in a sinusoidal fashion with time and whose magnitude depends on its spring constant and the amplitude of the wave; and a baseline buoyancy force that is always constant, upward (positive), and determined by the geometry of the WEC. Restorative forces on the WEC are considered to be the following: Gravitational force which always acts downward on the WEC and remains constant; the restorative force of the spring of the stator which always, because it is an extension spring, will exert a force downward (negative) that varies from zero to a maximum in sinusoidal fashion with time and whose maximum magnitude depends upon its spring constant and the amplitude of the wave. Other forces on the WEC include the Lenz's Law Counter EMF force whose direction is always opposite to the direction of the velocity vector of the rotor and frictional forces of the rotor against the slotted sliding tube of the stator which also is in opposition to the direction of the velocity vector of the rotor. Finally additional forces acting on the WEC as a whole consists of motion forces in the six degrees of freedom including heaving, swaying, surging, pitching, yawing, and rolling and are due to the complexity and less than total uniformity of the waveforms that impinge upon the WEC both in terms of structural formation and direction of propagation. It is of a desired state, for the purpose of decreasing frictional forces of the sliding rotor against the stationary stator and minimizing the quantity known as parasitic damping to both increase the efficiency of kinetic energy conversion to electrical energy and decrease the frictional wear on the components of the VLEG of the WEC, to have these six motion forces produce as little motion as possible in the stator fixed subunit of the WEC; this desired state is accomplished by making the mass of the ILWDS as massive as possible. Furthermore, it is the desired state to minimize for the same reasons described for the stationary stator these 6 forces on the rotor and this desired state is accomplished in this embodiment by the resistance of the springs to which the rotor is attached to these described forces.

When the trough of an ocean surface wave containing kinetic energy of the motion of the wave impinges upon the EKS apparatus 11 (FIG. 1B and FIG. 1C) and its repeating component WEC 191 (FIG. 1A), the ocean water surface level is at its minimum level. Referring again to FIG. 3A showing the WEC 191 in its lowest position at the wave trough, at this point the upper end of slotted rotor sliding tube 32 which surrounds the upper perturbing force spring 23 is up against the under surface of buoy floatation collar top 1, buoy floatation collar base 2 of WEC mobile subunit 19 is resting against fixed subunit top 5; outer slide tube 27 is at its lowest position and watertight sliding seal and joint 124 is at its lowest position. Note that the watertight condition keeping water out of the VLEG is maintained by the watertight sliding seal 124, hydrophobic lubrication with the preferred agent being a lubricant that contains polytetrafluorethelyne (PTFE) as one of its components between outer slide tube 27 and the slotted rotor sliding tube 32 whose upper end is contained within outer sliding tube 27, and by rubber or silicone bumper ring 25 contained within the sliding channel between tubes 27 and 32. Bumper ring 25 essentially functions as an o-ring. An alternative equally effective configuration, as shown in FIG. 3C, comprises either separate O rings 215 composed of silicone, rubber, or in the preferred configuration, PFTE (Teflon™) or UHMW Polyethylene (UHMW-PE) as well as non-corrodible metal brass or stainless steel piston rings in a group of one or more that can be attached to the outer surface of the upper end of rotor sliding tube 27 in the location occupied by bumper ring 25 and in place of this bumper ring to accomplish the same purpose of a watertight shock absorber to the moving outer sliding tube 27 as it comes to rest in its lowest position during the passage of the wave trough. Note that watertight seal 124 may comprise a rubber, silicone, PFTE, the preferred material, or pliable foam of similar suitable substance in the form of a narrow collar or O ring type of structure permeated with or coated with the suitable, preferable, but not exclusive, hydrophobic PTFE based lubricant just described. FIG. 3C also displays spring cable tension adjustment turnbuckle assembly 93 that was not shown in the WEC diagram of FIG. 3A.

The wave crest now begins to travel away from the WEC and the ocean water level begins to rise as the wave begins to enter its positive slope half cycle between the trough and succeeding crest, and during this period of time, the sum of the force upward of the wave plus the force upward by the perturbing force spring of the rotor plus the buoyancy force upward on the mobile subunit exceeds the sum of restorative force of gravity, the restorative force spring attached to the stator, and the opposing back EMF force all acting downward. Referring again to FIG. 3A, a buoyancy force is produced against the base 2 of the mobile subunit 19 causing the entire floatation buoy collar structure 26 comprising base 2 and top 1 to move vertically upward. This force, because the base 2 floats on the water rather than being mostly submerged as in the case of the fixed subunit, is proportional to the area of the floatation collar base 2 floating upon the water. Base 2 always floats on and just below the surface of the water where the maximum wave energy flux is located. In the preferred arrangement, the cross-sectional area of the buoy floatation collar base 2 should be as large as possible relative to the cross-sectional area of the fixed subunit 20 and be submerged for several inches beneath the ocean surface where the maximum wave kinetic energy and force occurs but not be so large as to encompass to successive wave crests simultaneously. As buoy floatation collar base 2 and top 1 rises with the rising water level separating the mobile subunit 19 from the fixed subunit 20, because top 1 and base 2 are attached to outer sliding tube 27 at points 24 and 24A respectively, watertight sliding seal 124 and outer slide tube 27 also begin rising; upper perturbing force extension spring 23 begins to contract and lower restoring force extension spring 63 begins to extend. A buoyancy force is also experienced by the fixed subunit 20 but its effect is negligible and secondary to four factors—1) its mass is drastically greater as opposed to the mass of the subunit 19 with this mass being in the form of a reaction mass comprised of the ILWDS 22 whose center of mass is located relatively deeply below the surface of the ocean. 2) The ratio of the buoyancy collar's cross-section surface area of the fixed subunit 20 lying at significant water depth to that of the much greater buoyancy cross-section area of the mobile subunit at and just below the ocean surface causes the fixed subunit to experience a relatively very little fraction of the wave energy flux above it. Thus, the fixed subunit 20 moves a very small fraction of the distance and speed of the mobile subunit 19. Furthermore, the buoyancy force on the fixed subunit, proportional to the volume of the buoyancy ring on the fixed subunit that is completely immersed in the water, is designed to be much smaller than the buoyancy force on the mobile subunit, an amount sufficient only to keep the fixed subunit neutrally to slightly positively buoyant and prevent it from sinking. Note that buoyancy of the fixed subunit is preferentially slightly positive where possible to keep its upper end in proximity to the ocean surface; if it was precisely neutrally buoyant, then that in itself could contribute to some instability and some tendency to rise and fall with the wave passage. 3) The vertical displacement and speed of vertical displacement of the fixed subunit 20 is kept much smaller than with the mobile subunit 19 because the position of the center of mass and gravity is located in the bottom of the WEC in the ILWDS and resides sufficiently deeply under the ocean's surface so that both the vertical component and the much smaller and less important horizontal component of the water particle wave motion is much reduced at that location as compared to at the ocean surface because of the drop off of such motion varies inversely with the square of the depth, resulting in the center of mass and gravity moving with the wave action above it to a much less extent. 4) The cross-sectional area of the buoy floatation collar that is exposed to maximum wave energy flux and force just beneath the surface is much greater than the cross-sectional area of the upper end of the fixed subunit buoyancy foam collar 30. The result of the mass difference and buoyancy force difference between the mobile subunit 19 and fixed subunit 20 causes the two subunits to separate from each other in the vertical distance with the fixed subunit staying relatively stationary and the mobile subunit rapidly rising producing a relative velocity between the two subunits. The relative velocity between the two subunits is transferred to the rotor by means of the multi-strand flexible stainless steel or mono-filament Kevlar cable which now moves with a relative velocity to the fixed subunit. Finally, the ratio of the mass of the rotor of the VLEG to the mass of the floatation collar should be kept as high as possible for maximum wave kinetic energy transfer to the rotor, but not so high as to make the mass of the mobile subunit 19 of which it is a part too high relative to the mass of the fixed subunit 20, which would decrease the relative velocity and distance traveled by the rotor relative to the stator on the fixed subunit 20, thereby reducing the efficiency of conversion to electric energy by the WEC repeating component of the EKS.

It can be shown that the force on any buoyant body subjected to incident wave motion can be given by and is proportional to the product of the volume of water displaced by that object, the density of water, the gravitational acceleration, g, 9.8 m/s$^2$, and the sin ($\omega$t), with the constant (denoted $\delta$, the depth constant) of proportionality decreasing as the water depth increases; $\omega$ is the angular frequency of the wave. Hence the more shallow a submerged object is submerged, the more force from a wave is experienced by the object in the same manner that a submarine hardly feels the effect of huge hurricane waves if it is deep enough below the surface. It can also be shown from this relationship that this wave force is thus dependent upon the product of the cross-sectional area of the object exposed to the surface being transited by the waves and the depth to which the object is submerged as it floats on the water, that is, the volume of the water displaced by the submerged object. Hence, one wishes the cross-sectional area of the buoy flotation collar of the mobile subunit to be as large as possible (but less than the wave length of the ocean wave—very large ships are stationary in the water while boats whose size is less than a wave length will vibrate considerably in the water due to wave passage—and the overall density of the mobile subunit across the volume of space it occupies should be as small as possible so that it will be submerged to the least extent possible causing the force on it, and its magnitude of vibration to be huge compared to the fixed subunit with its much higher density, much heavier center of mass and gravity, much deeper depth of submergence at which the center of mass and gravity are located, causing the proportional constant of the impinging force to be much lower, and a much smaller cross-sectional area presented to the impinging wave motion. Thus, for a given wave size, the wave force in on the mobile subunit is a much greater force acting on a much smaller mass than the much smaller force acting on the much greater mass of the fixed subunit. Hence, the mobile subunit oscillates over a large linear motion equal to that of twice the amplitude of the wave, and the fixed subunit hardly oscillates at all, creating the relative motion between the rotor and the stator of the WEC repeating subcomponent that is important to the present principles.

Figure 8A:
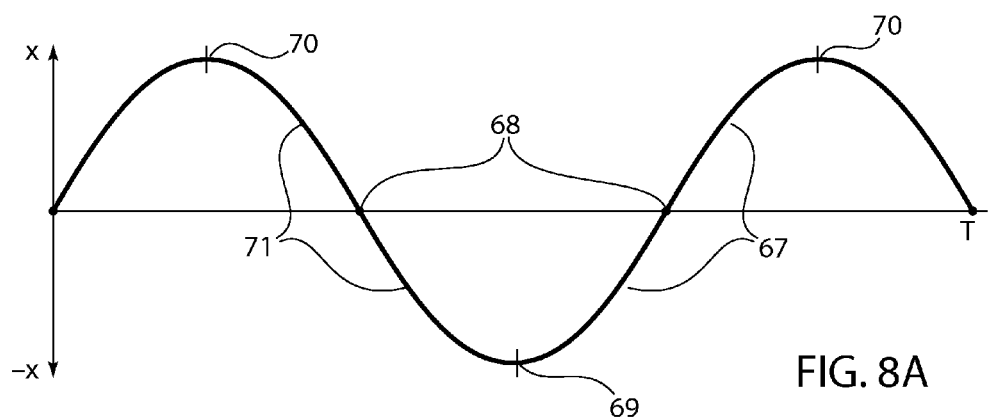
FIG. 8A is an illustrative diagram showing an idealized sinusoidal vertical displacement of the wave with respect to time as it passes through a WEC component of the Electrokinetic Seawall apparatus.
Figure 8B:
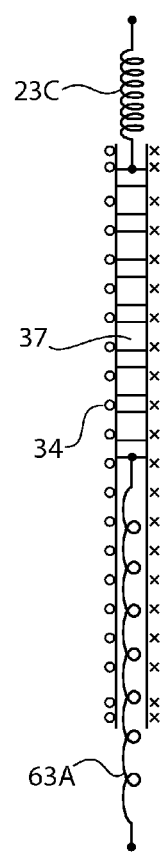
FIG. 8B is an illustrative diagram showing the upward positive vertical displacement of a PMA rotor (PMA rotor—FCA stator embodiment of the VLEG) with the passage of an ocean wave crest through the WEC.
Figure 8C:
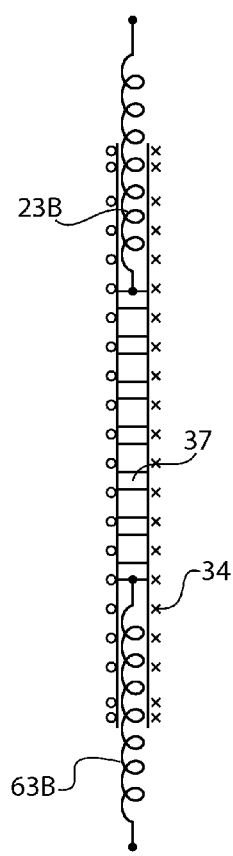
FIG. 8C is an illustrative diagram showing the neutral zero displacement of the PMA rotor (PMA rotor—FCA stator embodiment of the VLEG) with the passage of the neutral or zero point of the ocean wave through the WEC.
Figure 8D:
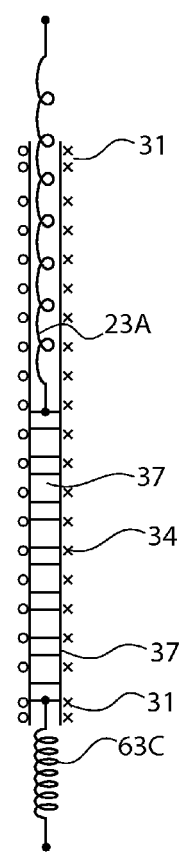
FIG. 8D is an illustrative diagram showing the downward negative vertical displacement of the PMA rotor (PMA rotor-FCA stator embodiment of the VLEG) with the passage of the ocean wave trough through the WEC.

Referring to FIG. 3A and FIG. 8D, initially as described above, the WEC is in position as shown with the rotor shown by PMA 37 in the lowest position at the point the wave trough 69 passes through. FIG. 8A shows a displacement vs. time graph of the impinging wave. Perturbing force rotor spring 23A is in the maximally extended position and it is storing a maximum of potential energy. Restoring force rotor spring 63C is minimally distended and is storing a minimum of potential energy. At this point, the gravitational force acting on the weight belonging to the mobile subunit 19 is exactly balanced by the buoyancy force acting on it; hence it is transiently stationary. When the trough 69 passes through, because the rotor containing the Permanent Magnet Array (PMA) 37 of the VLEG 21 is part of the mobile subunit 19, and the stator containing the Field Coil Array 34 is part of the fixed subunit 20, as the mobile subunit 19 begins to move upward, it pulls up on the upper perturbing force spring 23A that is now distended and it begins to contract; both upward forces now being exerted on the rotor PMA 37 causes it to start sliding upward in the slotted rotor slide tube 32 on the bearing surface formed from the thin stainless steel rings 38 that surround the pole pieces and or the magnets; the stainless steel rings 38 are lubricated to prevent unwanted frictional heat energy losses and frictional damage to the rare earth magnets or the sliding tube over time. The relative velocity of the mobile subunit 19 relative to the fixed subunit 20 due to the displacement upwards of the mobile subunit 19 produces a relative velocity between the rotor PMA 37 moving up and the relatively stationary stator FCA 34 which causes the magnetic lines of force emanating from this arrangement of like polarity magnetic poles repelling each other, to be described in great detail later, to efficiently cut through the FCA 34 copper coils producing a current and voltage in these windings. The electrical energy produced in these coils is subtracted from the kinetic energy developed by the upward vertically moving rotor, and since that kinetic energy was originally sourced from the wave moving through the WEC, the kinetic energy of that wave is decreased by at least that amount of energy that is dissipated by the VLEG in the WEC. In practice, because the WEC is not 100% efficient, the energy dissipated from the wave exceeds that of the electrical energy produced in the FCA during the velocity stroke of the rotor. At all times some of the kinetic energy of the wave is stored in either the perturbing force spring 23A or the restoring force spring 63C or both and then subsequently released back as kinetic energy of the rotor. Note that during this upward rising positive slope phase of the wave 67, the buoyancy force on the mobile subunit 19 plus the upward force of the wave itself plus the contraction of the distended perturbing force spring 23A exceeds the gravitational force downward on the mobile subunit 19 plus the back EMF force on the rotor acting downward producing a net upward displacement, velocity, and acceleration. Frictional forces opposing the rotor's motion may be disregarded because of the lubricated exceptionally smooth bearing surfaces of the stainless steel pole and magnet stainless steel sliding rings. If made of stainless steel, electropolishing the inner surface of the slotted sliding tube reduces frictional forces even further.

As the wave continues to propagate through the WEC, the rotor PMA 37 moves with higher velocity with a positive acceleration as the buoyancy force of the wave increases, reaching a maximum. The upper perturbing force spring 23 is contracting, releasing its stored potential energy as kinetic energy to the rotor while lower restoring force spring 63 is extending, increasing its stored potential energy. At the first zero point 68 on FIG. 8A of the wave, the status of the WEC is represented by FIG. 8C; the rotor PMA 37 and mobile subunit 19 is moving at maximum velocity relative to the stator and fixed subunit 20, and the amount of magnetic flux lines being cut by the rotor's PMA 37 movement through the FCA 34 of the stator per unit time is at a maximum. At this point the voltage and current, and hence electrical power and energy being generated by the VLEG 21, is at its maximum. At this point, both the perturbing force rotor spring 23B and the restoring force stator spring 63B are in less distended positions and they have a minimum amount of energy stored within both of them together. Also at this point, outer slide tube 27 has slid upward halfway up its sliding path (equal to the rotor stroke distance which in turn is equal to the maximum wave height that the WEC has been designed to handle, or less for waves of smaller magnitude). Buoy floatation collar top 1 has lifted away from the end of slotted rotor sliding tube 32.

In FIG. 8B the crest 70 of the wave begins to approach the WEC of the EKS. The velocity of the rotor PMA 37 in rotor slide tube 32 and the mobile subunit 19 is decreasing relative to the stator FCA 34 and the fixed subunit 19. The amount of kinetic energy being dissipated from the wave and the amount of electric power and energy created is decreasing, and the amount of energy stored in the upper perturbing force rotor spring 23C is decreasing approaching a minimum as the distention of the restoring force spring 63A of the stator begins to increase thereby increasing the energy stored by that spring toward its maximum amount. The rotor PMA 37 is approaching its maximum upward displacement as it slows down relative to the stator FCA 34. At this point, the sum of the buoyancy force plus the upward wave force is still greater than the force of gravity and the decreasing Lenz's Law back EMF force downward, and thus the rotor and the mobile subunit 19 is still moving upward albeit by a smaller velocity.

Referring to FIG. 8A, when the wave crest 70 has approached, the upward force of the wave has dropped to zero, and once again the gravitational force on the PMA rotor 37 and mobile subunit is exactly balanced by the buoyancy force on it, and again the rotor PMA 37 and mobile subunit 19 is at rest relative to the fixed subunit 20 and the FCA stator 34. At this time, there are no magnetic lines of flux cutting the coils, the kinetic energy of the wave being dissipated is zero, and the electrical power and energy generated is zero. The back EMF force is likewise zero. The perturbing force spring of the rotor 23C is minimally distended, and the restoring force spring of the stator 63A is maximally distended with its stored potential energy being at a maximum. Outer sliding tube 27 has slid upward on watertight sliding seal 124 to its maximally elevated position and seal 124 is abutting up against the blocking rubber bumper ring 25 attached to the upper end of the slotted rotor sliding tube preventing the buoy floatation collar from lifting off completely from the fixed subunit by waves that exceed in height the design capabilities of the WEC; waves of a lesser height will cause the maximum height reached by outer sliding tube 27 and watertight sliding seal 124 to rise to a lesser amount than the maximum height.

Once wave crest 70 passes in FIG. 8B, the wave enters its half cycle 71 in which its slope is negative until the next trough is reached. During this half cycle, the sum of the gravitational force downward on the rotor PMA 37 and the mobile subunit 19, the restorative force downward of the distended restorative force spring 63A of the stator, and the force exerted by the wave which is now in the downward direction all exceed the sum of the upward force of buoyancy on the mobile subunit and the rotor, the force upward exerted by the perturbing force spring 63 of the rotor PMA 37, and the Counter EMF force acting upward opposing the rotor's motion. This net summation of forces on the rotor causes it to move downward in increasing velocity following the negative mirror image of the motion of the rotor PMA 37 and the mobile subunit 19 on the positive slope half of the wave when the sum of the buoyancy force upward, the wave force upward, and the perturbing force spring 23A of the rotor exerting its force upward exceeded the sum of the downward gravitational force on the rotor and mobile subunit 19, the downward force exerted by the restorative force spring of the stator and the downward directed back EMF force on the rotor PMA 37. The cycle is completed during this half cycle when the next wave trough approaches, and while the kinetic energy dissipated during this negative slope half cycle is similar to that of dissipated during the positive slope half cycle 67, the electrical power and energy generated is of opposite polarity. During the negative sloped half cycle of the wave, the buoy floatation collar base 2 and top 1 of mobile subunit 19 begin falling with the falling ocean surface, which causes outer slide tube 27 and watertight slide seal 124 to fall, mobile subunit 19 approaches once again the top of fixed subunit 20, upper perturbing force spring 23 steadily extends storing potential energy from the wave, and lower perturbing force spring 63 begins contracting releasing its stored potential energy to the rotor. When the next wave trough arrives, the operational cycle of the WEC and the VLEG contained within it has been completed. At the point the trough arrives, the buoy floatation collar top 1 and base 2 settles onto the top 5 of the fixed subunit and shock absorber 5A, with the mechanical shock absorbing effect of shock absorber 5A on the top surface of subunit top 5 as well as the upper end of bumper ring 25 impinging on the under surface of buoy floatation collar top 1 slowing outer sliding tube 27 and sliding watertight seal and joint 124 to a gentle stop. Note that waves smaller than the waves of maximum amplitude for which the particular WEC was designed would cause the buoy floatation collar to approach but not touch bumper ring 25 and shock absorbing bumper 5A at the crest and trough of the wave respectively. Furthermore, because of the electromagnetic mechanical braking system at each end of the rotor slide tube, waves larger than that for which the WEC was designed will cause the rotor to brake, thereby causing the impact of the buoy floatation collar on bumper ring 25 at the crest of the wave and shock absorbing bumper 5A at the trough of the wave to be gentle in nature in consequence of the present embodiment having been designed so that the position of the breaking mechanism at each end of the rotor slide tube is such that they initiate and perform their function at approximately the same time the buoy floatation collar reaches structures 25 and 5A.

Figure 7A:
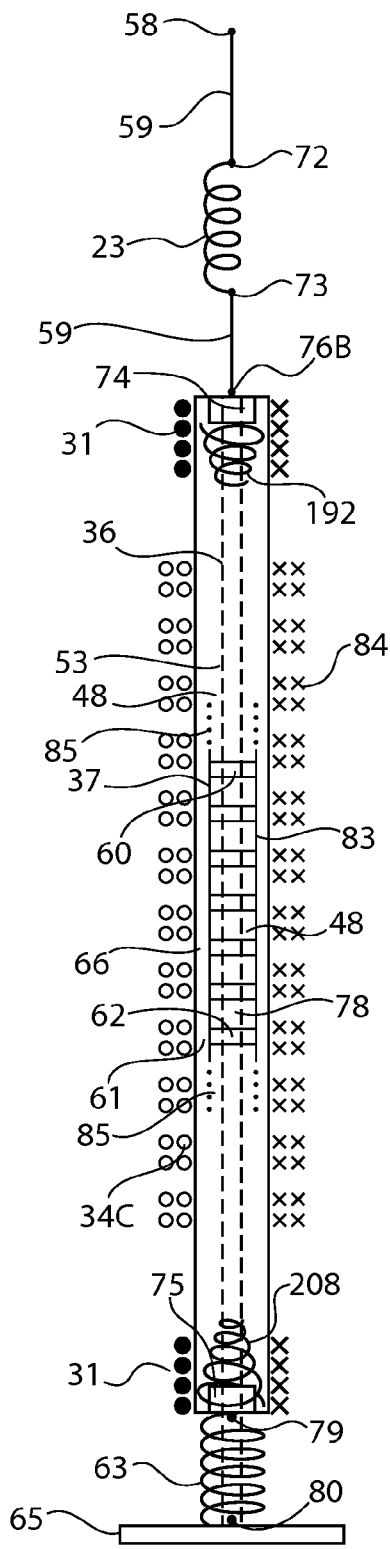
FIG. 7A illustrates (not to scale) a VLEG embodiment 1 composed of a 3 Magnetic Unit PMA stator and its associated FCA rotor of length twice that of the PMA Stator—The first of two exemplary invariantly symmetric embodiments of the VLEG of Order 3 described herein.
Figure 9E:
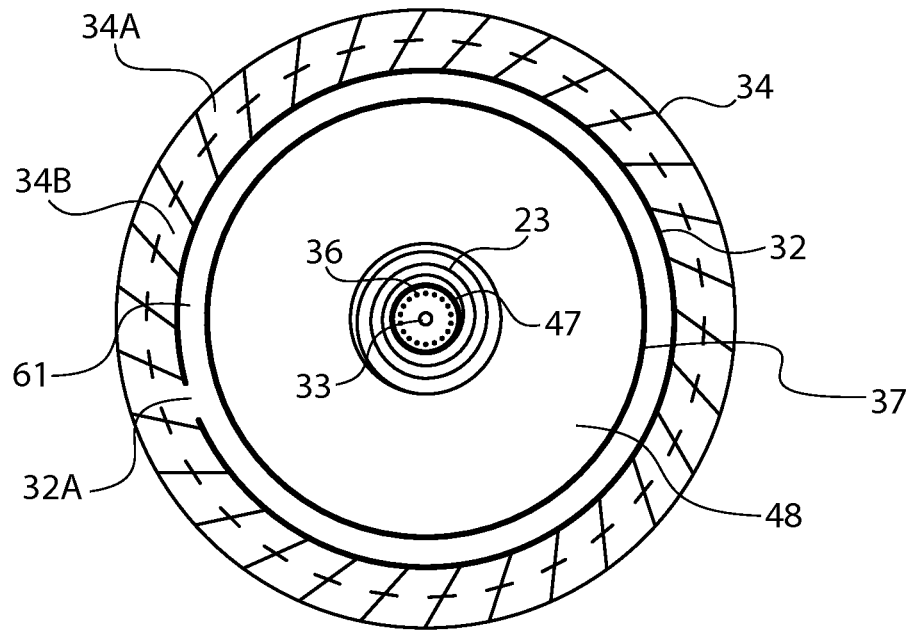
FIG. 9E shows a cross-section view from above of the VLEG embodiment composed of the PMA rotor and FCA stator.
Figure 9F:
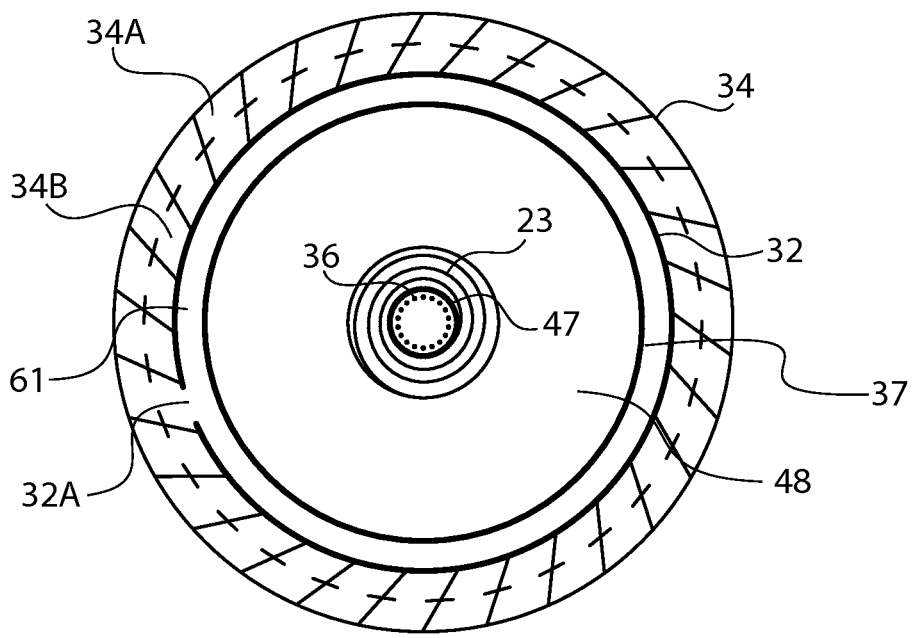
FIG. 9F shows the VLEG embodiment composed of the PMA stator and FCA rotor.

The slot of slotted rotor sliding tube 32 is not shown in side views FIG. 3A, FIG. 7A, B but is shown in VLEG cross section views in FIGS. 9E and 9 F and is made of stainless steel, durable hard plastic such as polycarbonate (Lexan®) or UHMW polyethylene, brass, or other sturdy non-ferromagnetic material and performs the following functions: 1) Prevents eddy current losses in the metal non-magnetic slide tube, and thus may be omitted if non-conductive plastic is used; 2) By being able to vary slightly the inner diameter of the sliding tube by flexing the edges of the slot closer together or further apart, the slot allows for tight and exact adjustment and minimization of the air gap distance between the outer cylindrical magnet surface of the PMA and the inner sliding tube surface; 3) Helps along with the central canal of the PMA to equalize air pressure above and below the sliding rotor preventing undesirable air resistance to the rotor's sliding velocity; if a plastic tube without a slot is used, air vents 214 at either end of the tube that is not blocked by FCA windings would be desirable for this purpose.

The preferred arrangement is to have the FCA 34 three times as long in length as the PMA 37 for two important reasons: 1) so as to insure that every magnet of the PMA 37 is underneath a coil of the FCA 34 at all times; not doing so would waste intensely magnetic field lines of flux that would escape out to space seriously degrading efficiency because of some magnets not being encircled by coil windings; in this arrangement, virtually all of the magnetic flux lines emanating from and flowing to the PMA 37 will intersect FCA 34 at some point and induce a voltage. While it is also a feasible situation to have the PMA 37 twice as long as the FCA 34 especially if the FCA was the rotor and the PMA was the stator, again there is severe leakage of flux lines because at any given time many magnets would not be encircled by coil windings, plus the fact that very large PMA's are harder to work with in terms of personnel, assembly, and cost, and it is more efficient, safe, and cheaper to enlarge the FCA length; it is more cost effective to waste copper windings over empty space than to waste large and expensive rare earth magnets by having them not encircled by copper windings. Very long PMA's would also be more difficult to use as a rotor as compared to shorter ones or to FCA's being used as a rotor as the difficulty and safety working with and assembling the extremely powerful rare earth magnets used as well as dealing with the increased lateral magnetic attraction of ferromagnetic debris along the sides of the PMA which would seriously degrade rotor sliding performance would become progressively problematical as PMA length is increased to longer lengths. 2) It can be mathematically shown that the maximum kinetic energy transferred to and developed in the rotor is related to the maximal velocity developed in the rotor squared if the stroke length of the rotor is three times that of the axial longitudinal length of the rotor.

While both embodiments of the VLEG are functionally equivalent, the preferred embodiment is for the rotor being the PMA and the FCA being the stator for two important reasons: 1) It can be shown mathematically that the kinetic energy transferred and developed in the rotor is proportional to the mass of the rotor. Thus, the mass of the rotor should be made as large as possible consistent with the ratio of the mass of the mobile submit to the fixed subunit being as small as possible. 2) There are many wire connections that are made between the many coils and the power collection circuitry (PCC). To connect many moving coils with moving wires to a fixed positioned PCC (even allowing for the fact that some of the PCC could be fixed to the FCA rotor itself) would produce serious reliability problems from wire and metal vibrational fatigue and eventual breakage in the rugged environment of the ocean. However, in certain circumstances the second embodiment with a stationary PMA and moving FCA may be the preferred structure.

Also, with the preferred arrangement, to ensure that a given amount of kinetic energy imparted to the rotor is efficiently converted to electrical energy, there should be two coils in the FCA for every magnet in the PMA or 4 coils for every magnet pair, and the combined width of these four coils should equal approximately the length of two magnet thicknesses plus two pole pieces to ensure that a coil would not be over significant amounts of S and N directed magnetic field lines simultaneously which would seriously degrade efficiency and power output except briefly when a given coil would be over the precise center of a magnet's longitudinal thickness. If the thickness of the power producing magnet is $T_m$ and the thickness of the pole piece is $T_p$, then the width of each of the four coils should be, in the preferred configuration, approximately $(T_m+T_p)/2$. This preferred configuration is most efficacious when the amplitudes of the incoming waves are relatively small, as is with case in calmer areas of the ocean, or in bays, estuaries, or large lakes where the wave kinetic damage factor to structures impinged upon by the waves is less damaging. However, while this preferential configuration is used repeatedly throughout the description of the present principles, the relationship between the total number of coils of the FCA and the total number of magnets in the PMA can be influenced by the size of the magnitude of the impinging waves. For smaller waves, the ratio of the number of coils in the FCA to the number of magnets are such that the preferred configuration leads to a FCA whose length approximates that of the PMA and there are two coils for each magnet and 4 coils for each magnet pair. When the waves are significantly higher with significantly higher damaging potential to structures and coastline impinged upon by such waves, there are two other conditions that should be satisfied for the desired efficient functioning of the VLEG in the WEC repeating subcomponent of the EKS: 1) Condition 1: the magnets must, in this example, always be under coils of the armature during the entire time of the wave cycle for an anticipated significant wave height, thus resulting in an armature length of twice that of the length of the PMA and in at least twice the total number of coils in the armature as the number of coils that would encompass the PMA at any given time, that is, four coils per magnet and eight coils per magnet pair to prevent inefficiency in kinetic energy to electrical energy power conversion because of excessive leakage of magnetic flux due to uncovered PMA magnets not within coils; and 2) Condition 2: For a given amount of available wave kinetic energy from a wave of given size, as stated above it can be shown that the maximum kinetic energy is transferred to the rotor when the length of the rotor stroke distance is three times the length of the rotor PMA, requiring in this example additional coils in the FCA armature so that the rotor PMA will always be encompassed by coils during this greater distance of vibration than in the distance of vibration of the first condition. Thus there are 6 coils of width just described for each magnet (12 coils per magnet pair) in the PMA when the PMA is the rotor as per the first embodiment. Given these two conditions acting together with the preferred arrangement of 4 coils of width $(T_m+T_p)/2$ per pair of magnets and pole pieces, there should be a range of two to six coils of the specified width per magnet, and four to 12 coils per magnet pair, with the latter number of 12 coils per magnet pair and 6 coils per magnet being the most efficacious as far as kinetic energy transfer and conversion to electric energy in WEC's exposed to larger waves; at a minimum for the larger waves there should always be at least four such coils of the specified preferential width over each pair of magnets and their associated pole pieces at any given time during the ocean wave cycle requiring in this example a minimum of 4 coils in the armature per magnet and 8 coils in the armature per magnet pair. An armature FCA satisfying the second condition above will always satisfy the first condition above more optimally because of the greater number of coils yet further reducing magnetic leakage. If the width of each coil is approximately $(T_m+T_p)/2$, then at any given time 4 coils will be over each magnet pair with each coil intersecting magnetic lines of flux traveling in the same direction (except for transient periods of time during the wave cycle where two of the four coils would intersect a low number of oppositely flowing lines of magnetic flux when those two coils were over the precise center of a magnet in between its north and south pole in the region of lowest magnetic field density) allowing for the maximum conversion of kinetic energy at a given rotor velocity into electrical energy. For waves of smaller amplitude in calmer bodies of water, conditions one and two give way to the preferred configuration of 2 coils per magnet and 4 coils per magnet pair of width $(T_m+T_p)/2$ as described previously.

Obviously, condition 2 as compared to condition 1 operative for larger waves would be expected to produce less induced electrical power per FCA coil and total amount of copper used in the windings is increased for a PMA of given length, decreasing the efficiency of the FCA, although the PMA operates at higher efficiency in terms of the amount of wave kinetic energy dissipated per magnet in the PMA because more kinetic energy is imparted to the rotor when the PMA length is one third that of the significant wave height in condition 2 as compared to when the PMA length is one half of that of the significant wave height in condition 1. Copper coil efficiency is maximized and the quantity of copper used in the windings is minimized in the preferred condition, preserving PMA efficiency but only with smaller waves. PMA efficiency of energy converted per magnet has precedence over FCA efficiency of energy converted per coil. Furthermore, a magnet not contained within a coil at all times is more detrimental to the efficiency of the VLEG as compared to a coil not enclosing a magnet during some part of the wave cycle. Kinetic energy imparted to the rotor is most advantageous to the operation of the VLEG and the present principles when this kinetic energy quantity is maximized. This is most effectively accomplished for a wave of given energy by linearly decreasing the mass of the rotor so that the velocity is increased as a squared function. Given that the kinetic energy dissipated by the rotor and hence the electrical power generated, which is proportional to the kinetic energy imparted to the rotor and is maximized for large waves when the length of the rotor element is one third that of the significant wave height and rotor stroke distance, smaller more intensely magnetized magnets will cause a greater rotor velocity to be developed, thereby producing the greater wave kinetic energy dissipation through increase magnetic flux linkages intersected per second. While a smaller mass of the rotor does decrease the kinetic energy transferred to the rotor for a given wave and wave force in, because $K=mv^2/2$, smaller, lighter, more intensely magnetized magnets result in a higher velocity as a more important factor as long as the total magnetic flux produced by these magnets remain a constant.

The problem of the decrease in efficiency of electrical conversion per FCA coil due to the underused coils that exist at any point of the wave cycle is unavoidable and can only be minimized unless one wishes to increase utilization of the coils at the expense of causing some magnets in the PMA to be underutilized such as what might occur in the second embodiment of the present principles where a long PMA stator is utilized with a short FCA rotor causing a coil to always be over a magnet but some magnets often not being under a coil. This impact to coil efficiency is secondary in importance to the decrease in efficiency of energy conversion that would occur if any magnets themselves were not under any coils at all times during the wave cycle, a situation that should if at all possible be avoided. The problem of underused coils can be compensated in part by at least 3 methods to increase the average individual coil energy conversion efficiency: 1) One can design the WEC to handle waves of the significant wave height that will be most likely to be encountered in any given location and not the maximum possible wave height that will be encountered. Then the stroke distance of the rotor can be made shorter, less coils in the FCA would be needed, and for a given rotor mass, magnets of greater radial axis length (diameter) and lesser longitudinal axis length (thickness) may be used, thereby concentrating the total given amount of magnetic flux into a smaller spatial volume. One can only enlarge the diameter of the PMA magnets by so much, because if the ratio of the longitudinal axis length to the radial axial diameter of the magnets becomes too small, the flux line concentration B field along the perimeter of the magnets, i.e. the cylindrical surface of the PMA which is advantageous in itself with the nearby coil placement, may become so great that the repulsive forces between the magnets may become problematical even with the stainless steel central support tube. Furthermore, the energy of the rarer larger waves will be wasted to some extent; 2) If the magnet material volume and mass are kept constant but the magnetic strength of the material is increased (a higher N factor or megagauss-oersted factor), the total magnetic flux lines within the volume of the given number of FCA coils is increased; 3) One can transition from a PMA whose longitudinal axis length is one third that of the significant wave height and stroke distance with 12 coils per magnet pair and 6 coils per magnet (condition 2) to that which is one half of the significant wave height with 8 coils per magnet pair and 4 coils per magnet (condition 1) which again with the total magnet mass and volume kept constant increases the total flux linkages per individual coil of the FCA but at the expense of sacrificing some of the kinetic energy in the form of a somewhat decreased velocity imparted to the moving rotor element associated by adopting condition 1 over condition 2. The tradeoffs are difficult but should be accomplished within the proviso that the main utilization of seawall embodiments of the present principles is to mitigate the damage done to structures upon which the waves impinge with an accompanying consequent production of electrical energy.

There is one important situation that can arise when the waves impinging on the WEC's of the EKS may be relatively small such as in a lake, estuary, bay, sound, or other calmer body of water or calm portion of the ocean. It was previously pointed out that the state of occurrence of such small waves would invoke the preferred arrangement of 4 coils per magnet pair and pole piece pair whose combined width is equal approximately to that of the width of the magnet pair and pole piece pair and this preferred arrangement would hold predominance over the other two conditions 1 and 2, calling for 8 and 12 coils respectively per magnet pair and pole piece pair, that become significant factors with larger waves. Under this circumstance of small waves, the efficiency of wave kinetic energy as defined by the amount of dissipation and conversion of such wave kinetic energy to electrical power per FCA coil goes down drastically if the conditions 1 and 2 of 8 and 12 coils per magnet pair and pole piece pair are applied. The preferred arrangement of 4 coils per magnet pair and pole piece pair dictates, with the presence of waves of small significant height, that the length of the FCA be only slightly longer than that of the PMA, and that the difference in length be equal to the significant wave height of the waves. For this to hold, the longitudinal length of the PMA should be significantly greater than that of the significant height of the waves. In this manner, every magnet of a very long PMA can vibrate under virtually every coil of a very long FCA just slightly longer than that PMA dissipating wave kinetic energy even if the significant height of the waves is relatively small, resulting in the greatest kinetic energy dissipation efficiency per PMA magnet and FCA coil together thereby allowing WEC's using long FCA and PMA lengths to dissipate considerable kinetic energy into electrical energy even with small waves being present. This advantageous state is only achievable when the wave significant height is much shorter than either the length of the PMA rotor or the FCA stator. It is important to note that as the ratio of the length of the PMA to the significant height of the waves gets larger from a magnitude of approximately 1:3 and approaches 1:1, the 12 coil condition (condition 2) per magnet pair and pole piece pair, to be referred to at this point as a PMA structural magnetic unit (SMU), is most beneficial, and the 8 coil condition (condition 1) per PMA magnetic structural unit, becomes more beneficial to maintain the highest efficiency of kinetic energy conversion by the WEC. As the ratio of length of the PMA to the significant height of the wave begins to increase significantly past 1:1, the preferred arrangement of 4 coils per magnetic structural unit comes into beneficial predominance for the advantageous state of maximal wave kinetic energy dissipation and is most advantageous as compared to the two other conditions 1 and 2 when this ratio is very high. It is important where possible to make the length of the FCA in the stator for embodiment 1 of the VLEG greater than the sum of the significant wave height and length of the PMA in the rotor to prevent some magnets of a PMA to be uncovered by coil windings at certain times of the wave cycle. Furthermore, this ratio should not be so high that the length of the WEC's PMA and FCA would be capable of extracting more kinetic energy from the wave than the small wave actually contains—PMA's and FCA's longer than this, i.e. where this described ratio is very high, result in no increased energy conversion; not only would this state be simply a waste of coil winding copper and rare earth magnet material, but also the excessive mass of the PMA relative to the small wave input force exerted on the buoy floatation collar by the small waves as well as an increased mass of the mobile subunit containing the rotor relative to the mass of the fixed subunit would impair the operation of the WEC.

Note that although the preferred first embodiment of the present principles comprises a moving PMA rotor and fixed stationary FCA stator armature, this discussion applies also to the second embodiment comprising a moving FCA armature rotor and fixed PMA stator. It is believed that the above engineering considerations are much easier to achieve with the first embodiment. However, in either case, the multitude of parameters may be adjusted in accordance with the above-described considerations to achieve an optimal mix of these parameters so that the WEC may be used with effective function in any body of water of waves of any height excluding storm high wind conditions and calm water surfaces lacking the presence of discernible waves. It is believed that the flexibility of design of the parameters just described as well as other parameters described elsewhere in the description of the present principles, which allow use over such a wide range of wave magnitudes, is novel and significant.

By way of illustration, for ocean waves of significant height, i.e. 2 to 6 meters, for example, a WEC should have a PMA rotor whose length is set at 2 meters and an FCA stator whose length is 6 meters for highest efficiency of kinetic energy dissipation, keeping all other factors (magnet and coil diameter size, wire gauge, etc.) constant. Further, there should be 12 coils for each PMA structural magnetic unit. If the significant height of the waves was 1 to 2 meters, the FCA length may be adjusted to 4 meters with 8 coils per structural magnetic unit. For waves of 0.25 to 1 meter, the FCA length may be adjusted to 2 meters plus the significant height of the wave or 2.25 to 3 meters with 4 coils per structural magnetic unit. Small waves of this level will still allow for high efficiency of kinetic energy dissipation because, although each magnet of the PMA moves a small distance, all the magnets are always moving within the FCA coils and there are many coil magnet pairs active at any given time. Note that waves smaller than 0.25 meter in significant height would probably not contain sufficient energy to make full use of a 2 meter PMA, as they would simply not contain sufficient energy in the wavefront surface impinging on the WEC and, hence, efficiency will drop considerably. Note, however, that using all the relationships and conditions described so far that determine optimal configurations of coil widths, FCA and PMA lengths, and coil to magnet ratios, even given waves of only 0.1 meter (10 cm.) in significant height, a WEC can be constructed that can produce significant electrical power from all the magnets and coils simultaneously. In this example, the WEC should have a 1.1 meter LCA stator (equal to the length of the sum of the PMA length plus the significant height of the wave) surrounding a 1 meter PMA rotor containing 10 structural magnetic units each 0.1 meter (100 cm.) in width with 2 magnets 0.035 meter (3.75 cm.) in thickness and 2 pole pieces of desired thickness (magnet thickness to pole piece thickness in the preferred configuration ranges from 2:1 to 8:1) relative to the thickness of each PMA magnet that are 0.0125 meter (1.25 cm) in thickness and with 4 coils of thickness 0.025 meter (2.5 cm) for each structural magnetic unit results in the use of 20 magnets, 20 pole pieces plus one extra end pole piece, and 44 coils. The application of the EKS can gradually change from primarily coastal structure protection from significantly sized waves to a primary function of conversion of kinetic wave power to electrical power as the size of the waves get smaller and are less destructive. This transition of utilization is strikingly illustrated by this example and is representative of a secondary function of EKS embodiments to produce electrical energy from the kinetic energy of sea waves. Additional calculations for selecting the proper sized magnets and pole pieces for the structure of the VLEG and WEC within the EKS operating in a given wave environment will be described presently.

The efficiency of the VLEG can be further enhanced when the length of the PMA rotor employed in the optimal configuration of the VLEG of the WEC and the number of utilized electric power producing magnets, pole pieces, and FCA coils are related to and designed for the desired significant wave height $H_{TE}$ of the waves that would be expected to be encountered most commonly. The preferred design is described as follows: $s_r$, the rotor stroke distance, should approximately be equal to the significant wave height, $H_{TE}$, and, as previously stated, optimal kinetic energy transfer to the rotor should be such that $s_r$ should be for the larger waves three times the longitudinal axial length of the rotor PMA. If $T_m$ and $T_p$ are the thicknesses of the electric power producing magnets and pole pieces respectfully that are to be employed, it can be shown that the optimal number of magnets and pole pieces in the preferential configuration is equal to $H_{TE}/3(T_m+T_p)$, the optimal number of magnet pairs in repulsion field configuration is equal to $H_{TE}/6(T_m+T_p)$ and the optimal number of coils in the stator armature in the FCA of preferred width described above, which can be expressed as equal $(T_m+T_p)/2$, would be satisfying the second of the two above conditions and is given by $2H_{TE}/(T_m+T_p)$. In this most preferential configuration for larger waves, there would be 6 coils in the stator FCA armature per magnet or 12 coils per magnet pair in the PMA. In the less preferred configuration for large waves of a lesser magnitude where the stroke distance, $s_r$, equal to the significant wave height, $H_{TE}$, is twice the distance of the axial longitudinal length of the PMA rotor and would be satisfying the first of the two above conditions would result in $H_{TE}/2(T_m+T_p)$ magnets and pole pieces being used in the PMA and $H_{TE}/4(T_m+T_p)$ magnet pairs being used, resulting in at least 4 coils in the stator FCA armature per magnet or 8 coils per magnet pair in the PMA, with the number of coils used in the armature FCA stator again being given by $2H_{TE}/(T_m+T_p)$. For smaller waves, the previously described preferred configuration of 2 coils with each magnet or four coils per magnet pair (PMA structural magnetic unit) would yield a number of magnets in the PMA equal to $X_{PMA}/(T_m+T_p)$ and number of magnet pairs (SMU's) equal to $X_{PMA}/2(T_m+T_p)$, where $X_{PMA}$ equals the PMA longitudinal axial length that has no relationship to the significant wave height other than being significantly larger than this height. In this case the number of coils used in the FCA can be given by $2(X_{PMA}+H_{TE})/(T_m+T_p)$. Note that for larger waves ($H_{TE}>X_{PMA}$ or $H_{TE}=X_{PMA}$), the number of PMA magnets, pole pieces, magnet pairs (structural magnetic units), and FCA coils are related linearly to the significant wave height, $H_{TE}$, (equal to the rotor stroke distance $s_r$) for any given magnet thickness, $T_m$, and pole piece thickness, $T_p$, such that the preferred ratio of $T_m:T_p$ ranges from 2:1 to 8:1, a range based upon engineering and assembly factors to be explained in detail when the Compressive Repulsive Magnetic Field Technology that comprises the structure and functioning of the PMA is described; for quite small waves ($H_{TE}\ll X_{PMA}$), the number of magnets, pole pieces, and structural magnet units magnet pairs are related only to $X_{PMA}$, $T_m$, and $T_p$ and are independent of both $T_{HE}$ and $s_r$, while the number of used coils in the FCA does depend on $H_{TE}$ and $X_{PMA}$; for waves of mild to moderate size ($H_{TE}<X_{PMA}$ approximately), any of these arrangements would be acceptable. A similar calculation for the number of magnets, magnet pairs in the PMA, and coils in the armature could be done if the stator was the PMA and the rotor was the FCA armature.

The design of the PMA 37 in the embodiment depicted in FIG. 3A calls for specially designed magnets with a central hole 47 through the magnets that allows the multi-strand stainless steel, mono-filament Kevlar or other suitable material composing flexible suspension cable 33 to travel through the PMA and be attached to it via knotted or suitable other means. Central hole 47 in conjunction with structural stainless steel support tube 36 in FIG. 3A performs at least 6 functions: 1) allows the PMA to be attached to the mobile subunit 19 via attachment points at breaking magnets 74 and 75 of FIG. 7B so that kinetic wave energy captured by the latter can be transferred to the rotor when the rotor is the PMA, the preferred embodiment. 2) Allows the anchoring of the spring suspension system—at point 80, the lower end to the fixed subunit 20 containing the stator via the lower restorative force spring 63 in FIG. 7B and the upper end at point 58 to the mobile subunit 19 when the PMA is the rotor. 3) Allows for structural stability of the PMA by allowing the stainless steel tube backbone to be bonded to each pole piece and magnet of the PMA. 4) Allows for the PMA to be structurally supported by the central tube when the PMA is the stator and it must be securely fixed to the fixed subunit 20 at point 80 as in FIG. 7A. 5) Especially important for long rotor PMA's with many magnets is that the central hole serves as a conduit of air that allows equalization of air pressures above and below the PMA as it slides in slotted sliding tube 32, a factor which if not accounted for, would greatly slow the rotor PMA in its vertical oscillation due to serious air drag and resistance which would seriously oppose the rotor's relative motion to the stator with the same negative effect as Lenz's Law counter EMF losses reducing electrical power output and efficiency; without the central hole, this serious drag and resistance problem would only otherwise be ameliorated inadequately through the thin space of the air gap 61 on FIG. 7B. In the case of the slotted metal rotor sliding tube, the slot also shares some of the function to equalize the air pressure above and below the rotor as it slides in the tube. The PMA is bonded to the outside surface of the stainless steel support tube, and though the central channel 47 has the stainless steel or Kevlar suspension cable running through it, sufficient airspace remains in the central hole 47 to allow excellent air pressure equalization to take place. 6) Though not part of the rotor, the braking magnets in both embodiments of the VLEG in the WEC have central holes so as to allow the passage of the suspension cable through them.

Note that the efficiency of any linear electric generator is adversely affected by a parameter known as parasitic damping which degrades mechanical transfer of energy of the wave to the rotor. It is governed by 4 factors minimized in the present invention: 1) Sliding friction minimized by the use of sliding bearing surfaces, lubricants, and smooth even electropolished surfaces at the sliding rotor tube PMA air gap interface; 2) Thermoelastic losses in the springs minimized by the use of relatively stiff springs; 3) Air resistance encountered by the rotor minimized by the central hole structure in the PMA, the slot in the sliding rotor tube, the end air vents in the non-slotted non-conductive plastic sliding rotor tube, and 4) Compensatory reactive vibration of the fixed subunit in response to the ocean wave input force minimized by a very high ratio of the mass of the fixed subunit to the mass of the mobile subunit and positioning of the center of gravity of the fixed subunit at a significant depth beneath the ocean surface. Parasitic damping must be equal to another critical parameter for maximum power output from a VLEG, the electromagnetic damping which will be discussed in the detailed description of the basic VLEG unit below.

The distance across which the rotor oscillates, the stroke distance, should equal the significant height of the largest waves designed to be handled by the WEC. Specifically, this height is equal to the distance from the trough to the crest of an equivalent wave, which is defined as the average of one third of the tallest waves likely to be observed at most times measured during a designated time interval. Optimally, as noted above, this height is three times the axial length of the PMA rotor, which should be one third the height of the average equivalent wave height just defined. Note that if the EKS apparatus is an array that comprises more than one row of WEC repeating units, then the energy dissipation function can be shared by each row. For instance, to have a reasonable amount of energy to be dissipated from a 2 meter high wave, a WEC with a rotor stroke distance of 2 meters and a rotor of 0.66 meter (66 cm) in axial length should be used. However, an EKS apparatus array consisting of 10 rows of WEC repeating units can employ a rotor stroke volume theoretically of only 0.2 meters and a much smaller rotor of 6.6 cm in axial length to dissipate a significant fraction of the energy dissipated by the larger unit. Thus, a few large WEC's packed fairly away from each other can be advantageously, in terms of engineering design, substituted by many small WEC's packed very closely together, a significant novel characteristic of the present principles.

Normally, unless the fixed subunit 20 is rigidly attached to the sea floor or to the adjacent conventional sea wall, as the mobile subunit 19 and consequently its contained rotor oscillates vertically in response to the passage of the wave, the fixed sub unit 20 will tend to oscillate along with it, greatly diminishing the relative velocity of the rotor PMA 37 with the stator FCA 34 contained within the fixed subunit, thereby markedly decreasing the power output because the latter is neutrally or slightly positively buoyant and will try to oscillate with the passage of the wave as well. In addition, the counter EMF force due to Lenz's law acting on the rotor PMA will also tend to cause the fixed subunit to oscillate undesirably relative to the rotor PMA.

To circumvent this difficulty, three approaches were taken in the preferred embodiment so that the input force by the wave on the fixed subunit 20 was minimized as much as possible relative to the wave input force on the mobile subunit 19. First, since the wave input force on any buoyant object is proportional to the area of buoyancy material of buoyant object exposed to the wave, the fixed subunit buoyancy component 30 FIG. 3A was made long in its vertical axis, and narrow in its diameter. Second, the ILWDS 22 was designed to create a very huge reaction mass compared to the reaction mass of the mobile subunit 19 causing the amplitude of any oscillation of the fixed subunit 20 to be very small compared to that of the mobile subunit 19 even if the WEC component is just floating and not even tethered. Third, as explained previously, the center of mass and gravity was designed to be centered in the ILWDS 22 that was placed to a significant depth beneath the surface of the ocean by the long stem of the fixed subunit 20 where wave motion water particle oscillations are markedly diminished in amplitude.

Again referring to FIG. 3A, the Inertial Liquid Wave Dampening System (ILWDS) functions with features similar to heave plates but also containing novel new features; it's nomenclature is based upon the entrapment of a large mass of liquid within the structure to act to almost completely dampen the oscillatory effect on the fixed subunit of the waves at the ocean surface. The inertial wave dampening mechanism can be attached to the stator of the WEC and can comprise a weight container including at least one ingress hole, such as 41, configured to draw water into the container to thereby attain sufficient weight to stabilize and render the stator relatively stationary in response to waves. For example, the ILWDS in FIG. 3A comprises a stack of two or more metal heave plates with skirts 8 braced together by metal brace 9. The metal skirts impede the motion of water in the vicinity of the heave plates helping to dampen out vertical oscillations from the waves above at the surface. The bottom heave plate 8 is attached to a water filled large weight 10. Heave plates with metal weights can perform a similar function, but a water filled weight has the distinct advantage of being massive in extent, but does not become a functioning part of the WEC until it is deployed in the water. When it is deployed, the WEC is allowed to sink to the desired depth with the entrance of water into weight 10 via bottom water ingress and egress holes 41 that are several in number with two being shown. As water enters the chamber of weight 10, the WEC sinks to its near neutral buoyancy point and adjusted to be slightly positive in buoyancy for increased stability at the desired depth. The water ingress into weight 10 is gradual, and thus the WEC sinks gently into its desired position. This arrangement allows for much easier transport of the WEC to its desired location as weight 10 will remain empty of water during transport, and the weight of the ILWDS structure 22 will consist of only the metal weight of heave plates 8, brace 9, and the metal chamber of weight 10. Furthermore, a novel mechanical means is provided to re-float the WEC back to the surface should it be necessary for maintenance or replacement. Here, the ILWDS can include a tube 200, 202 coupled to the weight container having a length sufficient to extend an end of the tube above a surface of the ocean when the stator of the WEC is at least partially submerged in the ocean or when the container is filled with water. The tube can be configured to be attached to a pump mechanism for expelling water from the container when the stator is at least partially submerged in water or when the container is filled with water. In the particular example illustrated in FIG. 3A, the re-float mechanism can be implemented through the introduction of air under pressure via rubber or plastic air hoses 200, 202, the latter attached to an air pump at the surface, air valve 201, and air ingress and egress hole 199; water is expelled out of holes 41. When the process needs to be reversed, this system is disconnected from the air pump and water once again ingresses into weight 10 forcing out the air previously introduced out via air hoses 200, 202 and air valve 201. This setup is clearly advantageous over weighting down and stabilization techniques for floating vertically oriented WEC devices. The combined mass of entrapped water in weight 10, the weight chamber itself, the heave plates, brace, and the water entrapped within the skirts are a huge reaction mass incorporated into the fixed subunit 20 relative to the reaction mass of the mobile subunit 19, a most desirable configuration. The ILWDS prevents the fixed unit from oscillating vertically even with large waves passing through the WEC above. It should be noted that it is important to have the center of gravity of the fixed subunit 20 of the WEC which is located in the ILWDS 22 structure to be as deep below the ocean as possible below and away from the buoyancy point because it can be shown that the horizontal force and velocity vectors for the water and the much more important vertical force and velocity vectors as well as the ocean surface wave energy density decrease with the square of increasing depth below the ocean surface; this factor is of major importance along with the large mass ratio of the fixed subunit 20 relative to the mobile subunit 19 in keeping the fixed subunit as immobile as possible so that the mobile subunit can develop the highest relative velocity in the rotor relative to the stator of the WEC repeating component of the EKS.

Again referring to FIG. 3A, the electromechanical braking system comprises: cylindrical rare earth NdFeB braking magnet 28A with central hole 64 and lower braking magnet 28B with central hole 59A through which stainless steel multi-strand cable 59 passes (central hole 59A also extends through fixed subunit top 5); upper very large gauge copper breaking coil 31A and its lower counterpart 31B that are intermittently electrically short-circuited; tapered stainless steel upper compression spring 192 whose upper end is attached to the lower surface of fixed subunit top 5; and stainless steel extension spring 63 previously described to be attached to PMA 37 and the top surface of the ILWDS heave plate skirt at attachment point 39B through cable 59 passing through braking magnet 28B. Note that upper braking magnet 28A is completely contained within the coils of compression spring 192 and that extension spring 63 serves the dual purpose of being part of the VLEG linear rotor's suspension system as well as part of the electromechanical breaking system. Furthermore, the polarity of each breaking magnet is the same as the facing end of PMA 37.

The electromechanical breaking system functions to limit the excursion of the linear rotor on the spring suspension system in the event of extremely large waves impinging upon the WEC by avoiding damage by excessively severe oscillation by waves exceeding the ability of the EKS to safely encounter. It comprises 3 functional components. The first component is electromagnetic and comprises large heavy gauge copper coils 31A and 31B that are wound around the upper and lower ends of slotted rotor sliding tube 32 respectively and are electrically shorted out on an intermittent basis; slotted rotor sliding tube 32 is part of the support structure for stator formed by FCA 34 which also includes the upper surface of the upper heave plate 8, outer water tight tube 29 and the bottom surface of the top 5 of the fixed subunit 20. The braking coil 31A and/or 31B, when short-circuited, imposes a counter-electromotive force on the permanent magnetic array in the rotor of the WEC as the array approaches the coil when the coil is short-circuited. For example, when electrically shorted, very large currents are induced within the end braking coils 31A and 31B by the approach of a strong magnet such as PMA 37 because of the very large wire diameter and short total length of wire involving just a few coil windings. As illustrated in inset FIG. 3A(1), these coils could equivalently be replaced by a thick ring of copper or suitable other conducting pipe which would accomplish the same effect of producing a very large current as the PMA 37 approaches resulting in a very large back EMF (electromotive force) that helps break the moving PMA to a stop. The second component is elastically mechanical and comprises tapered compression spring 192 on the top of the stator and extension spring 63 at the bottom of the stator mechanically decelerate the fast moving rotor upon its approach to the top and bottom ends of the stator respectively. Note that compression spring 192 collapses around braking magnet 28A that is contained within the coils of this spring. Note also that extension spring 63 serves the dual function of braking the rotor as well as assisting the rotor as it begins its down stroke on the start of the negative slope half of the wave. The third component is purely magnetic and comprises a repulsion field magnetic braking process; when the PMA 37 gets too close to either braking magnet 28A or 28B, because end poles of PMA 37 have the same polarity as the braking magnet poles that they respectively face, upon reaching the proximity of the braking magnet, the rotor is repelled away again decelerating it.

Note that the ends of the PMA are formed by thinner end magnetic field deflecting magnets 212 and 213 as compared to the thicker magnets 40 that compose most of the PMA. Magnets 212 and 213 have at least two functions. First, they are used to bend back and focus magnetic flux lines that exit out of and into the PMA and that are parallel or almost parallel to the long axis of the PMA; this function will be described in greater detail later. Second, because the outer poles of magnets 212 and 213 are of the same polarity as the poles of the end braking magnets 28A and 28B that they face respectively, the PMA is decelerated as it approaches the end braking magnets secondary to the action of a large wave. Unlike the thicker magnets 40, their primary function is not to dissipate wave kinetic energy into electrical energy but rather to bend and focus the end magnetic field of the PMA back onto the PMA onto an interior opposite polarity pole. In small enough WEC structures, magnets 212 and 213 may be omitted as the focusing function can be accomplished by the breaking magnets 24A and 24B themselves while repelling the ends of the PMA if it approaches too closely. It should be noted that addition of the end magnets 212 and 213 led to a 20% improvement in the magnetic field intensity in the areas of the field coil array, as the end magnets significantly reduced the amount of magnetic field lines that were lost to empty space.

This partly electromagnetic, partly mechanical, and partly purely magnetic brake that is comprised within the WEC has 3 distinct mechanisms are used rather than only one to brake an excessively moving rotor. Mechanical bumpers of hard rubber and other materials that can be used to mechanically and abruptly stop the rotor produces excessive energy loss from collision friction losses and a shorter lifespan because of the mechanical wear and fatigue. To avoid this type of mechanical wear, as noted above, embodiments of the present principles make use of a counter EMF short-circuited coil or circular plate (pipe segment) to brake the oscillating rotor. Unfortunately, this has the disadvantage of dissipating the energy of the rotor as wasted heat, reducing the efficiency of the device. To minimize this problem, embodiments employ a repulsive magnetic braking technique that uses the magnets themselves on the ends of the rotor, which have the same polarity alignment as braking magnets within the stator to cause the excessive kinetic energy of the rotor to be temporarily stored within the repulsive magnetic field as potential energy. This energy can be returned to the rotor upon the passage of the excessively high wave and used to generate electrical power. Furthermore, a spring system, through spring compression and expansion, not only mechanically slows down the rotor upon its arrival at the ends of the stator, but, as in the case of the magnetic breaking, captures the kinetic energy of the rotor and changes it to potential mechanical energy stored in the springs; both quantities of potential energy from the magnetic braking mechanism and the mechanical braking mechanism are able to be returned to the system once the large wave passes. Note also that the electromechanical braking mechanism greatly softens the impact on outer sliding tube 27 of FIG. 3A as it impinges upon the rubber blocking bumper ring 25 when the approaching crest of a wave of the largest size for which the WEC is designed or larger occurs, preventing wasted energy due to frictional heat losses and undesirable structural stress on the WEC, which is a problem with the single bumper impact braking methodology. As the outer sliding tube 27 approaches bumper ring 25, at the same time, the rotor is approaching the electromechanical braking mechanism. A similar braking effect on outer sliding tube 27 impacting on bumper ring 5A occurs when the trough of an excessively large wave approaches.

One other function of the end braking magnet is to focus and redirect magnetic flux lines flowing into and out of the ends of the PMA back into the interior poles of the PMA greatly minimizing the flux wastage and leakage into space as shown on FIG. 9C and FIG. 9D. This dual braking and focusing effect, which will be explained in greater detail below, occurs if the stroke distance of the rotor is not too large along its axis of vibration with respect to the size of the end braking magnets and reach of their magnetic fields. In fact, an advantageous condition will occur. For example, as a PMA without end magnetic field deflecting magnets approaches the end braking magnet, the magnetic field lines escaping into space are bent back to a greater and greater extent onto interior coils of opposite polarity in the PMA, which to some extent increases the electrical power produced as the rotor decelerates at the trough and crest of a larger wave where it is more likely to be in close proximity to the end braking magnet; this effect would not be applicable to PMAs whose ends have end magnetic field deflecting magnets which are advantageously used for rotors with large stroke distances.

Additionally, another distinguishing feature of the electromagnetic braking component embodiment is that it minimizes the ohmic heat losses using a novel technique to quickly switch automatically the braking coils between an open circuit state and short circuit state so that the heavy gauge wire windings are shorted and dissipate energy only when encountering an excessively large wave that could potentially damage the system. The switching mechanism is shown schematically as component 203 FIG. 3A for the upper braking coil and not shown for the lower braking coil for ease of illustration, and comprises either positional mercury tilt switch or other type of position sensor 203, including a switch 203A and a position sensor 203B, and is placed across the outputs of the braking coil windings so that the coil windings are short circuited when the switch 203A is in a closed state only with the passage of a single large wave of a given size and at no other time. The position sensor 203B is configured to sense a tilt of the converter and activate the switch 203A to short-circuit the coil in response to sensing that the tilt exceeds a threshold. In one exemplary embodiment, the threshold can be set to a value at or between 60 to 90 degrees. For instance, the design application used may call for waves higher than a given height producing approximately at or greater than a 60 to 90 degree tipping from the vertical of the buoy floatation collar top 26 being considered an unacceptable mechanical stress to the WEC; such a condition would activate the position sensor 203B of the mercury tilt switch 203, short circuiting the coil windings; once the wave passes, further waves smaller than this would keep tilt switch 203 open keeping the braking coils open-circuited avoiding any possible losses of energy through unwanted partial braking from smaller waves. Referring to the inset FIG. 3A (1), if a section of copper pipe 206 was used instead of the heavy gauge wire coils windings, a slit 207 can be placed in the pipe section along its length, the two sides of which would be connected to switch 203; if the tilt switch or position sensor was activated, the slit edges would be shorted together activating the electromagnetic braking process. This feature of automatic switching in and out the short circuit state of the braking copper coils or the solid copper ring is a particularly advantageous aspect provided by the present principles. With this novel three-part breaking mechanism, at least some fraction of the kinetic energy of even an excessively large wave can be dissipated and captured temporarily to be then converted to electric energy instead of having all of the energy of that wave wasted as ohmic resistance losses.

Figure 7B:
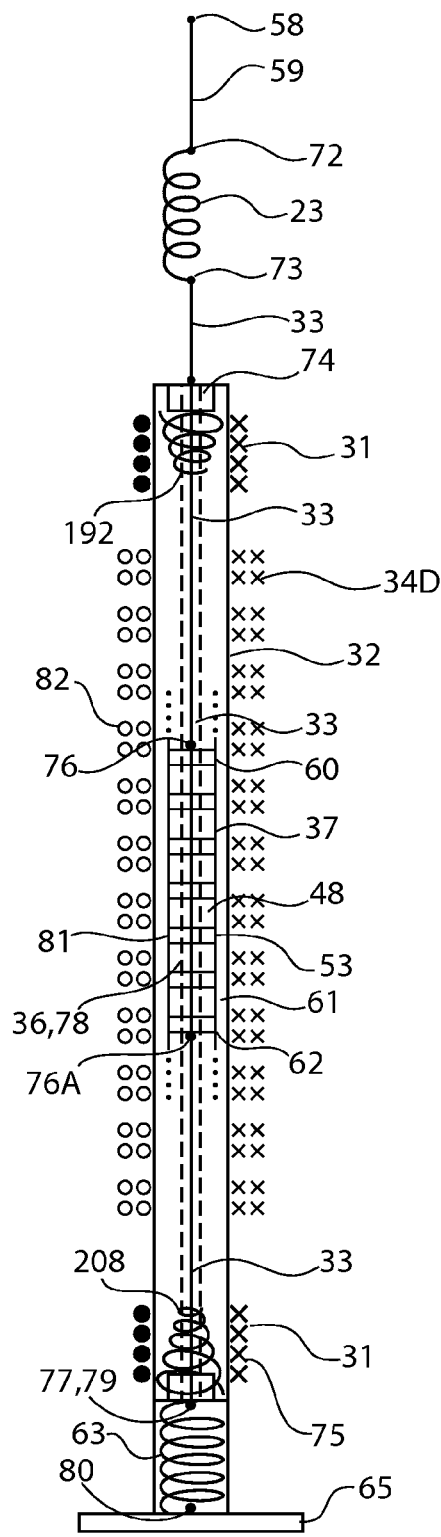
FIG. 7B illustrates (not to scale) a VLEG embodiment 2 composed of a 3 Magnetic Unit PMA Rotor and its associated FCA Stator of length twice that of the PMA Rotor—The second of two exemplary invariant embodiments of the VLEG of Order 1 described herein.

FIG. 7A and FIG. 7B shows the two different exemplary embodiments of the VLEG constituting the power conversion mechanism of the WEC repeating component of the EKS. FIG. 7A shows the embodiment in which the stator is PMA 37 and the rotor is FCA 34. FIG. 7B shows the embodiment in which the rotor is PMA 37 and the stator is FCA 34. The two different embodiments are functionally identical; the functional description of embodiment of FIG. 7B has already been described in detail with the description of the WEC of FIG. 3A, and thus, the detailed functional description of the embodiment of FIG. 7A will not be repeated as the similarity is apparent to experts in the field of linear electric generators. Note that the embodiment of FIG. 7B differs from FIG. 3A only by the fact that the lower extension restorative force spring 63 is separate from a second compression spring 208 functioning as a braking spring whereas in the description of FIG. 3A both the braking and restorative force functions were carried out by single spring 63. Also, in FIG. 7A, coil windings going out of the page are designated 34C and coil windings going into the page are designated as 84, while in FIG. 7B, they are designated 82 and 34D respectively. The embodiment of PMA rotor 37 and FCA stator 34 is the preferred embodiment as was explained previously. The PMA stator sits stationary on its support tube and the FCA rotor and its supporting slotted rotor slide tube slides in a vertically oscillating manner in the second embodiment versus the PMA rotor oscillating vertically and the FCA stator remaining stationary on its supporting slotted rotor sliding in the first preferred embodiment.

Structurally, the preferred embodiment of the PMA rotor, FCA stator VLEG shown in side view in FIG. 7B is as follows: PMA 37 containing end steel pole pieces 60 and 62, interior steel pole repulsive field pole pieces 53, magnets 48 and is attached to cable 33 at its upper and lower points 76 and 76A respectively and cable runs through PMA 37 inside support tube 36 via central hole 78 of each magnet and pole piece though which support tube 36 runs. Cable 33 is attached to the lower end of upper perturbing force spring at point 73 which in turn is attached at its upper end by cable 59 to reaction mass (2), the mobile subunit, (not shown) at attachment point 58. Braking magnets 74 and 75 with central holes (not labeled), tapered compression springs 192 and 208 attached to the top and bottom of ends of rotor sliding tube 32, and large gauge short circuit coil windings 31 at either end of rotor sliding tube 32 constitute the electromagnetic, mechanical, and purely magnetic components of the rotor braking mechanism. The FCA is wound around sliding tube 32 with coil windings 34D going into the page, and coil windings 82 going out of the page. The lower end of cable 33 is anchored to the bottom end of rotor slide tube 32 at the upper point of attachment 79 of lower restoring force spring 63. Rotor slide tube 32 is anchored to reaction mass (1) which would be the fixed subunit of the WEC at attachment plate 65.

Structurally, the second embodiment of the VLEG of the WEC with the PMA stator and the FCA rotor is shown in side view in FIG. 7A as follows: upper perturbing force spring 23 is attached to the reaction mass (2), the mobile subunit, at attachment point 58 and to the top of the FCA rotor at attachment point 76B via cables 59. The PMA stator 37 is half way up a long support tube that not only travels through its central channel 47 (not shown) to provide structural support but also keeps the PMA in a stationary desired location at the middle of the FCA during the neutral point of the wave. Upper and lower tapered compression braking springs 192 and 208 respectively are as in the first, preferred, embodiments with their associated attachment points. Cable 33 and its attachment points are not present. Braking magnets 74, 75, shorted large gauge coil windings 31, FCA windings 84 and 34C into the page and out of the page respectively, lower restorative force extension spring 63 attached to the bottom of the FCA rotor at its upper end and to the reaction mass (1), the fixed subunit, at its bottom end 65 at attachment point 80 are all as per the first embodiment. Note that the lower braking magnet 75 fits completely within the coils of the lower braking spring 208 in both embodiments. The stator PMA 37 comprises the same components as the rotor PMA 37 of the first embodiment.

In order to have the above operation of embodiments of the present principles occur with a reasonable degree of efficiency, and operational durability, and be applicable to a wide variety of environments and applications, several features should be incorporated into the EKS apparatus. The type of LEG that is used within the repeating component WEC of the EKS, which has been assigned the nomenclature "Vibrational Energy Generator" or "Vibrational Energy Transducer" and "Vibrational Energy Linear Electric Generator" (VLEG), includes several novel aspects, and together with the embodiments employed to protect sea coasts, harbors, and shoreline structures and property, establishes a new aspect of the technology in the field of environmental coastal and shoreline protection as well as the field of vibrational energy harvesting. Several of these features are further described in detail herein below.

The VLEG

The VLEG is a "vibration responsive electrokinetic transducer" that forms the heart of the wave kinetic energy dissipation to electric energy apparatus of the repeating unit Wave Energy Converter (WEC) of the Electrokinetic Sea Wall (EKS) apparatus that constitutes embodiments of the present principles. Though the VLEG may be used to convert vibrational mechanical energy of many types such as the energy of crashing surf, a large vehicle bouncing on a road, the wind oscillating a moving mass, etc., for expository purposes, the VLEG is described as a component for transforming undesirable wave kinetic energy into useful electrical energy, thereby not only permitting the present principles to serve its purpose of protection of structures exposed to wave movements, but also its purpose of producing electrical energy for useful work. The VLEG comprises a basic unit that is adapted to use as a component of both the moving rotor of the mobile subunit of the WEC and the stationary stator of the fixed subunit. It comprises five important, distinguishing components and can be used in a unique 3-dimensional organizational matrix structure: 1) a spring suspension system; 2) A unique technology that is given the nomenclature, "Compressive Repulsion Magnetic Field Technology; 3) A variable wire gauge copper coil winding arrangement; 4) A method of magnetic focusing of lines of flux onto the copper coils for enhanced production of electric energy from a given amount of vibrational kinetic energy; 5) A method for placing many VLEG's in parallel in a three dimensional Electrokinetic Transducer Matrix for much greater power output. Each one of these aspects of the VLEG will be described in succession below. In addition, several novel arrangements by which many of these devices may be placed in Electrokinetic Sea Wall apparatuses of varied configurations to dissipate the kinetic energy of waves over a large area of ocean surface of varied geometric shapes into useable electric energy will be further described.

The Basic VLEG Unit

Referring to side view FIG. 9A and top cross sectional view 9E depicting the first embodiment of the basic VLEG unit, the VLEG is composed of linear rotor 81 in turn composed of PMA 37 now designated as reaction mass (3) comprising end pole pieces 51 and 54, repulsive field middle pole piece 53 sandwiched between two similar south poles, and cylindrical rare earth NdFeB magnets 37A and 37B with all of these components having a central hole 47, ¼" in diameter, and through which runs a stainless steel hollow support tube 36 of 0.24 inch O.D. and thickness of 0.01 inch. Brass and other stiff nonmagnetic metals are suitable, and these dimensions can be changed depending upon the dimensions of the VLEG and its magnets and coils that are used. Through central tube 36 runs a multi-stranded flexible stainless steel or Kevlar (or any suitable flexible material of high tensile strength) cable 33 attached on the bottom of the cable at 79 to stator restoring force extension spring 63 which in turn is attached at point 80 to reaction mass (1) 65. Reaction mass (1) may be the sea bed, the ILWDS heave plate structure with a large water filled weight as described in FIG. 3A, a large anchor, a conventional sea wall or some other very large mass. The upper end of cable 33 is attached at point 73 to the lower end of perturbing force extension spring 23 whose upper end is attached at point 72 to reaction mass (2) (not shown in FIG. 9A but would be a mobile mass that is oscillated in the vertical direction by a suitable source of kinetic energy, which in the present embodiment would be the mobile subunit 19 buoy floatation collar of FIG. 3A). Reaction mass (1) should be many times greater in mass than the sum of the reaction mass (2) and the mass of the PMA designated as reaction mass (3) in order that PMA 37 attached to reaction mass (2) via cable 33 and spring 23, can develop sufficient velocity relative to reaction mass (1) which is important for the VLEG to operate properly. PMA 37 reaction mass (3) is attached by knotted, bonded, or other means to cable 33 at both the upper and lower ends at points 76 and 77 respectively so that as reaction mass (3) oscillates in a vertical direction in response to the source of kinetic energy; the oscillation is carried through by spring 23 and transmitted to PMA 37 reaction mass (3) by means of cable 33 being rigidly attached to PMA 37. If the attachment is by means of bonding, the bonding is done with a magnetic epoxy, J B Weld®, or its equivalent with a bond strength of at least 3500 lb. per sq. inch so as to insure the uniform distribution of magnetic flux across the central hole at each of the two attachment points 73 and 77 and the magnetic flux through the magnetic epoxy helps improve the strength of the epoxy bond between cable 33 and PMA 37. The cable could also be attached via a knot on each end of the PMA or through the use of a small clamp that is bonded to each end of the PMA.

This first embodiment of the VLEG may be optionally contained in a shell formed by a rigid metal or Lexan polycarbonate material comprising an outer cylinder (for clarity not shown here in FIGS. 9A and 9B but is shown on FIG. 3A as 29) and would be used for adverse environmental conditions. The VLEG is encased by this cylindrical shell along with top plate 74A, and bottom plate 74B which would enclose FCA linear stator 82, formed by copper field coil array (FCA) 34 attached to and supported by slotted rotor slide tube 32 whose lower end is rigidly attached to reaction mass (1) 65. The slotted rotor slide may be of any non-magnetic material, preferably stainless steel, brass, or polycarbonate plastic, and the slot 32A, shown in the cross section view illustrated in FIG. 9E, runs vertically down the length of the rotor slide tube, and is several mm in width. The slot width is adjusted to make sure that there can be no chance of contact with each edge during rotor motion which would nullify the marked reduction of eddy losses that this slot is designed to prevent. It is also adjusted by flexing slightly the walls of the sliding tube to increase the inside diameter of the sliding tube just slightly so that the rotor slides in the tube with the least friction possible and the smallest possible air gap between the magnet cylindrical surface and the inner slotted tube wall. The slot also allows for adjustment of the air pressure differential that occurs above and below the PMA as it slides in the tube which is detrimental as it opposes the development of the velocity of the rotor secondary to air entrapment ahead of the rotor. The slot may be omitted if slotted rotor slide tube 32 is made of non-conductive material such as polycarbonate plastic as there would be no eddy losses in the tube 32 if it is non-conductive, but the slot may still prove desirable for the other purpose of adjusting the inside diameter of the tube to match closely the outside diameter of the magnets of the PMA for air gap and sliding friction loss optimization as well as air pressure equalization around the rotor. If the slot is omitted, on a plastic sliding rotor tube, two small air vent holes not obstructed by FCA windings, one on either end of the slotted sliding tube, shown as air vents 214 in FIG. 3A, should be created for air pressure equalization. Finally, cylindrical magnets 74 and 75, each with an inside hole 48, ¼" in diameter, through which cable 33 passes, are attached to the top 74A and bottom 75A of the linear stator shell formed with slotted rotor sliding tube 32. Air gap 61 represents the space between the FCA stator 34 and PMA rotor 37. Both the central hole 47 and support tube 36 may be of varying dimensions if larger or smaller versions with different sized magnets and pole pieces are desired.

In a particularly desirous configuration, the slot 32A is made as narrow as possible consistent with a suitable inside diameter of the metal sliding tube 32 so as to allow efficient and easy sliding of the enclosed PMA 37 with the smallest air gap 61 possible, and if air vents 214 are added in this case to maintain air pressure equalization even with a metal slotted tube, the slot may be filled in with a non-conducting epoxy that maintains the sliding tube 32 in a non-electrically conducting state for preventing eddy currents which will have the beneficial effect of both allowing the PMA 37 to slide along the lubricated inner tube surface on a cushion of air, greatly minimizing constant contact of the outer cylindrical surface of the PMA 37 with the tube's inner surface, greatly reducing sliding friction and all of its resulting undesirable characteristics explained in detail elsewhere within the description of the present principles, and allowing the sliding in such a manner so as to minimize the amount of Lenz's Law counter EMF opposing this motion through the prevention of eddy currents in the sliding tube because of the tube's non-conducting state from the presence of the slot preventing a complete electrical circuit in the tube thus preventing such currents from occurring.

The FCA 34 surrounds the PMA 37 and is wound on and supported by slotted rotor tube 32. There are 4 separate coils that are designed using a variable gauge wiring technique to be described subsequently and comprising an outer layer of thick gauge wire 34A and an inner layer of thin gauge wire 34B. The preferred but not exclusive arrangement of these coils is to have their total combined width approximately equal to or just slightly larger than the length of the cylindrical axis forming the VLEG basic unit PMA. Thus, each coil has a width of one fourth that of the length of the PMA cylinder. The inner diameter of the coil is set by the diameter of the slotted rotor tube, and the outer diameter of the coil depends on the design dimensions, including magnet size and the presence of any adjacent coils as will soon be illustrated and described. Each FCA copper wire coil has inner coil windings of a thinner gauge wire and outer coil windings of a thicker gauge wire. The basic VLEG unit PMA structure comprises two magnets in repulsive field alignment, one end pole piece, and one repulsive pole piece, henceforth to be called one VLEG PMA magnetic unit structure, plus one additional end pole piece.

Referring to side view FIG. 9B and top cross section view 9F, illustrated is the second embodiment of the VLEG where the rotor is the FCA 34 that is a component of and attached to reaction mass (2), the mobile subunit 19 in the present embodiment, and the PMA 37 is the stator 83 attached to and is part of the much more massive reaction mass (1) which in the present embodiment is part of the fixed subunit 20 attached to that mass. In this version of the VLEG, there is no cable 33 in the stainless steel tube 36 that lies in the central hole 47 of the magnets of PMA 37 (part of reaction mass 1); reaction mass 3, the rotor, is composed of top plate 74A, bottom plate 74B and the slotted FCA support tube 32 all of which may be any non-magnetic metal or polycarbonate or other durable plastic stainless steel being the preferred material; upper perturbing force spring 23 is attached at the bottom to the top 74A of the linear rotor shell at attachment point 73 and at the top, to the mobile reaction mass (2) at attachment point 72; lower restoring force spring 63 is attached at the top to attachment point 79 the bottom of linear rotor shell 74B and at the bottom to the large reaction mass (1) at attachment point 80; Braking magnets 74 and 75 are again attached to the inner surfaces of top 74A and bottom of the rotor shell 74B respectively although there is now no need for central hole 78 in upper braking magnet 74 as no cable runs through it; lower braking magnet does have central hole 78 through which stainless steel support tube 36 passes. The FCA is supported by and is attached to slotted tube 32. Again, 61 is the air gap between the FCA rotor 34 and the PMA stator 37. As before, FCA 34 has an outer layer of thick gauge wire 34A and an inner layer of thin gauge wire 34B. Again, this embodiment can also be enclosed in a metal or durable plastic shell (not shown) that would enclose the VLEG in adverse environmental conditions as described under the first embodiment. Note that the encasement shell structure delineated in FIG. 10A enclosing a Vibrational Energy Electrokinetic Matrix Transducer, of which the basic VLEG unit is the simplest version, describes the mechanism by which a VLEG of either embodiment maybe enclosed within an environmentally protective casing; its description shall follow subsequently when embodiments the VLEG matrix structure are described. The remaining structures of FIG. 9B of the second embodiment are identical to those structures previously described in FIG. 9A of the first embodiment.

Both embodiments of the VLEG implementations described above are equivalent linear electrical energy generators operating on the same principles of Faraday's Law as applied to LEG's, and function in essentially the same manner. Thus, the function of the VLEG of FIG. 9B will not be spelled out in detail as is the case of the first embodiment as it would result in a virtually identical description. It is apparent to those skilled in the art LEG technology and electric energy generation that the two embodiments function similarly. It is emphasized that either embodiment of the VLEG can function in the WEC repeating unit of the EKS apparatus and all of the applications and embodiments of the present principles described herein. However, it is deemed that the embodiment where the linear rotor uses the PMA and the stator uses the FCA is the preferred embodiment, and henceforth, aside from FIG. 7A which shows incorporation of the second embodiment of the VLEG and FIG. 7B which show the incorporation of the first embodiment of the VLEG being used in the WEC repeating unit of the EKS, subsequent drawings will refer only to EKS apparatus variants that show the first embodiment (PMA rotor-FCA stator) of the VLEG. Those skilled in the art would understand that the WEC shown by FIG. 7B already described both in terms of function and structure in detail, is quite similar to the function and structure of the WEC shown in FIG. 7A, so this detailed description will be omitted for the sake of brevity; furthermore, since the electrical functioning of the VLEG basic unit of the first embodiment is similar to the detailed electrical functioning of the VLEG in the WEC of FIG. 7B, it will not be repeated except to say that the PMA rotor reaction mass (3) of the basic VLEG in FIG. 9A vibrates in a vertical direction in response to a vibrational energy source in the same manner as the larger VLEG of the WEC in FIG. 7B.

Figure 9G:
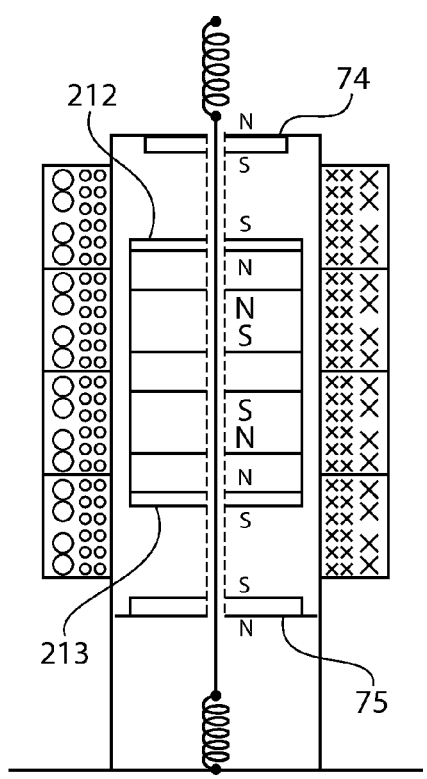
FIG. 9G shows a side view of an alternative structure of the VLEG, embodiment number 1, with an additional repulsive field deflecting magnet at each PMA rotor end.
Figure 9H:
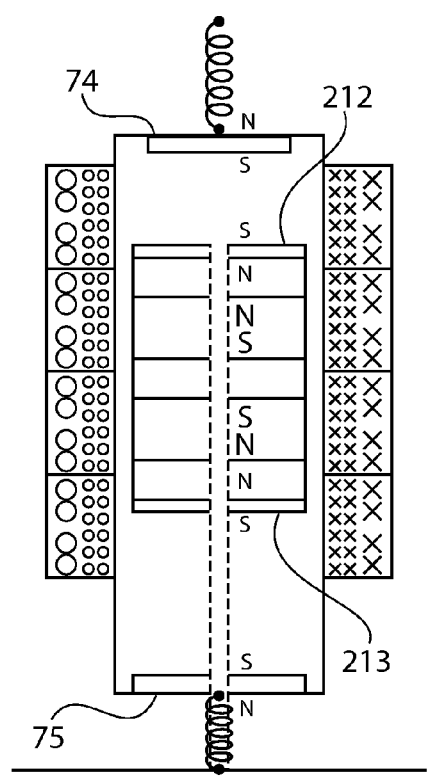
FIG. 9H shows a side view of an alternative structure of the VLEG, embodiment number 2, with an additional repulsive field deflecting magnet at each PMA stator end.

In FIG. 9G, a structural variant of embodiment one of the VLEG is shown in cross section view where, at the ends of the PMA rotor, an upper and a lower deflecting magnetic field magnet, 212 and 213 respectively, are added and, in FIG. 9H, a structural variant of embodiment two of the VLEG is shown in cross section view where at the ends of the PMA stator, an upper and a lower deflecting magnetic field magnet, 212 and 213 respectively, are added; in both cases, this structural arrangement is much more advantageous when the stroke distance of the rotor of either embodiment is so long that the end braking magnets 74 and 75 cannot simultaneously both provide a braking function and an ability to deflect the magnetic flux lines emanating into and out of the end pole pieces 51 and 60 of FIG. 9D of the PMA back into the PMA for increased magnetic flux coil linkage at the PMA ends as depicted in FIG. 9D; the magnetic deflection effect of end braking magnets 74 and 75 can only both brake the PMA and focus the magnetic flux emanating into and out of the ends of the PMA back into the interior of the PMA when the stroke distance is only a distance of about half the axis length of the VLEG basic PMA structural unit or less. The use of more powerful magnets with greater repelling force extends this distance accordingly. The end magnetic deflecting magnets have a diameter equal to that of the PMA but have a thickness that is a fraction of, and in the favored configuration, a quarter of the thickness of the magnets of the PMA that are used to convert kinetic energy into electrical energy; the magnetic field deflecting magnets 212 and 213 do not function with the primary purpose of converting kinetic energy into electrical energy, but rather to bend back and focus the escaping end magnetic field lines toward the PMA interior poles of opposite polarity thereby reducing flux leakage out into space and to promote the function of the energy converting magnets of the PMA. This structural addition to the PMA is advantageous with regards to efficiency of the device by increasing the flux gradient coming into and out of the sides of the PMA into the regions of space occupied by the coils of the FCA by a considerable amount that has been measured in constructed prototypes. This structural addition may be added to any VLEG, in the WEC of the present principles, or otherwise in any other type of apparatus in which the VLEG will be used where the stroke distance over which the rotor vibrates is longer than the reach of the magnetic field of the end braking magnets 74 and 75. In accordance with the present principles, because of the considerable distance that the end braking magnets are located from the proximity of the PMA, the end magnetic field deflecting magnets are used; for VLEGs used for other sources of vibrational energy with smaller amplitude of vibration, their function can be performed by the end braking magnets 74 and 75 on FIGS. 9A and 9B and 28A and 28B in FIG. 3A.

In general, it is more technically easier to collect and take off electrical power from an armature containing the power generating coil windings that is a stator rather than a rotor. One does not have to then deal with slip or collection rings, commutators, or moving wires that may be subject to metal fatigue and breakage. There may be applications for the VLEG where the first embodiment of the PMA rotor-FCA stator VLEG is more advantageous in terms of functional design, cost, or other factors; however, there are other applications including those that call for the use of the largest and most powerful PMA structures by magnet size, magnet magnetization strength, and number of magnets involved though the potential instability of such massive magnetized structures in vertical oscillatory motion as characterized by a PMA rotor in the present principles becomes a limiting factor. Counteracting this limitation, the kinetic energy imparted to the rotor becomes advantageously greater in a linear fashion with the mass of the rotor, and in general, the large magnets of large rotor PMA's would tend to have more mass than FCAs that would be used for the rotor.

While the basic VLEG magnetic unit employs 4 coils in its described configuration, for more practical and efficient wave kinetic energy capture and dissipation into electrical energy, the number of coils that would be in a preferred configuration for this function would be at least 8. As explained above, for maximal results to be obtained for a wave vibration of given significant height, the rotor PMA stroke volume should be contained within coil windings and should be equal to a length of 3 times the axial length of the basic VLEG unit's PMA (a length equal to the significant height of the wave). Thus, 12 coils should preferably be used. It is clear that in the preferred but not exclusive configuration where the combined width of the 4 coils of the basic VLEG is approximately equal to that of axial length of the PMA, the width of these coils will depend on the thickness of the NdFeB or other rare earth magnets used, which also determines the thickness of the pole pieces employed in the interior and ends of the PMA.

The Suspension System of the VLEG

Unique to this device are several advantageous characteristics: 1) 3 reaction masses—reaction mass (1) includes the fixed subunit and its components including the stator of the VLEG which in turn may be attached to anything from the seabed or any point on land, to any rigid structure attached to the seabed or any point on land, or to a large volume water filled heave plate system such as used in the present principles, the Inertial Liquid Wave Dampening System (ILWDS) that is part of the fixed subunit of the WEC for structures that are not rigidly secured thereby preventing the stator of the VLEG from moving significantly; reaction mass (2) in which a source of kinetic energy can cause this mass represented in the present principles by the floatation collar of the mobile subunit of the present principles to oscillate in a defined phase relationship to the excitatory source of energy thereby causing the rotor of the VLEG to oscillate and attain significant velocity; reaction mass (3), which is the mass of the rotor itself oscillating in the same phase relationship as reaction mass (2), and as it does so, the reaction mass (3) directly converts the kinetic energy input into electric energy; the ratio of mass between reaction mass (1) and the combined masses of reaction mass (2) and reaction mass (3) should be made as high as possible within the constraints of the design of the WEC or any other energy converting system using a VLEG such as in wave, wind, surf, transportation vehicle and rail traffic vibration energy harvesting as representative but not all inclusive sources of vibratory kinetic energy; 2) a string suspension system comprising: a) an upper perturbing force spring or spring system as shown in FIGS. 3B(1) and FIG. 3B(2) respectively of non-corrodible non-magnetic metal, preferably stainless steel, whose spring constant is such to best match the mechanical coupling of the energy emanating from the vibrating energy source during both the positive and negative (but primarily the positive) sloping half-cycles of the kinetic energy input cycle, usually but not necessarily a sine wave; b) a single lower restoring force single spring as shown in FIG. 3A, FIG. 7A, FIG. 7B, FIG. 9A, FIG. 9B, FIG. 9G and FIG. 9H of the same material but of a different spring constant to best match the mechanical coupling of the energy emanating from the vibrating energy source during both the negative and positive (but primarily the negative) sloping half-cycles of the kinetic energy input cycle. It can be shown that the spring constant of this series spring connected mass spring system is equal to $K_p K_r/(K_p+K_r)$ where $K_p$ and $K_r$ represent the spring constants of the perturbing force and restorative force springs respectively. In the preferred configuration, $K_p$ should be significantly greater (i.e. stiffer) than $K_r$ and both springs should always be under some tension in order to prevent undue vibration and snapping motions of the stainless steel cable from sudden and irregularly shaped waves.

It is believed that the suspension system of the VLEG, which constitutes the energy dissipating mechanism of the EKS and its repeating unit WEC's, is unique in form and structure. Furthermore, other novel advantages of this system are:

1) The use of one of the reaction masses, reaction mass (3), to directly convert its moving kinetic energy in either the FCA rotor or PMA rotor into electrical energy rather than redirecting its kinetic energy into rotary wheels and turbines, hydraulic lifts and columns, pulleys, spherical bearings, or gear linkages and other more complicated mechanical means.

2) The use of one reaction mass (1) that is massively larger than the combined mass of the other two reaction masses (2) and (3) so that even if the VLEG and any apparatus in which it is incorporated such as the embodiments described herein, the EKS embodiments, is placed in a freely tethered or floating medium such as the ocean, significant relative motion between the stator on reaction mass (1) and the rotor reaction mass (3) attached to reaction mass (2) will occur.

3) The net force acting on the rotor, reaction mass (3), may not be equal on the positive sloped half of the input energy waveform cycle (trough to crest) to the net force acting on the rotor on the negative slope half cycle (crest to trough) creating unequal velocities of the rotor and asymmetric kinetic energy dissipation and electric energy production during the entire cycle which is not desirable due to increased difficulty in regulating the electric energy removed by the Power Collection Circuit (PCC) requiring larger filter capacitors, more complex circuitry for load and line regulation. For instance, if the reaction mass (2) input force represented by an asymmetric wave input force on the buoy floatation collar mobile subunit in the EKS repeating unit WEC is much greater than the gravitational weight of reaction mass (3), the rotor containing the PMA or the FCA, the positive upswing, caused by the positive half of the wave being significantly greater in magnitude than the negative half, a situation more common than the other way around, for the rotor as the buoy floatation collar is forced upward by the wave in the trough to crest half cycle could be much more forceful than the gravitational weight pulling the rotor down on the crest to trough half cycle causing asymmetric kinetic energy dissipation and electric power generation. This can be balanced out by increasing the spring constant of the lower restoring force spring but keeping it significantly lower, that is, less stiff, than the spring constant of the upper perturbing force spring. The spring constants can be adjusted for the best symmetric pattern for ocean waves that are only semi-sinusoidal and asymmetric. For example, the ratio of the spring constant $K_P$ of the upper perturbing force spring to the spring constant $K_R$ of the lower restoring force spring can be decreased as necessary while keeping the ratio significantly greater than one. A preferential range for spring constants would be approximately 0.5 to 2.0 pounds per inch for the lower restoring force spring and approximately 5.0 to 20 pounds per inch for the upper perturbing force spring, and in the preferred configuration, the ratio of the two spring constants would be approximately 10:1 or less, as such a configuration has worked well in constructed prototypes.

4) During alternate half cycles of the incoming ocean wave, energy can be stored and released in alternate fashion by first the upper spring then the lower spring. The incident wave may often deviate quite significantly from a pure sine wave resulting in highly asymmetrically positive and negative sloping half cycles. The separate springs and their spring constants will more efficiently couple these asymmetrical half wave disturbances onto the moving mass (2), the mobile subunit, and thence to mass (3), the rotor, thereby increasing the efficiency of the kinetic energy transfer to the rotor allowing the system to resonate in tune with the wave form of the incoming vibratory energy wave, which greatly improves the mechanical impedance matching between the incoming energy wave train and the vibrations of the rotor and improves the efficiency of the kinetic energy capturing and dissipating process, and thereby increases the efficiency of the production of electrical energy.

5) Vibratory wave energy sources are often not pure sine waves because they may represent complex wave forms due to wave trains summing together from separate directions, such as in the case of vibrations caused by surf crashing along a shore or ocean waves in large bodies of water. As a result of this phenomenon, there are often horizontal lateral force components and torsional rotating lateral force components that can put stress on the rotor which can only respond to directly vertical components of the energy wave force input. Hence, springs, as compared to long axis linear sliding rods, bearing trains, hydraulic sliding columns and like mechanical means, can better dissipate these unwanted components, greatly improving the operating lifetime of the system by reduction of metal fatigue and frictional forces. This rotor spring suspension system is particularly advantageous in damping out the deleterious horizontal linear and rotational torsional forces within the mobile subunit due to wave asymmetry that can develop between the floating buoy collar and the rotor attached to it. The suspension system preserves the advantageous vertical linear motion that is desired to be in phase with both the buoy collar and the attached rotor resulting from the vertical motion of the instantaneous wave amplitude passing through the system. This advantageous characteristic is further enhanced by uniquely arranging the helix direction of the upper perturbing force spring to be oriented oppositely to the helix direction of the lower restoring force spring, thereby allowing for these undesirable perturbing forces on the oscillating rotor to be damped out by the resulting oppositely directed twisting displacement motions and exerted forces of the two springs in response to these undesirable perturbing forces exerted upon them and the cable attached to the PMA.

6) To be able to harvest and dissipate vibratory waves of huge magnitude, such as large ocean waves, the alignment of the rotor and the stator as far as maintaining a proper narrow air gap between them and reducing frictional forces between them should be extremely precise with very tight tolerances that should be maintained over long periods of intense vibratory activity. The spring suspension system is much more tolerant of this than linear spherical ball bearing trains, linear sliding rings, and other mechanical arrangements. Also, parasitic damping forces from these causes can be better and favorably attenuated with a mass spring system.

7) By allowing the system to resonate at its mechanical resonant frequency in tune with the frequency of the wave form of the incoming vibratory energy wave, the mechanical impedance matching between the incoming energy wave train and the vibrating rotor is greatly improved, in turn improving the efficiency of the kinetic energy capturing and dissipating process. The efficiency of the production of electrical energy is increased; the electrical power generated and the quantity of kinetic energy dissipated is thereby maximized for a given size of incident wave. Though this can never be accomplished perfectly because of non-sinusoidal wave asymmetry and because the fundamental frequency of the incoming ocean waves will vary with time, since the mechanical resonant frequency of the system is equal to $\omega=(K_{pr}/((M2+M3))^{1/2}$ where $\omega$=the mechanical resonant angular frequency of the mass spring system, and where M2 represents the mass of the mobile subunit buoy floatation collar of the WEC, M3 represents the mass of the rotor PMA (neglecting the weight of the attached springs) and $K_{pr}$=the series connected combined spring constant as previously defined, we can with this system adjust the stiffness of the springs for a given rotor mass to get as close as possible to this resonant frequency match to the incoming waves. While ocean waves are the representative example for expository purposes, this applies to any form of vibratory wave energy source including those produced by wind, vehicular and rail traffic, crashing surf, ship wakes, and so forth.

8) Parasitic damping, which robs a spring-mass VLEG of its efficiency, can lessened in this spring-mass system by favorably utilizing its unique structure characteristics thereby allowing the stiffening and suitable adjusting of the spring constants to reduce thermoelastic losses, by thereby allowing the decreased sliding friction through the use of special lubricants as described previously as well as allowing the PMA mass (3) essentially ride a cushion of air comprised of the narrow air gap between the PMA and the slotted rotor sliding tube, by thereby allowing the decrease in air resistance to the stroke of the rotor mass (3) by the favorable features of the VLEG including the hollow central support column, sliding rotor tube slot, and end air vents for hard plastic slotless rotor sliding tubes, and by thereby allowing for minimization of wasteful unwanted vibration in mass (1), the stationary mass, by making the ratio of mass (1) as high as possible to the sum of mass (2) and mass (3). This allows for a quantity known as the quality of the spring mass system, Q, analogous to the Q factor in a RLC electrically resonant circuit, to be made as high as possible; a higher Q factor allows for superior conversion of input vibratory energy into electrical energy. Since it can be shown that Q is equal to $\{(K_{pr}*M)^{1/2} D_p$ where $K_{pr}=K_p*K_r/(K_p+K_r)$, M=M(2)+M(3), is as defined previously, and $D_p$, the parasitic damping, can be measured experimentally by subjecting the system to a single wave, measuring the $S_r$, the resulting rotor stroke distance, measuring $\omega$, the angular wave frequency, ($\omega=2\pi f$ where f is the wave frequency) by observation or with an oscilloscope, the frequency at which the system naturally oscillates at, and knowing $F_{in}$, the measured force of the incident wave, then $D_p=-F_{in}/(\omega S_r)$. These relationships mathematically express the ability to adjust advantageously the parameters of this particular spring-mass system for the maximum performance in the manner that was explained, in particular by maximizing the sum of mass (1) plus mass (2), maximizing the ratio of mass (1) to the sum of mass (1) plus mass (2), by maximizing $K_{pr}$, and by maximizing the ratio of $K_p$ to $K_r$. The WEC repeating subcomponent of the EKS comprising the present principles has a configuration of this spring-mass system in its VLEG that allows for such optimization.

Compressive Repulsion Magnetic Field Technology

The VLEG uses a very advantageous magnetic pole orientation in the Permanent Magnet Array used either in the rotor or the stator of the first or second embodiment of the device. Most technologies in the field of electrical power generation use magnets, permanent or electromagnetic in type, whose poles are oriented in opposite polarity configuration. The present principles, through the use of the VLEG, employs a magnetic pole orientation that is drastically different. In particular, the magnets of the permanent magnetic array can be oriented such that like poles of the magnets are disposed adjacently to concentrate a magnetic field through the field coil array, as discussed herein below, for example, with respect to FIG. 5A.

Figure 4B:
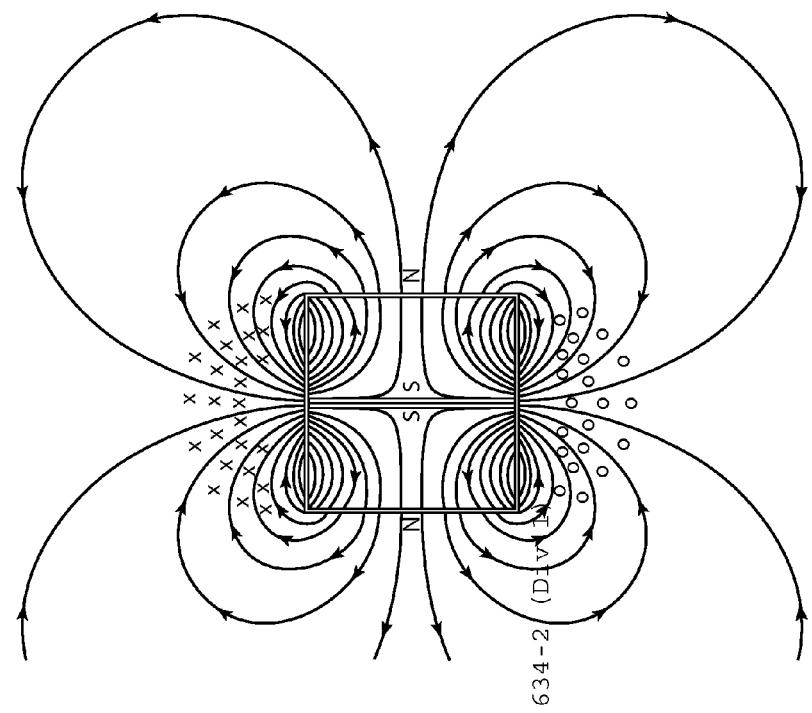
FIG. 4B illustrates the magnetic field distribution of a repelling magnet field pole configuration.
Figure 4A:
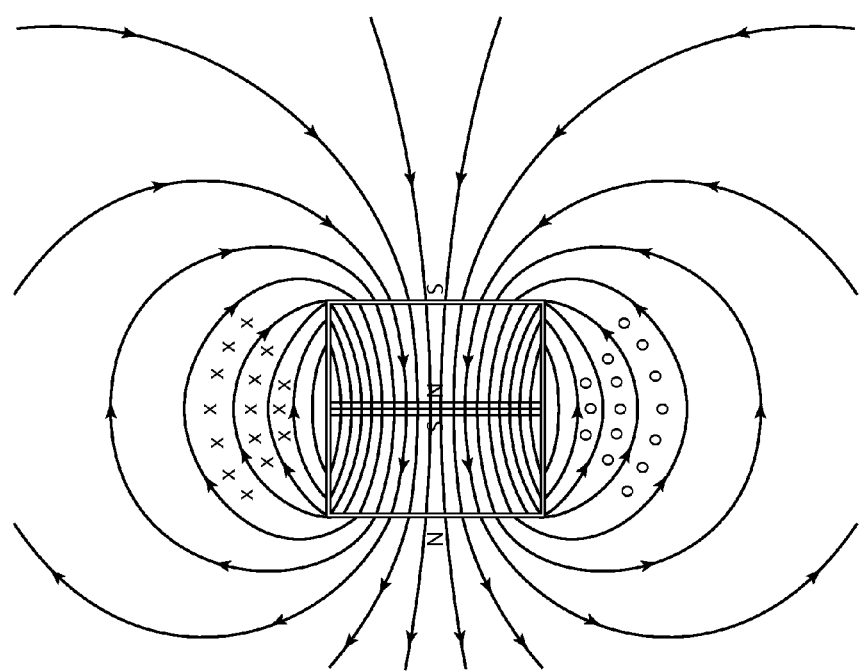
FIG. 4A illustrates the magnetic field distribution of an attracting magnet field pole configuration.

Referring initially to FIG. 4A, two similar magnets in size and magnetic strength have a north pole facing a south pole. This is prior art found in numerous types of technologies. All the flux flows out the north (N) pole of the left magnet, around in space to the south (S) pole of the right magnet, and then completes the magnetic circuit by flowing through the N-S pole interface and back to the original N pole. The force between the magnets is attractive and equal in magnitude to the force of one of the magnets attracted to a very thick magnetic plate. Most of the flux comes out of the magnet at its ends, very little in the direction perpendicular to the axis of the cylinder formed by the two magnets, whose strength together is twice that of each magnet with twice the flux leaving and entering the ends as compared to one of the magnets.

FIG. 4B illustrates quite a different magnetic field pattern. Here the S pole of each magnet was brought adjacent to each other causing much less magnetic lines of force to come out the ends of the combined magnetic cylinder, and many more lines of force to come out perpendicular to axis of the cylinder. For large magnets it requires tremendous force to place these two like S poles in adjacent opposition to each other and counteract the extreme repulsive force equal in magnitude to the force of attraction of one of the magnets alone against a heavy steel plate. Most of the magnetic field lines of the two magnets are squeezed immensely into a much smaller space resulting in a far more intense magnetic field in the region of space where copper coils around the magnet would be placed for a generator in accordance with the present principles. This is clearly seen by the array of X's and O's on FIG. 4A and FIG. 4B which represent the presence of a coil winding; the array of X's denote the windings of a coil surrounding the magnet pair going into the paper and the O's denote the windings of that coil coming out of the paper. The coil windings are clearly located in a region of higher magnetic flux with the S poles in repulsive opposition and it is clearly seen that the total number of flux lines from the two magnets are squeezed into a smaller spatial volume leading to an increased flux density. Though the surface pole magnetic flux density, B, that might be typical for a rare earth magnet used in exemplary embodiments of the current invention would be about 5000 to 6000 gauss (0.05 to 0.06 Tesla), the compression of the magnetic fields would produce a field intensity of twice that exceeding 10,000 gauss or 1.0 Tesla. Measurements have been taken to confirm this field intensification. It is clear that if the magnet pairs were to vibrate in a linear direction, x, along their axial length, the magnetic flux gradient represented by the number of flux lines of force being cut by a conductor, that is flux conductor linkages, $d\phi/dx$, or the flux gradient along the direction of vibration consists of magnetic flux lines perpendicular to the stationary coils, is far more intense with the repulsive field configuration than with the standard conventional attractive field configuration. Hence, for a vibratory motion of the magnets of equal amplitude, velocity, and angular frequency, the power generated in the coils of FIG. 4B will be quite more significant than for the coils of FIG. 4A.

FIG. 5A shows the magnetic field distribution of a VLEG PMA embodiment employing 3 VLEG Magnetic Unit Structures; inset FIG. 5B shows a conventional prior art magnetic field configuration. Each VLEG magnetic unit structure as described previously is comprised of 2 NdFeB rare earth magnets plus 2 pole pieces, which together with one additional end pole piece constitutes the basic VLEG PMA magnetic structural unit. The end magnetic field deflecting magnets may be added as necessary to the VLEG basic magnetic unit structure. A novel and preferred feature of all VLEG PMA structures described herein, is that the structure comprises a stack or vertical array of VLEG magnetic unit structures of at least one in number plus one additional end pole piece assembled in the compressive repulsive magnetic pole configuration. Thus, in an example of the preferred embodiment, if y is an integer greater or equal to one, the number of VLEG PMA magnetic unit structures in the PMA is y, the number of magnets in the PMA equals 2y, the number of pole pieces equals 2y+1, and the number of regions of repulsive magnetic fields where like poles face each other is 2y−1. This mathematical description forces the two end poles of the VLEG PMA to be of the same polarity in complete opposition to the conventional PMA of the prior art described above where magnet stacks in the alternating attractive pole arrangement of necessity have one end pole being of opposite polarity to the other end pole.

The total flux emanating from one magnetic N pole and flowing into one magnetic S pole is designated 1N and 1S respectively. Referring to FIG. 5A and FIG. 5B, this flux quantity, 1N (or 1S) designated as 45 and 52 respectively, of total flux lines are present at each end of the VLEG PMA structure N (or S) pole; 2N (or 2S) total flux lines designated as 49 are present in each repulsive field space along the side of the structure between adjacent like magnetic poles accounting for the doubling in magnitude of the B (magnetic) field measurements quoted above. In actuality, in the specially designed PMA's for the exemplary VLEG embodiment described here, where there is an additional specification that follows from the above numerical rules, namely that the end magnetic poles should be always of the same polarity, what is measured is that the flux densities B in the outer repulsive field regions closer to the end of a long PMA is a bit less than the innermost repulsive field regions due to the manner that the flux lines emanating from the N pole (or into the S pole) of the PMA cannot go far and widely into space and return to the other end pole (as it is of the same polarity as the pole that they had left) as in the case of the conventional attractive field array described above; instead, they must return to a complementary opposite inner pole, a distinctive further benefit in increasing the flux density in the vicinity of the coil windings. By contrast, in the prior art of configuration of inset FIG. 5B, a total of 4N flux lines and 4S flux lines designated as 41 and 44 respectively are present at the N pole and S pole respectively where the flux lines are undesirable, and hardly any flux lines are present in the space along the sides of the PMA where they should intersect surrounding coil structures.

Let the x axis represent the longitudinal axis of the PMA parallel to the direction of vibration of the PMA, and let dN/dx represent the coil turns gradient along the x axis which when integrated over x yields the total number of coil turns, N, in the coils surrounding the PMA through which the flux lines intersect. Now let $d\phi/dx$ represent the magnetic flux gradient along the x axis of the VLEG magnet vibration direction that enters and leaves the PMA perpendicular to its outer cylindrical surface; this flux gradient is intensely greater in the repulsive pole configuration as compared to the conventional attractive pole configuration. Let the flux gradient be integrated over x yielding $\phi$ representing the total number of flux lines produced by the PMA leaving and re-entering it. From Faraday's Law, the induced voltage (hence current, power, and electrical energy) is proportional to the amount of flux lines cut by a conductor (flux conductor linkages) per unit of time, and this amount is proportional to the product of both $\phi$ and N as well as the velocity of the PMA during its vibration. This leads to the conclusion that, for a given FCA of given geometry and total coil turns N, because total flux $\phi$ traveling across the cylindrical side of the PMA is a huge number in the repulsive like pole configuration as compared to the conventional attractive opposite polarity configuration, the amount of power production in the coils would be very large in the former configuration, and very small in the latter configuration.

Because magnetic flux lines around a magnet are always closed loops even if some appear to extend to infinity, the number of flux lines that come out of any VLEG PMA structure must always equal the number of flux lines going back in; thus, the strength of the fields in the repulsive field regions must be twice that at the end regions of the PMA (allowing for the mild non-uniformity mentioned above), and the total amount of flux lines generated by the VLEG PMA structure as seen in FIG. 5A is identically equal to a conventional attractive pole PMA structure as seen in FIG. 5B. It is the radically different configuration and arrangement of the magnetic poles that lead to a radically different distribution of the magnetic field lines that constitutes the novel design of preferred VLEG PMA structures whether it is only a basic unit as described or large multi-magnetic structural unit PMA structures that have been built and demonstrated to be of great benefit to the energy conversion function in the WEC repeating component of the EKS. In the inset FIG. 5B for comparison, we see a PMA of conventional prior art where the N and S poles are in an alternate pattern resulting in flux patterns that are totally different. In prior art conventional arrangements, very little magnetic flux emanates from the cylindrical side of the PMA, where the FCA is placed in accordance with the present principles, and moreover, what flux that does come out is parallel to the axis of the PMA cylinder, in a distinctly inefficient and undesirable location and direction, especially for the exemplary embodiments of the VLEG described herein. Mostly all the flux leaves and re-enters the cylinder at the ends which is the least desirable place to position the coils as the coils would have to be prohibitively large and costly to capture a reasonable percentage of the flux stream. Furthermore, many flux lines exiting the end poles parallel or nearly parallel to the long axis of the PMA cylinder will never intersect a copper coil and hence will be wasted, a phenomenon known as magnetic flux leakage. All of these characteristics of the prior art configuration of FIG. 5B are undesirable and are eliminated or greatly improved upon by the exemplary embodiments described herein. While these escaping flux lines can be bent toward the end coils using heavy ferromagnetic metal armature structures, this was judged undesirable in preferred embodiments of the present principles because of weight considerations and because Compressive Repulsive Magnetic Field Technology does away with the need for these heavy armature structures as will be explained subsequently.

A further very important explanation of the derived benefit and novel features of the preferred examples of VLEG PMA structures described herein is that the end magnetic poles of the PMA should be in repulsive magnetic field mode and, as such, should have the same polarity. This configuration is consistent with the unique and specifically defined mathematically structure given above. In the conventional opposite pole attractive magnetic force PMA, many flux lines starting out perpendicular to the face of one end pole and flowing parallel to the axis of the cylinder will sweep out huge magnetic flux line loops in space that are totally useless to cut across coil lines unless huge coils were placed at and far past the ends of the structure, and still, many flux lines will escape intersecting a coil winding producing severe magnetic flux leakage. In the present configuration, a flux line of one end pole, no matter how far it will sweep into and around space, cannot return to the other end pole of the VLEG PMA structure because it is of like polarity to the first pole. Hence, that line of magnetic flux must be directed to the closest available pole of opposite polarity when it attempts to return to the PMA structure causing it to impact the PMA at an interior point along its length axis where it will intersect the coils surrounding the PMA. The amount of flux lines that are lost uselessly to huge magnetic loops in space, that is, magnetic leakage, is beneficially and significantly reduced with the current configuration.

Now if the magnets of FIG. 5B are oriented as per FIG. 5A and are forced together, a great amount of force and expenditure of energy would be needed to assemble a PMA structure representative of the novel "Compressive Repulsion Magnetic Field" Technology (CRMF). Specifically, the magnets are affixed under a compressive strain due to repulsive forces resulting from the proximity of like poles. Here, the proximity of the like poles is such that are sufficient to cause the magnets to accelerate with substantial force in opposing directions if the magnets were not affixed. This structure is therefore assembled with a significant expenditure of energy that is stored in a high potential magnetic energy state with that energy being stored in the structure's compressed magnetic fields as opposed to the conventional attractive pole arrangement where potential magnetic energy of the magnetic structure is lowered as it is assembled and energy of the system is only increased when the magnets are pulled apart. Because such a collection of powerful rare earth magnets with compressed repulsive magnetic fields are highly unstable, such a structure containing large amounts of potential energy contained within the compressed magnetic fields can fly apart with explosive and harmful force if dropped or mishandled. Furthermore, because of the difficulty in building and maintaining such an arrangement even for small sized WEC's, such a compressive repulsion magnetic field PMA should be stabilized using a novel structure comprising 4 components of the preferred VLEG PMA embodiments described herein and referred to in FIG. 9A and FIG. 9B: (1) special magnets 37a and 37b that have an inner cavity 47 through which (2) a stainless steel support tube 36 runs with (3) pole pieces 51, 53, 54 that separate the magnets all bonded together by (4) a very strong magnetic epoxy (not visible) as exemplified but not exclusively represented by JB Weld® with a holding power of at least 3,500 pounds per square inch that was used in constructed prototypes. The repulsive force between a given pair of adjacent magnets in a PMA is significant and is sufficient to cause the magnets to accelerate in opposing directions if the magnets were not affixed. Indeed, this structure converts a very hazardous and unstable magnetic configuration, essentially a "magnetic stick of dynamite," into a stable one that produces multiple regions of compressed magnetic lines of force with magnetic field intensities that are much increased in magnitude in the regions of space where the copper field coils will be placed thereby greatly facilitating the production of electrical energy. Hence magnetic fields are focused, directed, and amplified in the regions of the electric power generating coils without the heavy armatures used for such purposes with attractive magnetic pole configurations. Hysteresis and eddy current losses are significantly reduced and the magnetic drag by the magnets of the rotor as they move in the vicinity of a heavy ferromagnetic armature are eliminated although the Lenz's law back EMF force on the rotor due to the coil's induced current remains.

It should be noted that the method of fixation of the magnets and pole pieces together was accomplished with the strongest of magnetic epoxies. However, as discussed in more detail herein below, the fixation of the magnets together can be implemented by mechanical compression and fixation by means of pole pieces with a threaded central hole attached to the rare earth magnets with a central non-threaded hole which is then threaded as a unit onto a central structural tube that is also threaded, and in this case, the central support tube can be non-magnetic stainless steel, brass, and other non-magnetic materials. Here, the threads facilitate the assembly of such powerful magnets in a controlled manner.

The repulsive force distributed along the long axis of the PMA can exist over a huge range. Using the most miniscule magnets (1/8" o.d.×1/16" i.d.×1/16" thick N42 magnets with a pull of 0.36 pounds), a 6 magnet PMA with 7 pole pieces (excluding the end deflecting magnetic field magnets) would have a repulsive force of 5×0.36=1.8 pounds distributed across its 3/8" length with no pole pieces (4.8 pounds per inch). For the magnets used in prototypes of the present principles, the N42 magnets were 2" o.d.×0.25" i.d.×1" thick magnets with a pull strength of 205×6=1230 pounds of repulsive force distributed over a PMA length of 9.5" including 0.5" thick pole pieces (129.5 pounds per inch). The largest N42 magnets available with a central hole are 4" o.d.×0.25" i.d.×3" thick with a pull strength of 1200 pounds leads to a repulsive force of 5×1200=7200 pounds distributed over its length of 28" including 0.5" thick pole pieces (349 pounds per inch). Thus, the repulsive force tending to pull the PMA apart if not for the central anchoring supporting rod increases dramatically with the size and strength of the magnets, and changes inversely with the thickness of the pole pieces. By using magnets of N52 magnetization, these numbers are increased by approximately 25%. Using thinner pole pieces would of course make the repulsive force per inch of PMA length greater.

In accordance with preferred embodiments, the ranges of the repulsive force between a given pair of magnets in a PMA can be tailored and selected based on the particular environment in which the VLEG is implemented. For example, 20 to 100 pounds of repulsive force between a given pair of magnets in a PMA can be employed for bodies of water that are calm with relatively small waves, such as inland seas and large lakes. Alternatively, this range can be employed for WEC embodiments in which WEC's multiple PMA higher order VLEG electrokinetic matrix transducers are used and incorporated. Further, 100 to 300 pounds of repulsive force between a given pair of magnets in a PMA can be employed in oceans of more typical waves of larger and more typical size. In addition, the 100-300 pound range can be employed in PMA VLEG Electrokinetic Matrix Transducers that are relatively few in number. For example, for environments to which the 100-300 pound range is preferentially directed, WEC's can contain one to a small number of PMA's in their VLEG Electrokinetic Transducers. In accordance with another exemplary aspect, 300 to 1200 pounds of repulsive force between a given pair of magnets in a PMA can be employed in the largest WEC's designed for the largest ocean waves that regularly might occur, such as in the Pacific ocean along the coasts of Hawaii, California and Chile in which the WEC can use a single massive PMA in its VLEG Electrokinetic Matrix Transducer. Although a pull strength of 300 pounds to 1200 pounds for each magnetic pair interface would be most preferential, larger custom-made magnets subject to some potentially limiting factors described herein below can be employed. It is also to be noted that the air gap factor that undesirably decreases the density of and total number of flux coil wire linkages in the vicinity of the inner portions of the coils, which occurs with increasing air gap width, becomes less of a factor as the size and magnetization of the magnets increase for a given gap width.

While there are no theoretical limits as to how large custom made magnets can be built, resulting in no limits on the pull strength of such magnets that are used in an WEC, such a limit may be imposed by the following factors: 1) The structural strength of the central support tube which can be made quite significant; 2) The method of fixation of the magnets and pole pieces together, which in embodiments of the present principles was accomplished with the strongest of magnetic epoxies but may also be done by mechanical compression and fixation of suitable and novel means described below; 3) The ability to safely handle such large magnets; 4) The spacing between adjacent WEC repeating subcomponents needed to prevent undesirable magnetic interactions between the adjacent PMA's of adjacent WEC's should not be so great that the wave kinetic dissipation function of the EKS is seriously degraded, as to be explained subsequently; 5) If a VLEG electrokinetic matrix transducer has greater than one PMA and VLEG, the magnetic interaction between adjacent PMA's will very quickly become unacceptably strong as the size and strength of the magnets are increased; 6) The costs may quickly become prohibitive with arbitrarily large and powerful rare earth magnets. Likewise, there should be a limitation regarding the minimum repulsive force suitable for the wave kinetic energy dissipation and conversion function of an EKS, which should employ rare earth magnets of at least a pull strength of 20 pounds, as noted above. This threshold is based upon the fact that magnets of lesser strength would simply not have sufficient quantities of magnetic flux when used in the compressive repulsion magnetic field technology to produce a large conversion of wave kinetic energy into electrical power, rendering devices with less repulsive force relatively inefficient, especially with regard to EKS embodiments that rely on the conversion to dissipate potentially harmful waves. In general, the desirable magnetic pull strength of individual magnets can fall into being appropriate for three aspects of the wave kinetic energy dissipation function, as noted above.

Figure 5C:
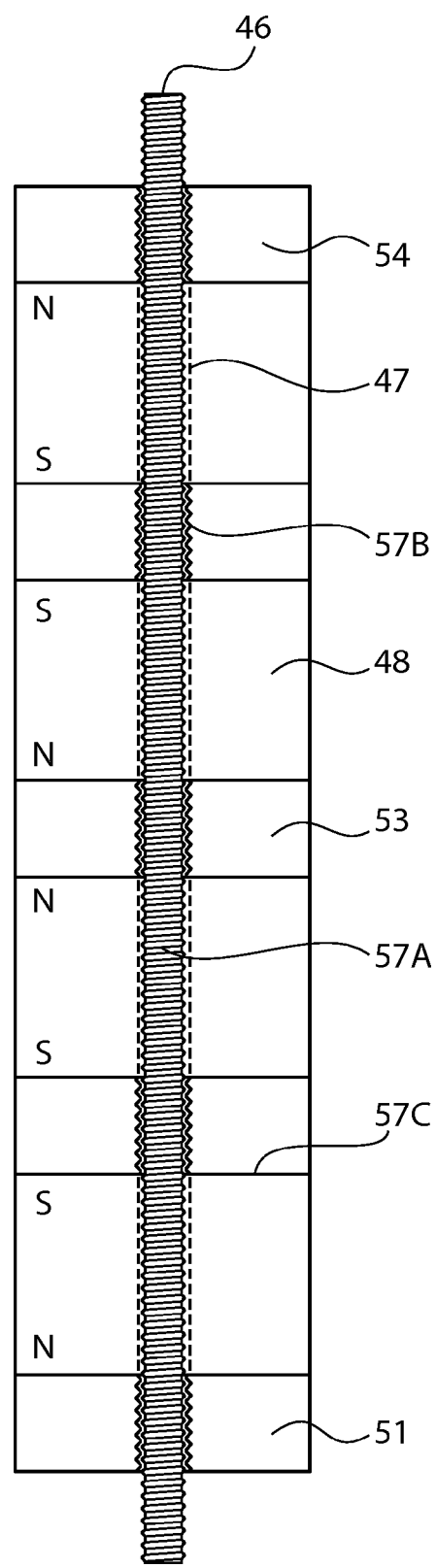
FIG. 5C shows a CRMF PMA implementation of Compressive Repulsive Magnetic Field Technology employing a threaded central support tube and threaded magnetic pole pieces.

With respect to considerations described above that may have impact on limiting the size and strength of the rare earth magnets used in the PMA, FIG. 5C illustrates the novel means that have been formulated and constructed to greatly increase the allowable size of such magnets and to greatly facilitate the assembly of such PMA that are subject to such intense gradients of severe repulsive magnetic force. As compared to FIG. 5A, FIG. 5C shows a compressive repulsive magnetic field PMA, upper end pole piece 54, three interior pole pieces 53 and a lower end pole piece 51, all of which now have a much larger central hole 47 whose size is proportional to the size of PMA rare earth magnets 48 and whose size may exceed as much as 3 inches or more in diameter. Central hole 47 of the pole pieces has a new characteristic of being threaded on its interior diameter surface by threads 57B. The configuration of FIG. 5C also includes a significantly larger diameter central support tube 46 whose diameter is just slightly less than the central hole 47 in which it is contained and that now has a new characteristic of being threaded on its outside surface over its entire lengths by threads 57A that are complimentary to threads 57B on the interior inside diameter surface of pole pieces. In addition, the configuration further includes four significantly large rare earth magnets in compressive repulsive magnetic field configuration with a similar sized central hole 47 but whose inside diameter interior surface is not threaded. Note that the first PMA prototypes were assembled by hand by exerting considerable hand pressure as each new pole piece and magnet, one by one, were compressed down upon the central support tube 46, suitably immobilized and subsequently bonded together and bonded to the central support tube's outside surface with magnetic epoxy as previously described at surfaces 57C; the hand compression limited the size and strength of the magnets used in these prototypes. However, in the modified configuration of FIG. 5C, a magnet is bonded to a pole piece and this magnet-pole piece unit is threaded down the central support tube onto its previously placed predecessor whose upper surface has had a layer of bonding epoxy applied to it. In this manner, PMA structures of large diameter and length with very powerful magnets can be assembled in a highly stable, controllable, and safe manner. Essentially, the PMA takes on the structure of a large threaded screw mechanism which allows precise control of very heavy repulsive magnetic forces. Because of this controllability factor created by threads 57A on the central support tube and threads 57B on the pole pieces, in addition to the central support tube being composed of nonmagnetic metals such as stainless steel or brass, the tube may now be composed of magnetic materials without increasing the instability of assembly and also allowing for better focusing of the magnetic fields in the areas of repulsive magnetic regions. Furthermore, this novel means of construction and assembly of the PMA allows for thinner pole pieces and higher magnet thickness to pole piece thickness ratios, thereby significantly increasing the intensity of the repulsive magnetic fields in between the magnetic pole pieces, which offers the following additional advantages that result in increased wave kinetic energy power dissipation and more byproduct electrical energy being produced: 1) More magnetic flux linkages through the FCA coils; and 2) a shorter longitudinal axial length of the PMA. The smaller resulting weight of the pole pieces allows for either thicker more powerful magnets or more magnets of the same strength to be used within the same PMA volume of space.

Note that in embodiments of the present principles, cylindrical magnets were used. However, magnets of any geometrical cross section that are magnetized preferentially in their thickness dimension can be used should special applications require it.

Theoretically, the repulsive field pole pieces or coupling elements 53 of FIG. 9A and FIG. 9B could be dispensed with as per FIG. 4B. However, there are two distinct advantages having these pole pieces in place: 1) the stability of the structure is greatly improved as far as the ease of assembly—for example, to ease assembly in the working prototypes, each magnet and pole piece were successively and individually bonded to the stainless steel tube backbone while under great pressure; the presence of pole pieces reduces considerably the compressive forces on the magnets needed to overcome their mutual repulsive forces during assembly as would be evident from the calculations above; 2) more importantly, since the pole pieces are made of suitable highly ferromagnetic materials such as low carbon steel, low carbon high silicon electric transformer steel, and the like, the very high magnetic permeability and magnetic saturation levels of these pole pieces allow for concentration and amplification of the total amount of magnetic flux emanating and entering the PMA where the coils reside so that the regions of compressed magnetic fields have still higher field densities; the pole pieces act like magnetic windows and lenses that concentrate and direct the magnetic flux out and into the PMA perpendicularly to its long axis directly through the encircling FCA windings greatly increasing flux coil winding linkages, again without the use of heavy coil surrounding armature structures. Essentially the repulsive pole pieces of the PMA perform the same focusing and magnetic field intensity amplification function as heavy ferromagnetic structures in the stator with the previously mentioned disadvantages, and in effect, the focusing and magnetic field intensity amplification functions are located on the PMA rotor themselves rather than on the stator. This particular advantageous characteristic is more apparent and significant on the preferred first embodiment of the VLEG with the PMA rotor and the FCA stator although the advantage also exists with the second embodiment of the PMA being the stator and the FCA being the rotor. Ideally, the higher the ratio of the magnet thickness to the pole piece thickness, the more magnetic field compression and concentration one has, the more electric power is produced, and the less amount of copper with smaller and less costly coil windings that can be used. However, if the thickness of the repulsive pole piece becomes too small relative to the magnet thickness and diameter, aside from the PMA becoming very difficult to assemble when dealing with large magnets because of the tremendous compressive forces and energy needed and the theoretical possibility of structural failure with the magnets and pole pieces flying apart at high velocity, the pole pieces will reach the magnetic saturation point (for hard low carbon or electric transformer steel, about 18 KGauss or 1.8 Tesla) so that the pole piece will become less able to contain and focus the magnetic repulsive field onto the coils in the effective manner just described. The preferred range is estimated to be a ratio of magnet thickness to repulsive pole piece of 2:1 to 8:1. In fact when the ratio is properly adjusted for the given sized magnet of a given strength of magnetization as it has been in the presently described embodiments of the VLEG used in the WEC repeating component of the EKS apparatus so that virtually all of the magnetic flux can be encompassed within and compressed into the repulsive pole piece to be directed out across the encircling coil windings, another favorable operative feature of the repulsive pole piece emerges. While a large compressive force has to be exerted in assembling each magnet in the repulsive field mode onto the magnet stack, when that magnet just approaches the pole piece of correct thickness that is over the magnet underneath, the new magnet being added suddenly is weakly attracted to the pole piece because of magnetic induction on the upper surface of the pole piece; the inter-magnet force suddenly becomes weakly attractive, and the force adds to the stability of the PMA because that PMA is in a lower energy state than when the additional magnet is a slightly greater distance away. The repulsive pole piece may be either a solid cylinder, or if especially silicon electric transformer steel is used, the pole piece could be built up as laminated layers bonded with suitable magnetic high strength epoxy. The advantage of the latter arrangement is that eddy losses from Lenz's Law Back EMF current generation in the pole pieces which could slow down the rotor PMA's velocity are reduced. However, the very strong internal repulsive magnetic forces within the pole piece should be taken into consideration with respect to the stability of the PMA structure; for small magnet structures, bonded laminated cylindrical pole pieces are advantageous in some applications, but for larger magnet structures, the solid much stronger cylinder pole pieces would be the preferred embodiment. Note that the geometry of the pole pieces may take shapes other than a cylinder, but the shape taken should match the cross sectional geometry of the magnets being separated by the pole pieces.

There are four additional advantageous operational characteristics that relate to efficiency of power generation that are a consequential result of the use of pole pieces to direct the flux lines flowing in and out of the cylindrical side of the VLEG PMA to encompass the coil windings: 1) there is no magnetic drag on the motion of the PMA relative to the coil windings caused by the pole pieces themselves being attracted to the magnetic fields of the magnets as in the case of heavy large ferromagnetic armatures surrounding the coil windings; 2) the pole pieces do not contribute any undesirable Lenz's Law back EMF force opposing the relative motion of the PMA with the FCA windings as no currents are induced in the pole pieces as opposed to the situation whereby coil encompassing ferromagnetic armature structures, even with the use of laminations and appropriate types of steel, have eddy currents induced within them that contribute to back EMF force production; 3) The only currents that are induced causing an unavoidable production of EMF back force inherent to all electrical generators is in the coil windings themselves and not in the pole pieces; 4) the elimination of coil winding encompassing ferromagnetic armature structures eliminates the wastage of energy from hysteresis and eddy current ohmic losses that are still present even with the use of suitable steels and laminations.

The pole pieces can be clad in a thin ring 38 of non-magnetic stainless steel that will act as a sliding bearing with lubrication against the inner surface of slotted rotor sliding tube 32 as shown in FIG. 3A. In addition to reducing sliding frictional energy losses, because these bearing surfaces will make the diameter of the pole pieces slightly larger than that of that of the cylindrical magnets comprising the PMA, the magnets themselves will not be damaged due to the constant friction with the sliding tube. The stainless steel rings may also be applied to the cylindrical sides of the magnets themselves accomplishing the same benefit. With either placement, the stainless steel rings also ensure that the air gap (61 on FIGS. 9A and 9B) between the PMA's cylindrical surface and the inside of the slotted rotor sliding tube 32 remains constant as the rotor vertically slides up and down within the sliding tube, a very desirable characteristic that makes the power generation more uniform, the sliding motion more uniform, and a decrease in erosive frictional damage to the inner surface of the tube or the relatively fragile metal coat of the rare earth magnets used. Note that if the metal coating, usually of nickel or nickel layered with copper, is compromised due to frictional losses of the rotor against the sliding tube, the NIB (Neodymium Iron Boron or NdFeB) rare earth magnets used as the preferred embodiment will suffer catastrophic damage—the magnet material structure is brittle and will crumble from mechanical stress, the iron will oxidize increasing magnet brittleness, and the magnetization of the of the magnet will decrease with time as the magnetic metal coating acts as a "keeper" partially short circuiting some of the magnetic flux from the N pole to the S pole when the magnet is not adjacent to ferromagnetic materials or magnets of opposite polarity. Additionally, as a result of these lessened frictional losses, the parasitic damping factor associated with the VLEG goes down, maximizing the electrical power generated for a given amplitude of wave vibration.

The advantages of Compressed Repulsive Magnetic Field Technology include: 1) Most of the magnetic lines of force leave and enter through the sides of the PMA across the surrounding FCA windings rather than the ends of the PMA with the repulsive pole pieces acting as both windows and magnifying magnetic lenses that direct all of the flux lines directly into the FCA coil windings; 2) In the standard attractive pole magnetic field configuration, virtually all the magnetic lines of force leave the N pole end of the PMA and are distributed over a much larger area of space before returning to the S pole end thus requiring very large coils at either end that must be moved considerable distances to intersect most of the field lines entering and leaving the PMA; 3) While the total magnetic flux lines of force is the same in both configurations, in the configuration of preferred embodiments the magnetic flux lines are concentrated into a smaller area of space leading to a more intense magnetic field in the region of the FCA, and in the areas nearby to the repulsive pairs of poles where most of the coil windings are located; the fields may be as much as 100% more intense as is clearly shown by the flux field lines produced with the technique of fine element series magnetic field imaging in FIG. 4B as compared to FIG. 4A; 4) In the standard configuration, much of the coil windings do not produce appreciable power when they are over the region of the PMA not near the end poles where the efflux and influx of field lines occur whereas in the configuration of preferred exemplary embodiments of the present principles, all magnets of the PMA are always surrounded by the coil windings that are always intersecting significant amounts of flux producing electrical power whenever the coils are over the PMA except at the crest and trough of the wave when the rotor is stopped; 5) It is much more simple to move a stack of smaller coils rapidly and for much greater distances then a very large coil at either end of a PMA with the standard attractive pole configuration; 6) The multiple PMA multiple FCA VLEG Electrokinetic Matrix, an advantageous arrangement of multiple VLEG structures to be described subsequently, can simply not be built with the standard configuration and whereas they can be built using Compressive Repulsive Magnetic Field technology; 7) To prevent a large amount of magnetic flux leakage into space without intersection with field coils the standard configuration of attractive poles requires large heavy ferromagnetic armatures to focus the magnetic field onto the coils—while this is quite characteristic of motors and rotor generators, is highly undesirable for linear electric generators of this type because of significant eddy and hysteresis losses, the requirement of much more massive dampening systems, the significant increases in magnetic drag on the rotor, and significant increases in back EMF forces retarding the acceleration and velocity of the rotor.

Note that with regard to focusing magnetic field lines, implementing magnet stacks in one enclosure shell and the field coil array in a separate enclosure shell, where one enclosure's side is adjacent to the other enclosure's side, along with an armature is a substantially less efficient system because of an asymmetric focusing of the magnetic lines of force into the adjacent coil and ferromagnetic armature on one side of the magnet stack leaving the field lines from the other side of the magnet stack not having penetrated the field windings as well as a necessary increase in the air gap between the magnets and windings of such an arrangement. In contrast, the configuration of magnets in accordance with CRMF focuses the magnetic lines of force by using the positions of the magnetic poles themselves instead of heavy ferromagnetic armature structures to focus magnetic field lines. Further, in preferred VLEG embodiments, the FCA coil windings completely encircle the circumference of the PMA to maximize intersection with magnetic field lines.

It should be further noted that there is virtually no limit to the size of the coils and magnets that can be used in the Compressive Repulsive Magnetic Field configuration as long as the system can accommodate the intense force required to compress large and powerful magnets together in a magnet stack. Furthermore, if magnetic strength is defined as either the degree to which the material composing the magnet is magnetized, a quantity known as the N factor or magnetic energy product that ranges from N1 (1 MEGA-GAUSS-OERSTED, $BH_{MAX}=1$ MGOe) being the least magnetized to a maximum of about N52 ($BH_{MAX}=52$ MGOe) being the most magnetized, or the pulling force in pounds or Newtons, which is proportional for a given degree of magnetization to the dimensions and volume of the magnet, the size of the associated coils and the amount of copper used is minimized with favorable cost considerations with Compressive Repulsive Magnetic Field technology. It is important to note that by compressing the repelling magnetic poles closer together with thinner repulsive pole pieces, the length of the PMA can be reduced for any given size magnet being used which beneficially causes the following advantages: 1) smaller less costly coil sizes and less copper to be used for any given desired power output; 2) the smaller in thickness the repulsive pole pieces are and the closer the repulsive poles are, the smaller the mass of the PMA rotor will be which allows it to travel at a higher velocity for a given magnitude of wave force increasing the electrical power generation and efficiency of wave energy dissipation as well as allowing the rotor to be braked more easily when necessary for a very large wave by the braking mechanism of the VLEG. The preferred embodiments of the VLEG described here use a structure and configuration of magnets that is distinctly different and possesses advantageous characteristics as to enhancing its effectiveness with respect to known systems of linear electric generators. The advantages are especially apparent with regard to the generation of useful electrical energy by dissipating undesirable ocean wave energy via the wave energy converter (WEC) repeating component described above.

Not only does compressive repulsive magnetic field technology represent a significant improvement to the art of electric power generation by moving magnetic field coil interactions, it is also important to the operation of the purely magnetic component of the exemplary electromagnetic and mechanical breaking system embodiment of the WEC and VLEG described herein. CRMF also is important to the operation of the end magnetic field deflecting magnets in the WEC and VLEG embodiments described herein. These two aspects of the technology will be discussed in more detail shortly below.

Variable Wire Gauge Field Coil Array

Figure 6:
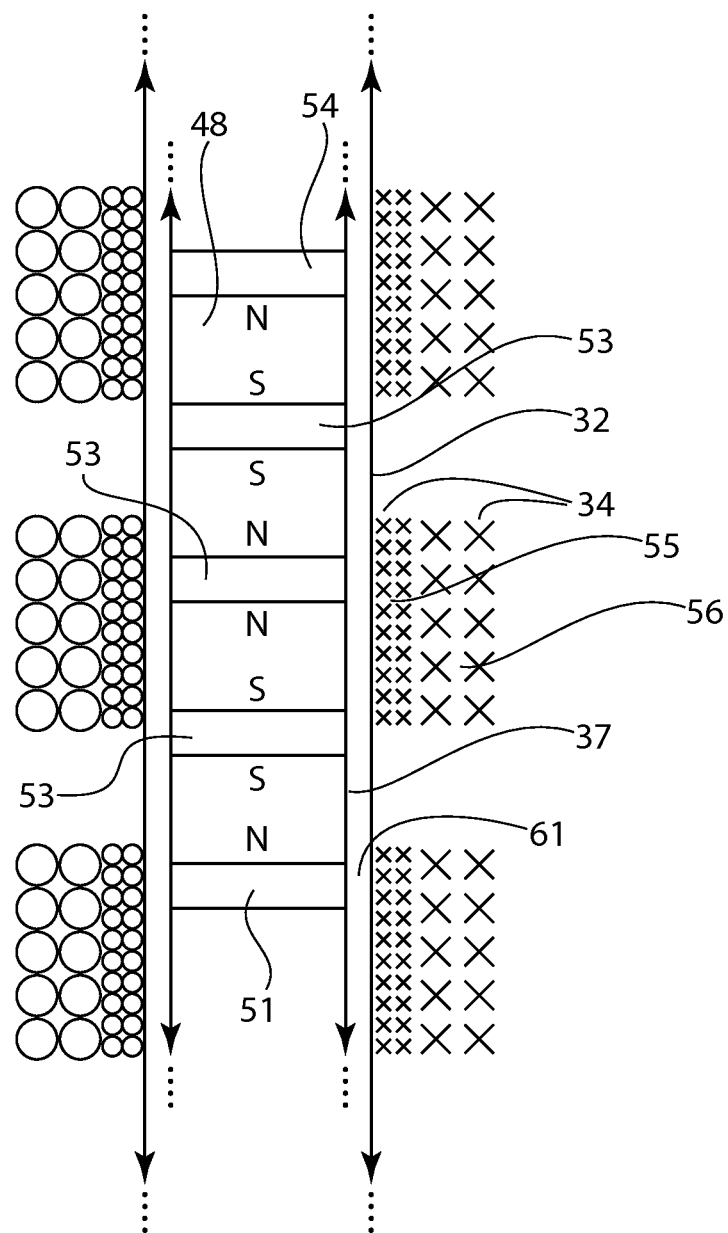
FIG. 6 shows a variable wire gauge Field Coil Array (FCA) surrounding the Compressive Repulsive Magnetic Field PMA.

Referring to FIG. 6, shown in magnified detail are the coil windings that constitute the FCA of a preferred embodiment. FCA 34 is shown supported by slotted rotor slide tube 32 separated by air gap 61 from PMA 37 comprising two VLEG magnetic structure units with end N pole pieces 51 and 54, 3 repulsive magnetic field regions with pole pieces, one of which is designated 53. FCA 34 is divided into two layers, an inner small gauge wire layer 55 with a denser wire turns per inch of higher resistance wire surrounded by outer coil layer 56 containing a larger gauge wire of lower resistance and a lower density of wire turns per inch. Thus, a conducting wire of an outer portion of the FCA can have a thickness that is greater than a thickness of a conducting wire in an inner portion of the FCA closer to the PMA than the outer portion. In this bi-layer variable gauge winding approach, the two different thickness wires are wired together in series so that their individually developed EMF is additive in magnitude is a distinguishing arrangement for wiring armatures in LEGs. The spacing between the groups of windings is exaggerated for the purpose of illustrative clarity.

Many competing factors go into wire gauge size selection for LEG coils. Coil windings using large wire diameters (low gauge number wires) have the advantages of less resistance, can carry larger current loads with less ohmic heating loss, are advantageous in keeping the armature resistance low for certain applications, and stronger wire windings are more resistant to the Lorentz forces tending to stress apart the coil windings. However, in these coils the more heavier currents in the wire windings cause more severe Lorentz force stress than lower currents, more Lenz's Law losses via more production of counter EMF which works against the motion of the rotor, uses a great quantity of copper affecting undesirably the weight, volume, and cost of the coils, cause increase eddy and hysteresis losses in metal structures nearby, and have a lower density of turns per inch decreasing the developed voltage in the coils. Small diameter wires (high gauge wires) have directly all of the opposite attributes. Because these many factors often oppose each other, a compromise should be reached with the final wire size selection.

If we characterize the magnetic field around the PMA as having two regions, a high intensity field area with a high flux density, B, and a region farther out as the magnetic field falls away with distance from the magnet that is of lower flux density, we note that in an area of high flux density it would be advantageous to use small diameter wire to compose the coil windings near the magnet structure. Such a coil would have an increased number of turns, a higher induced voltage, a decrease winding to magnet air gap (the distance between a coil winding turn and the magnet structure), decreased current, increased resistance per unit length of wire, decreased I squared R losses, decreased coil turn circumference and cross-sectional area, and less back EMF from Lenz's Law produced. In the area farther out from the magnet structure in the area of weaker magnetic flux, it would be advantageous to use larger diameter wire to compose the coil windings. Such a coil there would have a decreased number of turns, a lower induced voltage, an increased winding to magnet air gap, an increased induced current, increased I squared R losses from the increased circumference of each winding offset by a decreased resistance per unit length of wire, increased coil winding turn cross-sectional area offsetting the decreased magnetic field intensity, and again back EMF would be increased secondary to increased current but the opposing force on the inducing magnet would be decreased secondary to the greater air gap. If one winding of a constant thickness wire was wound extending from the area of strong to the area of weak magnetic fields, there would be less optimum conditions due to one of these parameters being favorable in one region of the magnetic field and less favorable in the other. If, however, there are two coils wound on top of the other such that the thinner gauge wire was wound on the inner portion of the coil close to the magnet structure, and the thicker gauge wire was wound on the outer portion of the coil farther out from the magnet structure, where the two coils would be connected in series, we would match the desirable characteristics of the particular wire with the field strength around the coil.

An important aspect of the present principles is the efficiency of the dissipation of ocean wave kinetic energy into electrical energy. While the spring suspension system is important in coupling the kinetic energy of the wave into the kinetic energy of the rotor PMA dissipating that energy, the efficiency of the Faraday induction of that rotor kinetic energy into electrical energy is dependent on the strength and distribution of the magnetic fields resulting in a zone of intersection of the magnetic flux lines with the field coil array. Optimizing the design of the coil by varying the gauge of the wire along the coil winding has been shown to increase the intensity of the developed magnetic field of an electromagnet with a coil with a known current level and geometry by 50% as compared to a similar coil of constant wire thickness with superior and more uniform heat dissipation along the entire coil. Using that fact in reverse has lead to the incorporation of a similar coil variable gauge wire arrangement in the FCA of the VLEG to increase the amount of electrical power produced for a given geometry and size for the given rotor PMA and stator FCA. By having thinner wire used in the regions of maximum magnetic flux density adjacent to the circumferential side of the PMA, a large voltage can be developed with a small amount of copper metal in a relatively small volume and the current can be kept reasonably low throughout the coil to minimize Lenz Law EMF forces close to the PMA where it would produce the most negative effect on the latter's relative motion to the FCA; eddy losses in the slotted metal rotor sliding support tube as the rotor slid by the coil windings would be reduced, and the Lorenz Force on the coil windings would be reduced where it would normally be most stressing to the wire. The coil wiring configuration in the inner layer would satisfy the characteristic of a high voltage and low current situation frequently desired in electric machines such as motors and generators. This is very advantageous since the power dissipation, $P=I^2R$, increases with the square of the current but only increases approximately linearly with the number of windings; the power lost in the windings can be minimized by reducing I and increasing the number of turns N proportionally. For example, halving I and doubling N halves the power loss. This is one reason most electromagnets have windings with many turns of thinner gauge wire.

However, further away from the rotor, where the flux density is significantly less, the length of each wire turn should be significantly greater to generate useful voltage. Furthermore, each outer turn should be laid down on its previously inner adjacent one, so that the turns of wire have a gradually increasing radius and length. The resistance of the wire if the wire diameter was kept small and constant at the same gauge as the inner windings would become prohibitively too high with intolerable energy loss through $I^2R$ ohmic losses. The advantage of more turns producing more voltage will be nullified by the rapidly increasing resistance of the wire as the coil turn radius increases. Also thin wire would be more subjective to fatigue and failure because of Lorentz forces within the coil at these large radii. To overcome these problems, thicker wire of a lower gauge is used in the outer layers of the coil while a thinner wire of higher gauge is used in the inner layers of the coil. In effect this distribution of windings, rather than trying to compromise on a wire thickness that would be most suitable to both the high magnetic flux and low magnetic flux regions within the geometry of the coils, uses a thicker lower gauge wire more suitable for the lower magnetic flux regions and a thinner higher gauge wire more suitable for the higher magnetic flux regions in the appropriate areas for maximal power generation. Other advantages are that heat generation in the coil will be more uniform and more easily eliminated rather than being concentrated in the inner coil windings; current in the entire coil will be neither too high or too low since a coil with part of its winding with low thickness wire and part with high thickness wire would have the characteristics of a uniform coil with moderate thickness. Furthermore, the undesirable Lenz's Law back EMF would be decreased in both halves of the coil in this arrangement because the inner high gauge wire coil is in series with the outer low gauge wire coil, and thus limits the induced current through the entire coil; because ohmic I squared R losses is proportional to the square of the induced current, and back EMF is proportional to the induced current, both of these two sources of undesirable energy loss will be minimized.

It should be noted that coils of an FCA can be wound to have continuously variable gauge thicknesses or several thickness wires used in series. With this coil configuration, the electrical power generated per turn of coil winding is more uniform throughout the coil geometry. Because of the numerous factors described here in coil design compete against each other, the precise optimal ratio of how much of the coil should be constituted as the inner thin wire portion and how much of the coil should constitute the outer thick wire portion would depend on the specific application and design in which the coil is employed. However, this unique configuration can include a continuously varying gauge wire winding configuration should prove effective in improving the efficiency of conversion to electrical power. One must note, however, that it can be shown that the most optimal partition between thin and thick wire for the inner and outer section of the coil, and for that matter even with a continuously variable wire gauge coil that uses progressively lower gauge thicker wire as the coil turns are wound more distant, cannot decrease the energy losses in the coil by less than a quantity that is proportional to the square of the strength of the magnetic field intensity, B. One must note that it is also possible to have additional layers of varying intermediate gauge thickness copper wire windings between the outer and inner layers just described all connected in series together as one coil which would be expected to improve upon the two layer coil configuration and approximate the continuously varying wire gauge configuration.

Regarding coil size, in general, the larger the diameter of the magnets, the greater the outside and inside diameter that should be used for the coil in the FCA. Because magnetic strength and total flux produced increases with the increase in diameter and magnet volume, the coils can be wound to a greater useable outside diameter because of the greater volume of the magnetic field of useable strength. Also, the width of each coil depends upon the magnet thickness, as it has already been mentioned that the preferred range of coil width should be such that the combined width of the four coils assigned to each VLEG PMA magnetic structural unit be approximately equal to the length of that structural magnetic unit to minimize and avoid excessive field line cancellation caused by the same coil moving over oppositely directed field lines. Finally, in the situation where FCA's are intermingled with PMA's in a Vibrational Energy Electrokinetic Transducer Matrix, if the thickness of the coil is defined as the difference between its outside and inside diameters, then the combined thicknesses of two adjacent FCA's enclosing two adjacent PMA's should be a certain minimum amount to keep the two PMA's a certain minimum distance from each other to avoid excessive attractive drag and frictional losses from their mutual attraction of their complementary poles which would degrade the performance of the sliding PMA's within their rotor sliding tubes; if this inter-PMA distance is too short, the PMA's might at the worst simply stop sliding in response to wave action or at best simply wear out the moving surfaces from friction; if this inter-PMA distance is too long due to the thicknesses of the coils being too high, the lines of force traveling between adjacent PMA's will defocus and undesirably spread out in space. For a VLEG with a single PMA and FCA, to produce a useable amount of power in a coil turn, the coils should be wound to a thickness no larger than an amount such that their outermost turns lie in a magnetic field intensity no less than 500 to 1000 Gauss (0.05 to 0.1 Tesla). In the prototypes constructed where N42 cylindrical magnets of dimensions of 2" o.d.×0.25" i.d.×1" thickness with 200 pounds of magnetic pull were used, this allowed an optimal coil thickness determined by magnetic field strength measurements around the PMA to be approximately 1.5". For the Vibrational Energy Electrokinetic Transducer Matrix composed of multiple PMA's in close proximity to each other using magnets of this size, the minimum distance of separation between adjacent PMA's becomes twice that of the coil thickness just specified above, or 3.0" representing the distance across the thicknesses of two adjacent FCA coils surrounding two adjacent PMA's. It is easily seen that larger or smaller magnets as well as magnets with different cross sectional geometries, such as square and rectangular, or different N magnetization strengths would call for coils with thicknesses of different magnitudes. Furthermore, the use of end magnetic field deflecting magnets 212 and 213 illustrated in FIG. 3A, FIG. 9G, and FIG. 9H on each PMA has been measured to increase the intensity of the magnetic field around each PMA by 20%. This aspect will allow the optimal maximum coil thickness to be increased further by approximately this amount. As another example, if magnets in the PMA's were of the lowest possible useable strength that, as mentioned previously, should be 20 pounds of pull, magnets of similar shape to that specified in the prototypes but whose volume would be 10% that of the larger magnets (magnetic pull is proportional to volume of magnet magnetic material comprising that magnet for a given strength of magnetization) would result in a minimum distance of separation of twice the thickness of each coil of 0.7" or 1.4" scaling all dimensions down by a factor equal to the cube root of 10, or 2.15 approximately. This arrangement will be further elaborated on with the detailed structural description of the Vibrational Energy Electrokinetic Matrix Transducer herein below.

Another important factor of coil design is the relationship of the effective resistance of all of the coils in the FCA, i.e. the generator's internal resistance, to the load resistance presented to the generator's outputs. This is extremely complicated and in the simplified case, one can state the maximum power theorem puts a maximum limit on the percentage of the electrical power generated that can be transferred to the load at 50% when the load resistance is equal to the internal generator coil resistance. However, there is a quantity inherent in all LEG's called electromagnetic damping that should be adjusted carefully to achieve the maximum electric power generation from a given amount of input kinetic wave energy at which the 50% maximum would be applied. The spring mass VLEG is most efficient when its natural mechanical resonant system approximates as closely as possible to the vibrational frequency of the input energy. Under this condition, the electromagnetic damping factor should be equal to the parasitic damping factor. The parasitic damping factor depends on mechanical and frictional losses in the generator as previously described. The electromagnetic damping factor depends on the square of the flux gradient along the moving axis of the PMA, $d\phi/dx$, as previously described, and this quantity is set by the PMA geometry and magnet strength and size. It also depends on the square of the number of wire turns in the coil. Finally, it depends on the sum of the coil resistance and the load resistance of the generator.

It can be shown that when the frequency of the wave is as close as possible to the mechanical resonant frequency of the spring mass VLEG, the following two equations govern optimal coil characteristics and how it relates to the generator load resistance for maximal electrical power output (Eq. 7a):

$$D_e = N^2(d\phi/dx)^2 - R_c \text{ and } R_{optl} = (N^2/D_p)(d\phi/dx)^2 - R_c$$
when $D_e = D_p$ where $D_e$ is the electromagnetic damping factor, $D_p$ is the parasitic damping factor, N is the number of coil turns, $d\phi/dx$ is the flux gradient along the axial length of the cylindrical side of the PMA exiting or entering perpendicular to that surface and the direction of vibration, $R_c$ is the coil resistance, and $R_{optl}$ is the optimal load resistance. By adjusting the wire gauge and the relative length in the two sections of the variable wire gauge FCA coils, one can adjust the spring mass VLEG to satisfy the above equations so that for a given amount of vibrational wave kinetic energy falling upon the WEC repeating component of the EKS or any other device containing the present spring mass VLEG structure, a maximal amount of kinetic energy is transferred to the rotor of the VLEG, the highest percentage of the incident wave energy is dissipated, and the highest percentage of the dissipated energy is converted into electrical energy. Adjustment of either the spring constants, the resistance and the number of turns of the variable gauge coil series connected coil segments, and mass (2) (the mobile subunit of the EKS in the embodiments described herein), and the load resistance of the generator—once mass (3) of the PMA rotor and the size and strength of the magnets has been chosen, and the parasitic damping factor has been made as low as possible—can be performed to fine tune the VLEG to an optimal kinetic energy dissipation function and electrical power generation. The system of variable gauge coils, mass spring system configuration, and compressive repulsion magnetic field technology PMA's in the given arrangement that possesses this manner of optimization for its desired function of vibrating wave energy conversion are distinguishing features of embodiments of the present principles described herein.

The End Magnet Flux Focusing and Braking System

Referring once again to FIGS. 9A and 9B showing a side view of examples of the first and preferred embodiment of the basic VLEG unit and the second embodiment of the basic VLEG unit, respectively, the end braking magnets 74 and 75 are noted again. It should be understood that in the discussion below, the N pole designation may be changed to the S pole designation without any change in any aspect of the functional operation and description of the end magnet flux focusing and braking system as well as any other component of the present principles described herein. The end deflecting magnetic field magnets are not shown on the basic VLEG unit for purposes of brevity. The novel use of the end braking magnets in functioning to damp out excessively long motions of the rotor from particularly large waves as a component in the electromechanical braking system for the WEC repeating unit of the EKS has already been described in detail. Here, in the basic VLEG unit, the upper N pole of upper braking magnet 74 repels and decelerates PMA 37 to a stop every time the end N pole of PMA 37 arrives in close proximity as a result of a positive sloping half of a strong vibrational event. N pole on lower braking magnet 75 performs in the same manner when the lower N pole of PMA 37 arrives in proximity to it as a result of the subsequent negative sloping half of a strong vibrational event. In the event of a wave train of vibrational disturbances, the kinetic energy of the impinging wave is stored in the potential energy of the repulsive magnetic field between the PMA N pole and the braking magnet N pole only to be released as useful kinetic energy for power conversion on the subsequent movement of the rotor after the passage of the vibrational event. Thus, very little of the incoming kinetic energy is dissipated as waste heat from frictional impact losses. Unlike the VLEG of the WEC, the basic VLEG unit does not incorporate shorted coil windings and braking springs as part of the braking mechanism. Again note that the two braking magnets themselves are in repulsive field mode with respect to each other showing yet another useful configuration of the unique use of repulsive magnetic fields in the total configuration of all of the magnetic poles in the VLEG.

In addition to the braking function, the end magnetic magnets have another novel feature that drastically reduces flux leakage and wastage of magnetic flux lines from the PMA. FIG. 9C illustrates the magnetic field line configuration of the basic VLEG PMA, similar to FIG. 4B. While the flux leakage at the ends of the PMA magnetic structure unit that do not impinge on the coil windings is much less than that as shown in the conventional attractive magnetic pole configuration as shown by FIG. 5B, nevertheless, the leakage is still considerable through the ends of the PMA. However, FIG. 9D shows what happens to the magnetic field line distribution when braking magnets 74, 75 are used. The end magnetic flux leakage drops drastically as N pole emerging flux lines 45, 52 are "boxed" in and repelled, and the only destination that they have left to travel is to terminate on a nearby S pole, which in this basic VLEG unit, is the only repulsive magnetic field region of the PMA, the pair of S poles facing each other through the repulsive pole piece 53. In large VLEG applications such as the WEC repeating component of the EKS of FIG. 3A, this magnetic focusing effect is much less marked as there is considerable distance between the end of the PMA and the corresponding braking magnet—the primary use of the braking magnet in this category of applications is just braking. However, if one is using small PMA VLEG units of one to three magnetic structures (two to six magnets, three to seven pole pieces) in length in such applications as magnetic shock absorber energy generator, wind energy vibrational generators, or surface small wave WEC's, and if the size of the magnets are large, this magnetic focusing effect is truly an efficient way to stop magnetic flux leakage and greatly enhance the efficiency of vibrational energy dissipation and electrical energy conversion.

When the stroke length of the VLEG, however, is much longer than the distance between the ends of the PMA and the ends of the respective braking magnets that face them, to achieve the same focusing effect as described above, we can add the end magnetic field deflecting magnets 212 and 213 shown in FIGS. 9G and 9H. Exactly the same magnetic flux line focusing effect is accomplished as in VLEG's operating over much shorter stroke lengths. The functioning of this structural variant of the basic VLEG has already been described in detail.

Figure 10A:
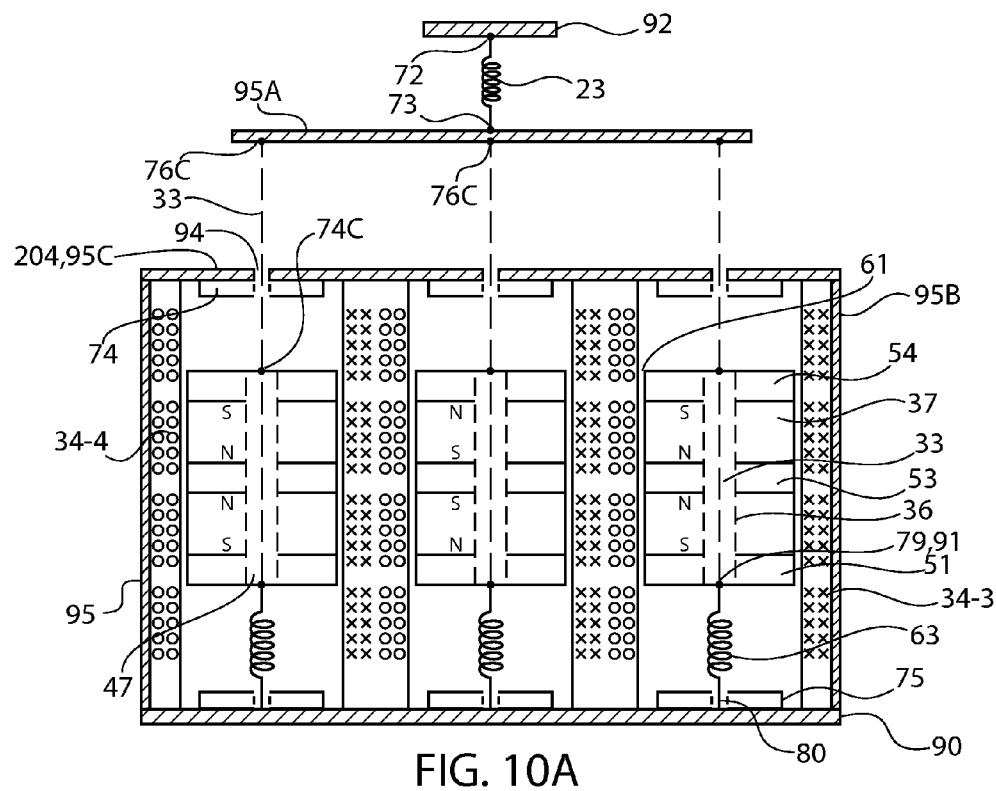
FIG. 10A Depicts (to approximate scale) a side view of a Vibrational Energy Electrokinetic Matrix Transducer of order 9 that collects and dissipates vibrational wave kinetic energy into electrical energy—embodiment 1, the preferred embodiment, with 9 (3 shown) single magnetic unit PMA rotors in repulsive pole configuration and 9 FCA stators (3 shown)

Other design considerations of the electromagnetic spring braking systems include that the braking magnet magnetic pole should be relatively more powerful than the end rotor magnet pole of same polarity that it faces; that the number of turns of wire shorted and the gauge of that wire can be varied as well as the stiffness of the braking springs can be varied to achieve a braking effect of variable magnitude; and that the location of the shorted braking coils or copper shorting collar can be varied to set the maximum size of the wave that the rotor will be permitted to oscillate fully with.
The Vibrational Energy Electrokinetic Matrix Transducer The Vibrational Energy Electrokinetic Transducer Matrix in exemplary embodiments described herein is a three-dimensional array of VLEG units composed in a lattice structure. However, it should be understood that configurations or geometric structures other than a lattice structure can be employed. In general, this wave energy conversion system can include a plurality of vibrational linear electric generators (VLEGs), where each of said VLEGs includes a field coil array and a permanent magnetic array that is configured to induce an electrical current in the field coil array in response to relative motion effected by waves traversing a fluid medium in which the VLEGs are disposed, as discussed above. FIG. 10A illustrates a side view cross section of an exemplary arrangement of VLEG's structured as a 3 by 3 matrix or a total of 9 VLEG units. This is more clearly seen in FIG. 10B which, in addition to the structural components, shows a top view of the magnetic field line distribution within the matrix. This arrangement of Linear Electric Generators is a distinguishing and advantageous feature, as it employs multiple layers of LEG's, each containing the unique embodiment of the VLEG in such a way where the magnetic fields of one extends to and is focused into all of its adjacent neighbors with a 3 dimensional matrix of PMA's interdigitating with a 3 dimensional matrix of FCA's. With respect to the range of distances separating adjacent VLEG's within a WEC, this range is dependent on, first, the amount of magnetic material in each magnet used, which determines the dimensional size of the magnets, which in turn determines the size and intensity of the surrounding magnetic fields, which then determines the thickness (the difference between the outside diameter and inside diameter) of the coils surrounding the magnets, and then this inter-VLEG distance is equal to twice that. For the prototypes constructed with N42 cylindrical magnets possessing 200 pounds of magnetic pull with the dimensions previously stated, it was already explained that this distance was measured and determined to be approximately 3 inches. For the smallest useable N42 magnets with similar geometry with 20 pounds of magnetic pull, it has already been explained that the distance was 1.4 inches. For the largest off the shelf cylindrical N42 magnets which possess magnetic pulls of up to 1200 pounds and six times more magnetic material per magnet, producing a scaling up factor equal to the cube root of 6 equal to 1.44, the distance would be approximately 4.3 inches. Thus, the range of inter-VLEG distances in a multi-VLEG Electrokinetic Matrix Transducer would be approximately slightly above once inch to just under five inches in preferred arrangements. When we add the effects of end deflecting magnetic field magnets, end braking magnets, and higher magnetizations up to N52 as compared to these calculations involving N42 magnets, we arrive at a practical range of about one inch to 12 inches as the desirable and preferred range of distances. One can consider the use of magnets of any size, thereby further enlarging the distance separating adjacent VLEG's, but the use of such large and immensely powerful magnets in a WEC with many VLEG's would need special engineering considerations with regards to assembly and the structural strength of the assembled structure.

Each of the individual 9 VLEG units in the embodiment one configuration of the PMA rotor 37 and the FCA 34 stator in this example function in the same manner as previously described and there are no modifications in the structural components other than now spring 23 functions as the upper perturbing force spring for all the units together, whereas lower restoring force spring 63 still are assigned to each VLEG unit. Each VLEG unit shown here is the basic unit of one PMA magnetic structural unit plus one pole piece. 34-3 denotes coil windings of FCA 34 that point down into the page, and 34-4 refers to those that point up out of the page. Structure 95, a VLEG and stator encasement shell composed of lower anchor plate 90, sides 95 and 95B and top plate 95C represents non-magnetic casing out of suitable materials previously described that covers the whole LEG matrix to shield it from its environment whether it is from the ocean such as in the WEC of the EKS or in some other environment. Perturbing force spring cable anchoring plate 95A is attached to force spring 23 at attachment point 73 allowing the latter to be attached to all 9 of multi-stand stainless steel cables 33 at upper cable attachment points 76C. Restorative spring upper attachment points 79, lower attachment points 80, inner stainless steel tubes 36 in central cavities 47, repulsive pole pieces 53, end pole pieces 51, 54, braking magnets 74, 75, cable 33 lower PMA attachment points 91, and upper PMA attachment points 74C are all as in the basic VLEG unit described in detail previously. If it is desired to magnetically shield the VLEG matrix from adjacent structures, magnetic shielding 204 may be placed around the matrix at a suitable distance so as not to significantly interact with the vertically oscillating PMA arrays.

Not shown in FIG. 10A is the structural enhancement to the PMA comprising end magnetic field deflection magnets 212 and 213 of FIG. 9G, the structural and functional configuration of which has been described previously in detail, that may be added to each of the PMA rotors of FIG. 10A in the event, for example, that the rotor-stroke distance is appreciably greater than one half the axial length of the PMA structural unit in each PMA such as in the given exemplary application comprising the WEC repeating unit of the present principles, the EKS. This structural enhancement may be applied to all vibrational energy electrokinetic matrix transducer structures described herein.

Figure 10B:
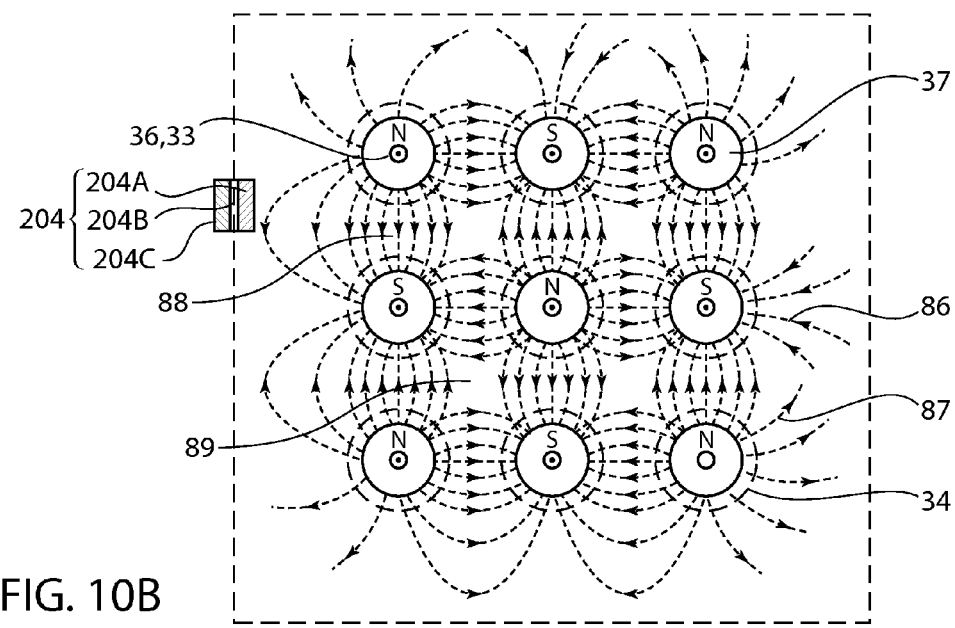
FIG. 10B depicts a top view of the internal magnetic field of the order 9 Vibrational Energy Electrokinetic Matrix Transducer of FIG. 10A.

FIG. 10B indicates how the optional magnetic shielding 204 is constructed; it is a three layered structure in this embodiment. Looking at the inset bracketing magnetic shielding 204, 204A represents a material with a very high B saturation point (Magnetic Field Flux Density), high permeability, low coercivity (resistance to demagnetization), and the ability to be applied in thin sheets; low carbon high silicon electrical steel (also known as transformer steel, $\mu_m$=5000, $B_{sat}$=1.8T) is excellent for this as well as Giron™ ($\mu_m$=5000, $B_{sat}$=2.0T) or MagnetShield™ ($\mu_m$=4000, $B_{sat}$=2.1T); 204B represents a bonding layer of strong bonding magnetic epoxy such as JB Weld™; and outer layer 204C comprising very highly magnetically permeable material such as Permalloy™, Ultra-Perm™, or Mu-Metal™ ($\mu_m$>400,000). The inner layer traps most of the leaking flux lines and whatever is left are made to travel only in the outer layer where eventually, the flux lines will close their spatial loop onto a pole of opposite polarity. It is fairly evident that while theoretically, the second embodiment of the VLEG, where the rotors are the FCA's and the stators are the PMA's, can be the component of a VLEG matrix, to have many moving FCA structures and to collect electrical power from such a complicated moving armature structure via slip rings or allowing loosely constrained wires to be moved with the oscillations of the rotor would not be a satisfactory arrangement from the maintenance and survivability standpoint. Thus from a practical engineering standpoint, it is much more difficult to design the VLEG matrix transducer with a lattice of moving FCA rotors, though it can be done by those of ordinary skill in the art based on the present description if an application requires it. The following description of the vibrational energy electrokinetic matrix transducer will be made with respect to embodiment number 1 of the VLEG.

An important feature of the Vibrational Energy Electrokinetic Transducer Matrix is the magnetic field flux distribution. Here, the plurality of VLEGs are configured such that poles of given magnets of a given permanent magnetic array in a given VLEG in the VLEGs are adjacent to poles of opposite polarity of other magnets of another permanent magnetic array of at least one other VLEG of the VLEGs that is adjacent to the given VLEG to concentrate a magnetic field through a field coil array of at least one of the given VLEG or the other VLEG(s). For example, in the preferred embodiment illustrated in FIG. 10B, every magnet pole of every PMA 37 of every VLEG is adjacent to an opposite magnetic pole belonging to each of its adjacent neighbors. As a result, the flux lines emanating from the repulsive pole regions at the sides of each PMA are focused through the surrounding FCA 34 coils to create regions 88 of maximum flux densities within the coil regions to create a maximum Faraday induction effect through the entire matrix. Note that, as an added beneficial effect, in the spaces 89 between adjacent FCA structures where there are no coil windings present, there is very little flux lines present, a most desirable feature. There is virtually no magnetic flux leakage and wastage through this advantageous effect which is somewhat less marked at the periphery of the matrix where the outer VLEG, especially at the corners of the matrix, are not next to the maximum number of four adjacent poles of opposite polarity such as indicated by Region 86. Nevertheless, flux coil linkage wastage is reduced even at the corners and the sides of the matrix. This advantageous effect occurs because each internal PMA is adjacent to eight other PMA structures; four of them are closely adjacent and of the opposite magnetic polarity attracting flux lines from a N pole of the central PMA to a S pole of the four closely adjacent PMA structures; the other four PMA structures that are further away are in the repulsive mode like magnetic polarity configuration with the N pole of the central PMA being repelled from the surrounding four less adjacent PMA structures; each PMA along the side of the matrix is adjacent to 5 other ones, and each corner PMA is adjacent to 3 neighboring ones, and thus the effect is less marked. The intense magnetic focusing occurs throughout the internal space of the matrix and one in effect has a three dimensional lattice of magnetic poles moving with relative velocity to a 3 dimensional intertwined lattice of copper coils resulting in Faraday production of electricity throughout every portion of the three dimensional structure. All of this magnetic field confinement and focusing is done by the magnetic poles themselves without the need for heavy magnetic armature structures as found in typical electric generator arrangements. This drastically cuts down eddy losses, Lenz Law Back EMF drag forces, and hysteresis losses that decrease the efficiency of the of the electric power conversion.

Figure 11:
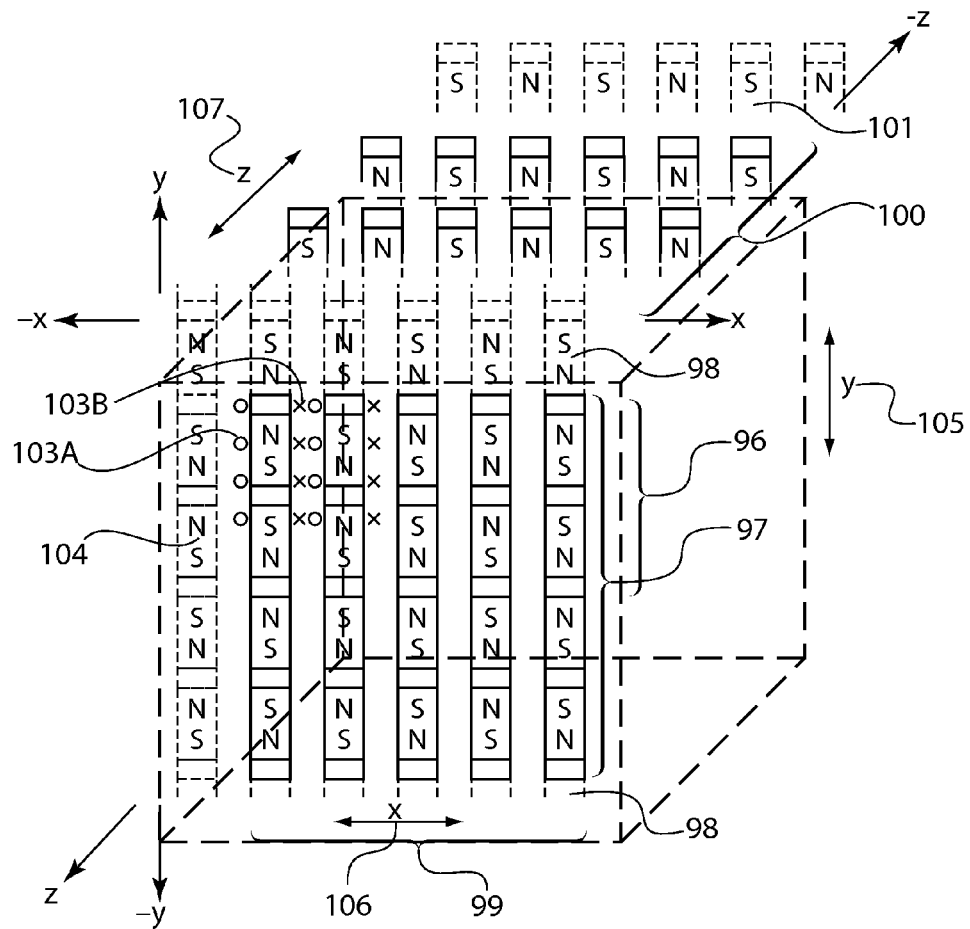
FIG. 11 depicts the structure of higher order Vibrational Energy Electrokinetic Matrix Transducers—A 5 PMA×2 PMA by 3 PMA (order 30) three dimensional matrix is shown with extension to higher orders—the associated FCA's have been omitted for clarity—for preferred embodiment 1, where the PMA's are the rotors and the FCA's are the stators.

Referring to FIG. 11, the structure of the 3-dimensional parallel VLEG Electrokinetic Matrix Transducer can be extended to structures of any size in 3-dimensions all having the just described most optimal advantages if, for example, a certain repeating structure that conforms to certain structural rules is followed. Referring to FIG. 11 which illustrates a 2 by 5 by 3 VLEG Electrokinetic Matrix Transducer, we see that each PMA column 97 comprises 2 PMA magnetic structure units 96 in the y direction using a x, y, z coordinate system. The y direction orientation of PMA magnetic structural units into columns is given by 105, the x direction orientation of PMA columns into a layer is given by 106, and the z direction orientation of PMA layers into a 3-dimensional lattice structure is given by 107. Following previously defined rules for the PMA structure, where for each integer y greater or equal to 1, the number of VLEG structural PMA magnetic units in each PMA is y, the number of magnets in each PMA is 2y (even number), the number of pole pieces is 2y+1 (odd number), the number of repulsive regions is 2y−1 (odd number), the polarity of each end of the PMA are the same (two N or two S poles). There are 5 PMA columns present in the x direction forming one layer of PMA columns. The number and orientation of the PMA structures 97 in a layer 99 are as follows: for integers x greater or equal to 0, the total number of PMA columns is 2x+1 (odd number), the magnetic poles of each PMA structure is in opposite polarity to the magnetic pole adjacent to it in each neighboring PMA structure on either side, and the end magnetic poles of the first and last PMA structure columns 97 are all of the same polarity (four N poles in total) but the end magnetic poles of adjacent PMA columns are of opposite polarities. Finally, the layers of PMA structures 99 are organized into a 3-dimensional lattice in the z direction according to the rules that for integers greater or equal to zero, the number of layers is equal to 2z+1 (odd number), the magnetic poles of each layer are opposite in polarity to the magnetic poles adjacent to it in each layer in front of it and behind it, and the end poles at the corners of the first layer and last layer are all of the same polarity (eight N poles in total). All of the end poles essentially should have the same (a common) polarity (S poles are equally acceptable and maybe interchanged with N pole designations in this description) at the 8 vertices or corners of a rectangular crystal-like lattice structure. Outlined in dotted drawing, additional VLEG PMA magnetic structural units 98 can be added along with additional PMA columns 104 that can be added and additional PMA layers 101 that can be added to enlarge the matrix to any arbitrary size as illustrated in FIG. 11 consistent with stable mechanical stresses placed on the structure and consistent with the relations set forth above. The intertwined FCA matrix is represented by coil windings 103A (O's) going out of the page and 103B (X's) going into the page. The order of the VLEG Electrokinetic Transducer is given by the product (2x+1) (y) (2z+1) where x and z are integers ≥0 and y is an integer ≥1. The number of PMA structures which is equal to the number of VLEG's in the matrix transducer is given by (2x+1) (2z+1).

For instance, the basic VLEG has x=0, y=1, and z=0. Hence its order is (2*0+1) (1) (2*0+1) or 1 and the basic VLEG Unit is a Vibrational Energy Electrokinetic Transducer of order 1. The device of FIGS. 10A and 10B has x=1, y=1, z=1 and hence, the order of that VLEG Electrokinetic Transducer is (2*1+1) (1) (2*1+1)=9. Finally the device of FIG. 11 can be given as x=2, y=2, and z=1 to give (2*2+1) (2) (2*1+1)=5*2*3=30. The product (2x+1) (y) (2z+1) not only gives the order of the VLEG Electrokinetic Transducer, it also gives the total number of VLEG PMA magnetic structure units in the matrix; the product (2x+1) (2z+1) gives both the number of PMA structures, FCA structures, and Linear Electric Generators within the matrix. Any of these devices following this rigid geometric structure can replace the VLEGs in the WEC's shown in FIG. 3A, FIG. 7A, and FIG. 7B, each of which has x=0, y=3, z=0 yielding an order of 3. The only limit on the size of this structure that can be placed into the WEC of the EKS is engineering considerations that accompany the use of large and powerful magnets, the height of the waves whose energy is to be dissipated, weight considerations on the spring suspension system, mechanical stress on the device caused by torsional and horizontal components of wave motion on the WEC, and cost factors. Note that the PMA lattice would be within the mobile subunit of the WEC of the EKS and that the FCA lattice would be within the fixed subunit of the WEC. Note that the multilayered magnetic shielding 204 of FIG. 10B would be located along the two face sides in the YZ plane and the two face sides in the XY plane of the VLEG electrokinetic matrix transducer outer 6 sided surface of FIG. 11; shielding should not be applied to the two face sides in the XZ plane because of the direction of vibration which is in the Y direction.

Further note that while FIG. 11 does not show end deflecting magnetic field magnets (212 and 213, FIG. 9G) on each component VLEG of the VLEG electrokinetic matrix transducer, it may be added if so desired to further and greatly enhance the deflection of magnetic flux lines back into the transducer instead of being lost to space as magnetic flux leakage. As described previously, this option to do so would be employed if the end braking magnets of the VLEG, not shown in FIG. 11, are located significantly away from the ends of the PMA's if the stroke distance is significantly greater than the reach of the end magnetic fields of the end pole pieces of the PMA's. Also note that if one component VLEG of the VLEG electrokinetic matrix transducer is equipped with a pair of end deflecting magnetic field magnets, they all should be to maximize effective functioning of the matrix.

To relate the order of the matrix transducer to the size of the incident wave energy disturbance, we know that maximum kinetic energy of the rotor develops when the PMA axial length is one third the rotor stroke length which should be equal to the significant wave height ($s_{pma}=s_r/3=H_{te}/3$) when the vibration is in the y direction of FIG. 11. The number of PMA structural magnet units (SMU's) in each PMA, y, in the preferred most efficient configuration is equal to the PMA axial length divided by twice the sum of thickness of one pole piece plus one magnet ($y=s_{pma}/2(T_m+T_p)$). Since in the preferred configuration, the number of coils for each PMA (SMU) is 4 whose combined width is equal to that of the axial length of that unit, the number of coils in the stator will be 4 times the number of structural magnetic units times 3. That is, in the preferred embodiment, once the maximum significant wave height, thickness of the PMA pole pieces and magnets are chosen for the given WEC design, the number of coils used for each PMA of each VLEG is 12 times the number of PMA SMU's used and 6 times the number of magnets used. These relations hold true for any size VLEG electrokinetic matrix transducer from order one as illustrated in FIGS. 9A, B, G, H; order three as displayed in FIG. 3A; order 9 as displayed in FIGS. 10A, B; or order 30 as displayed in FIG. 11. Again note that only the preferred embodiment number one of the VLEG (rotor PMA and stator FCA) should be used when there is more than one PMA (x>0, z>0). Also note that the coil number computed above represents the ideal preferred configuration for maximum electrical power output for a given sized wave determining a resulting sized PMA, but the number of coils actually used may be less due to design considerations. However, the coil number should not be less than 8 times the number of PMA SMU's or 4 times the number of PMA magnets or else there will be a serious degradation in the efficiency of the device. These relationships hold for when the VLEG Electrokinetic Matrix Transducer encounters ocean waves of significant size that would ordinarily be present in the bodies of water in which it is deployed.

There is one special case previously discussed with respect to ocean waves, however, that allows the VLEG Electrokinetic Matrix Transducer to be used in bodies of relatively calm waters with small waves that do not impose a need to protect a structure or coast from damage of the kinetic energy of waves and hence, the transducer is being used strictly as an energy harvesting device for conversion of this kinetic energy to electrical energy. In this particular case, the stroke distance of the PMA rotor will usually be very small, usually quite smaller than the PMA length itself. In this circumstance the ratio of the length of the FCA to the length of the PMA should, in order to prevent many of the coils from never passing over a repulsive magnetic field area of space, be only slightly greater than 1:1 rather than the 3:1 ratio that has been described up to this point for use in ocean waves. More exactly, the length of the FCA, in a preferred embodiment, should equal the length of the PMA plus twice the amplitude of the wave vibration or the wave height. In this case, the number of coils in the FCA would be 4 times the number of SMU's in the PMA (or twice that of the number of magnets in the PMA) plus X, where X equals the wave vibration height divided by the thickness of each of the coils in the FCA. With this arrangement, virtually all coils will be almost always over a magnet, thereby producing power and thus allowing VLEG's with long PMA's to be highly efficient in producing electric power in calmer, smaller bodies of water and its use generalized to other environmental circumstances such with wind, road and rail traffic, boat wakes, and surf vibrations, where the energy vibrations maybe rather small. In fact two additional characteristics emerge from this particular embodiment of the present principles: 1) With small wave vibrations, the efficiency of wave kinetic energy to electrical energy conversion increases as the ratio of the PMA length (and hence the number of SMU's and coils) to the wave vibration height increases and 2) the previously defined lower usability limit of magnets of at least 20 pounds of pull for the purpose of employment with commonly encountered ocean surface waves in preferred embodiments can be decreased to magnets that are significantly smaller both in terms of magnet pull and dimensional scale. As an exemplary quantity of magnet pull and size, the magnets can be as small as 0.25" o.d.×0.0625" i.d.×0.25" thick possessing a magnetic pull of 6.5 pounds leading to a coil thickness and inter-VLEG distance as low as (using to the previously described process that applies the scaling method of calculation to the prototype laboratory measurements, this time with a scale factor here of the cube root of 32 or 3.17) 0.5" and 1.0" respectively, thereby allowing for rather small embodiments of the present principles to be implemented for these low level vibrational energy sources.

This arrangement of uniquely structured VLEG's incorporated into a novel 3 dimensional lattice of LEG's producing extraordinarily low amounts of flux leakage, Faraday Induction of electricity throughout a significant volume of space created by a 3 dimensional matrix of PMA's oscillating in relative velocity to a 3 dimensional lattice of FCA's, focusing of magnetic fields into coil arrays without the need for large heavy ferromagnetic armature structures, thereby lowering hysteresis and eddy losses, and the unique structuring of the coils give rise to a totally new and different manner of dissipating kinetic energy of ocean waves into useful electric power. The incorporation of this device into the WEC is an important and distinguishing aspect of the Electrokinetic Seawall repeating unit. In essence we may regard all of the PMA's in the VLEG transducer matrix as a 3 dimensional magnet PMA matrix rotor that interdigitates with and vibrates with respect to a 3 dimensional coil matrix stator represented by all of the FCA's in the VLEG transducer matrix with the source of the vibration being applied to the VLEG transducer matrix being the wave kinetic energy being incident upon the WEC repeating subcomponent that contains the transducer matrix. We have essentially, a 3 dimensional linear generator, of which the basic WEC and VLEG units of FIGS. 3A, 7A, 7B, 9A, 9B, 9G, and 9H are the simplest configurations. There is one VLEG electrokinetic matrix transducer in each WEC repeating subcomponent making up the EKS that comprises the present principles.

Tethering, and Electrical Power Takeoff

Figure 12A:
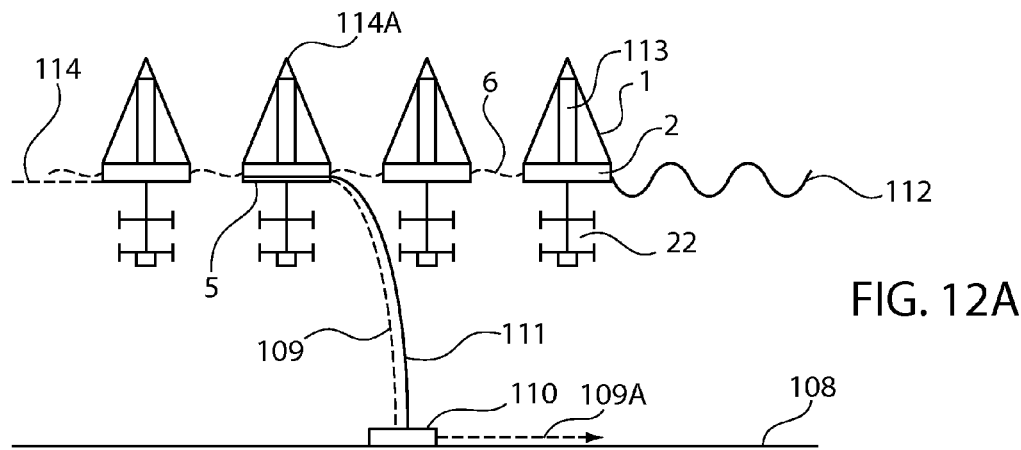
FIG. 12A illustrates an example in which an Electrokinetic Seawall Apparatus is flexibly tethered to an anchor on the seabed using a chain, cable, or spring and with a power takeoff cable, where the individual WEC's are not rigidly attached to each other.
Figure 12B:
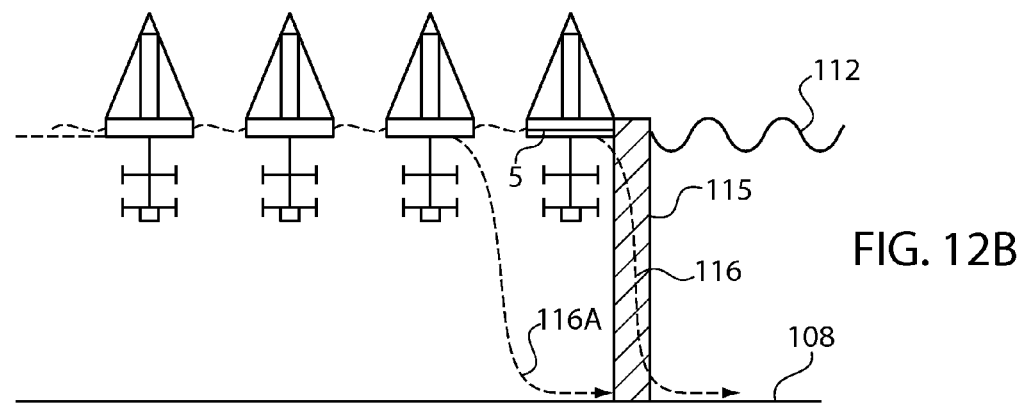
FIG. 12B illustrates an example in which an Electrokinetic Seawall Apparatus is rigidly anchored to the seabed by a column, where the power takeoff cable may either be taken separately to the seabed or through a rigid anchoring pole and where the individual WECs are not rigidly attached to each other.
Figure 12C:
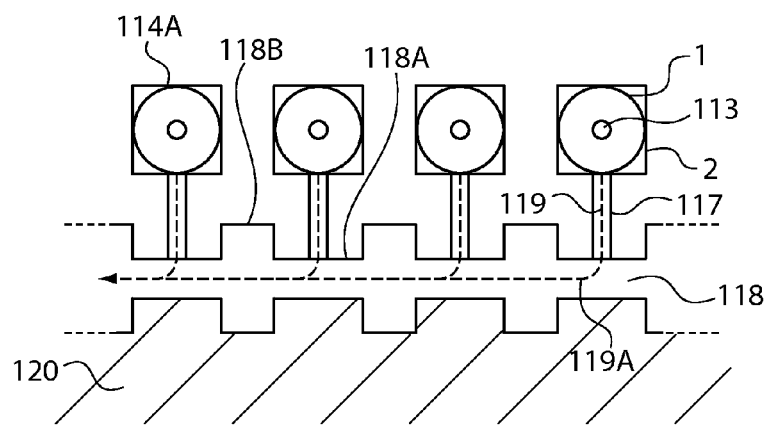
FIG. 12C illustrates an example in which WEC components of an Electrokinetic Seawall Apparatus are individually and rigidly attached to a conventional mechanical seawall or bulkhead so that they are essentially components of this conventional mechanical seawall.

In one embodiment of this portion of the present principle, side view FIG. 12A illustrates an Electrokinetic Sea Wall that is tethered by a cable 111 connected between the top plate 5 of and shown for one fixed subunit just below the base of the mobile subunit 2 and a fixed anchoring structure 110 on the seabed floor 108 where electric cable 109A takes generated electrical power away. A power take off cable 109 hangs downward as part of cable 111. 112 represents the ocean surface. 114 indicates a tether connecting the last WEC repeating component 114A to a tethering point on the shoreline or to additional WEC's. 6 represents a tether connecting adjacent WEC repeating components. As previously discussed, 1, 2 and 22 represent the buoy mobile subunit top, base, and the inertial liquid wave dampening system (ILWDS) respectively while 113 represents the rotor slide tube structure. In the second embodiment of this portion of the present principles, side view FIG. 12B illustrates the EKS as rigidly attached to the seabed floor by means of a hard fixed pole or pipe 115 attached to the top plate 5 of and shown for one fixed subunit. The power take off cable may either reach the seabed floor by traveling within the anchoring pipe, or freely hanging down to the seabed floor in a separate manner. FIG. 12C depicts a top view of a third embodiment of this portion of the present principles where the tethering mechanism is a rigid one by which each WEC 114A is rigidly attached via its fixed subunit (not shown) to the adjacent sea wall, pier, or bulkhead 118 by rigid metal braces or connectors 117. Because the WEC's are attached by rigid means, for smoothly straight or curved seawalls, exemplary distances between the adjacent WEC's may range from only approximately 10 centimeters for smaller sized WEC's to a distance equal to that of the largest cross-sectional diameter of the buoy floatation collar base 2 of the largest WEC's which can be up to 10 meters in diameter with this distance being smaller for concavely curved sea walls and larger for convexly curved sea walls. Also, if the seawall is an indented bulk head such as 118 and it is intended to have the EKS close in proximity to the bulkhead for reasons of structural stability of the brace and for absorbing as much kinetic wave energy from both the oncoming waves and waves reflected off the bulkhead, the inter-WEC distance should be in the preferred configuration approximately somewhat more than the width of a convex section 118B of bulkhead as shown, a distance in the range of about 0.5 to 2 meters. The preferred arrangement for the rigid tethered distance between a smooth seawall and the EKS should be at least the greatest diameter of the cross-sectional area of the WEC, which can range from approximately 10 centimeters to 10 meters and, for bulkhead seawalls of the form and structure 118, not larger than a concave section 118A if it is desired to bring the EKS as close as possible to that bulkhead. The power take off cable 119 runs from each WEC repeating unit of the EKS to form an above ground power cable 119A on the conventional seawall, which in this illustration is a metal bulkhead 118 behind which is the land 120. Floatation buoy collar top 1 and base 2 and rotor oscillation structure 113 are also displayed.

Figure 13A:
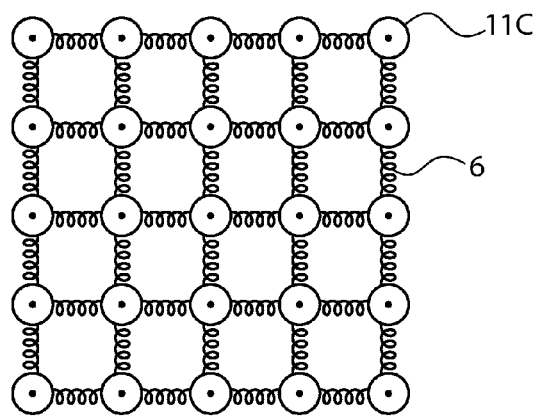
FIG. 13A depicts a top view of a square mesh configuration of the Electrokinetic Seawall with its repeating component WEC's in a square grid location lattice.
Figure 13B:
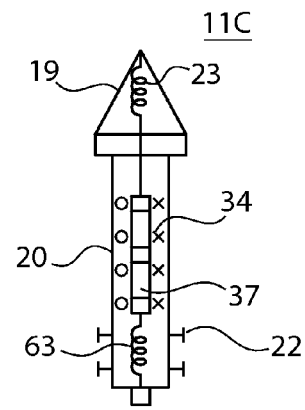
FIG. 13B depicts the individual WEC component of the mesh array of FIG. 13A.
Figure 13C:
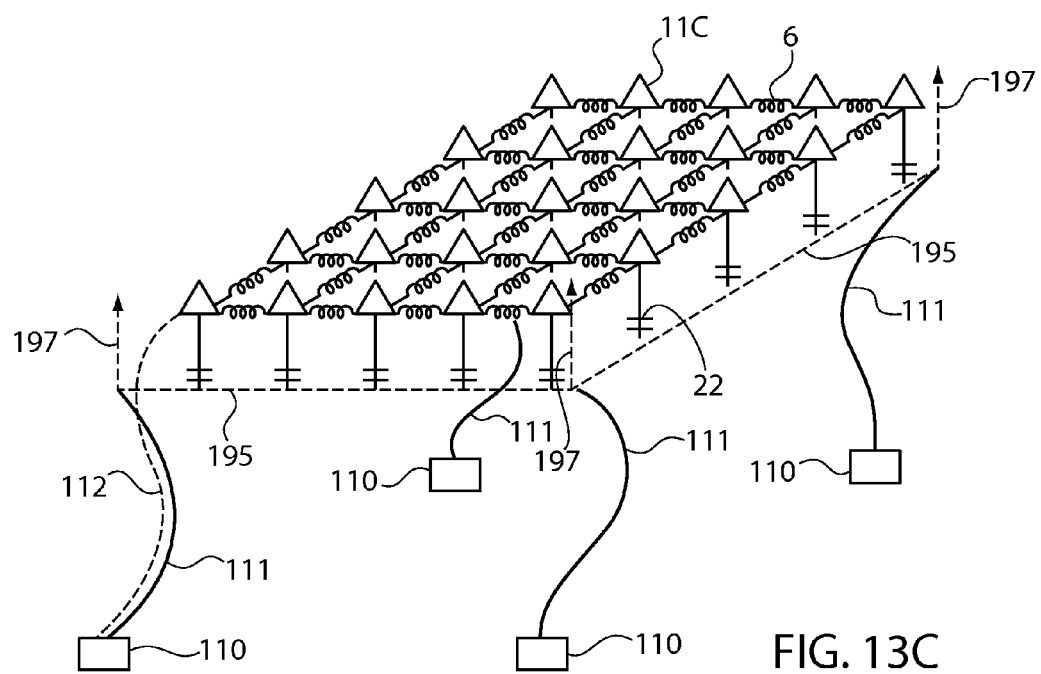
FIG. 13C depicts the side oblique view looking slightly down of the square mesh configuration of FIG. 13A with its associated tethered corner anchors to the seabed.

If the embodiment of the EKS is not rigidly attached to the seawall but rather is freely floating in the vicinity of the seawall, the inter-WEC flexible tethering distance should be as previously described to prevent collisions from wave tipping of the WEC's and the EKS should be tethered in a floating manner by non-rigid cables to a seabed anchoring mechanism such as 110 in FIG. 12A, and FIG. 13C, as well as anchor 193 in FIG. 12D and FIG. 12E (1); at least two cables in number for positional stability relative to the seawall should be used, but, if necessary, additional cables would be employed so that the closest possible approach of the EKS to the seawall even when exposed to large waves and strong drifting currents should be no closer than 4 mobile subunit buoy floatation diameters of the range just described.

The fourth embodiment is illustrated in side view FIG. 12 D, which shows a heavy metal brace 194 that in effect converts all of the ILWDS structures 22 of the fixed subunits of the repeating WEC components 114A into one rigid stabilizing structure to which cable 111 is attached to anchor 193, which is attached to seabed floor 108. Again power cable 116 is attached to the seabed floor 108. For the purpose of having the EKS being tethered, it is important to note that the massive mass reaction effect of this brace 194 makes it unnecessary for the EKS to be anchored at all if so desired and cable 111 and anchor 193 can be done away with. If it is desired to have the EKS be freely floating, tether 114 anchored to the shore line or to a conventional seawall can be omitted. Furthermore, since each WEC is anchored rigidly via its fixed subunit to the brace lying beneath it, tethering springs 6 could be omitted if desired for greater simplicity of the structure. The heavy metal brace itself can be rigidly tethered to a nearby seawall. The heavy metal brace converts the embodiment to a rigid EKS so that all tethering distance considerations described above for the rigid tethering to a seawall would apply. Sufficient buoyancy material of the same composition as previously described for both the mobile subunit 19 and the fixed subunit 20 is added in the form of blocks or rings 30 on each ILWDS 22 and 30A on brace 194 so as to make the entire structure containing the EKS and its repeating components subunits neutrally or slightly positively buoyant. The center of mass and gravity of the entire structure is deep in the water well below the surface and below the structure's center of buoyancy to create stability of the combined fixed unit composed of all the WEC fixed subunit structures with respect to the surface wave oscillations. The fifth embodiment of this portion of the present principles is shown in side view FIG. 12 E (1) as a radical enhancement of the previous embodiment in which the brace 194 has been replaced by a massive boat-like structure 195 rigidly attached to all of the fixed subunits of the WEC repeating components of the EKS. Aside from making the fixed anchorage via cable 111 and anchor 103 in FIG. 12E (1) optional allowing the EKS apparatus to float like a boat, it has enormous implications to the stability and efficiency with regard to dissipating ocean wave kinetic energy to be explained in the mechanism by which embodiments of the present principles achieve stabilization in the ocean, as discussed herein below.

Ocean Wave Stabilization of the EKS

To this point, keeping the reaction mass (1) formed by the fixed subunit 20 of the WEC containing the stator FCA 34 of the VLEG relatively immobile with respect to the mobile subunit 19 reaction mass (2) containing the rotor PMA 37 reaction mass (3) of the VLEG has been explained to be important in order to develop significant relative velocity of the rotor relative to the stator from the ocean wave front impinging on the EKS. Most of the reaction mass (1) and this stabilization function was produced from the large inertial mass of metal and entrapped water in the ILWDS 22 of the fixed subunit 20 of the WEC. This method of stabilization and immobilization of the individual fixed subunit 20 of the present principles so far described were primarily represented in the ILWDS and are advantageous over other methods for this kind of wave stabilization, such as heave plate structures. Now to be described is a radical improvement in this stabilization function that is unique to the present principles and is shown in FIG. 12 E(1) (side view) and FIG. 12 E (2) (top view). In particular, a plurality of WECs can be enveloped by and tethered to a semi-enclosed container that is configured to be at least partially submerged within the ocean and to be filled with ocean water. Here, the container, when disposed in the ocean, has a center of mass at a depth below the surface of the ocean that is sufficient to render the container relatively stationary when the waves traverse over the container. For example, instead of just a heavy metal plate brace connecting all of the fixed subunits via their ILWDS together, we have a structure with the same buoyancy characteristics of an iceberg or large oil tanker that is submerged to the major extent in the ocean. This "boat mass" of metal, which may be water filled like the weight chamber 10 of ILWDS 22, represents a truly massive reaction mass (1) relative to reaction mass (2) represented by the mobile subunit and is equal to the combined masses of all the fixed subunits in the EKS plus the mass of the metal and water entrapped in the "boat mass" 195. This huge mass, which is on the order of 10 to 100 tons and from an engineering standpoint can be made as large as a supertanker of 3 orders of magnitude larger, is held neutrally to slightly positively buoyant with the center of buoyancy just beneath the surface of the water and the center of gravity and mass very deep in the water relative to the center of buoyancy as a result of buoyancy blocks 198 made out of the same material as the buoy floating collar mobile subunit 19 and the buoyancy blocks or collars previously described for the fixed subunit 20. It is important that the center of gravity should be as deep below the surface as possible because horizontal force and velocity vectors and the more significant vertical force and velocity vectors of the wave motion, which would tend to oscillate the boat mass, decrease with the square of the depth beneath the ocean's surface. The precise location of the center of buoyancy is adjusted by suitable amounts of buoyancy material attached to the heavy reaction mass (1). The buoyancy material and weight of the "boat mass" 195 would have to be distributed in such a manner to prevent unstable rolling motions in the directions perpendicular and parallel to the long axis of the structure, by which the stability of a boat oscillating in the waves would be accomplished. The "boat mass" 195 comprises the buoyancy blocks or rings 198 attached to each of 4 "boat mass" columns 197 and a massive metal plate 195A which may be water filled. This massive metal plate can be square, rectangular, circular, or any geometric shape. The buoyancy blocks may protrude slightly above the ocean surface 112 especially during wave troughs. The individual WEC repeating components are tethered together by springs 6 in the previously described manner. Because each of the WEC's are rigidly attached to the boat mass, tethering springs 6 could be omitted for greater simplicity of this structure. If "boat mass" plate 195A is water filled, air can be pumped in and out through ingress and egress holes as previously described for the ILWDS of the WEC repeating unit and the one way air valve and air hose system shown if FIG. 3A; this water ingress and egress system is not shown on FIG. 12E(1) for ease of illustration.

To illustrate the function of this embodiment of the EKS apparatus, which is now more of the form of a floating platform, it may be described as functioning like a large iceberg which has 87% of its mass beneath the ocean's surface. Its massive inertial makes it immobile relative to the ocean waves that impinge upon it. Now if we create a small lake in the middle of the iceberg and allow it to connect with the ocean, and place a WEC in that small lake with the fixed subunit firmly anchored at the bottom of the lake to the iceberg, and we now allow waves to impinge upon the iceberg and go into the lake in the middle of it, the mobile subunit would rise and fall with the passage of wave crests and troughs while the fixed subunit would be totally and completely fixed to the massive iceberg resulting in the rotor of the mobile subunit being accelerated up and back in the vertical direction relative to the stator in the fixed subunit which is fixed solidly to the massively immobile iceberg, thereby producing the necessary relative motion between the rotor and stator that is required for the operation of the present principles.

The massive "boat mass" functions as does the iceberg. The fixed subunits of the array of WEC's attached to the "boat mass" 195 by way of the ILWDS 22 seen on each WEC (shown as 191 in FIGS. 1A and 11C in FIGS. 2A, B, and C) are totally and solidly fixed in position for all but the most gigantic waves. At the same time, the ocean waves may travel through the array of WEC's forming the EKS coming from any direction with no deterioration of efficiency as a function of the direction of wave propagation (shown as 196 in FIG. 12E (2)) where it is illustrated that unattenuated waves 16 coming from any direction pass through the four "boat mass" columns and become attenuated waves 17 with respect to their kinetic energy. This action is omnidirectional—the direction of propagation does not make any difference in the efficiency of the EKS to attenuate wave energy. No steering mechanism is required in contrast to many other types of wave energy converters. Thus, a large area of ocean can be covered by these EKS arrays attached to boat masses and wave kinetic energy can be attenuated over large tracts of ocean area, which in and of itself is believed to be a novel aspect of the present principles.

Electrokinetic Sea Wall Mesh Arrays

While exemplary embodiments of the present principles were described as wave kinetic energy dissipating devices in the form of a sea wall type of barrier, the technology comprising the EKS can take another form. Already discussed is the ability of many small VLEG's in WEC's with small rotor strokes to replace one large VLEG in a WEC with a large rotor stroke. It is possible to have all of the WEC repeating components of the EKS to occupy a lattice configuration of any of many geometric shapes that can cover a significant space of ocean. Large waves entering this region of ocean from any direction of propagation can be completely attenuated over the length of the wave front impinging the EKS apparatus. In this configuration, the EKS apparatus is given the nomenclature of Electrokinetic Sea Wall Mesh Array. Referring to FIG. 13A, we see a top view of a geometrically square mesh array of 5 WEC's repeating units 11C on a side for a total number of 25 WEC repeating units with each WEC tethered by springs, chains, or stiff cables 6 with the spring being the preferred embodiment to its 4 nearest members except along the periphery of the mesh where the tethering is to either two or three nearby neighboring WEC's. The materials used for tether 6 should be non-corrodible in sea water and quite strong and may include stainless steel chains and multi-stranded cable, nylon and polystyrene rope, Kevlar™ cable and/or other suitable materials well-adapted to the marine environment. Because the tethers should withstand the forces of the largest storm waves which will be sufficient to possibly move even the individual WEC fixed subunits and their ILWDS's, the tensile strength of these tethers should be at least 500 pounds for the smaller WEC units and at least several thousand pounds for the larger WEC units, and the tethers should be sufficiently rigid yet flexible to allow some relative motion of one WEC with respect to its neighboring WEC's but not sufficient motion to cause them to crash into each other with resulting damage from the propagation of very large waves through the EKS Mesh Array. The preferred arrangement is to use stainless steel springs with large spring constants on the order of 10 to 100 pounds/inch and of a length sufficient to keep the spacing between adjacent WEC's at least equal to $4L(\sin \theta)$, where $\theta$ is the tipping angle from the vertical and is at least 60° in preferred embodiments. As the size and mass of the WEC increases, the spring constant and spring length should increase in a proportional manner. The preferred arrangement for the EKS Mesh Array is to use springs of lower spring constants and shorter lengths for small WEC's that would allow for this embodiment of the present principles to take on the structure of a floating ocean energy absorbing carpet that absorbs kinetic energy and converts it into electrical energy over the entire surface of the mesh providing a structure with excellent storm survival capabilities.

The issue of magnetic interaction between adjacent WEC's with internal very strong and large magnets comprised within should be taken into consideration. For densely packed EKS meshes with closely spaced WEC repeating subcomponents, aside from the need for spacing to prevent collision events, one also has to allow for possible magnetic interaction via repulsion or attractive forces between adjacent WEC subcomponents. If the magnets used are sufficiently large and powerful, flexibly but not rigidly tethered WEC's might be adversely repelled or attracted by their neighbors with the possibility of serious damage to the EKS mesh. Thus, the inter-WEC distance should be the larger of the two distances, $S_C$, the minimum collision safety distance, or $S_M$, the minimum magnetic interaction safety distance, the latter being given by a known rule that strong magnets should be separated from electronics, other magnets, and ferromagnetic objects by a minimum safe separation distance, $s_M$, which equals 4 inches plus one additional inch for every 10 pounds of pull exhibited by the magnet in question. Thus, a WEC that houses a PMA using magnets with a pull force of 1200 lbs, the largest off-the-self commercially available industrial magnets, would produce an uncommon situation where such WEC repeating subcomponents tethered by flexible means should be no closer than 10.4 ft even if the collision safety distance, $s_C$, of two adjacent WEC's with a buoy floatation collar height of 2 ft above the ocean surface would be $4L \sin(60°)$ would be 6.9 ft. The magnetic interaction is of significantly less concern if the WEC's are of a lesser size (lesser length or weaker magnets) or are tethered by rigid means. A magnetic shielding, such as that described in FIG. 10B, can be employed to decrease the inter-WEC distance to that of the minimum collision safety distance, a desirable configuration as adjacent WEC's should be as close as possible for improved wave energy attenuation.

FIG. 13B shows in more detail a side view of a single WEC in schematic form 11C (side view) of the basic structure described repeatedly previously. Again present in FIG. 13B are the FCA stator 34, PMA rotor 37, ILWDS 22, upper perturbing force spring 23 and lower restorative force spring 63, mobile subunit 19, and fixed subunit 20. FIG. 13C gives a side oblique top view showing springs 6, WEC's 11C, four tethering cables 111 tethering the EKS mesh array to sea bed floor anchoring points 110, and power collection cable 112 exiting from the mesh array Power Collection Circuitry of the mesh (not shown). Note also, the "boat mass" EKS inertial reaction mass stabilizer structure 195 attached to each Inertial Liquid Wave Dampening System (ILWDS) 22 with four columns 197 (three shown) extending above the ocean's surface is also present and illustrated in dotted lines to indicate that it may optionally be used with the WEC mesh array to create a rigid massive structure and may optionally replace the four tethering cables and anchoring points if it is desired to have the EKS mesh array freely floating. The preferred embodiment is to use both structures, the "boat mass" structure 195 and anchoring cables/points 111/110 to provide stabilization to the mesh array as a whole both in terms of vertical oscillation of the fixed subunits 20 and location of the mesh array in the ocean respectively. When both structures are used, the waves can approach the EKS mesh array from any direction, no steering mechanism for the EKS mesh array is needed, the EKS mesh array is prevented from drifting aimlessly in the current, and finally, all of the fixed subunits 20 are braced together by the "boat mass" 195 to form one extremely stationary reaction mass (1) against which all of the mobile subunits 19 (reaction masses (2)) can develop efficiently a rotor velocity relative to the stator in the fixed subunit. Each row of WEC's 11C dissipates a fraction of the wave kinetic energy, and if the efficiency of each row of WEC's in dissipating the energy of the wave is defined for each row as $E_{\textit{ff-row}} = (E_{wave-in} - E_{wave-out})/E_{wave-in}$ (it is assumed to be constant for each row), where $E_{wave-in}$ is the energy of the wave as it enters the row and $E_{wave-out}$ is the energy of the wave as it leaves the row, and if there are n number of rows, $E_{\textit{ff-mesh}}$ equals the sum for all rows of this equation for each row. It can be shown that for an n row mesh array, the $E_{wave-out}$ after n rows equals $E_{wave-out-of-mesh} = (E_{\textit{ff-row}})^n \times E_{wave-into-mesh}$ and the $E_{\textit{ff-mesh}} = (E_{wave-into-mesh} - E_{wave-out-of-mesh})/E_{wave-into-mesh}$, where $E_{wave-out-of-mesh}$ is the energy of the wave as it leaves the mesh array, $E_{wave-into-mesh}$ is the energy of the wave as it enters the mesh array, and $E_{\textit{ff-mesh}}$ is the efficiency of the mesh array. One can have sufficient number of rows so that the wave kinetic energy absorbed by the mesh array approaches zero percent of the incident wave energy. However, after a certain number of rows the amount of energy absorbed by each succeeding row of WEC's becomes more and more negligible. The sum of the rotor stroke distances of the WEC repeating unit forming each row should approximately equal the significant height of the largest practical waves that of which it is desired to dissipate its energy. Alternatively, the EKS mesh array can be replaced by a linear single row EKS array although the rotor stroke distance would be much larger, and the WEC's would be more difficult to engineer, more difficult to design for storm conditions, and involve more costly WEC repeating units whose rotor stroke distance is equal to the height of the wave and equivalent to the product of the stroke distance of the smaller mesh WEC and the number of rows in the mesh. Furthermore, the density of the EKS mesh array can be much higher, as the minimum inter-WEC distance given by S=4L sin 60° incorporates a very liberal safety factor (or even less as previously explained), where L equals the height of the fixed subunit and L goes up considerably for the larger WEC repeating units. One should note that theoretically any VLEG Electrokinetic Matrix Transducer of any order can be placed in the EKS mesh array WEC repeating components, but since these WEC's are designed to be small, matrices of order 1, 2, or 3 (a single PMA with 1, 2, or 3 PMA magnetic structure units (y=1, 2, or 3)) are more practical. Survivability of the EKS mesh array in large sea storm waves would be expected to be better than that of large WEC structures that have to be spaced far apart for such eventualities; the mesh would float like a carpet on the ocean's surface. For ocean or other water bodies like channels or inlets where wave propagation is more or less always in the same direction, square or rectangular EKS mesh arrays would be the preferred arrangement with the longer dimension of the array perpendicular to the propagating wave front; for open water locations where the wave propagation is omni-directional, then circular or higher order polygonal structures would be more desirable. Note that known arrangements of other types of vertically oscillating WEC's have used arrangements of multiple units that were quite farther apart than the present principles, greatly reducing the efficiency of energy capturing from the propagating waves. It is believed that the maximum spacing of the WEC repeating subcomponents should be such that the spatial distance of each WEC from any of its nearest neighbors in any direction away from that WEC should not be any greater than approximately 8 times the height of each floating buoy collar of each WEC above the surface of the ocean. The basis for this maximum spacing are the following two conditions: 1) The maximal magnetic interaction extending out from today's most powerful rare earth commercial magnets will not extend out to this distance and 2) Any wider spacing seriously degrades the kinetic energy extraction ratio (kinetic wave energy flowing into the EKS minus the kinetic wave energy flowing out of the EKS—that quantity which is then divided by the kinetic wave energy flowing into the EKS) of the EKS array; the spacing between adjacent WEC's in a row perpendicular to the direction of wave propagation will degrade this wave kinetic energy extraction, and the larger the spacing, the greater the degradation. This degradation if not controlled leads to two problems—1) the amount of kinetic wave energy extracted over the area of the ocean in which the EKS is deployed becomes too limited to incur sufficient protection of structures behind it and 2) the magnitude of the by-product of this wave kinetic energy dissipation function, the production of useful electrical energy, is seriously degraded as well. This spacing problem can be overcome by increasing the number of rows of the EKS from a linear array of one row to the 2 dimensional geometrically variable array of many rows of the mesh arrangement. However, this multiple row mesh configuration will most effectively make up for the spacing issue if the spacing between each WEC described above is less than the specified 8 times the height of each WEC above the water; spacings greater than that spacing lead to a degree of degrading of the energy extraction ratio that the institution of a 2 dimensional multiple row configuration cannot likely overcome. Other arrangements of vertically oriented WEC networks fail to take into consideration the spacing problem and in such configurations, the individual WEC's that contain linear electric generators are spaced far too wide both for any meaningful wave kinetic energy attenuation for coastal structure protection, and fail to extract in a useful way as much electrical energy as can be extracted from the given area of the ocean in which these networks are located. The spacing degradation problem is greatly attenuated by rigidly tethering the fixed subunits of the individual WEC's to the seabed, an adjacent fixed conventional sea wall or other fixed structure, a large metal brace plate, or the large "boat mass" as described previously; a very massive ILWDS and fixed subunit would accomplish the same purpose; by such means previously depicted in FIG. 12B through 12E, the movement of the mobile subunit away from the vertical can be reduced by such an extent that tethering distances at least for the smaller WEC repeating subcomponents of the EKS could be reduced to as little as several inches.

Figure 13D:
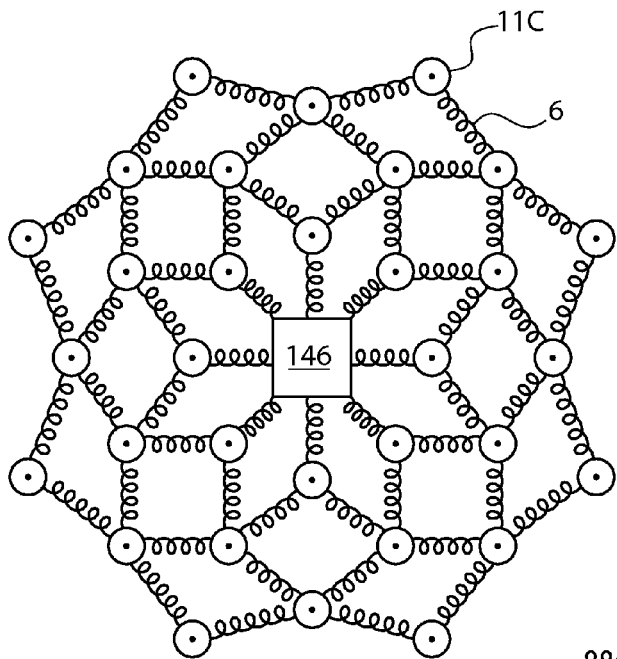
FIG. 13D depicts a top view of a circular mesh configuration of the Electrokinetic Seawall with its repeating component WEC's in a symmetric, moderately dense spring lattice configuration enclosing and protecting a structure within.
Figure 13E:
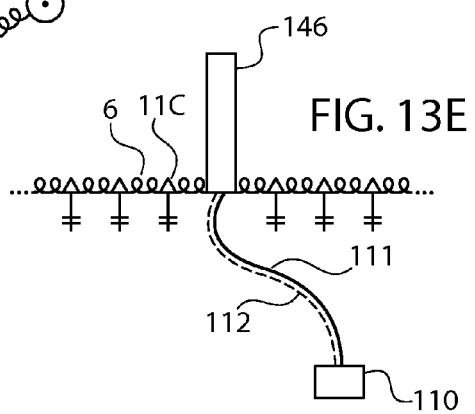
FIG. 13E depicts a side view of the circular mesh lattice configuration of FIG. 13D.
Figure 13F:
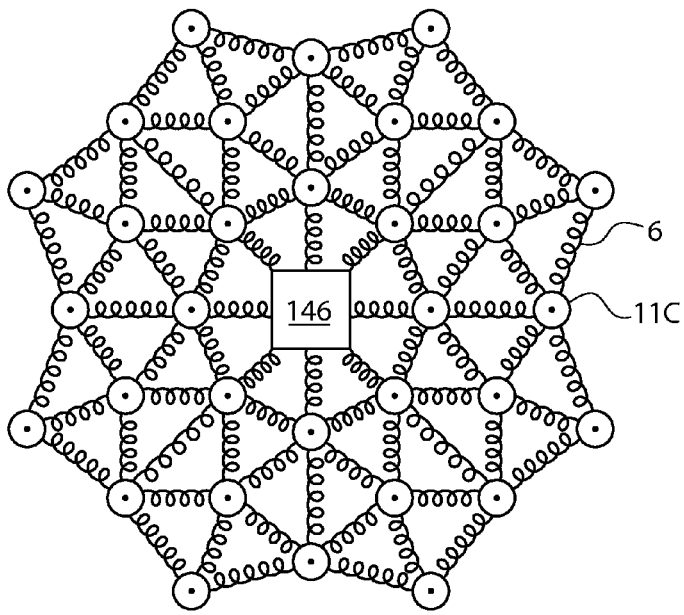
FIG. 13F depicts a top view of a circular mesh configuration of the Electrokinetic Seawall with its repeating component WEC's in a symmetric, very dense spring lattice configuration enclosing and protecting a structure within.

A circular EKS mesh array structure is depicted in FIG. 13D and FIG. 13F, which provide top view illustrations of the arrays. In FIG. 13F, the density of the springs 6 is approximately twice that of the structure of FIG. 13D, which makes for a more strengthened array though at the cost of flexibility. WEC's 11C (top view) in the FIG. 13F have a greater number of tethering springs between adjacent neighbors. There will be applications where the rigidity strength parameter is traded off for flexibility. FIG. 13E shows the EKS array in side view. Again anchoring cable 111 and power collecting cable 112, anchoring plate 110, springs 6 and WEC structures 11C (side view) are shown. Likewise, as per FIG. 13C, the fixed subunits of all of the WEC structures 11C may be rigidly tethered together with a "boat mass" structure. Also illustrated is an interesting application where a structure 146, which may be a buoy, a seafloor attached tower or some other structure, in the center of the EKS circular mesh array receiving the benefit of wave protection from the mesh array surrounding it. Here, a plurality of WECs are configured to envelop a structure 146 to dissipate the mechanical energy of waves that traverse into the structure.

Electrical Power Collection Circuitry

Figure 14:
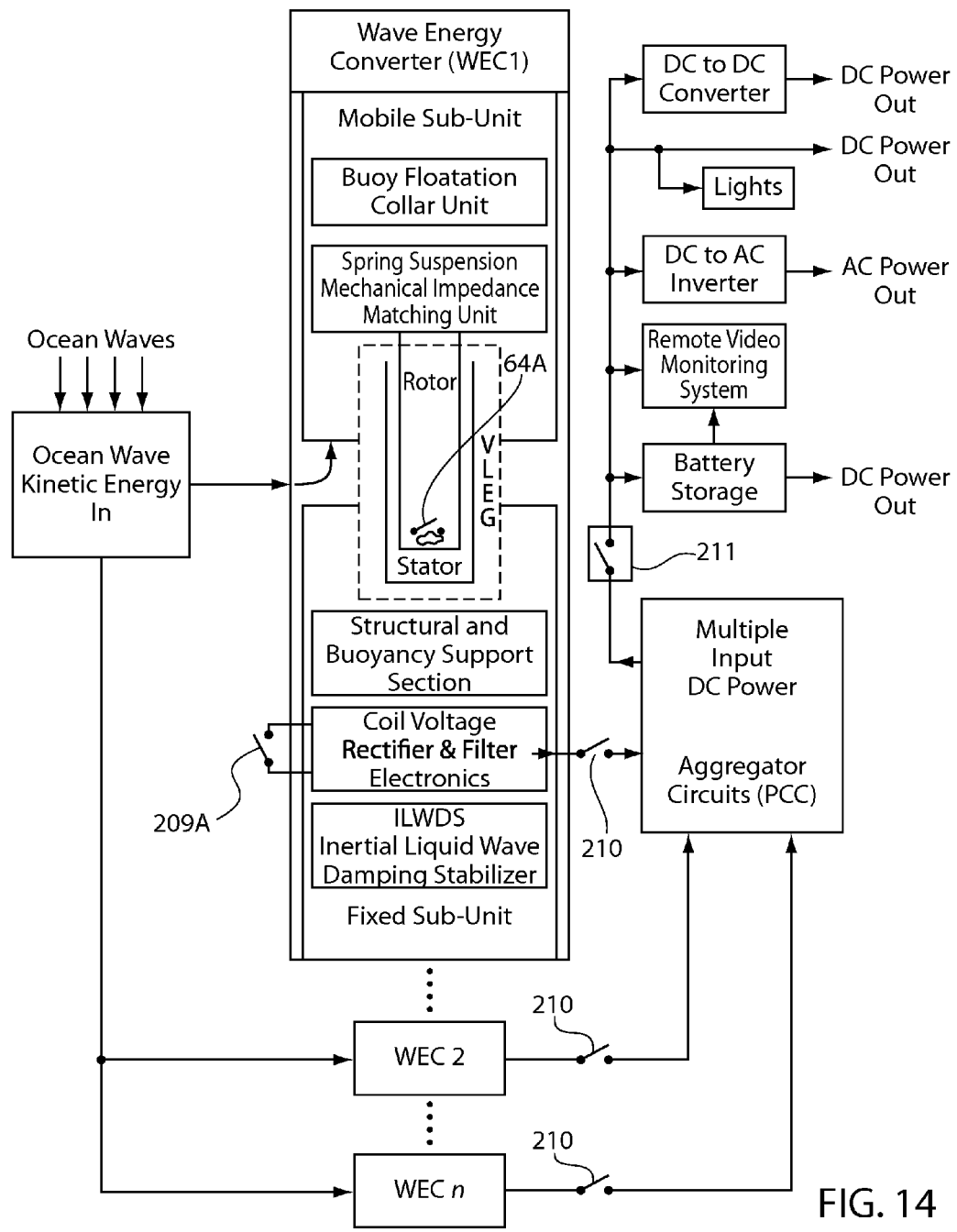
FIG. 14 Illustrates a block diagram of a system implementing wave kinetic energy dissipation through conversion to electric energy and transfer via various embodiments of Power Collection Circuitry (PCC).

Once the kinetic wave energy has been dissipated by embodiments of the present principles and converted into electrical power, the electrical energy needs to be collected through an electrical Power Collection Circuit or Circuitry (PCC). FIG. 14 depicts a block diagram of an exemplary embodiment of an Electrokinetic Seawall apparatus which indicates the function of the PCC. Ocean waves propagate into WEC 1,2 . . . and n, with WEC 1 broken up into a block diagram of the Mobile Subunit and its component Buoy Floatation Collar Unit and Spring Suspension System and Mechanical Wave Impedance Matching Section of which the rotor is part; the Fixed Subunit composed of the Structural and Buoyancy support, the Inertial Liquid Wave Dampening System (ILWDS), coil voltage rectifier and filter electronics, and the stator; and the rotor of the Mobile Subunit with the stator of the Fixed Subunit forming the VLEG. The Power Collection Circuit consists of the coil voltage output rectifier and filter electronics that is part of each VLEG, a Multiple Input DC Power Aggregator Circuit which combines the many DC output voltages and currents from the FCA rectifier and filter circuits, and sends the DC power out unchanged, for storage in a storage battery, converted to a DC power source of a different voltage via a DC to DC converter, or converted back to AC of a voltage suitable for a particular application. Note that a small amount of DC power is taken from the direct DC out line for the LED modules (205 FIG. 1A) used to illuminate each WEC making the EKS visible to passing ships. Finally, because large units are capable of producing large amounts of electrical power in remote tracts of ocean, a method of internet-based video monitoring and control signals are used. Not shown is the possible use of computerized monitoring and control circuitry that may be used to better regulate the behavior and output of the electronics used in the apparatus. In accordance with one advantageous aspect of the present principles, very many DC voltage outputs that have a range of low to intermediate levels of output power are combined through the use of multi-phase rectifier filter and power aggregator circuits for the purpose of vibrational electrical energy harvesting over a significant area of energy producing surface. The configurations of the multi-phase full wave rectifier filter circuitry and associated Multiple DC Power Source Aggregator circuits used in embodiments of the present principles include several advantageous features, as discussed in further detail herein below. The PCC may take several preferred embodiments depending upon the configuration of the WEC repeating units of the EKS. Not shown is possible automated computerized monitoring circuitry that monitors and influences the electrical power output; this circuitry should be employed for survivability, efficiency, and safety reasons in large installations of the EKS.

The block diagram of FIG. 14 also shows several important safety switches in the electronics and the Power Collection Circuitry of a preferred embodiment of the present principles. First, when a WEC repeating unit of the EKS apparatus needs to be serviced or replaced, means should exist to shut down the PCC for that WEC to avoid electric shock hazard; switches 210 function in this manner and disconnects the PCC of that WEC from the PCC of the entire EKS apparatus. Second, when the WEC is to be replaced or serviced, means should be provided so that the PMA, whose mass might be considerable in larger units, does not oscillate violently as the WEC is manipulated, which not only represents a mechanical danger from large powerful magnets moving unpredictably but also represents a potential electric shock hazard from the voltage generated by the PMA moving unpredictably relative to the stator. The means by which these problems are ameliorated is accomplished in this embodiment by FCA shorting switch 209A which shorts out all of the coils of the WEC. This by itself will cause the electrical output of the VLEG in the WEC to fall to zero. In addition, shorting out the FCA coils will result in a relatively high current flow in the shorted coil windings producing significant Lenz's Law back EMF forces on the PMA which will greatly retard the extent and forcefulness of any of its movements during maintenance manipulation of the WEC, greatly reducing any chance of mechanical instability and subsequent injury to personnel. This consequential result is of further benefit in that it also will cut the electrical power generated by the FCA coil windings to practically zero, virtually eliminating any chance of electric shock hazard to personnel. Water sensor switch 64A that sits at the bottom portion of the rotor slide tube is attached to the fixed subunit stator in an appropriate position as low as possible suitable to the detection of water in the bottom of the rotor chamber of the WEC, a condition that can lead to catastrophic electrical failure. The switch 64A is in series with switch 210 and is designed to shut power off from the WEC if it detects sea water or other water in the bottom of the rotor slide tube. One other advantageous aspect of the mechanical and electric safety mechanisms of the present principles is switch 211; this switch, which shuts off the power output of the PCC for the entire EKS apparatus, is remotely controlled and may be controlled from great distances via the internet as the preferred method of remote control and may be part of any computerized monitoring and control circuitry that can be added to the apparatus; when it is desired to shut down the entire EKS apparatus, this switch is opened, disconnecting all of the PCC from the output power takeoff cable that removes electrical power from the EKS. Such a circumstance would happen, for example, if weather forecasts predict a violent storm that would be expected to arrive at the location occupied by the EKS apparatus, which possibly may be in a remote and hard to access location, and it is desired to shut down the EKS in advance of the storm or for any maintenance procedure. This feature greatly adds to the survivability of the apparatus in severely adverse weather conditions which already is significant given the paucity of moving mechanical parts composing the EKS.

The video monitoring system of the present principles, which is consistent with the current art of video monitoring technology, employs a system technology developed by Livevideomonitor.com™ that comprises extremely simple internet-connected high resolution video cameras and remote control on and off switches that can respond to certain hazardous conditions such as water within the VLEG rotor sliding tube that may be operated via a satellite internet communications link. The purposes of this system include: 1) monitoring visibility, weather conditions and wave heights especially for dangerous weather conditions; 2) monitoring the proper functioning of the lighting system of the EKS so that shipping will be aware of its presence; 3) turning either parts or all of the system off in the event of operational failure, the advance of dangerous storms into the area of the EKS, and for maintenance and testing done via switches 209A, 210, and 211 which may be connected for remote control operation; 4) detecting via water sensor switch 64A the leakage and presence of sea water, which can be corrosive, leading to catastrophic failure of the WEC in terms of consequences both to the magnets and the coils, within the internal rotor slide tube 32 space of the VLEG; 5) collisions and other structural damage that suddenly develops. Because this system should remain operative after mechanical and electrical failure possibly having developed, it would obtain its electrical power from the storage battery rather than directly from the power collection circuitry (PCC).

In accordance with exemplary aspects, the power collection circuit can include a plurality of field coils in which electrical currents are induced. Here, each field coil provides a current at a different, respective phase. As discussed in the examples of POCs herein below, at least one bridge rectifier circuit can comprise sets of Schottky diodes that are each coupled to a respective field coil of the plurality of field coils to rectify the current from the respective field coil to enable harvesting of electrical power produced from the induction in the coils.

Figure 15A:
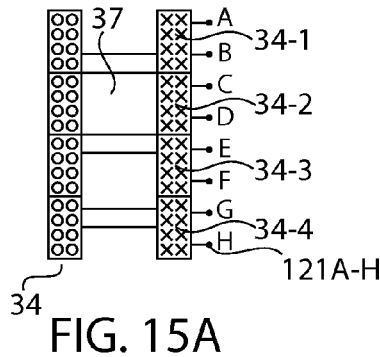
FIG. 15A is a schematic diagram of electrical connections for embodiment 1 of the VLEG (matrix order 1) with a 4 coil FCA Stator and 2 magnet repulsive pole single structural magnetic unit PMA Rotor.
Figure 15B:
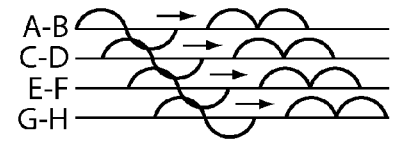
FIG. 15B shows the phase relationships of the AC voltage waveforms produced in each of the 4 coil outputs from the VLEG of FIG. 15A.

For example, FIG. 15A shows a schematic of the PMA rotor 37 and FCA stator 34 of the basic unit VLEG comprising PMA 37 with one magnetic structural unit, four copper coils, 34-1 through 34-4 with lead pairs AB, CD, EF, GH respectively collectively designated as 121A-H; the coils here are shown in the preferred but not exclusive arrangement of each coil being approximately equal to or just slightly larger than one-quarter of the length of the PMA, that is, their combined width is approximately equal to or just slightly larger than the length of the PMA. As shown in FIG. 15 B, relative motion of the rotor 37 with respect to the stator 34 due to wave oscillation will give rise to voltage waveforms in coil circuits A-B, C-D, E-F, G-H that are 90° sequentially out of phase with each other giving rise to a 4-phase AC circuit that will be rectified to produce 90° out of phase unfiltered DC voltage wave forms that are subsequently smoothed out by at least one of the exemplary filtering circuits illustrated in FIGS. 15C, 15D, 15E, and 15F. All four of these rectifying and filtering circuits can be used in the PCC and will now be described. The diodes used in all four of these exemplary circuits are Schottky barrier power diodes, type 40 PIV 3A RK44; other such diodes with higher PIV and current ratings may be used for larger configurations of the WEC.

Figure 15C:
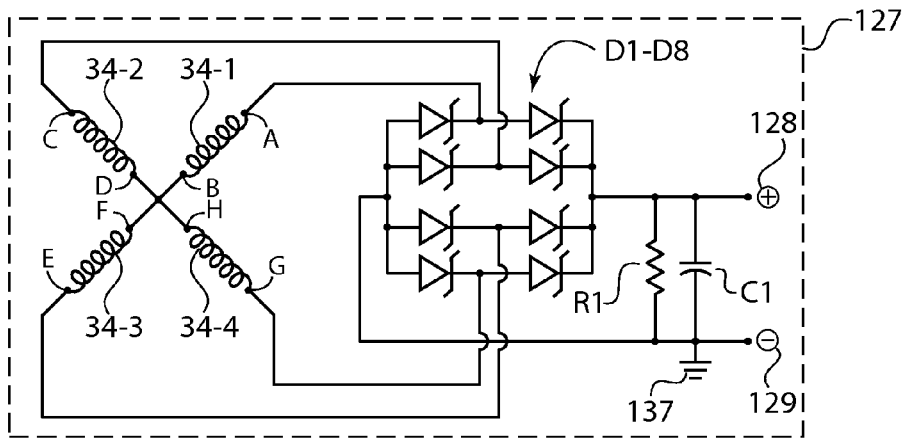
FIG. 15C is a schematic diagram of embodiment 1 of power collection circuitry (PCC) comprising a conventional 4-phase full wave bridge rectifier resulting in a filtered two terminal DC output voltage that may be used with the basic VLEG.

FIG. 15C depicts circuit 127 which includes a 4-phase bridge full wave rectifier circuit with filtering capacitors. Coils 34-1 through 34-4 are connected via lines AB, CD, EF, and GH as shown to 4-phase full wave Schottky rectifier diodes D1-D8. Schottky diodes are advantageously used in a 4-phase bridge rectifier (and may be used in full wave rectifiers of any higher phase) because, in small lower power VLEG units, minimizing ohmic power losses in diode junction regions are important to the efficiency of such a device. Preferred embodiments of the PCC employ Schottky diodes despite their slightly increased cost for several reasons. For example, ohmic resistive losses, which can dissipate a significant amount of the power produced in a low voltage LEG, increase as the junction forward voltage drop increases. The pn junction voltage drop across standard silicon power diodes is 0.5 to 0.6 volts. Further, germanium diodes have a junction voltage drop of about 0.3 volts and are virtually impossible to obtain on an economical basis for currents of greater than 0.2 amperes. However, the voltage drop across Schottky diode junctions is as low as only 0.1 volts, thereby ensuring that ohmic resistive losses are minimized and the efficiency of the VLEG units is optimized. The use of Schottky diodes in 4 phase and higher full wave bridge rectifier configurations is believed to be a novel feature.

As illustrated in FIG. 15C, the output of the bridge rectifier formed by diodes D1-D8 is filtered via filter capacitor C1 with a value that is large on the order of 10,000 microfarads but the exact value is non-critical as long as it is large enough to keep DC voltage ripple at a minimum. Bleeder resistor R1 with a value of 10 k to 100 k ohms is employed to bleed off charge from C1 when the VLEG is desired to be off. Larger units would employ lower resistance bleeders. Circuit ground 137 is connected to negative DC output terminal 129 and the positive DC voltage appears through terminal 128. Note that the number of different phase AC input power sources that can be accommodated by this circuit is not subject to any limit; an n phase Schottky diode full wave bridge rectifier can be made up of n AC power inputs separated in phase by 360°/n if 2n diodes are used, one pair of diodes for each additional phase AC power input source. Also note that the AC power inputs do not have to have any regular phase relationships to each other with this circuit. This characteristic as well as the use of Schottky diodes makes this circuit particularly of use in harvesting electrical energy from multiple parallel sources of voltages and currents of low magnitude and from four to thousands in number from sources of any vibrational energy including ocean surf, wind induced vibrations, transportation vehicle vibrations, and the like; the use of power Schottky barrier diodes such as the 40 PIV 3A RK44 will enable the use of input sources of considerable range of power magnitude.

Figure 15D:
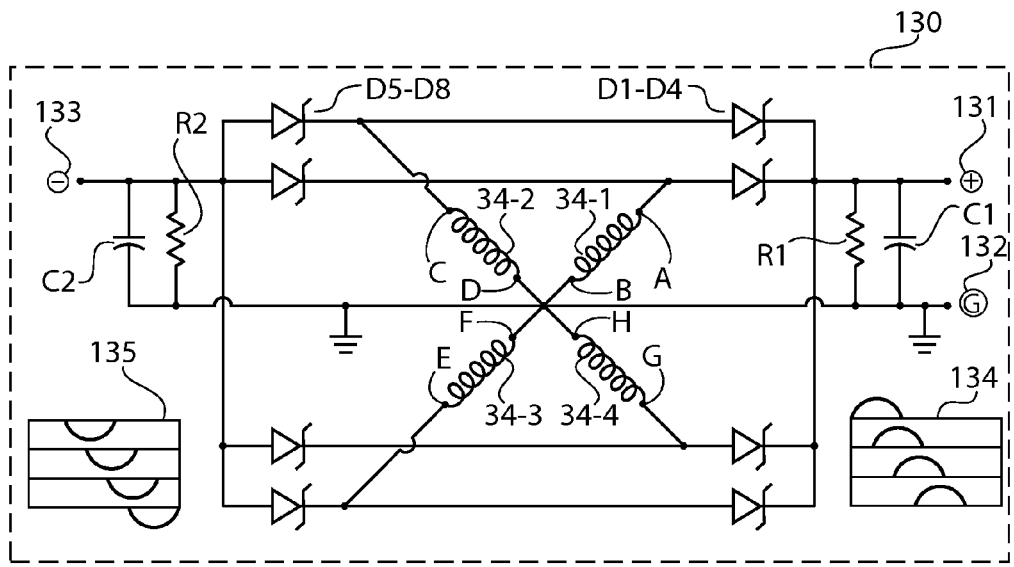
FIG. 15D is a schematic diagram of embodiment 2 of PCC comprising a 4-phase full wave rectifier with grounded coil inputs resulting in a three terminal center tapped filtered bipolar DC output voltage that may be used with the basic VLEG.

The circuit 130 of FIG. 15D was designed for applications where it would be desirable to have a bipolar output with a center tap ground. It too is a 4 phase full wave rectifier, but it is composed of two half sections, each of which are full wave center tapped rectifier circuits; one section produces and separates out a positive half cycle pulse for each phase resulting from four successive positive pulses from coils 34-1 through 34-4 connected via leads AB, CD, EF, and HG respectively that are summed together by Schottky diodes D1 through D4 and filtered through large filter capacitor C1 into a positive DC voltage output across positive terminal 131 and circuit ground 132; the other section produces and separates out a negative half cycle pulse for each phase resulting in floor successive negative pulses from coils 34-1 through 34-4 via leads AB, CD, EF, and GH respectively that are summed together by Schottky diodes D5 through D8 and filtered through large filter capacitor C2 into a negative DC voltage output cross negative terminal 133 and circuit ground 132. All capacitors for all of the exemplary filtering circuits to be described are as described for C1 for the circuit of FIG. 15C. R1 and R2 are bleeder resistors with a preferred value of 10K to 100K. The positive 4 pulse train output 134 and the negative 4 pulse train 135 developed as the PMA 37 N pole and then the S pole repulsive magnetic field regions of space around the rotor of the VLEG slides past FCA coils 34-1 through 34-4 in succession are illustrated in FIG. 15D. Some applications may require a bipolar output with a center tap neutral ground and circuitry that accomplishes this desired feature for 4-phase AC power lines to be rectified into a bipolar DC power source with a center tap ground is believed to be novel. Distinguishing characteristics of this circuit include the use of Schottky diodes and the use of full wave center tapped rectification for an AC power source of phase greater than three. This circuit configuration is believed to be quite novel and although the 4-phase configuration is perfectly suitable for the exemplary embodiments of the Vibrational Linear Energy Generator that forms the wave kinetic energy dissipating electrical power generating capability of an EKS, the circuit 130 can handle any number of coils, n, producing an n phases AC output that can be full wave rectified into a bipolar DC output with center tapped neutral ground through the addition of 2n additional diodes. Furthermore, note that the number of different phase AC input power sources that can be accommodated by this circuit is not subject to any limit; an n phase Schottky diode full wave bridge rectifier can be made up of n AC power inputs separated in phase by 360°/n if 2n diodes are used, one pair of diodes for each additional phase AC power input source. The AC voltage inputs do not have to exhibit a constant phase relationship to each other. This characteristic as well as use of Schottky diodes makes this circuit particularly of use in harvesting electrical energy vibrational energy sources other than ocean waves from multiple parallel sources from four to thousands of voltages and currents of low magnitude; with the use of power Schottky diodes such as the 40V PIV 3A RK44 used in exemplary embodiments described herein, these AC power sources can be considerable in terms of range of magnitude from very low to intermediate levels of power input.

Figure 15E:
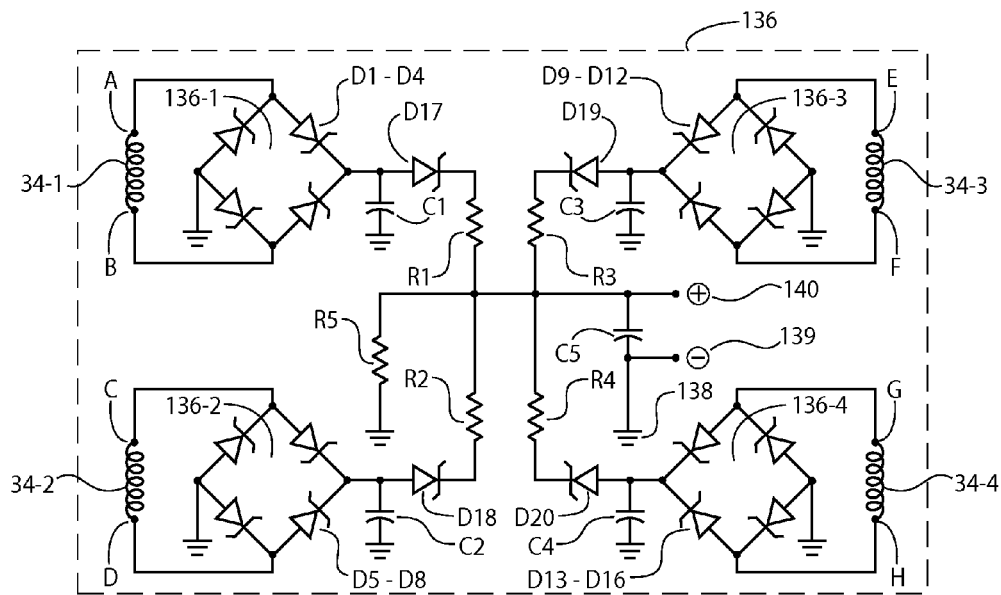
FIG. 15E shows an embodiment 3 of PCC comprising a 4 input single phase bridge rectifier network with a current summing aggregating circuit resulting in a filtered two terminal DC output voltage and current through the load whose magnitude is approximately the sum of the individual filtered DC voltage and current outputs from the four coils used with the basic VLEG.

Yet another Power Collecting Circuit that is advantageous with respect to configuration and function is denoted as a DC current summation circuit and is illustrated in FIG. 15E as circuit 136. Here, each of the four FCA coils 34-1 through 34-4 is connected by leads AB, CD, EH, and GH to Schottky diode full wave bridge rectifier circuits 136-1 through 136-4 respectively; the bridge rectifier circuits are composed of Schottky diodes D1-D4, D5-D8, D9-D12, and D13-D16 respectively. The heavily rippled DC voltage output of each bridge rectifier is filtered by large filter capacitors C1 through C4 and, to bleed off residual charge off these capacitors when the EKS apparatus is in the off state, bleed resistors R1 through R4 with a preferred value of 10K through 100K are used. Using ballast or current balancing resistors R1 through R4 in series with Schottky current steering diodes D17 through D20, the DC current outputs from the four bridge rectifier circuits 136-1 through 136-4 are summed together and connected to circuit ground via R5. R1 through R4 are large power resistors with the same and extremely low resistance of between 0.1 to 1.0 ohm as the preferred range and the ratio of the load resistance that is placed between positive voltage output 140 and circuit ground 139 and any of the four current balancing ballast resistors R1 through R4 should be smaller than the load resistance by a factor of greater than 100 to 1 to minimize power losses in the current balancing circuit. R5 is a bleeder resistor with the preferred value of 10K to 100 k and C5 is an output filter of high capacitance that filters the DC output voltage that appears across positive terminal 140 and negative terminal 138 (circuit ground 138). Advantageous aspects of this circuit include: 1) Schottky diodes are used in the bridge rectifiers; 2) A current aggregating or summing circuit is used to add together small to intermediate large current outflows from each of the 4 coils of the FCA of the VLEG through the use of ballast current balancing resistors which results in a higher voltage and current through any load resistance connected across output terminals 139 and 140; 3) Schottky steering diodes insure that there is no DC current flowing backward into any of the coils if the output filtered DC voltage of one coil is less than that of another coil or a short circuit/open circuit unstable condition occurs in any of the four coils. Note that the current balancing ballast resistors R1-R4 insure that there are not different DC voltages present simultaneously from the outputs of the four coils on the positive output terminal 140 which would be a highly undesirable situation. Note also that in the event of a short circuit or open circuit of one of the coils, the steering Schottky diodes D17 through D20 prevent undesirable current paths and unstable voltages from propagating through the other coils. Further, since the PCC 136 sums the output DC currents from each of the 4 individual coils 34-1 through 34-4 into the output load resistance, the voltage appearing across the load resistance across output terminals 39 and 140 is the approximate sum of all 4 of the filtered DC output voltage from each coil. This higher load voltage is desirable in applications where it is desired to minimize I squared R ohmic losses in the transmission wires and allows better impedance matching and hence improved power transfer efficiency as per the Maximum Power Theorem between a higher resistance load and a lower resistance coil generating electrical power out. At the same time, if the load resistance is required to be small, the summation of the currents produced by the four coils through the load resistance is a desirable feature. Another distinguishing feature of this circuit is that it may be used in an advantageous manner of combining the current outputs of several VLEG's together as to be shortly described.

Figure 15F:
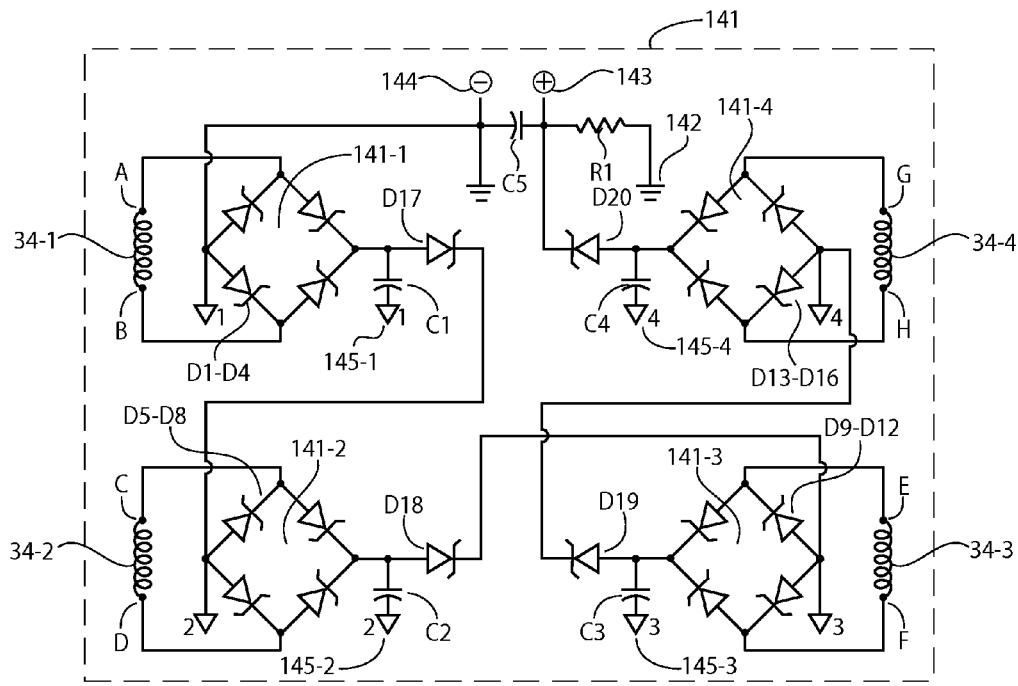
FIG. 15F shows embodiment 4 of PCC comprising a four input single phase bridge rectifier network with a voltage summing aggregating circuit resulting in a filtered two terminal DC output voltage through the load that is approximately the sum of the voltages of the individual filtered DC voltage outputs of the four coils used with the basic VLEG.

Another embodiment of a PCC in accordance with the present principles is shown in FIG. 15F, which depicts a voltage summation circuit 141. The circuit 141 includes a full wave bridge Schottky diode rectifier 141-1 with diodes D1-D4 and large filter capacitor C1 whose AC voltage inputs are connected to the first coil 34-1 of the FCA via leads A and B and whose DC voltage output is connected via Schottky diode D17 to the circuit branch ground of the full wave bridge rectifying and filtering circuit 141-2. The circuit 141-2 comprises Schottky diode bridge D5-D8 with large filter capacitor C2 whose AC voltage inputs are connected to the second coil 34-2 of the FCA via leads C and D and whose DC voltage output is connected via Schottky diode 18 to the circuit branch ground of the full wave bridge rectifying and filtering circuit 141-3. In turn, the circuit 141-3 comprises Schottky diode bridge D9-D12 with large filter capacitor C3 whose AC Voltage inputs are connected to the third coil 34-3 of the FCA via leads E and F and whose DC voltage output is connected via Schottky diode D19 to the circuit branch ground of the full wave bridge rectifying and filtering circuit 141-4. Further, the circuit 141-4 comprises Schottky diode bridge D13-D16 with large filter capacitor C4 whose AC voltage inputs are connected to the fourth coil 34-4 via leads G and H and whose DC voltage output is connected via Schottky diode D20 to the positive output terminal 143 via large filter capacitor C5 and bleeder resistor R1. Here, the bleeder resistor R1 has the same purpose of bleeding off charge from the filter capacitor with the same preferred resistance 10 K through 100K as in the previously described circuitry. The positive DC output voltage appears across the positive terminal 143 and negative terminal 144 connected to circuit system ground 142 (which is identical to branch circuit ground 145-1). The magnitude of that DC voltage is the sum of the filtered output DC voltages resulting from the induction of voltages in each of the coils as PMA 37 slides past the four coils 34-1 to 34-4 in succession. Advantageous features of this circuit again include 1) Schottky diode bridge full wave circuitry 2) connected to each in series fashion to the next one in sequence via Schottky steering diodes that prevent current backflow into each of the feeding coils, in essence isolating one coil's DC voltage output from the other coils, thereby mitigating operating instabilities from possible short and open circuits that might occur in one of the coils and 3) combining output DC voltages of significant magnitude together to produce the sum of the voltages produced by the individual coils, a desired condition in applications where higher output voltages and lower output currents are required to decrease ohmic I squared R wire losses as well as when it is needed to more properly match a higher impedance load circuit to the lower impedance of the generating coils leading to more efficient power transfer as per the Maximum Power Theorem.

Note that any of the circuits of FIG. 15C, FIG. 15D, FIG. 15E, or FIG. 15F may be used individually or in combination to form the PCC of individual VLEG's or groups of VLEG's that comprise the wave kinetic energy dissipation mechanism and electric power generation, and the exact selection and combination of these circuits that are used may vary as to the preferred embodiment with the structure of the VLEG matrix forming the WEC repeating component of the EKS and the number and shape of the WEC array used in any given configuration in accordance with the present principles.

The current summing circuit 136 of FIG. 15E and the voltage summing circuit 141 of FIG. 15F have some additional notable characteristics in common. The number of AC power inputs, phased or unrelated in phase, may be increased to any arbitrary number by adding additional full wave bridge rectifier filter circuits, and in the case of the current summing circuit 136, additional Schottky current steering diodes and current balancing ballast resistors can be added in parallel; in the case of the voltage summing circuit 141, additional rectified filtered DC outputs can be series connected as shown. Furthermore, the full wave bridge rectifier filter circuits in these power source summing circuits can be replaced with direct DC voltage and current sources of any number, and these input sources can be the DC outputs of circuits 127, 130, 136, and 141 of FIG. 15C through FIG. 15F respectively or may represent any other DC input power sources including batteries. The voltage and current rating of the power Schottky barrier diodes used determine the magnitude of the input DC power of the inputs that can be summed together. Once again, anywhere from three to thousands of AC power sources phased and not in phase as well as DC power sources can be summated in an energy harvesting PCC from sources as diverse as ocean waves as in the case of the embodiments described herein, ocean surf, transportation related vibrational energy sources, and wind.

Figure 16:
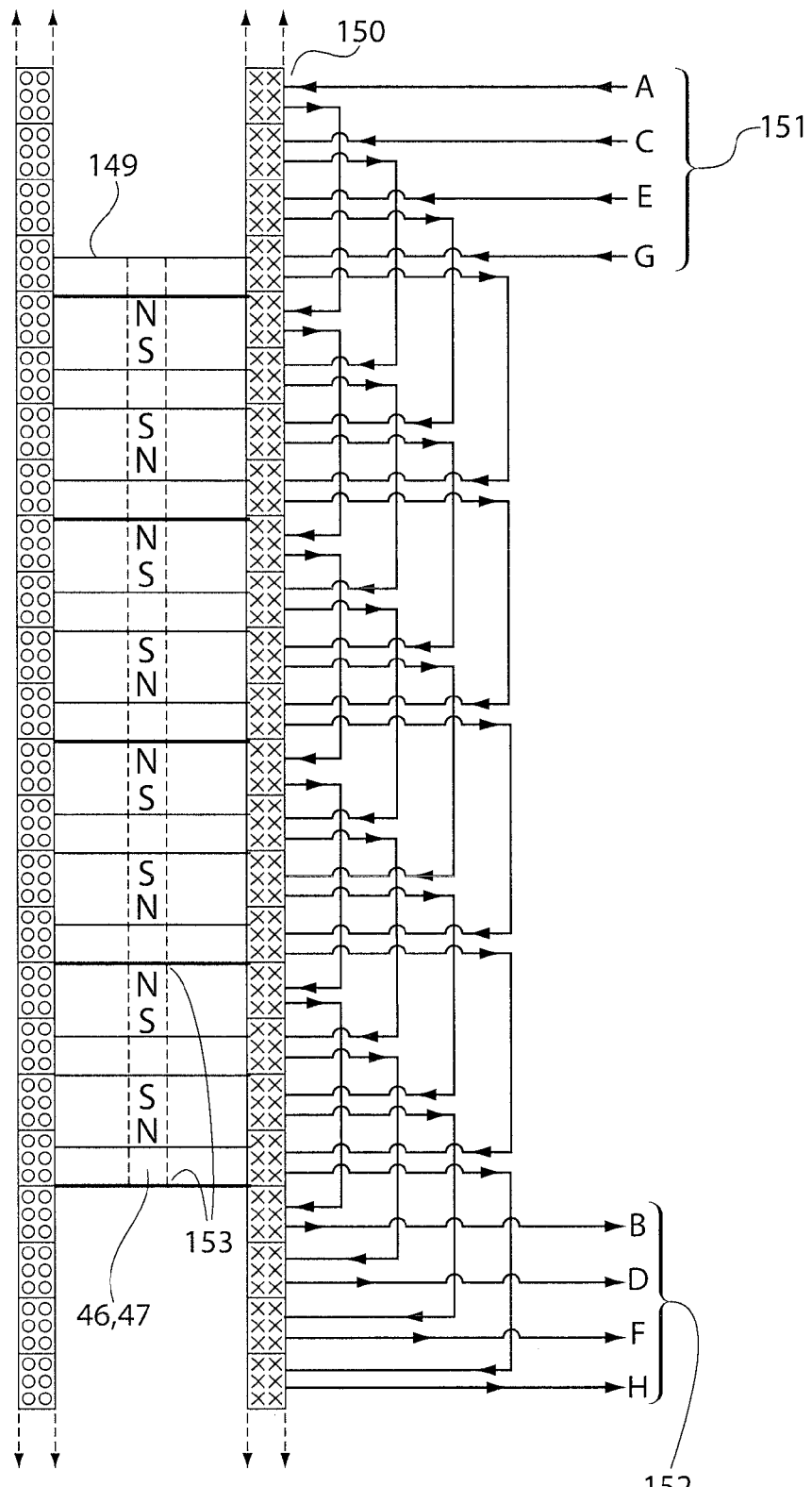
FIG. 16 illustrates a four magnetic unit VLEG PMA with a partially drawn FCA whose coils are series connected in four groups so as to produce a 4-phase AC output, the associated PCC of the VLEG PMA, the four possible shown embodiments for AC to DC power rectification and filtering, and a DC to DC converter and DC to AC inverter.

The significant flexibility of design for these four rectifying circuits lead to a complex and rich assortment of possible Power Collection Circuitry configurations in accordance with the present principles, or for that matter, any source of low level electrical energy, AC or DC power, that is harvested from a great deal of energy collecting inputs covering an energy generating space. For instance, FIG. 16 shows a VLEG, drawn approximately to scale, comprising a PMA rotor with 4 structural magnetic units 153 containing central cavity 47 and metal support tube 46; the PMA is in Compressive Repulsion Magnetic Field configuration and a FCA 150 with 32 separate coils of which 24 are shown; for simplicity, end deflecting magnetic field magnets are not shown. Output leads of the 32 coils are organized in four banks of series connected coils so that any coil in that group of 8 (5 coils in each group are actually shown to be connected) is over the same magnetic pole region as the remaining coils in that group causing the voltages induced in that coil to be additive with the remaining seven coils; the input leads 151 to the 4 banks of coils are designated A, C, E, and G; the output leads 152 from the 4 banks of coils are designated B, D, F, H. This configuration results in the induced voltage and current in the first coil bank to be 90 degrees ahead in phase of that induced in the second coil bank which in turn is 90 degrees ahead in phase of the third coil bank which in turn is 90 degrees ahead of the fourth bank creating a four phase AC output across the corresponding pairs of input and output leads 151 and 152. These input output lead pairs are designated AB, CD, EF, and GH which can then be fed to any of the 4 different types of PCC circuits depicted in: FIG. 15C, the Full Wave Schottky Diode Bridge Rectifier Filter circuit 127; FIG. 15D, the Full Wave Schottky Diode Center Tap Rectifier Filter circuit with bipolar output and neutral center tap 130; FIG. 15E, the Current Summation Full Wave Schottky Diode Bridge Rectifier Filter circuit 136; and FIG. 15F, the Voltage Summation Full Wave Schottky Diode Bridge Rectifier Filter circuit 141. Input output lead pairs AB, CD, EF, and GH correspond to the lead connections of the 4 coils of the four PCC circuits of FIG. 15 labeled in the identical manner. From any of these four PCC circuits, the generated electrical power can be then taken off the WEC and EKS directly as shown by the block diagram in FIG. 14, stored in a storage battery, converted to a different DC voltage via a DC to DC converter 148 or changed to a suitable alternative AC voltage by a DC to AC inverter 148A.

Figure 17:
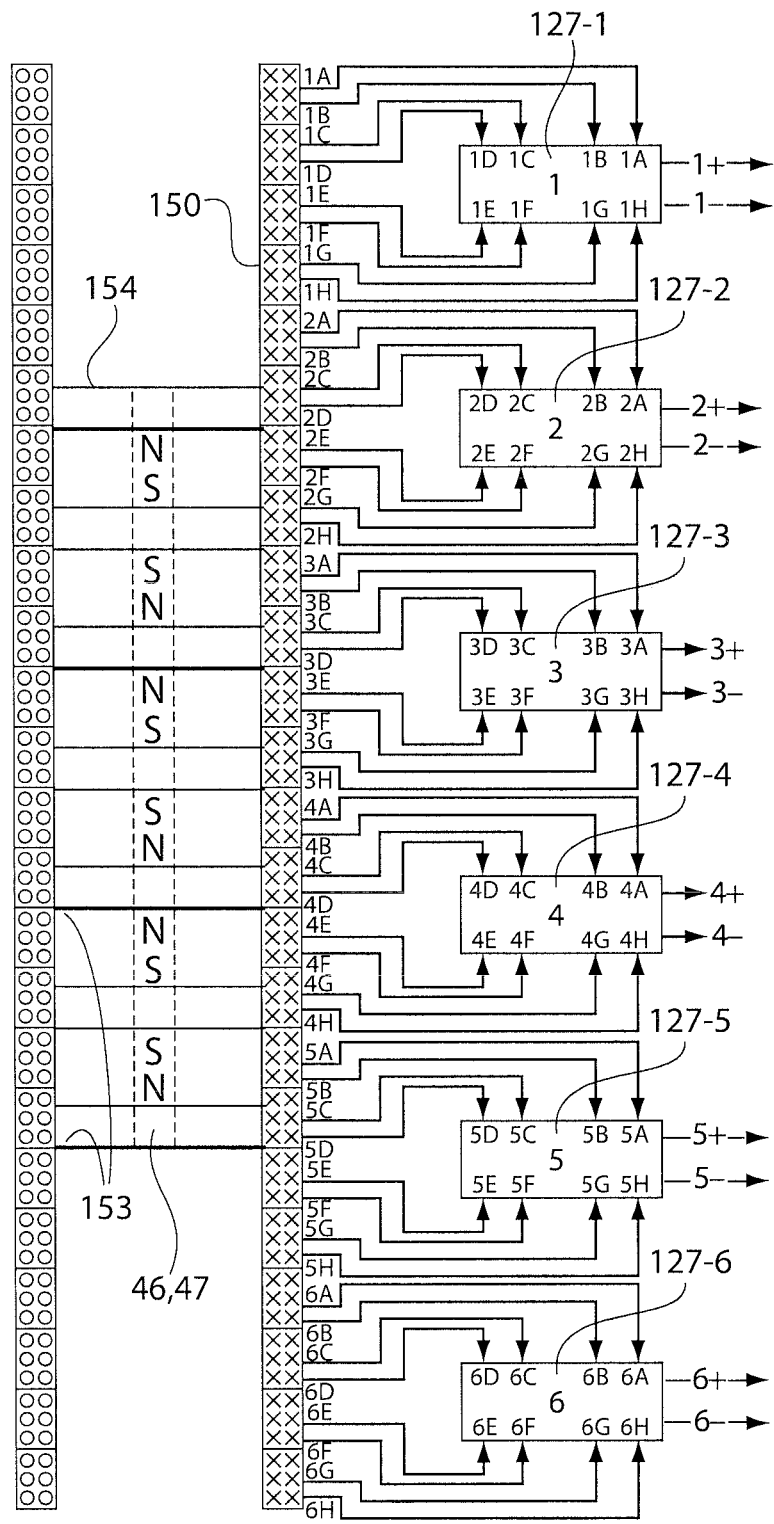
FIG. 17 depicts a three magnetic unit VLEG PMA with an approximately drawn to scale FCA and its associated PCC circuitry comprising six individual 4-phase full wave bridge rectifier filter circuits for each VLEG magnetic unit whose four coils are each connected to the AC inputs of the corresponding bridge rectifier and whose DC outputs of each may be connected to either a six input DC current summing aggregator circuit or a DC voltage summing aggregator circuit with a final DC voltage output.

FIG. 17 depicts a different exemplary configuration for the PCC of the WEC repeating unit of an exemplary EKS apparatus. PMA rotor 154, drawn approximately to scale, comprises 3 VLEG magnetic structural units 153 in Compression Repulsive Magnetic Field configuration again with central channel 47 through which central support metal tube 46 travels; for simplicity, end deflecting magnetic field magnets are not shown. FCA 150 comprises 24 coils grouped in groups of 4 coils that are aligned adjacent to each other with one group extending the length of one VLEG PMA magnetic structural unit as previously described. Each group of 4 coils are assigned a number 1 through 6 and for each group of coils, four pairs of leads emanate, one from each coil; from the first coil they are labeled as 1A and 1B, 1C and 1D, 1E and 1F, 1G and 1H; from the second coil they are labeled as 2A and 2B, 2C and 2D, 2E and 2F, 2G and 2H; and so on for all 6 coil groups of 4. The leads from a numbered group of 4 coils go to a respectively numbered four phase full wave Schottky diode rectifier and filter circuit 127 that has been previously described. Again the lettering code of the leads matches up with the coil connections of the rectifier circuit 127 of FIG. 15C. Again the output of each coil of the coil group differs in phase by 90 degrees from the coil adjacent to it to produce a 4 phase AC power signal that will be rectified by the numbered four phase rectifier filter circuit 127 associated with that numbered coil group. These rectifier circuits 127 numbered as 127-1 through 127-6 each produce a pair of positive and negative DC voltage and current output pairs designated as 1+ and 1−, 2+ and 2−, and so forth through 6+ and 6−. We now have six separate DC voltage current sources emanating from the six rectifier circuits. Since the desired goal is to combine all 6 DC power lines into one stable DC output power line that has collected the power from all the coils in the VLEG, we can use, for example, either a novel 6 input current summation circuit 155 or novel six input voltage summation circuit 156 to accomplish the corresponding design. Only two pairs of output leads from two of the four 4-phase rectifier circuits are shown for the sake of clarity connected to either the current summing circuit 155 or the voltage summing circuit 156. Obviously, all six pairs of outputs from the six rectifier circuits 127-1 through 127-6 would be connected to a circuit 155 or 156.

It is important to note that in fact the full wave Schottky diode bridge rectifier circuit 127 could have easily been replaced with any of the other three circuits 130, 136, and 141 of FIG. 15D, FIGS. 15E and 15F respectively; for circuit 130 the center tapped ground of the bipolar DC output would not be used in this case, in effect creating a voltage doubling circuit across the positive and negative outputs; circuit 136 would sum all the DC currents produced from each of the 4 coils in each VLEG unit; circuit 141 would sum all the DC voltages produced from each of the 4 coils in the VLEG unit. The final DC voltage and current output of the PCC would vary depending on which of the four circuits processed the AC power generated by the six groups of 4 coils and fed their outputs to either circuit 155 or 156 of FIG. 17, but the maximum total DC power output possible with appropriate load circuits would be approximately the same for a given quantity of wave input energy as would be expected as that parameter only depends upon the electrical characteristics of the VLEG itself.

Figure 18A:
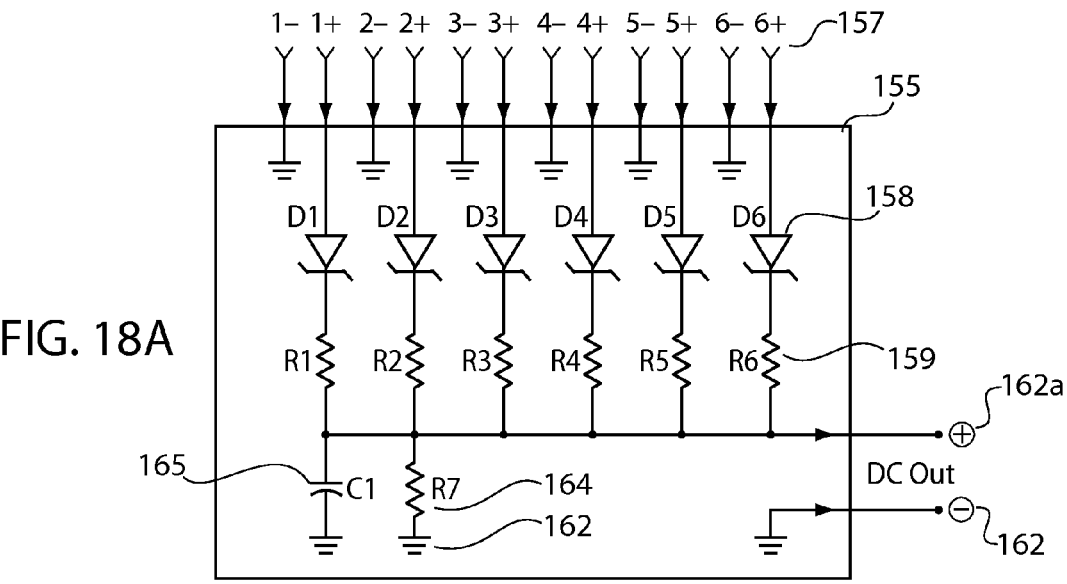
FIG. 18A illustrates the schematic diagram of the six DC current input current summing aggregator circuit of FIG. 17 in detail.
Figure 18B:
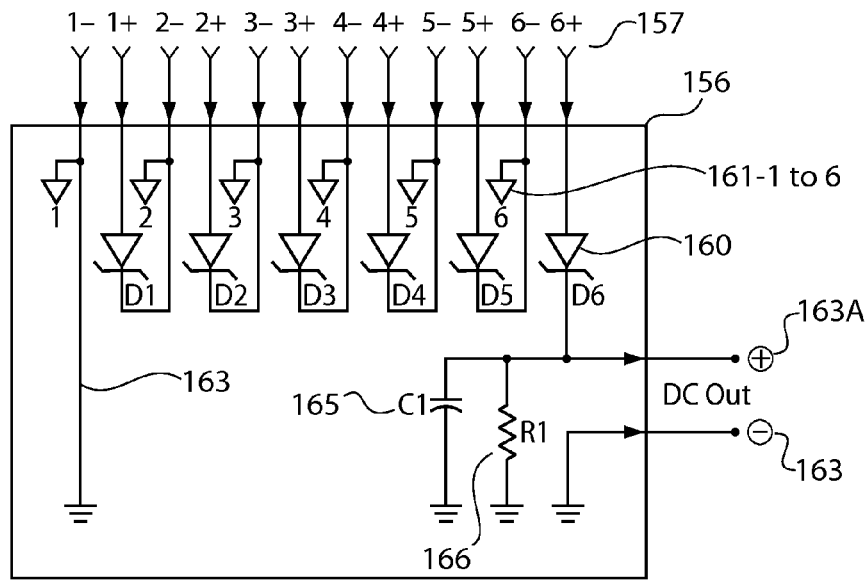
FIG. 18B illustrates the schematic diagram of the six DC voltage input voltage summing aggregator circuit of FIG. 17 in detail.

The electronic details of six input current summation circuit 155 and six input voltage summation circuit 156 depicted in FIG. 17 are illustrated in FIG. 18A and FIG. 18B respectively. In FIG. 18A, all 6 input pairs from the six 4-phase rectifier filter circuits 127-1 to 127-6 are directed in such a way that the negative inputs are grounded to circuit ground 162 and the positive inputs are directed through current directing Schottky diodes 158 D1-D6 via current balancing ballast resistors R1-R6 to the positive DC voltage output 162A. The Schottky diodes serve the function of preventing any back flow of current to any of the six 4-phase rectifier outputs if suddenly the voltage on one input line exceeded the voltage on another input line which would, without the diode, cause current to flow from the higher voltage input line into the lower voltage input line, that is back into the output of the 4-phase rectifier that had an instantaneous lower voltage output then another 4-phase rectifier. This would create highly unstable electrical currents in the output sections of the circuitry causing an undesirable and possibly even dangerous effect. Also, in the event that a coil or one of the 4-phase rectifiers develops a short, there would not be a massive inrush of current into the shorted input or coil, and if one coil or 4-phase rectifier circuit developed an open circuit, a large voltage would not be directed backwards to other portions of the PCC. The current summing function is carried out by ballast resistors R1 through R6 whose current balancing ensures that the voltage is constant at the same level at all points on the positive voltage output bus. C1 165 is a large filter capacitor of at least 10,000 microfarads to decrease DC ripple, and R7 is a bleeder resistor of 1K to 10K that discharges C1 after the EKS is turned off for maintenance purposes, but it should be a power resistor as the residual charge is much larger than with previous PCC examples already shown. The current delivered to the load resistance (not shown) is equal to the sum of the currents in the 6 input lines from the six rectifier circuits 127-1 through 127-6 and the measured voltage across the load resistance is approximately somewhat less than the sum of the instantaneous positive DC voltages on all of the input lines. Essentially six DC current sources are being connected in parallel into the load resistance. Note that this circuit is essentially a six input version of circuit 136 of FIG. 15E with the bridge rectifier filter sub-circuits from the input coils being replaced by the DC output voltages from the six rectifier circuits 127-1 through 127-6.

FIG. 18B illustrates a six input voltage summation circuit 156 in greater detail and it is essentially circuit 141 shown in FIG. 15F but now there are 6 DC input pairs from the six 4-phase Schottky diode full wave bridge rectifier filter circuits 127-1 through 127-6 instead of the 4 AC voltage inputs from the coils and their full wave bridge rectifier filter sub-circuits. The negative inputs of each input pair is connected directly to a local input ground 161-1 through 161-6, respectively. The positive input of input pair 1 from rectifier circuit 127-1 is connected to the local input ground 161-2 via Schottky diode D1, the positive input of input pair 2 from rectifier 127-2 is connected to the local input ground 161-3, via D2, the positive input of input pair 3 from rectifier 127-3 is connected to the local input ground 161-4 via D3, the positive input of input pair 4 from rectifier 127-4 is connected to the local input ground 161-5 via D4, the positive input of input pair 5 from rectifier 127-5 is connected to the local input ground 161-6 via D5 and the positive input of input pair 6 is connected directly to the positive output bus 163A via D6. The positive DC output voltage appears between circuit ground 162 that is tied to local ground 161-1 and the positive output terminal 162A and it is a sum of the instantaneous voltages present at any given time on the six positive input lines disregarding the tiny voltage drops across the Schottky diode junctions. Essentially, six DC voltage sources are being connected in series into the load resistance. Once again, capacitor C1 165 is large in excess of 10,000 microfarads and provides additional DC voltage filtering, and R1 is a bleeder power resistor of 1K to 10K draining charge from C1 when the apparatus is shut down for maintenance or other reasons.

Note that the six input current summation circuit 155 is a six input extension of the previously discussed four input current summation circuit 136 of FIG. 15E and the six input voltage summation circuit 156 is a six input extension of the previously discussed four input voltage summation circuit 141 of FIG. 15F. Note also, whereas the inputs to the circuits 136 and 141 of FIG. 15 E and FIG. 15F respectively were coil outputs, the inputs in the embodiment of the PCC of FIG. 17 are the DC outputs of a group of four phase AC full wave Schottky diode bridge rectifiers. Note further that input extensions of circuits 136 and 141 allow for any group of DC currents and voltages to be summed together into one current and voltage output source respectively and these inputs can be not only DC voltage and current outputs from any of the four circuits depicted in FIG. 15C through FIG. 15F, but any DC inputs of reasonable voltage and current from many types of electrical sources including batteries. Hence the configuration pattern potential of the Power Collection Circuitry embodiments of the present principles is remarkably robust and yet remarkably simple in configuration and advantageously combine DC input power sources in parallel into one output power source. Further, the embodiments of the present principles described herein are applied for the aggregation and energy harvesting of multiple parallel low and intermediate DC input power sources to a single DC output power source. The circuitry described herein is uniquely suitable and advantageous for dissipating wave kinetic energy by a large number of WEC repeating units of EKS apparatuses. However, it should be understood that this energy harvesting circuitry is by all means not limited to the application described herein. Indeed, any geometrical array of vibrational energy over a spatial region such as piezoelectrical generators, radiofrequency antenna receiver generators, geothermal thermoelectric generators and so forth using physical principles that are different from Faraday's law that underlies the functioning of the embodiments of the present principles described herein can be inputted into circuits 127, 130, 136, and 141 and networks of such circuits to allow for aggregation of low and intermediate level vibrational power sources into useable electric energy present within the confines of that space.

One other distinct advantage of circuits 127, 130, 136, and 141 is that the outputs of these circuits themselves can be used to fine tune and adjust the maximum output of the WEC VLEG. These circuits present an effective load resistance between their DC voltage outputs to the complexly wired FCA of the armature of the VLEG. This load resistance is mostly governed by what is connected to these outputs but also is affected by the PCC circuits themselves. The load resistance can be optimized for the effective coil resistance represented by the network of FCA coils even after all of the design parameters of the VLEG has been set by installing a monolithic switching DC to DC converter 148 of FIG. 18C across the DC outputs of the above-described circuits such has been done with the working prototypes of the present principles. By adjusting the output voltage of the converter, the effective load resistance facing the generator coils can be adjusted so that the effective load and coil resistances are approximately equal to each other, satisfying the maximal power transfer theorem, and the electromagnetic damping can be made approximately equal to the parasitic damping of the generator. This fine tuning of the VLEG power output thus helps achieve two conditions: 1) maximum efficiency of energy transferred to the load and 2) maximum power generated by the generator. The series of monolithic regulating converters by Dimension Engineering™ (DE-SW-ADJ3 (5-35V in, 3-13V out, 3A out) and DE-SWADJHV (5-60V in, 2-14V out, 1A out) are quite but not uniquely suitable for this application as they are >95% efficient, extremely and precisely adjustable, and may be placed in parallel for greater power handling ability. Placed in between the power collection circuits 127, 130, 136, and 141, and the load destination of the WEC, this component allows input wave kinetic energy to be dissipated to its maximum extent with all other variables held constant yielding the maximum amount of electrical power across the load with little loss of power in the converter.

Figure 18C:
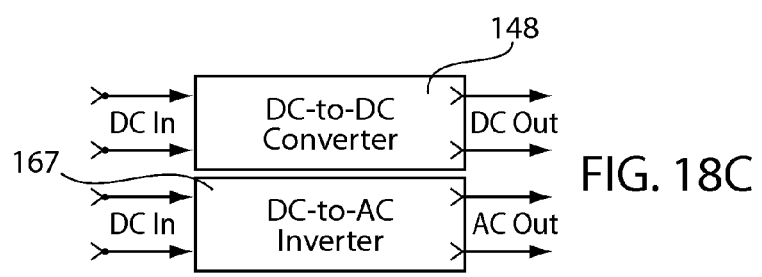
FIG. 18C illustrates the DC to AC inverter or DC to DC converter to which any of the summing circuits of FIGS. 16, 17, 18A, and 18B may be connected.

FIG. 18C illustrates that the DC output may be changed to a different DC voltage through DC-to-DC converter 148 or to AC of a desired voltage through DC-to-AC inverter 167.

Figure 18D:
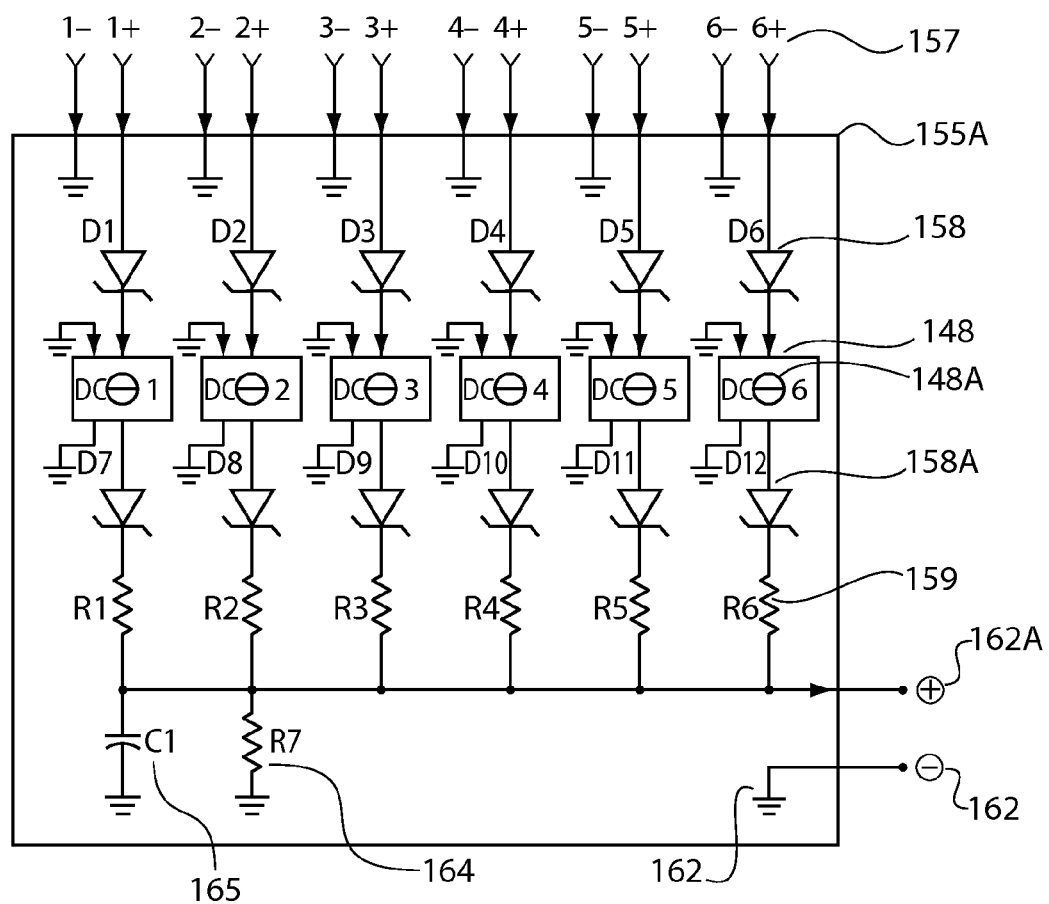
FIG. 18D illustrates a schematic diagram of an ultra precision embodiment of the current summing aggregator circuit illustrated in FIG. 18B.

FIG. 18D shows an unique ultra-precise configuration 155a of the 6 input current summation circuit 155 (FIG. 18A) version of circuit 136 in which the monolithic DC to DC circuit 148 (DC-1 thru DC-6) described above is placed in series after the current steering Schottky diodes 158 (D1-D6) and in series before a second set of current steering diodes 158a (D7-D12) placed in series with the current balancing ballast resistor 159 in each of the six circuit branches. Diodes 158 perform at least three functions—1) isolation of the DC inputs 1 through 6, 2) protection against short circuits and open circuits in the DC inputs, and 3) blockage of any reverse flowing currents back to the DC inputs. Diodes 158a perform at least four functions—1) isolation of the DC to DC converter outputs from each other, 2) protection against short circuits and open circuits in the DC to DC converter outputs, 3) blockage of any reverse flowing currents back into the DC to DC converters and 4) precise equalization of the voltage outputs at the junction of the diodes D7-D12 and the ballast current balancing resistors by precise manual adjustment of the converter output voltage, an inherent feature of the ten turn precision miniature potentiometer that is an integral part of these monolithic regulating switching converters by Dimension Engineering™, which reduces the ohmic losses in these resistors as they further equalize the voltage at all points on the positive DC output bus 162a. The fourth-described function of diodes 158a is accomplished precisely in this embodiment by the 10 turn voltage adjust control 148a on each DC to DC converter DC1 through DC6 which serves to precisely adjust the effective output load resistance presented to the FCA coils and it is this feature that gives this exemplary circuit such precision and reliability to summate a large number of parallel DC power input currents together into one stable DC output current with the maximum efficiency subject to the constraints of the Maximum Power Theorem. Diodes 158a (D7-D12) should be matched as closely as possible with respect to the voltage drop across their barrier junctions to accomplish this precise voltage equalization in the most effective manner; diodes 158 (D1-D6) do not have to be closely matched in the just described manner. Ballast resistors 159 (R1-R6), filter capacitor 165 (C1) and bleeder resistor 164 (R7) are as and function as previously described in circuit 157.

Of the power collection circuits 127, 130, 136, and 141, the current summation circuit 136 derives the most significantly advantageous performance from the configuration 155a of placing the DC to DC switching regulator converter 148 after each steering diode 158. In this six input configuration 155a variation of circuit 136, the output voltage at the junction of the positive output terminal of 148 and current balancing ballast resistor 159 can be balanced extremely precisely so that the six branch circuit voltage outputs are precisely equal at these junctions so that the ballast resistors can much more efficiently keep all points of the positive output circuit bus precisely at the same voltage. This in turn reduces power consumption of the ballast resistors and can more precisely balance the effective output resistance presented to the generator armature coils or to prior PCC circuits used in the power collection circuitry. It is important to note that this circuit allows for the use of batteries and other DC input sources that may be of different voltages to have their current inputs summed in parallel to one final summation output current with extreme constant precision and reliability against voltage and current output variations, shorts and open circuits in the input DC sources. Furthermore if one or more of the parallel DC input voltages drift in magnitude over time, the output DC voltage of circuit 157 will hold precisely steady. Thus, the parallel DC output currents of several WEC repeating units of the EKS may be combined together into one electrical cable using this preferred type of circuitry represented by configuration 155a if ultra precise and reliable current summation is desired. For power collection circuitry of individual coils in the FCA of individual VLEG's that would not ordinarily require the ultra precise version 155a of circuit 136, the circuit configuration of 136 in FIG. 15E would suffice. It is believed that this given configuration of current summation circuitry is a novel way of combining parallel DC input currents into a single summed output current. Note that the 4 terminal monolithic switching regulator DC to DC converter 148 employed here has only two input leads with one connected to circuit ground 162, and two output leads with one connected to circuit ground 162, giving this circuit tremendous simplicity. Furthermore, since each Dimension Engineering™ converter can handle an input DC voltage and current of 25 w, the six such inputs can be summed together to yield an output summation current that can be as high as 150 watts across the load between outputs 162 and 162a. The number of inputs as in the case of the other circuits can be extended to as many as desired simply by adding the corresponding identical components to additional identical branches for additional power output. Similarly suitable DC to DC converters of similar or higher power handling capacity may be substituted for the Dimension Engineering™ component used in the exemplary embodiments described here, though this switching regulating DC to DC converter is the preferred converter so chosen because of its monolithic compact structural form, its extremely high efficiency, the precise multi-turn potentiometer, its wide range of input and output DC voltages, stability, and its ability to have multiple such devices in parallel to handle even significantly more powerful DC input voltage sources. Such versatility, simplicity, precision, and power handling capacity for the art of summation of parallel low and intermediate magnitude sized DC currents to produce one summation output current in the configurations described herein is believed to be novel.

Figure 19A:
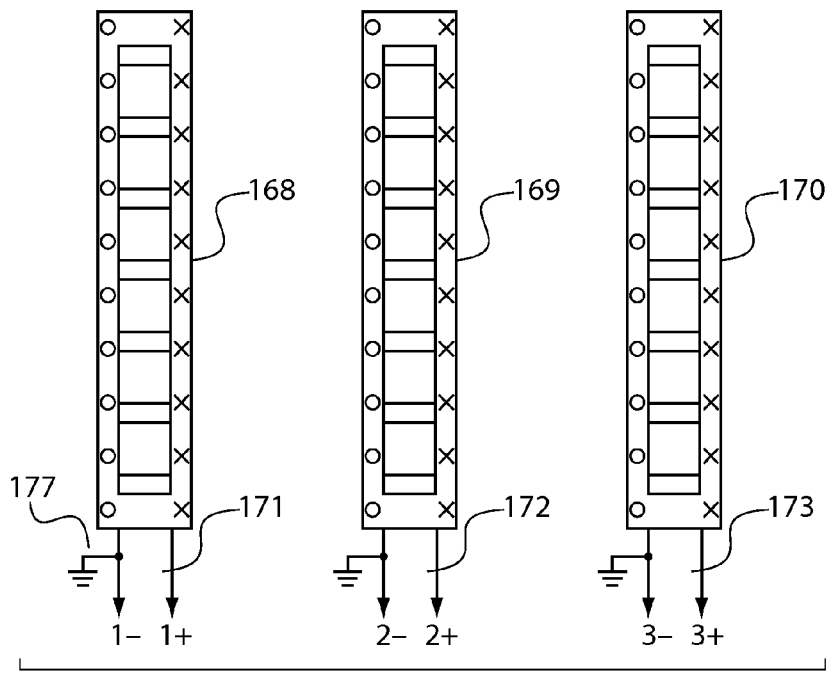
FIG. 19A shows 3 separate VLEGs, each with separate PCC circuits and outputs as a module representation.
Figure 19B:
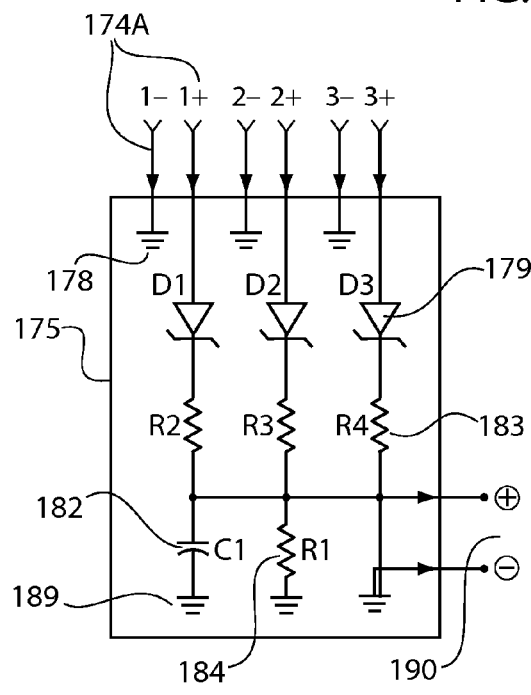
FIG. 19B shows a schematic diagram for the current summing aggregator circuit for the three VLEG's of FIG. 19A.
Figure 19C:
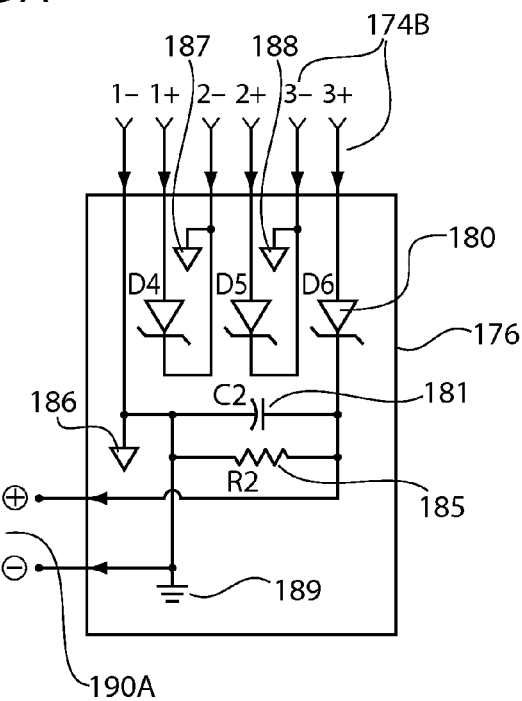
FIG. 19C shows a schematic diagram for the voltage summing aggregator circuit for these three VLEG's of FIG. 19A.

FIG. 19 is a further demonstration of the versatility of the PCC circuitry described in FIGS. 15 C, D, E, and F or FIGS. 16, 17, 18A, B, and D. FIG. 19A represents three separate VLEG units of order 3 (3 PMA structural magnetic units) in three separate WEC repeating components 168, 169, and 170 of a small three-WEC linear array EKS apparatus each containing a PMA rotor structure, a FCA stator structure, and a PCC whose output paired sets of positive and negative terminals are given by 171, 172, 173 with the individual output lines being given as 1− and 1+, 2− and 2+, 3− and 3+ respectively; each WEC has its own ground 177 going to circuits 175 and 176 as lines 1−, 2−, and 3−; the PCC for each VLEG of each WEC can be any of the PCC embodiments in FIGS. 15 C, D, E, and F or FIG. 16, FIG. 17, FIGS. 18A, B, and D. FIG. 19B represents circuit 175, a three input embodiment of the current summation circuit 136 of FIG. 15E with 3 sets of DC voltage inputs 174A from WEC's 168, 169, and 170, and FIG. 19C represents circuit 176, a three input embodiment of the voltage summation circuit 141 of FIG. 15F with 3 sets of DC voltage inputs 174B from WEC's 168, 169, and 170; all current balancing ballast resistors 183 (R2-R4), both filtering capacitors 181, (C1), and 182, (C2), respectively, and bleeder resistors 184, (R1), and 185, (R2), as well as current steering Schottky diodes 179 (D1-D3) for current summation circuit 175 and 180 (D4-D6) for voltage summation circuit 176 have the functions ascribed to them previously; 178 represents the input grounds (1−, 2−, 3−) to the current summation circuit 175; input DC voltage and current inputs 174B (1+, 2+, 3+), system grounds 189 and local grounds 186, 187, 188 are present for the voltage summation circuit as in previous circuit embodiments; output DC line pair 190 of the current summation circuit and output DC line pair 190A of the voltage summation circuit represent the final power output collection point of all of the 3 VLEG's in the 3 WEC's comprising a 3 WEC array of the present invention. Note that the 3 input version of circuit 155a of FIG. 18D representing the enhanced current summation circuitry can be substituted for current summation circuit 175 of FIG. 19B for enhanced reliability at the point of the final power output stage of the PCC for the array of WEC repeating units of the EKS. From that power collection point 190 or 190A of the entire PCC for the EKS apparatus, all of the available generated electrical power of the EKS apparatus is directed to a load application located on or off the EKS apparatus or both, a battery for energy storage, a DC to AC inverter, or another DC to DC converter for any output DC voltage that may be desired as well as power for illuminating the EKS apparatus at night and the video monitoring system. The PCC of either FIG. 19B or 19C can be extended to any number of DC input pairs from any number of VLEG's in any number of WEC's of any EKS apparatus of any shape, dimension, or geometric configuration.

Wave Energy Dissipation and Electrical Power Generation Parameters

Figure 20A:
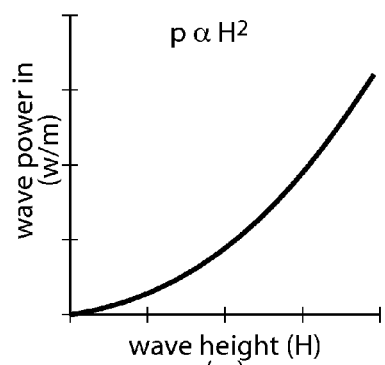
FIGS. 20A, 20B, 20C, and 20D illustrate the power output of a VLEG as a function of ocean wave height, ocean wave period, PMA magnet linear dimensions as volume, and the number of VLEG magnetic structural units in the PMA, respectively.
Figure 20B:
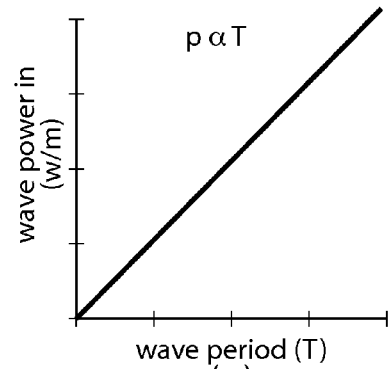
Figure 20C:
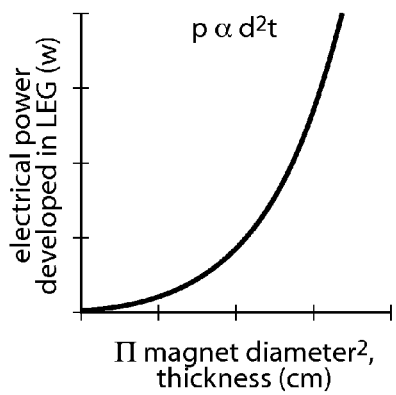
Figure 20D:
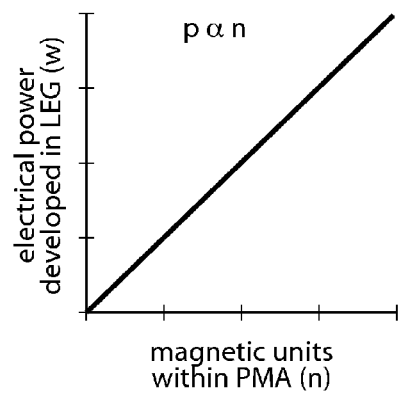
Figure 20E:
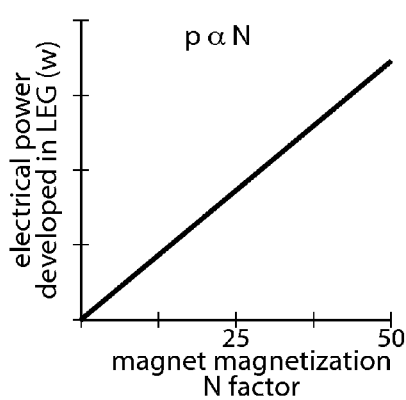
FIGS. 20E and 20F illustrate the power output of a VLEG of a given size as a function of the degree of magnetization of the magnets (N factor) and a function of the number of coils in the FCA and the number of VLEG structural magnetic units in the PMA, respectively.
Figure 20F:
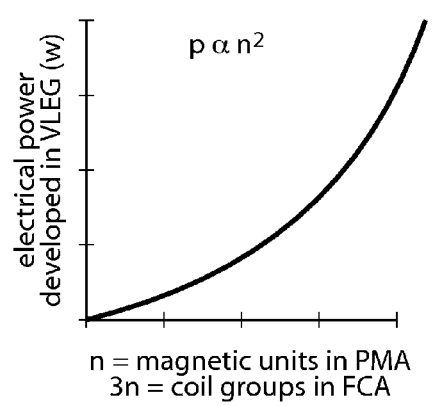

FIG. 20A shows the exponential square relationship of the incident power per meter of wave front of the waves impinging upon an EKS apparatus as a function of the significant wave height which is defined as the average statistical height of the highest one third of all wave heights that occur in a defined observed period of time. FIG. 20B shows the linear relationship between the incident power per meter wave front as a function of wave period. FIG. 20C displays the electrical power developed in the VLEG as a function of the product of the magnet cylinder diameter squared and magnet thickness and varies as a function of the cube of the linear dimensions of the magnets used in the rotor assuming the strength of the magnetization strength of each of the magnetic material is held constant. FIG. 20D shows that the electric power developed in the VLEG's is linearly related to the number of the basic VLEG structural magnetic units in the PMA. FIG. 20E shows that the electrical power developed for a given sized LEG is proportional in a linear manner to the N magnetization factor of the magnet which ranges from 0 (non-magnetized) to N52, the strongest NIB (NdFeB) rare earth magnets currently available commercially. FIG. 20F shows the peak electrical power developed by a VLEG consisting of one PMA of n structural magnetic units and 3n groups of 4 coils and it is proportional to n squared.

Figure 21:
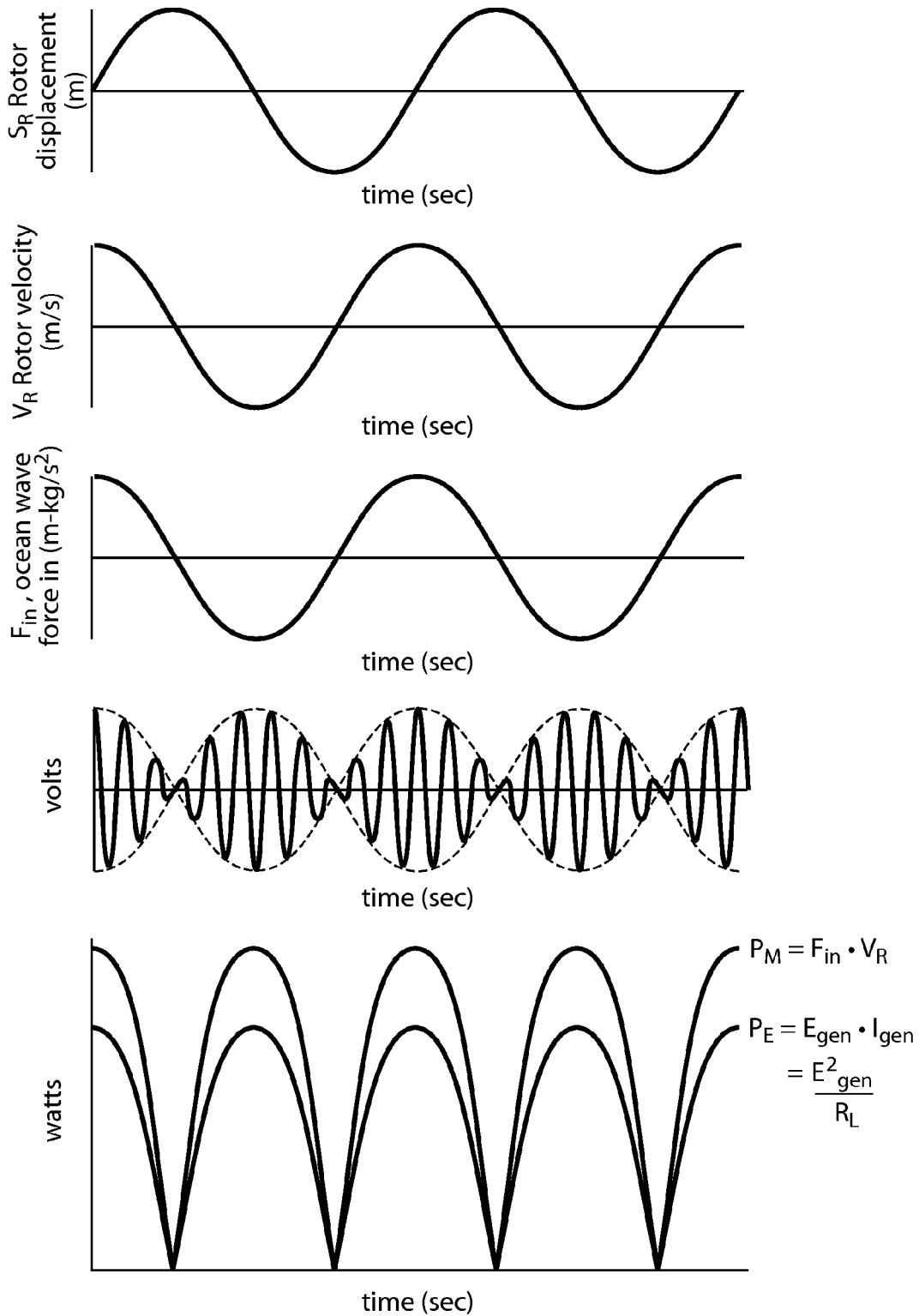
FIG. 21 illustrates the phase relationships between the vertical displacement of a VLEG rotor and its velocity and the force in to the WEC from the ocean wave, the voltage signal in the VLEG as a function of time, the mechanical ocean wave kinetic power, $P_M$, dissipated by the rotor, and the electrical power, $P_E$, developed in the VLEG by the relative movement of the rotor with respect to the FCA stator.

FIG. 21 shows the phase relationship between the wave force in on the WEC repeating component of an EKS and the velocity of the rotor; while the velocity of the rotor is in phase with the wave force on the WEC, the displacement of the rotor lags these two parameters by 90 degrees. The voltage developed in the FCA by the PMA is dependent on 4 temporal factors: 1) dependence upon the frequency of the modulated sine wave pattern of the wave input force; 2) the pole pitch, that is the distance between adjacent regions of repulsive magnetic fields and the end magnetic pole fields from the nearest repulsive magnetic region and this is dependent upon the thickness of the magnets and pole pieces used; 3) the frequency of the AC voltage generated in each coil equals the number of alternating polarity magnetic field region pairs that passes through that coil per unit time; 4) the summation of all the voltages generated in all the coils of the FCA at any point in time. Note that the period and shape of the waves impinging upon the EKS apparatus modulates and determines the shape of the complex voltage waveform produced by the other three factors. Finally, a graph of watts ($P_M$) developed in the rotor as kinetic energy, which can be shown to be equal to the product of the instantaneous value for the wave force in ($F_{in}$) on the WEC and the rotor's velocity ($V_R$), can be shown to be related to the electrical watts generated in each coil which is a product of the voltage generated in each coil and the current generated in each coil; for the entire VLEG, the electrical power generated=the product of the produced generator voltage and current, that is, $P_E = (E_{gen})(I_{gen})$ and $P_E$ is related to the load resistance where $P_E = (E_{gen})^2/R_L$.

Efficiency of the EKS Apparatus

The wave kinetic energy that is dissipated by the EKS apparatus and the resulting electrical power generated is dependent in a complicated manner on parameters that are either external to the EKS apparatus and characteristic of the ocean wave environment or parameters that are internal to the design and structure of the EKS apparatus itself. External factors include: the mechanical impedance matching between the EKS and the impinging waves; the period of the incident ocean waves (L); the depth of the ocean where the EKS apparatus is in place; the angle of wave incidence relative to the EKS apparatus (not applicable to omnidirectional circular or near circular geometric mesh EKS arrays); the number of rows of WEC repeating components of the EKS apparatus, the geometry of the WEC array, the total number of WEC's, and the force in ($F_{in}$) exerted by the incident ocean waves dependent both as a sinusoidal or approximately sinusoidal function of time and a quantity that is a product of the significant height ($H_{te}$) previously defined of the incident ocean waves, the depth constant ($\delta$), the cross sectional area of the buoy floatation collar of the mobile subunit (A), the density of water $\rho$, and the gravity acceleration, g; internal parameters of an electromagnetic or mechanical nature which affects the generator characteristic of electromagnetic damping, which include: the characteristics of the spring suspension system including spring constants; the structural shape, cross sectional buoyant area (A), and mass magnitude of the fixed and mobile subunits; compressed repulsive magnetic field PMA magnet shape, size, magnetization strength, and the repulsive pole interpole distance; FCA shape geometry, diameter and thickness of the coils, number of coils, wire gauge; magnetic flux leakage loss, hysteresis losses, eddy losses, and Lenz's Law losses; Ohmic resistance losses of the coil windings; diode junction voltage drops of the power collection circuitry; mass of the rotor; length of the rotor with respect to the length of the stator, the stroke volume traveled by the rotor and its relation to the significant height of the incident ocean waves, and the maximum velocity of the rotor relative to the stator; the structural geometric characteristics or order (order equals the product of the rows of PMA's, the number of magnetic units in each PMA, and the number of layers of PMA's) of the Electrokinetic Transducer used in the VLEG of the WEC repeating component; the flux gradient along the axis of vibration of the rotor; and air gap between the rotor and stator. Internal factors of a mechanical energy wastage nature which comprise the generator parameter known as parasitic damping include: frictional sliding losses of the rotor, air resistance to rotor movement, thermoelastic losses in the springs, and unwanted oscillation of the fixed subunit in response to the input wave. The present principles have dealt with ways to optimize all of these factors to enhance the performance of the exemplary embodiments disclosed herein.

All electrical generators, rotary and linear alike, have their electrical generation output affected by two parameters characteristic of every such generator, the electrical (voltage) constant ($K_E$) and the force constant ($K_F$). The force constant, $K_F$, is dependent upon the design and geometry of the generator and it is the proportionality constant in the Lenz's Law counter EMF force that attempts to oppose the rotor's velocity and acceleration and is given by $F_{leg}=(K_F)(I_{gen})$, where $F_{leg}$ equals the back EMF force on the rotor and $I_{gen}$ equals the current developed in the field coils of the generator. The electrical constant, $K_E$, is dependent upon such things as magnetic pole to field coil air gap, the geometry of the magnetic field, the geometry of the coil assembly of the generator, the armature concentration (which in the exemplary embodiments described herein is implemented by magnetic flux focusing by a repulsive field pole configuration rather than through the use of heavy ferromagnetic armatures) and the flux density of the magnetic field. It is related to the electromagnetic damping factor already discussed.

In order to discuss power output, it is necessary to refer to the equation of motion of VLEG embodiments of the present principles. In words, it can be stated that the wave force in ($F_{in}$) on the WEC mobile subunit is equal to the sum of the counteracting force of the mobile subunit ($F_{MSU}$, equal to the product of the mass of the water displaced by the mobile subunit and its acceleration or rate of change of its velocity, $dv_{pma}/dt$) plus the opposing force to due Lenz's Law counter EMF, $F_L$, opposing the motion of the rotor. In mathematical terms, this may be written as equation 8:

$$F_{IN}=F_{MSU}+F_L \text{ where } F_{IN}=0.5\rho g A H_{te}\delta \sin(\omega t),$$
$$F_{MSU}=\rho AL(dv_{pma}/dt), F_L=K_F K_E v_{pma}/R_L$$

and the mass of the water displaced by the mobile subunit=the mass of the subunit, and the velocity of the rotor PMA ($v_{pma}$) equals the velocity of the mobile subunit induced by the wave. This gives us the second order differential equation of motion for the VLEG:

$$0.5\rho g A H_{TE}\delta \sin(\omega t)=\rho AL(dv_{pma}/dt)+K_F K_E v_{pma}/R_L \qquad \text{Eq. 8:}$$

which when solved for the displacement of the mobile subunit (and rotor) with respect to time, thereby allowing the derivation for the equation for the peak and instantaneous power of the wave driven vertical oscillation of the rotor relative to the stator of the VLEG, it can then be shown that:

$$P_{Out}=(F_{IN}K_E)^2 R_L/2[(K_F K_E)^2+(\omega R_L \rho AL)^2] \qquad \text{Eq. 9A:}$$

$$P_{Peak}=(\rho g A H_{te}\delta K_E)^2 R_L/8[(K_F K_E)^2+(\omega R_L \rho AL)^2] \qquad \text{Eq. 9B:}$$

$$P_{Out}=P_{Peak}(\sin \omega t)^2 \qquad \text{Eq. 9C:}$$

where $P_{out}$=the instantaneous power output of the VLEG in watts which when integrated over time will yield the average power out, $P_{Peak}$=the peak power output in watts, $R_L$=the load resistance in ohms, $\rho$=the density of water in kg/m$^3$, g=the gravitational acceleration in m/s$^2$, A=the cross-sectional area of the oscillating subunit of the WEC repeating component of the corresponding EKS, the buoy floatation collar, which is exposed to the buoyant force of the incoming wave, $H_{te}$ is the significant wave height, $\delta$=a constant (depth constant) derived from the wave equation using the wave period, L, of the wave and depth of the ocean at that point and it decreases with depth, $\omega=2\pi/T_e$ where $\omega$ and $T_e$ is the angular frequency and period of the wave respectively, $K_F$ and $K_E$ are the force and electrical constants of the generator, L is the depth the buoy floatation collar of the fixed subunit is submerged beneath the ocean surface, $F_{IN}$ is the wave force exerted by the wave on the buoy floatation collar and is given by equation 8 and its associated equations above, and $s_r$ is equal to the rotor stroke length. If we assume that for the basic VLEG of a given size including a PMA having one magnetic structural unit consisting of two magnets in repulsive magnetic field configuration and two ferromagnetic pole pieces (an end pole piece and an interior repulsive field pole piece) plus one additional end pole piece and an FCA having 4 field coils whose width is approximately one quarter of the length of the cylinder formed by the magnetic structural unit as the preferred but not exclusive arrangement, $K_F$ and $K_E$ will have a constant value for every similarly designed and similarly sized basic VLEG unit. If each WEC is composed of a VLEG electrokinetic matrix transducer of order N where N is defined as previously, $$N=(2x+1)(y)(2z+1), \text{ integers } x \text{ and } z>=0, y>=1,$$

where N=the order of the VLEG Electrokinetic Transducer matrix equal to the product of the number of structural magnetic units in each PMA, the number of PMA's in each layer of PMA's, and the number of layers in each transducer matrix with the basic VLEG unit being of order 1, and given that there is one Transducer Matrix in each WEC repeating unit of the EKS apparatus in this example, and M is the number of WEC's in the EKS array apparatus, the instantaneous and Peak power generated for M such transducers in M WEC repeating components of the EKS is:

$$P_{Out}=(NM)P_{Peak}(\sin \omega t)^2 \text{ where } P_{Peak} \text{ is defined by}$$
$$\text{Eq. 9B above.} \qquad \text{Eq. 10:}$$

When we examine these equations, we see that the wave kinetic energy dissipation function will be optimized and electrical output power of the generator will increase and can be maximized by reducing generator constants $K_F$, $K_E$ by design adjustments to the internal parameters listed above, by adjusting the effective load resistance $R_L$ to equal the combined FCA generator resistance of each repeating component of the entire EKS apparatus as per the Maximum Power Theorem, by making A as large as possible and L as small as possible by design adjustments to the external parameters listed above and causing the mobile subunit to float as close to the ocean surface as possible where the greatest wave force and energy flow occurs, and by placement of the EKS apparatus in the ocean or any suitable body of water at a location having appropriate propagating waves of significant height subject to the maximum wave height and period consistent with the design considerations relating endurance and structural strength of the WEC repeating components. Making the submerged depth of the buoy floatation collar, $L_{wec}$, as low as possible is advantageous, and should be done so by significantly decreasing its mass, (mass (2)) which along with the mass of the rotor (M3) should be small relative to the fixed subunit mass (1) and thus, L, should be very small relative to the height of the buoy floatation collar which should be greater than $s_r$, the maximum rotor stroke distance; nevertheless, for every small decrement in depth that the buoy floatation collar can be submerged and placed closer to the ocean surface, the greater the force and hence the greater the kinetic energy that will be imparted advantageously to the rotor. This can be done by means of adjustment of the amount, shape, and volume of the buoyancy material keeping the buoyancy floatation collar afloat. A significant portion of the mass of the mobile subunit, which consists of the mass of the buoy floatation collar (M2) plus the mass of the rotor (M3), should reside in the rotor because, for a given wave height, the maximum kinetic energy developed in the rotor depends on its mass as well as the square of its developed velocity in response to the acceleration by the wave.

Efficiency of an EKS apparatus in dissipating ocean wave kinetic energy can be defined by the output amount of electrical power extracted by the EKS divided by the power in the wavefronts impinging upon the entire EKS across the line of intersection between the entire EKS covering a certain area of wave surface corrected in some cases for the angle of wave propagation. The first quantity is given by equation (8) above and the second quantity is given either equation (1) or its approximation, equation (2). However, since the WEC repeating components should be spaced apart in the water, much of the wavefront does not intersect a WEC and simply passes through it undisturbed. Furthermore, the fact that there may be multiple rows of WEC's and a wide variety of geometric shapes to the EKS, computing efficiency on this basis would be difficult.

A better procedure would be to define six possible efficiencies: first, the efficiency of conversion of electrical energy (or power) from the wave kinetic energy captured by the EKS array as a whole may be defined as the ratio of electrical power produced by the array to the wave kinetic energy (or power) incident upon the array. Second, the efficiency of each WEC repeating unit may be defined as the ratio of the amount of electrical energy (or power) produced by one WEC to the amount of kinetic energy (or power) incident upon that WEC. Obviously, the first efficiency will always be less than the second, as there are regions of space within the EKS array where the wave passes through undisturbed. Third, the efficiency of each WEC for the dissipation of kinetic wave energy (or power) impinging upon that WEC may be defined as the ratio of the wave kinetic energy (or power) captured by that WEC to the wave kinetic energy (or power) incident upon that WEC. Fourth, the efficiency of the entire EKS in dissipating wave kinetic energy may be defined as the ratio of the captured kinetic energy (or power) of all the WEC's together to the ratio of the incident wave kinetic energy (or power) upon the entire EKS array. Fifth, we may define the efficiency of the electrical energy (or power) conversion of the kinetic energy captured by each WEC as the ratio of the electrical energy (or power) output by that WEC to the kinetic energy (or power) captured by that WEC. Sixth, and finally, we may define the efficiency of the electrical energy (or power) conversion of the kinetic energy captured by the EKS array in its entirety by the ratio of the electrical energy generated by the array to the total amount of wave kinetic energy captured and dissipated by the array. As opposed to giving a detailed account of how to measure and calculate these six efficiencies, for purposes of brevity, a sample calculation for the first two efficiencies in an idealized simplified manner is provided:

1) First measure the maximum electrical power generated by all of the WEC repeating components together, that is the total electrical power generated by the EKS apparatus that is extractable to a load circuit whose resistance most closely matches the combined internal resistance of all the coil windings in all the FCA armatures in all the WEC repeating units in the EKS. This is $P_{ext}$. Then $2P_{ext}$ will be the total amount of electrical power generated including the 50% lost in the coil windings as per the maximal power transfer theorem. To compute this load resistance matching the internal resistance of the EKS, compute or measure it for one WEC unit, and then calculate the parallel resistance for all the WEC units together. One can also vary the load resistance of the EKS array and determine the maximal power output, known as the Maximal Power Point (MPP) for the WEC array. Once this measurement is obtained, using the Maximal Power Theorem, double this measured electrical power output to produce the total amount of electrical power produced in the EKS including the 50% I squared R ohmic losses in the coil windings. This will also give $2P_{ext}$. $2P_{ext}$ can also be obtained by measuring the maximum electrical output with a load impedance (resistance) matched for a single WEC, doubling that value, multiplying by the number of WEC's in the EKS; this is accurate if each WEC sees waves of approximately the same amplitude. However, for an EKS array with many parallel rows, the incident wave power and energy presented to any WEC will vary with the row that the WEC is located and hence the electrical output power will vary somewhat, and the calculations will be more complex. Note also that the Maximal Power Theorem really refers to impedance matching, but since the frequency of the AC power produced is so low given the low wave frequency, the impedance matching refers to load resistance matching with the EKS's FCA coil windings and the effects of inductance and capacitance can be largely ignored in this situation.

2) Next compute the Power Extracted. $P_{ext}$, for each WEC by dividing $P_{ext}$ by the number of WEC repeating units in the EKS array.

3) Determine the length of the line of intersection between the base of the floatation collar and the incoming wavefront. Since the WEC mobile subunit floatation collar is a round structure, one does not have to correct for the angle of incidence of the waves onto the WEC.

4) Compute the wave energy flux or wave power in w/m of wave front impinging on the WEC by using either equation 1 or its approximation equation 2 to compute the wave energy flux for the ocean around the WEC in w/m and then multiplying this quantity of power in w/m of wavefront by the length of the line of intersection of the mobile subunit floatation collar base with the impinging wave front. This is the average input wave power for each WEC.

5) Divide the quantity in step 2 by step 4 to give the efficiency of the conversion of incident wave kinetic energy to electrical energy by each WEC as defined by efficiency definition number two above.

6) Compute the total incident wave power that impinges upon the entire EKS array. First determine the widest cross section diameter of the area of ocean covered by the EKS array that is in a direction perpendicular to the direction of wave propagation. Then determine the wave power or wave energy flux that is present in the wavefront impinging that cross-sectional diameter to give the amount of wave power impinging upon the entire EKS array in KW/m using eq. 1 or its approximation eq. 2.

7) Divide the quantity $2P_{ext}$ of step 1, the total electrical power generated by the EKS array, by the total wave power incident on the entire EKS array calculated in step 6 to give the efficiency of electrical conversion as defined by efficiency definition number one above for the entire EKS array as a whole.

Note that these calculations can be done using either wave kinetic energy ($J/m^2$ of ocean surface) or wave energy flux (wave power) (w/m of incident wave front) and electrical energy (J) or electrical power (J/s). For short periods of time when the wave power incident on the EKS is relatively constant, the numbers obtained for the efficiency of electrical power conversion and for the efficiency of wave power dissipation would be equal to that of efficiency of electrical energy conversion, and the efficiency of wave energy dissipation.

This calculation can be run by a program executed by a hardware processor and stored on a computer-readable storage medium. Further, the calculation can be performed for any EKS apparatus, be it a single WEC alone in isolation, a linear row of WEC repeating units, or a mesh of WEC units of any arbitrary geometric shape or density of packing. Though to repeat, for meshes of more than a few rows or very densely packed arrays such as those of FIGS. 13 A, C, D, and F, more complex mathematical techniques should be employed. There is no need to correct for the angle of incidence between the wave propagation direction and the orientation of the array with respect to that direction for computation of the electrical power (energy) conversion efficiency for an individual WEC because that quantity is dependent upon the individual WEC repeating units that are omni-directional with respect to the waves because of their circular cross-section on the surface of the water. However, for computation of the efficiency of wave power (energy) dissipation of the EKS array as a whole, one merely has to know the maximal cross section diameter of the region of ocean encompassed by the array in the direction that is perpendicular to the direction of wave propagation.

The efficiency of electrical power transfer to the load of the WEC repeating component EKS apparatus can be increased and be maximized to a significantly high number, to as high as 90%, if, for each WEC unit, the load resistance that that WEC sees and thus for the EKS apparatus as a whole is made significantly higher than the combined internal resistance of all of the FCA coils of each of the WEC units composing the EKS, a situation in which a PCC circuit that delivers a higher voltage at a lower current would usually be used. However, the power output transferred to the load in this situation will not be a maximum in magnitude even as the efficiency might be quite high as per the constraints of the maximum power theorem. There are applications, however, that might involve somewhat lower generated voltages and somewhat higher generated currents where it might be desired to have the maximum electrical output be generated and delivered to the load even though the efficiency will be at a maximum of 50% as a result of the constraints of the maximal power theorem with the other 50% of the output power being wasted due to ohmic i squared r losses in the coil windings. Which option is chosen depends upon what is desired to be done with the electric power generated.

In the exemplary embodiments described herein, optimization of the total amount of wave kinetic energy dissipated via the most efficient production of electrical energy by each VLEG in each WEC repeating component of the EKS can be facilitated by optimization of the tremendous number of design parameters involving the coils of the FCA, the magnets of the PMA, the spring suspension system of series connected springs connected between three masses, the power collection circuitry, considerations regarding resonance frequency and mechanical impedance matching of the apparatus to that of the incoming waves to the closest extent possible, matching the electromagnetic damping factor as closely as possible to that of the parasitic damping factor, and the geometry of the component parts of the VLEG structure that have been discussed in the detailed description provided above.

In accordance with preferred embodiments, parasitic damping is minimized and hence the efficiency of the wave kinetic energy dissipation conversion process to electrical energy of the VLEG being enhanced in an advantageous decreased manner due to the mechanical configuration of the preferred exemplary WEC repeating components of the EKS embodiments which exhibit remarkable mechanical simplicity for wave energy converter devices; there are only two moving parts—a vibrating magnet or copper coil rotor suspended by springs and a floating buoy collar that vibrates with the incoming waves via a single sliding joint. There is no need for complex mechanical systems that intervene between the incident wave oscillation and the relative movement of the rotor with respect to the stator, in contrast to known WEC devices. The moving rotor is the component that directly converts the linear kinetic energy of ocean wave motion into electrical energy with a remarkable simplicity. There is no need for intermediate energy conversion components such as hydraulic systems, linear to rotary motion converters, bearing roller systems, air column compression systems, pump systems, separations of the rotor and the stator into different containment structure configurations, complex multiple hinge assembly systems, flywheel systems and other similar components. Hence, the survivability and durability in difficult marine environments including storms are enhanced.

For a given efficiency designed into the VLEG and the WEC repeating component of the EKS, the energy dissipation capacity of the present principles can be enhanced by varying the geometric shape of the array from a seawall to a geometric mesh energy dissipating platform whose density of WEC's can be made extremely high, especially if smaller WEC's are used to "carpet" a region of wave turbulent ocean without the need for any steering mechanism. It is believed that such geometrical versatility is a novel feature; embodiments of the present principles described herein may be applicable to all geometric shapes including circles, squares and higher order polygons, linear and ring arrays with the choice of design being dictated by whether the primary function is to protect structures behind an electrokinetic seawall and produce electricity as a byproduct of the dissipation of deleterious ocean wave energy or to use the WEC for the primary purpose of ocean wave power conversion to electrical energy via geometric mesh embodiments that are capable of being positioned, operated and monitored by remote means at points far out into the ocean away from environmentally sensitive shorelines.

It will be further appreciated by those skilled in the art that the figures representing the present principles are purely illustrative, and the exemplary EKS apparatuses and VLEGs may be implemented in any number of ways, including the protective and desirable dissipation of kinetic wave energy of ocean waves via conversion into useful electrical energy; furthermore, the functionality of the present principles as it relates to dissipating kinetic energy via the vibrational energy electrokinetic matrix transducer and its associated power collection circuitry may be extended to all forms of vibrational energy sources in the environment over a wide magnitude of vibrational amplitudes and to all applications where such vibrational energy sources may exist within the environment of oceans, other bodies of water, and in other spatial regions and environments, and which may be harvested using means as described herein.

Having described preferred embodiments of linear faraday induction generators, as well as various exemplary arrangements thereof, which are intended to be illustrative and not limiting, it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A linear generator, comprising:
a permanent magnet array, comprising:
a plurality of magnets affixed end-to-end, each of said plurality of magnets comprising an internal central channel, wherein the plurality of magnets are oriented such that like poles of the magnets are disposed adjacently;
a plurality of pole pieces positioned both at ends of the permanent magnet array and between adjacent magnets, each of said plurality of pole pieces comprising a threaded, internal central channel; and
a threaded support cylinder positioned within the central channels of both the plurality of magnets and the plurality of pole pieces, wherein the plurality of magnets are affixed by mechanical compression by the plurality of pole pieces engaging with threads of the threaded support cylinder;
a set of conductive coils arranged around the permanent magnet array;
a four-phase full wave rectifier configured to accept inputs of alternating current from the set of conductive coils and to produce one or more direct current outputs; and
a summing circuit configured to aggregate the one or more direct current outputs from the rectifier to produce a combined, rectified direct current output.

2. The linear generator of claim 1, wherein the four-phase full wave rectifier comprises Schottky diodes.

3. The linear generator of claim 1, wherein the four-phase full wave rectifier is a bridge rectifier, wherein first ends of each respective conductive coil in the set of conductive coils is are tied together and a second end of each conductive coil feeds a rectifier diode network.

4. The linear generator of claim 1, wherein the four-phase full wave rectifier comprises two full wave center tapped rectifier circuits, a first tapped rectifier circuit of the two tapped rectifier circuits is configured to separate out a positive half cycle for each phase and a second tapped rectifier circuit of the two tapped rectifier circuits is configured to separate out a negative half cycle for each phase.

5. The linear generator of claim 4, wherein the four-phase full wave rectifier produces a bipolar output.

6. The linear generator of claim 1, wherein the summing circuit is a current summing circuit with a plurality of inputs.

7. The linear generator of claim 6, wherein the current summing circuit comprises a set of monolithic direct current to direct current voltage converters connected in series between a pair of current steering Schottky diodes.

8. The linear generator of claim 1, wherein the summing circuit is a voltage summing circuit with a plurality of inputs.

9. The linear generator of claim 1, further comprising a plurality of additional sets of conductive coils and a respective rectifier for each set of the additional sets of conductive coils.

10. The linear generator of claim 9, wherein the summing circuit receives inputs from each of the rectifiers.

11. The linear generator of claim 1, wherein the set of conductive coils comprises four subsets of a plurality of conductive coils, with each coil in a respective subset being electrically connected in series with other coils in the respective subset, each subset being connected to an input of the four-phase full-wave rectifier.

12. The linear generator of claim 1, wherein the set of conductive coils comprises a plurality of subsets of four conductive coils per subset, with each subset of four conductive coils feeding a respective summing circuit via a respective four-phase full wave rectifier circuit.

13. The linear generator of claim 12, further comprising a second-layer summing circuit configured to sum outputs of each of the respective summing circuits for respective subsets of four conductive coils.

14. The linear generator of claim 13, wherein the second-layer summing circuit is a summing circuit with a plurality of inputs configured to produce a single direct current output.

15. An array of linear generators, comprising:
a plurality of individual linear generators, each having a single direct current output and each comprising:
a permanent magnet array comprising:
a plurality of magnets affixed end-to-end, each of said plurality of magnets comprising an internal central channel, wherein the plurality of magnets are oriented such that like poles of the magnets are disposed adjacently;
a plurality of pole pieces positioned both at ends of the permanent magnet array and between adjacent magnets, each of said plurality of pole pieces comprising a threaded, internal central channel; and
a threaded support cylinder positioned within the central channels of both the plurality of magnets and the plurality of pole pieces, wherein the plurality of magnets are affixed by mechanical compression by the plurality of pole pieces engaging with threads of the threaded support cylinder;
a set of conductive coils arranged around the permanent magnet array, the set comprising four subsets of a plurality of conductive coils, with each coil in a respective subset being electrically connected in series with other coils in the respective subset;

a four-phase full wave rectifier configured to accept inputs of alternating current from each subset of conductive coils and to produce one or more direct current outputs; and a summing circuit configured to aggregate the one or more direct current outputs from the rectifier to produce a combined, rectified direct current output.

16. The array of linear generators of claim 15, further comprising an array-level summing circuit configured to aggregate the combined direct current outputs of the plurality of individual linear generators to produce a single direct current output for the array.

17. A system of generator arrays, comprising:

a plurality of arrays of linear generators as recited in claim 16; and a system-level summing circuit configured to aggregate the single direct current outputs for the plurality of arrays to produce a single direct current system output.

18. An array of linear generators, comprising:

a plurality of individual linear generators, each having a single direct current output and each comprising:

a permanent magnet array comprising:

a plurality of magnets affixed end-to-end, each of said plurality of magnets comprising an internal central channel, wherein the plurality of magnets are oriented such that like poles of the magnets are disposed adjacently;

a plurality of pole pieces positioned both at ends of the permanent magnet array and between adjacent magnets, each of said plurality of pole pieces comprising a threaded, internal central channel; and a threaded support cylinder positioned within the central channels of both the plurality of magnets and the plurality of pole pieces, wherein the plurality of magnets are affixed by mechanical compression by the plurality of pole pieces engaging with threads of the threaded support cylinder;

a set of conductive coils arranged around the permanent magnet array, the set comprising a plurality of subsets of four conductive coils each;

a plurality of four-phase full wave rectifiers configured to accept inputs of alternating current from a respective subset of four conductive coils and to produce one or more direct current outputs; and a summing circuit configured to aggregate the one or more direct current outputs from the rectifiers to produce a combined, rectified direct current output.

19. The array of linear generators of claim 18, further comprising an array-level summing circuit configured to aggregate the combined direct current outputs of the plurality of individual linear generators to produce a single direct current output for the array.

20. A system of generator arrays, comprising:

a plurality of arrays of linear generators as recited in claim 19; and a system-level summing circuit configured to aggregate the single direct current outputs for the plurality of arrays to produce a single direct current system output.

* * * * *